MODULAR COMPUTER SYSTEM

Filed Nov. 30, 1962

INVENTORS
JAMES P. ANDERSON
SAMUEL A. HOFFMAN
LUCILE E. MOTT
STANLEY J. PEZELY
JOSEPH SHIFMAN
JOHN A. WILKINSON

BY Joseph P. Kates
ATTORNEY

INVENTORS.
JAMES P. ANDERSON
SAMUEL A. HOFFMAN
LUCILE E. MOTT
STANLEY J. PEZELY
JOSEPH SHIFMAN
JOHN A. WILKINSON

BY Joseph P. Kates
ATTORNEY

INVENTORS.
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY INVENTORS.
JAMES P. ANDERSON
SAMUEL A. HOFFMAN
LUCILE E. MOTT
STANLEY J. PEZELY
JOSEPH SHIFMAN
JOHN A. WILKINSON BY Joseph P. Kates
ATTORNEY INVENTORS.
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY INVENTORS.
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY INVENTORS.
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY INVENTORS
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY INVENTORS
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY INVENTORS.
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY Dec. 31, 1968 J. P. ANDERSON ET AL 3,419,849

MODULAR COMPUTER SYSTEM

Filed Nov. 30, 1962 Sheet 31 of 61

INVENTORS
JAMES P. ANDERSON
SAMUEL A. HOFFMAN
LUCILE E. MOTT
STANLEY J. PEZELY
JOSEPH SHIFMAN
JOHN A. WILKINSON
BY Joseph P. Kates
ATTORNEY

ABI LINE (BIT DEFINITIONS)

| 1 | 16 | 32 48 |
|---|---|---|
| FILE NAME/USER LINK/DEVICE NAME | MMDDDDDDSpFR/WØL/OWSI | POINTER |

M = MODE
0-DATA
1-PROGRAM AREA OR DATA AREA OR SIMPLE SUBROUTINE
2-DUMMY
3-REQUEST FOR SPACE OR I/O

D = DISPLACE-NUMBER OF LINES FROM PATH L

F = TELL WHETHER "FILE NAME (BEFORE READYING) OR USER LINK (AFTER READING)"
1-FILE NAME
0-USER LINK

R/W = SAYS WHETHER PROGRAM WILL READ OR WRITE FOR DETERMINATION OF MEMORY BOUNDS
0-READ
1-WRITE

Ø = OWN
0-NOT OWN
1-YES OWN

I/O = LOCK OUT-KEEPS PROGRAMS FROM READING AND WRITING IN SAME DATA OBJECT AT SAME TIME
0-NO LOCKOUT
1-YES LOCKOUT

W = BIT USED TO RESOLVE CONFLICTS BETWEEN SIMULTANEOUS READYING AND REMOVING
0-NOT WAITING
1-WAITING (SPACE, I/O, ETC.)

S = SNAG BIT
0-USABLE
1-NOT USABLE

I = INDIRECT BIT
0-NOT INDIRECT
1-INDIRECT

Sp = SPARE

FIG. 69

FIG. 75A
FIG. 75B

FIG. 75

FIG. 75A

| TYPE INSTRUCTION | | SYLLABLE LAYOUT ADDRESS LOCATION PROVIDED | | | INSTRUCTION | | SPECIFIC SYLLABLE LAYOUT | ADDRESS LOCATION | | | |
|---|---|---|---|---|---|---|---|---|---|---|---|
| | | A1 | A2 | A3 | | OCTAL CODE | | A1 | A2 | A3 | |
| "THREE-ADDRESS" | OPERATOR | OPERAND ADDRESS | OPERAND ADDRESS | STORE ADDRESS | BAD | 65 | 0 | (M) | (M) | (M) | (1) |
| | | | | | BDV | 60 | | | | | |
| | | | | | BMU | 61 | | | | | |
| | | | | | BSU | 64 | | | | | |
| | | | | | FAD | 67 | | | | | |
| | | | | | FDV | 62 | | | | | |
| | | | | | FMU | 63 | | | | | |
| | | | | | FSU | 66 | | | | | |
| | | | | | LAN | 56 | | | | | |
| | | | | | LOR | 55 | | | | | |
| | | | | | LXR | 54 | | | | | |
| | OPERATOR | OPERAND ADDRESS | OPERAND ADDRESS | BRANCH ADDRESS | ACE | 72 | 0 | (M) | (M) | B | (2) |
| | | | | | ACG | 71 | | | | | |
| | | | | | ACL | 70 | | | | | |
| | | | | | BRB | 26 | | | | | |
| | | | | | CEQ | 76 | | | | | |
| | | | | | CGR | 75 | | | | | |
| | | | | | CLS | 74 | | | | | |
| | OPERATOR | OPERAND ADDRESS | SPECIAL SYLLABLE | STORE ADDRESS | AIF | 40 | 0 | (M) | F | (M) | (3) |
| | | | | | BAF | 43 | | | | | |
| | | | | | BSF | 42 | | | | | |
| | | | | | LAF | 47 | | | | | |
| | | | | | LCF | 46 | | | | | |
| | | | | | LOF | 44 | | | | | |
| | | | | | LXF | 45 | | | | | |
| | | | | | SAF | 41 | | | | | |
| | | | | | SHF | 36 | 0 | (M) | S | (M) | |
| | | | | | SRM | 34 | 0 | (M) | $V_T$ | (M) | |

FIG.75B

| | | | | | | | | | | | |
|---|---|---|---|---|---|---|---|---|---|---|---|
| | OPERATOR | OPERAND ADDRESS | SPECIAL SYLLABLE | BRANCH ADDRESS | CEF<br>CGF<br>CLF | 52<br>51<br>50 | 0 | (E) | F | B | (4) |
| | | | | | CSE | 32 | 0 | (M) | C | B | (5) |
| | OPERATOR | SPECIAL SYLLABLE | SPECIAL SYLLABLE | BRANCH ADDRESS | XLC | 12 | 0 | I | I | B | (6) |
| | | | | | RPT | 10 | 0 | $R_c$ | $R_i$ | B | (7) |
| | OPERATOR | SPECIAL SYLLABLE | OPERAND ADDRESS | BRANCH ADDRESS | TIO | 16 | 0 | IO | M | B | (8) |
| "TWO-ADDRESS" | OPERATOR | OPERAND ADDRESS | STORE ADDRESS | | CBF<br>LCM<br>TRS | 25<br>24<br>35 | 0 | (M) | ($\underline{M}$) | | (9) |
| | OPERATOR | OPERAND ADDRESS | SPECIAL SYLLABLE | | LTF | 30 | 0 | (M) | T | | (10) |
| | OPERATOR | OPERAND ADDRESS | VARIANT SYLLABLE | | LSR | 31 | 0 | (M) | $V_s$ | | (11) |
| | OPERATOR | SPECIAL SYLLABLE | SPECIAL SYLLABLE | | SRJ | 14 | 0 | $J_a$ | $J_i$ | | (12) |
| | OPERATOR | VARIANT SYLLABLE | BRANCH ADDRESS | | BRC | 11 | 0 | L | B | | (13) |
| | OPERATOR | SPECIAL SYLLABLE | STORE ADDRESS | | STF | 15 | 0 | T | ($\underline{M}$) | | (14) |
| "ONE-ADDRESS" | OPERATOR | STORE ADDRESS | | | CLA<br>SER | 20<br>21 | 0 | (M) | | | (15) |
| | OPERATOR | BRANCH ADDRESS | | | UCT | 22 | 0 | B | | | (16) |
| "NO-ADDRESS" | OPERATOR | | | | HLT<br>IRR<br>NOP<br>RVS<br>SRR<br>SSD<br>SSU | 01<br>05<br>00<br>06<br>04<br>03<br>02 | 0 | | | | (17) |

United States Patent Office 3,419,849
Patented Dec. 31, 1968

3,419,849
MODULAR COMPUTER SYSTEM

James P. Anderson, Flourtown, Samuel A. Hoffman, Erdenheim, Lucile E. Mott, Ardmore, Stanley J. Pezely, Norristown, Joseph Shifman, Villanova, and John A. Wilkinson, West Chester, Pa., assignors to Burroughs Corporation, Detroit, Mich., a corporation of Michigan Filed Nov. 30, 1962, Ser. No. 246,855
20 Claims. (Cl. 340—172.5)

The present invention relates to a modular computing system. More particularly, the present invention relates to a command and control automatic data processing system. This inventive system is a completely modular system employing interconnected, functionally independent, multiple computer, memory, and input/output control modules in an expansible organization co-ordinated by an automatic operating and scheduling control system. The various functional modules provided by the system of the present invention are welded into a co-ordinated system which is electrically interconnected by switching interlock means. In this invention the switching interlock means in conjunction with the automatic operating and scheduling control system enable the inventive system's functionally independent computer modules, and input/output modules to utilize a shared memory which comprises a plurality of memory modules. All of the modules of the inventive system are interconnected to form a flexible system capable of multi and parallel processing. The inventive system herein provided schedules itself, insures its own maximum efficiency, adapts to real-time influence, adapts to changes in program priorities and growth in its work load without reprogramming, automatically bypasses its own malfunctions, and cannot be totally disabled by a single failure of a system element. A variable size system is provided by this invention wherein the number of modules depends entirely on the application. The user selects the system he needs immediately, and as requirements increase, additional modules are added to expand the total capability. Even though requirements may double over a given period, for example, a user need only install what is required at the moment. All additional modules are integrated with a minimum of down time only for interconnection and without change of the object program.

The inventive system is a computer and data processing system which can be freely organized and freely expanded, by use of its presented combinations of modular elements, to satisfy the changing needs of a command and control system for industrial, for business, or for military purposes. Its organization and built-in growth potential suited for command and control systems also tie in suitability for communication systems, such as space surveillance, traffic control systems, weather data collection, and reporting systems. The system has high speed, expansibility, adaptability, flexibility, and reliability.

The inventive system adapts instantly to a real-time environment. It is particularly suited to applications where large quantities of data are to be processed and where a large number of diversed tasks are to be performed. It provides means and methods for parallel processing and automatic programming.

The inventive system is a totally modular system. It is organized for a specific application by combining an appropriate complement of computer modules, memory modules, input/output modules, and a common exchange of input and output devices, and for compatability, peripheral transposers to provide harmonious coupling interconnection between the fixed output interface of the universal input/output control modules and the various peripheral input and output devices of the system. The system provides variability and capability of adding modules to itself without affecting existing object programs.

In the inventive system the computer modules, memory modules, and input/output control modules are functionally independent of one another and are interconnected through a switching interlock. The system is controlled by an automatic operating and scheduling control means and method. The computer modules and input/output control modules are connected to the memory modules by the switching interlock through data transfer busses which are computer busses and input/output control unit busses. The input and output devices are interconnected with the input/output modules through an input/output exchange which in the illstrative embodiment accommodates up to 64 devices.

It is difficult to discuss disadvantages and deficiencies of prior art systems inasmuch as the present invention presents a second generation of computer systems which is a pioneer as an integrated, yet completely modular system with freely interchangeable control by each of its plurality of computers, its means to electronically interconnect various types of each of the modules, and its automatic operating and scheduling features and since for the first time, it enables performance of complex functions associated with a complete command and control computer system. Therefore, since there are no anticipatory prior art systems and methods of the nature of this invention, discussion of prior art systems and their disadvantages and deficiencies can only be made generally by a reference to known or possible projections of known computer techniques.

The most obvious prior art system scheme which might be made to perform a command and control function or similar function, is the single-computer system. This scheme fails to meet the availability requirement necessary for complex systems also because the failure of any part-computer, memory, or input/output control, disables the entire system.

Other prior art systems involve duplication, triplication, etc. of single-computer systems to obtain availability and greater processing rates. Initially, this approach appears attractive, inasmuch as programs for the application may be split among two or more independent single-computer systems, using as many set systems as needed to perform all of the required computations. Even the availability requirements seem satisfied, since a redundant system may be kept in idle reserve as backup for the main function.

These prior art, single-computer systems attacked a set of programs serially wherein a first program was followed by a second program, etc. When the computer capacity was saturated, a total program load could not be run in the time available. Accordingly, in such cases a brute force approach was employed. That is, more computers were added and the work load divided. This multi-computer approach can be used effectively only where the individual programs in the work load are unrelated.

On closer examination, it is apparent also that such a system has many disadvantages for complex operations such as required for command and control applications. Besides requiring considerable human effort to co-ordinate the operation of the system, and considerable waste of available machine time, the replicated single-computers are ineffective wherever data and programs need be presented in highly interrelated fashion. Further, the steps necessary for the backup system to take over the main function, should the need arise, is cumbersome, particularly in time-critical applications where constant monitoring of events is required.

The possibility of a partially shared memory wherein some storage is shared and some storage is privately allocated to individual computers, would appear to be advantageous in the data protection seemingly provided by having some memory private to each computer. However, even this advantage vanishes when necessary to exchange data between computers, because where computer failure occurs, the contents of the private memory of that computer is lost to the system. Furthermore, many tasks in complex applications such as command and control applications require access to the same data.

The system of the present invention not only goes this far, but also recognizes and solves the difficulty where an appreciable private memory of the same speed as the shared memory is incorporated. This difficulty is that, for example, where it was required to make some privately stored data available to the fully shared memory or to another private memory, in such a system data transfer time would be lost. Moreover, utilization efficiency is lost in such a system, since some private memory may be unused, while another computer may require more memory than is directly available, and may be forced to transfer other blocks of data back to bulk storage to make way for the necessary storage. If the invention stopped here, while steps forward would be taken by its other features there is the problem that input/output control unit complements provide additional similar questions of decreased overall availability and decreased efficiency.

Master-slave schemes exist which incorporate a master computer of different character than the others. Such a system is described in the article "Organizing a Network of Computers To Meet Deadlines," A. L. Linear, W. A. Notz, J. O. Smith, and A. Weinberger, Proceedings, Eastern Joint Computer Conference, December 1957. Another master slave scheme involves a master computer having basic design features which are similar to the others, but which differs in its prescribed role. Such a configuration is described in the article "The RW–400 A New Polymorphic Data System," R. E. Porter, Datamation, Vol. 6, No. 1, January/February 1960, EP. 8–14. Such a scheme shows appreciation of the need for employing multiple computers. The solution of co-ordinating the processing efforts of more than one computer by a master computer presents several difficulties.

The loss of the master computer downs the whole assembly. This makes such an assembly of computers inadequate for complex operations such as command and control because such an assembly cannot meet the availability requirement. The system is vulnerable in that a failure in the master computer disables the entire system. Even if attempt to overcome this weakness were made by providing means so that the master control function could be automatically switched this is not satisfactory because of the inefficiency inherent in this procedure.

This means provides further disadvantages in that where the work load of the master computer becomes very large, the master computer becomes a bottle-neck resulting in inefficient use of all other elements of this assemblage. On the other hand, where the work load fails to keep the master computer busy, a waste of computer power results because the specialized master computer works only part time.

The present invention overcomes these and other deficiencies of prior art systems and in addition provides many additional advantageous features. In the present invention the computing function is decentralized by providing a plurality of computing units. This decentralization is effected in a co-ordinated configuration which fulfills the availability requirement that the computer be available for use at all times substantially. The memory system is completely shared by all processors. Hence data is freely communicable among these computers. Input/output control functions are decoupled from any particular computer or computers. This enhances availability and efficiency. The several computers, totally shared memory and decoupled input and output units provided in this invention is a perfect structure for satisfying the adaptability requirements for performing complex functions such as command and control. The inventive structure provides flexibility of control to enable dynamic, highly variable, processing requirements to be met. The system configuration of this invention realizes its full computational potential in providing means to co-ordinate its many system elements to behave at any given time like a system specifically designed to handle the tasks with which it is faced at that time. It provides means wherein the operating system program can be decoupled from any specific computer since in the system of the present inventions the entire memory is directly accessible to all computer modules. Enhanced programming flexibility is achieved in the invention by means whereby master computer functions can be effected by a method comprising steps of which are translated to directions stored in the total shared memory provided for in the invention. The equality of responsibility among the computing units provided by the inventive system, which allows each computer to perform as the master when running the operating system, enables identical computer modules, freely interconnectible to a set of identical memory modules and a set of identical input/output control modules, the latter, in turn, freely interconnectible to a highly variable and diverse input/output complement. The complete modularity of system elements provides an effective solution to the problem of expansability, enabling such expansion simply by adding modules identical to those in the existing complement. This enables important advantages of economy and manufacture, maintenance and spare parts provisioning. The totally modular organization of the invention enables redundancy of the required complement of any module type, as, for example, where greater reliability is needed, to be easily achieved by incorporating as little as one additional module of that type in the system. Furthermore, the additional module of each type need not be idle, the system is operating thereby with active spares. Parallel processing and automatic programming are provided by this invention.

The following co-pending U.S. Patent applications are assigned to the assignee of the present invention and provide additional background information concerning module and component features to facilitate understanding of the description herein. These patent applications are incorporated by reference as a portion of this specification: U.S. patent application Ser. No. 89,525, for "Computer System," filed Feb. 15, 1961, by Warren W. Hopper, Stanley J. Pezely, Leonard H. Sichel, Jr., Ronald B. Lounsbury, and Patricia V. Zimmerman; U.S. patent application, Ser. No. 241,273 for "Computer," filed Nov. 30, 1962 by Lucile E. Mott, Ronald B. Lounsbury, Blair C. Thompson, S. Peter Beauregard, James L. Murtaugh, Jr., and August A. Sardinas; U.S. patent application, Ser. No. 241,421 for "Data Processor Input/Output Control System," filed Nov. 30, 1962 by Stanley J. Pezely, Leonard H. Sichel, Jr., Raymond Hallman, and Cornelius C. Perkins, now U.S. Patent No. 3,274,561, issued Sept. 20, 1966; U.S. patent application, Ser. No. 241,225 for "Automatic Interrupt System for Data Processor," filed Nov. 30, 1962 by Blair C. Thompson, Cornelius C. Perkins, Joseph Shifman, and Stanley J. Pezely, now U.S. Patent No. 3,286,239, issued Nov. 15, 1966; U.S. patent application; Ser. No. 226,895, for "Magnetic Memory System," filed Sept. 28, 1962, by Albert M. Bates, now U.S. Patent No. 3,271,741, issued Sept. 6, 1966; U.S. patent application, Ser. No. 224,344, for "High Speed Alternating Current Fault Sensing Circuit," filed Sept. 18, 1962, by Albert P. Fegely, now U.S. Patent No. 3,239,718, issued March 8, 1966; U.S. patent application, Ser. No. 229,328, for "High Speed Direct Current Voltage Fault Sensing, Indicating and Load Protecting Apparatus," filed Oct. 9, 1962, by Albert P. Fegely, now U.S. Patent No. 3,225,257, issued Dec. 21, 1965; and U.S. patent application, Ser. No. 217,009, for "Supporting Apparatus," filed Aug. 15, 1962, by Leon Mayon and Robert H. Riches, now U.S. Patent No. 3,146,047, issued Aug. 25, 1964.

The system of the invention employs freely interconnected functionally independent, multiple computer memory, and input/output control modules in an expansible organization co-ordinated by an automatic operating and scheduling control means and method. The inventive system has the capacity to monitor and direct the operation of a large man and/or machine complex either for industrial or military purposes. The system of the invention is particularly suited to applications where large quantities of data are to be processed and where there is an enormous quantity of diverse, but interrelated tasks to be performed. These tasks may arise in real time. The inventive automatic data processing system comprises a fully integrated co-ordinated control data processing facility to provide such command and control capacity. The inventive system is capable of memory sharing in interlocked communicational relationship therewith of requestor modules. The requestor modules comprise the computers and the input/output control modules. The inventive system schedules itself, insures its own maximum efficiency, adapts to changes and growth in its word load without reprogramming, and diagnoses and automatically bypasses its own malfunctions. It cannot be totally disabled by a single failure of a system element of module. It is capable of providing special function such as servicing displays and of dealing with communication facilities whether located on or under land or sea and in outer space. The invention herein provides means whereby most of the system is always available. Except where supported by alternates in a few cases, the inventive system uses no system elements which perform functions so critical that failure of such system elements could compromise the primary system functions.

The inventive modular processor system is made up of functionally independent modules interconnected to form a flexible highly efficient system. It overcomes the deficiencies of prior art systems by providing a totally modular computing system which gives the ultimate approach in digital computer organization. It is expansible in such a manner that adaptability is enabled to handle both more of the same function and to incorporate new functions. Both of these expansions may be accomplished in this system with little or no transitional downtime resulting. Expansion is possible without providing more capability than needed at a given time. The ability of the system to grow to meet demands applies to computational units as well as memory, and input and output devices. This invention eliminates need for reprogramming of old functions upon expansion of the data processing facility. The invention also enables new functions to be easily incorporated into the overall system. By planning to achieve this capability of the invention, programs may be written in a manner which is independent of system configuration or problem mix. These programs, also can be interchangeable between sites in different geographic local areas which perform like tasks.

A large volume of routines must be written for a command and control system. In the inventive system, it is possible for many different people in different locations and of different areas of responsibility, to write portions of programs and for the programs to be subsequently linked together by the computer operating system. The system of the invention is oriented toward the use of a high-level procedure-oriented language which, while possessing the features of usual algorithmic languages for scientific computations, may also include provisions for maintaining large files of data sets. The inventive system is made such that the data sets may not need to be as carefully structured.

Thus, the inventive system provides the basic three requirements of availability, adaptability, and expansibility.

In the inventive system a plurality of computer modules, a plurality of memory modules, and input/output control modules are interconnected through a switching matrix and respond to an automatic operating and scheduling means and method. This means and method incorporates the feature of coding and permanently storing operating and scheduling and method steps and information in predetermined sections in a totally shared memory. Access to the shared memory is gained by each computer as needed to determine work assignments. The scheduling function is thus implemented by storage of the process in memory locating it by programming techniques. Optionally, the scheduling means and method of the invention can be implemented in specialized wired in circuitry. In the inventive system the programmer need not schedule. Instead, he specifies the rules by which scheduling may be accomplished. Each module schedules itself, spontaneously establishing temporary master/slave relationships with other computers for parallel operations. No major element is tasked with performance of critical functions. Those functoins which are vital to system operations are performed by simple passive equipment which can be easily and inexpensively duplexed to provide absolute system protection.

The automatic operating and scheduling control method is coded and stored in totally shared memory. The automatic operating and scheduling control method is operated upon by each computer only as needed to determine work assignments. Each computer schedules itself, establishing master/slave relationships with other computers. This provides optimum handling of parallel operations. Hardware failure simply reduces the on-line equipment configuration, permitting normal operations to continue at a reduced rate. The inventive system, thus has no central elements, whose failure could immobilize the entire system. For example, failure of a switching interlock component only effects the operation of a single module with which it is associated. The automatic operating and scheduling method may be protected by locating it in several memory modules.

A switching matrix applicable to use in the present invention is described in the aforementioned incorporated copending patent application, Ser. No. 89,525, of Hopper, Pezely, Sichel, Lounsbury, and Zimmerman, for "Computer System". The switching interlock in the illustrative embodiment of this inventive system is distributed physically through all the modules. The switching interlock effects electronically each of the many brief interconnections by which all information is transferred among computer, memory, and input/output control modules.

The switching interlock is the focus of data flow within the system. It provides automatic parallel routing and control of intermodule communication and interrupt systems. The interlock resolves communication conflicts by scheduling, not by buffering. It accomplishes its function with a comparatively small amount of circuitry and without delay either in cases of no conflict or where there are conflicting messages by an in built system of priorities.

As brought out in applicant's assignee's last-mentioned patent application, in addition to the electronic switching function, the switching interlock has the ability to detect and resolve conflicts such as occur when two or more computer modules attempt access to the same memory module.

The switching interlock consists functionally of a cross-point switch matrix which effects the actual switching of bus interconnection, and a bus allocator which resolves all time conflicts resulting from simultaneous requests for access to the same bus or system module. Conflicting requests are queued up accordingly to the priority assigned to the requestor modules.

Priorities are pre-emptive in that the appearance of a higher priority request causes service of that request before service of a lower priority request already in the queue. Queuing probabilities of queues longer than one are very unlikely.

The priority scheduling function is performed by the bus allocator, essentially a set of logi:al matrices. The conflict detector detects the presence of conflicts and requests for interconnection. The priority matrix resolves the priority of each request. The logical product of the states of the conflict and priority matrices determine the state of the queue matrix, which, in turn, governs the setting of the cross-point switches unless the requested module is busy.

The switching interlock when employed with the embodiments herein disclosed is distributed throughout the system to impart true modularity and permits system to continue operating despite failure of one or more modules. This switching interlock is passive in the absence of conflicting demands to thereby permit communication of information therethrough normally.

Throughout the description, herein provided, for the sake of brevity the term input/output meaning input and/or output will be abbreviated by employing the designation "I/O".

In a first preferred illustrative embodiment configuration of this invention, a maximum of 4 computer modules, a maximum of 16 memory modules of 4,096 words each, a first group of a maximum of 10 high speed input/output control modules, a switch interlock, an input/output exchange unit, and 64 input and output channels for a maximum of 64 input and output units are provided .

The inventive system connects computer modules with the memory modules and interconnects the I/O control modules, with each of the memory modules via the switch interlock. The I/O exchange unit is provided for communication between I/O control modules and a maximum of 64 channels to which input and output devices are connectible.

In a second illustrative embodiment, 3 computer modules, the first and a second group of 10 high speed I/O control modules are provided, the latter on an additional input/output exchange. The I/O exchange unit provided between the I/O devices and the I/O control devices is a communication and control medium.

The inventive system herein described enables simultaneous processing of a plurality of programs. An automatic operating and scheduling control system is provided and this allocates module assignments to provide maximum efficiency and program flexibility. This automatic operating and scheduling control system employs a system operating method which is properly reduced to coded information which may be stored in totally shared memory and therefore be available to any computer. The coded information provides a sequence of steps which the requestors effect only as needed to exert control over the system. The automatic operating and scheduling system includes means to provide its own executive routine for an operating system, which can call out additional routines as required. The configuration of the automatic operating and scheduling control permits variation from application to application both in sequence and quantity of available routine and in disposition of storage.

The automatic operating and scheduling control operates effectively on two levels, one for system control, the other for task processing.

The system control function embodies everything necessary to fetch system programs and associated data from some location in the I/O complement, and to ready the programs for execution by finding and allocating space in memory, and initiating processing. The system control function does the task processing function also, provides elaborate bookkeeping for programs being run, programs that are active and are permitted to occupy main memory space, I/O commands being executed, other I/O commands waiting, external data blocks to be received and decoded, and activation of the appropriate program to handle such external data.

The automatic operating and scheduling control system of the invention will be described in detail hereinafter. However, some idea of its scope can be obtained from the fact that some of its major functions comprise: configuration determination, memory allocation, scheduling, program readying and end-of-job cleanup, reporting and logging, diagnostics and confidence checking, and external interrupt processing.

The task processing function of the automatic operating and scheduling control is to execute all program I/O requests in order to centralize scheduling problems and to protect the system from the possibility of data destruction by ill-structured or conflicting programs.

In executing its functions, the automatic operating and scheduling control system is responsive to a comprehensive set of interrupts. All interrupt conditions are transmitted to all computer modules in the system. Each computer module can respond to any interrupt condition common to all computers and to any interrupt unique to itself. Responsibility for interrupt conditions may be distributed to different computer modules by the interrupt mask register provided for each computer that controls the setting of individual bits of the interrupt register. The occurrence of any interrupt causes one of the system computer modules to leave the program it has been running and switch over to taking charge of automatic operating and scheduling functions. The computer enters a control mode for this purpose. The control mode differs from the normal computer operating mode in that it locks out the response to some interrupts although keeping a record of them and it enables the execution of additional instructions reserved for use in performing the automatic operating and scheduling function. Some interrupts which are never locked out or never masked are power failure, real time clock updating, parity error, no access to memory, illegal instructions and halt.

The interrupts may be caused by normal operating conditions including such conditions as external requests, completion of an I/O operation, a real-time clock overflow, array data absent, computer-to-computer interrupts, and control mode entry upon normal mode halt. Interrupts may also occur because of abnormalities of either program or equipment including attempt by the program to write out of bounds, arithmetic overflow, illegal instruction, inability to access memory, or an internal parity error, primary power failure, automatic restart after primary power failure, and I/O termination other than normal completion.

Control of all I/O activity is also within the province of the automatic operating and scheduling control system. Records are kept on the condition and availability of each I/O device. The location of all files in the computer system whether on magnetic tape, drum, disc file, card, or other external inputs and outputs are also recorded. A request for input by file name is evaluated, and, if the device associated with this name is really available, the action is initiated. If for any reason request must be deferred, it is placed in a program queue to await conditions which permit its initiation.

Typical conditions which cause deferral of an I/O operation include: (1) no available I/O control module or channel, (2) the device in which the file is located is presently in use, and (3) the file does not exist in the system. The system provides means wherein where the file does not exist in the system the message is typed out on a supervisory printer asking for the missing file.

The I/O complete interrupt signals the completion of each I/O operation. Along with this interrupt, an I/O result descriptor is deposited in an automatic operating and scheduling control table. The status relayed in this descriptor indicates whether or not the operation is successful. If not successful, what went wrong, for example, a parity error, a tape break, card jams, etc., is indicated so that the automatic operating and scheduling control may initiate the proper action. If the operation is successful, any waiting I/O operations, which can now proceed, are initiated.

The automatic operating and scheduling control system allocates module assignment and governs the sharing of memory by the I/O control modules and by the computer modules. This provides program flexibility and maximum efficiency in that concurrent operation of all computer and I/O control modules is provided for.

This scheduling in the inventive means and method relies upon a job table maintained by the automatic operating and scheduling control. Each entry is identified with a name priority, precedence requirements, and equipment requirements. Priority may be dynamic, depending upon time, external requests, other programs, or a function of many variable conditions. Each time the automatic operating and scheduling control system is called upon to select a program to be run, whether as a result of the completion of a program or of some other interrupt condition, the job table is evaluated. In a real-time system, situations occur wherein there is no system program to be run, and time of components in the system is available for other uses. In the inventive system, means are available whereby this time can be used for auxiliary functions, such as confidence routines. By means in the automatic operating and scheduling control system, the means and methods of the invention provides capability for program segmentation at the discretion of the programmer. Control macros embedded in the code of directions inform the automatic operating and scheduling control that parallel processing with two or more computers is possible at a given point. In order to effect this, it must be specified where the branches indicated in this manner will join after the parallel processing is completed.

As indicated, memory is shared by the I/O control modules and by the computer modules, and concurrent operation of all computer and I/O control modules may be provided. Since memory, as well as the other units, is also divided into modules, direct simultaneous memory access is provided to all computers and to the input/output exchange, input/output control module configurations and a system of queuing is provided where two requestor modules require the same memory module at the same time.

A requestor module is defined as either a processor module or an I/O control module which is attempting to gain access to memory.

The invention further provides additional automatic control of intermodule communications. It is adaptable to incorporate an automatic interrupt system. The inventive system has incisive self-diagnostic capability and responsive thereto it employs the automatic operating and scheduling control means for automatic bypass of faulty modules.

The inventive system may operate at a multimegacycle clock rate. The illustrative embodiment operates at a three megacycle clock rate. The illustrative embodiment operates with a 49-bit word, comprising 48 data bits including sign plus a parity bit.

Within computer modules of the illustrative embodiment system are identical, general purpose, arithmetic and control units. They present internal structure such that all programs and data are arbitrarily locatable to simplify the storage allocation function of the automatic operating and scheduling means, and secondly, insure that programs are not modified during execution. The latter consideration minimizes the amount of work required to preempt a program, since that all that has to be saved to reinstate the interrupted program at a later time is the data for that program and the register contents of the computer module running the program at the time it is dumped.

The instructions of the computer of the system of the invention herein described comprises a variable-length syllable string which permits intermixed 0-, 1-, 2-, and 3-address operation, 3-level general indexing, and deep n-level indirect addressing, where *n* is any number. A separate fast-access, thin-film memory including an implicitly addressed accumulator stack used in conjunction with the arithmetic unit is provided. The fast-access memory includes a number of registers such as the program base register, data base register, index registers, limit registers, etc. Manual, automatic and program interrupts are provided. In operation, the arithmetic unit of the computer operates parallelly and the arithmetic operation overlaps memory access. The instruction format includes fixed-point, floating point, logical and partial-field commands and a character field operation repertoire.

The computer module arithmetic unit operates in parallel but receives data from the switching interlock in serial-parallel form. The thin-film register storage and operand stack of each computer operates in the illustrative embodiment at a three megacycle clock rate to greatly reduce the required accesses to memory modules. The command list of the computer includes binary fixed- and floating-point arithmetic instructions. Computer organization is oriented towards sufficient floating-point computation. As stated, the addressing structure of the computer is designed to incorporate the power of a 3-address machine. However, less than the maximum of three addresses can be processed with each instruction, thus saving instruction time and program storage. Instructions are specified by strings of 12-bit syllables. A program instruction may consist either of a single operation syllable or of a complex syllable string. Four program syllables are stored in each memory location for maximum program packing efficiency. However, instruction strings need not conform to normal word boundaries.

The computer module is more fully described in the aforementioned copending patent application Ser. No. 241,273 for Computer, of Mott, Lounsbury, Thompson, Beauregard, Murtaugh, and Sardinas.

The memory modules provided in the illustrative embodiment are linear-select, word-organized, homogeneous, random-access, ferrite-core storage configurations with 4096, 49-bit words provided per module and utilizable under extreme environmental conditions. Sixteen memory modules, each pair with an individual power supply and all necessary electronics to control the reading, writing and transmission of data are provided, as separate power supply, etc., for each module is contemplated also. The memory modules are small enough to minimize conflicts where one or more requestors attempt access to the same memory module, and large enough to keep the cost of duplicated power supplies and addressing logic within bounds. Variations in size are contemplated where more suitable. The cost of individual small units of memory is offset by the lessening of catastrophe in the event of failure of a module. The memory modules have a four micro-second read/write cycle repetition rate. Each memory module is directly addressable by any computer or by any of the I/O control modules. In the illustrative embodiment construction, two memory modules with a common power supply can be placed in one cabinet. The sixteen memory modules provide 65,536 words in memory.

The input/output control module comprises essentially control and data manipulation registers and associated decoding and timing circuits. Each is capable of controlling any device of its I/O complement and there can be as many simultaneous I/O input/output operations as there are I/O control modules.

The input/output control modules control any type of input/output device. They accept instructions from any of the computer modules and effect data transfer from memory to the I/O exchange concurrent with an independent computer operation. The I/O control modules are capable of simultaneous operation. Upon certain conditions arising, they generate interrupts which are recognizable by any of the computer modules.

The I/O control module executes I/O operations defined and initiated by computer module action. In keeping with the system objectives, I/O control modules are not assigned to any particular computer module, but rather are treated in much the same way as memory modules with automatic resolution of conflicting attempted accesses made via the switching interlock function. Once an I/O operation is initiated, it proceeds independently until completion.

I/O control module action is initiated by the execution of a transmit I/O instruction in one of the computer modules, which causes an I/O descriptor word to be delivered from a memory location address by the computer to an inactive or not busy I/O control module. The I/O descriptor is an instruction to the I/O control module that selects a device, determines the direction of data flow, the address of the first word, and the number of words to be transferred.

Interposed between the I/O control modules and the physical external devices is a cross-bar switch designated the I/O exchange. This automatic exchange is similar in function to the switching interlock. The automatic exchange permits two-way data flow between any I/O control module and any input or output device in the system. It further enhances the flexibility of the system by providing as many possible external data transfer paths to each input/output device as there are I/O control modules.

The input/output exchange automatically connects the control modules with specified input/output devices on command from the computer module. A console, effectively an input/output device, displays system status to the operator and permits him to effect inquiries and manual interrupt.

The input/output complement is 64 input/output channels per input/output exchange. This provides a total of 64 input and output devices in the first illustrative embodiment which has one I/O exchange and 128 or $2\times64$ input/output channels for the second illustrative embodiment which has two I/O exchanges. The illustrative embodiment programs "on-line" operation of the input/output devices. These input/output devices may comprise an operating or system status console, high-speed magnetic tape transports, card punches, card readers, paper tape perforators and readers, an electrostatic printer, supervisory printers, a page printer, high speed line printers, magnetic drums, intersystem data links, high-speed card punches, magnetic disc files, high speed line printers, special real time clocks, etc. Others which might be included comprise analog-to-digital converters, digital-to-D.C. analog converters, digital-to-A.C. analog converters, synchro-to-digital and digital-to-synchro converters.

The present invention presents the above-mentioned and many other advantages over prior art systems. In general, the present invention provides a completely modular processor and means and methods associated therewith capable of automatic parallel processing and automatic programming and which surpasses all competitive present and presently foreseeable computing systems in many features including expansibility, adaptability, flexibility and reliability.

Accordingly, an object of the present invention is to provide a truly modular computer system.

Another object of the present invention is to provide a modular processor system which is organized for built-in growth potential and well suited for a number of applications involving complex and voluminous data processing and computer operations.

Another object of the present invention is to provide a modular processor organizable for specific applications and including appropriate complementary computer modules, memory modules, input/output control modules, input/output devices, and a common exchange between I/O control modules and I/O devices.

Another object of the present invention is to provide a modular computer system based upon an automatic operating and scheduling control system wherein coded methods for scheduling and for operation upon the occurrence of certain events are stored in a totally shared memory and this is operated upon by each computer only as needed to determine work assignments, wherein each computer schedules itself, establishing temporary master/slave relationships with other computers for optimum handling of parallel operations.

Another object of the present invention is to provide a truly modular processor system wherein hardware failure simply reduces the on-line equipment configuration, permitting normal operation to continue at a reduced rate and wherein no central elements are provided whose failure could immobilize the entire system.

Another object of the present invention is to provide a modular computer system with improved modules and rapid-access features adaptable for binary fixed- and floating-point arithmetic instructions with efficient floating point computation.

Another object of the present invention is to provide a modular processing system which reacts instantly to real-time influence, to new programs, to changes in program priorities and which adapts to manual or automatic interrupt signals and the operational structure of which permits broad programming flexibility and efficient operation and program storage and which provides comprehensive man/machine communication.

Another object of the present invention is to provide a substantially completely modular computing system wherein memory is divided into modules which may be used concurrently by all computer and input-output exchange busses and presenting modular contained means wherein conflicts of gaining access are resolved according to priority and wherein memory may be shared.

Another object of the present invention is to provide a module processor system of computers, and input-output control units which in turn control input and output units wherein a means and method are incorporated which automatically operates the requestor module computers and I/O control modules and causes time-sharing of memory and wherein the system has automatic interrupt capability to recognize programmed and hardware-generated interrupt conditions caused by situations arising in the execution of a program, which will recognize manually-initiated requests and automated-external requests for communication with the computer system and also recognizes equipment faults to cause transfer of control of the interrupted computer from the object program to an automatic operating and scheduling means which handles the condition and then after the interrupt condition has been satisfied returns control to the object program.

Another object of the present invention is to provide a modular computer system which is unique in its orientation towards both military and industrial applications, which utilizes advanced circuit packaging and logical techniques which is adaptable to both machine language programming and automatic programming, which is provided with interrupt conditions for emergencies, and for a plurality of unique interrupt conditions to cause an automatic operating and/or scheduling control system to take over, which is capable of a normal mode of operation for running object programs and an interrupt mode during which system scheduling by the automatic operating and scheduling control means and method is implemented.

Another object of the invention is to provide a totally modular computer system with superior module structure and methods and means of integration of the system comprising in conjunction with a modularly incorporated switch interlock system and an I/O exchange, an automatic operating and scheduling means and method to enable complex computing of associated parallel programs such as required in command and control and communications applications.

While the novel and distinctive features of the invention are particularly pointed in the appended claims, a more expository treatment of the invention, in principle and in detail, together with additional objects and advantages thereof, is afforded by the following description and accompanying drawings, in which:

FIG. 1 is a partially pictorial and partially schematic diagrammatic representation of an illustrative embodiment of the invention showing a five bus system incorporating three computer modules, a switch interlock, four memory module cabinets comprising eight memory modules, a first automatic input/output exchange, four input/output control module cabinets comprising eight input/output control modules, and a complement of input and output units, said system being freely expansible as illustrated to include optionally first a second automatic input/output exchange and attendant input/output control modules and erminal equipment; or second, a fourth computer, the system being further freely exapnsible to a full complement of optionally additional included input/output control modules to a total of ten per input/output exchange to a total of 16 memory modules and to a total of 64 input/output units;

FIG. 2 is a block representation of a preferred illustrative embodiment of the invention, showing the system of FIG. 1 expanded to full complement size, the arrow denoting the options of a fourth computer or a second input/output exchange with an additional full complement of up to ten additional input/output control units and up to sixty-four additional input and output devices.

FIG. 3 comprises FIGS. 3A and 3B taken in side-by-side relationship with FIG. 3A to the left, FIG. 3A and 3B together providing a cabling and block representation of the system of FIG. 2, the preferred illustrative embodiment system of the invention;

FIG. 4 comprises FIGS. 4A and 4B in side-by-side relationship with FIG. 4A to the left, FIGS. 4A and 4B together presenting a block diagram of any of the computer modules of the preferred illustrative embodiment of the invention;

FIG. 5 comprises FIGS. 5A and 5B at the top left and top right respectively and FIGS. 5C and 5D at the bottom left and bottom right respectively, FIGS. 5A, 5B, 5C, and 5D forming a composite block diagram representative of any of memory modules of the preferred illustrative embodiment of the invention;

Figure 2:
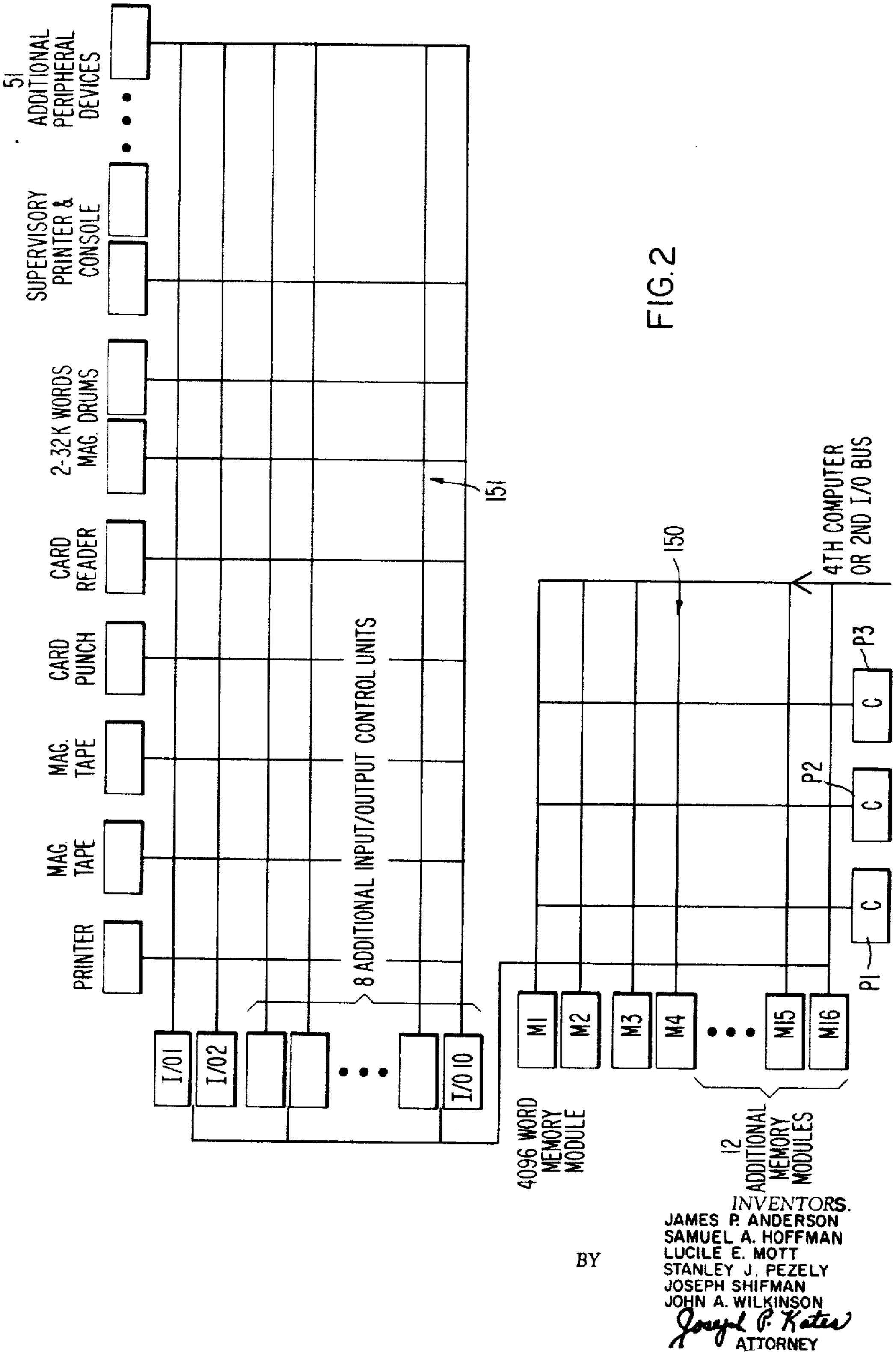
Figures 5, 5C:
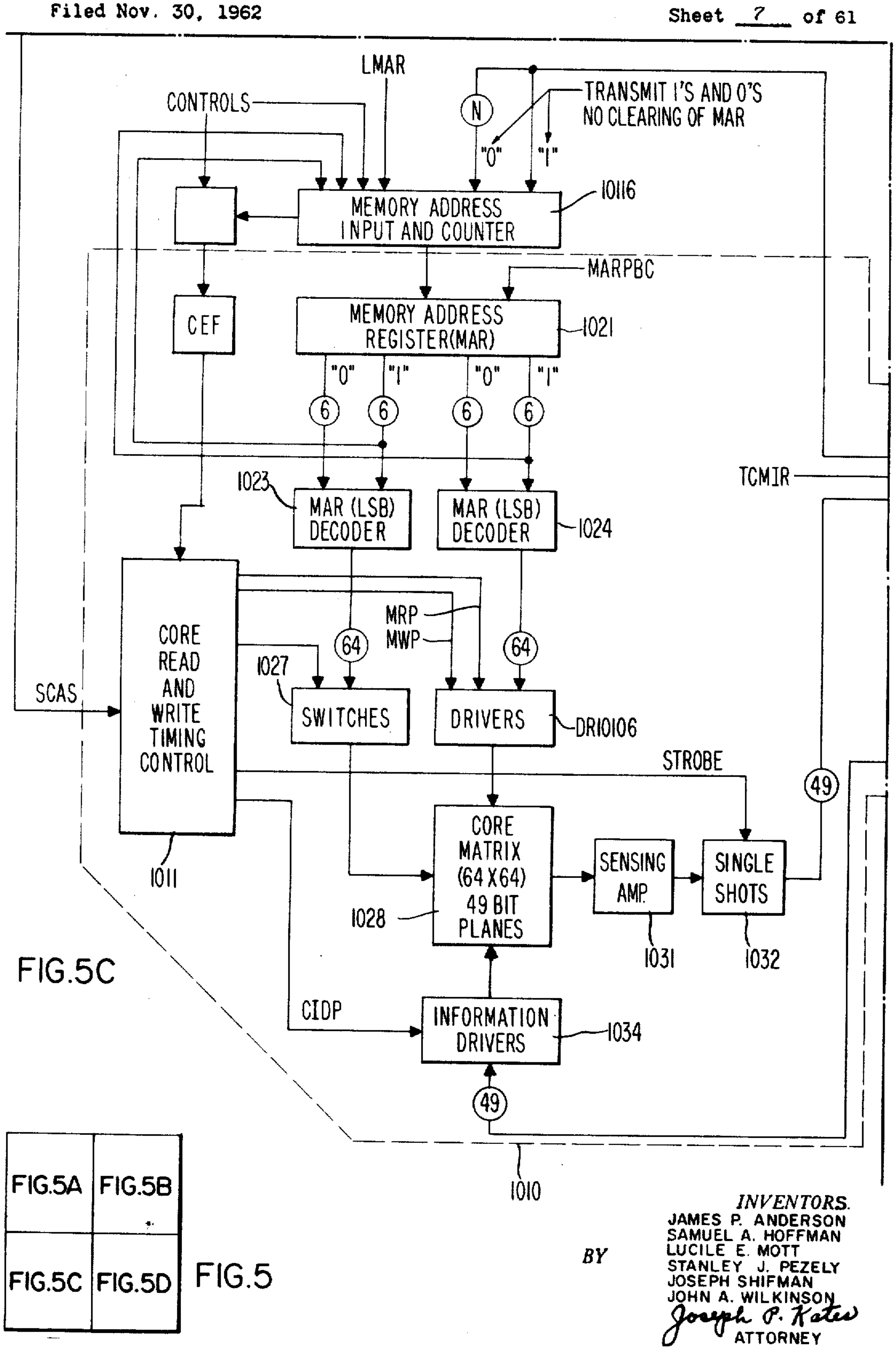
Figure 5A:
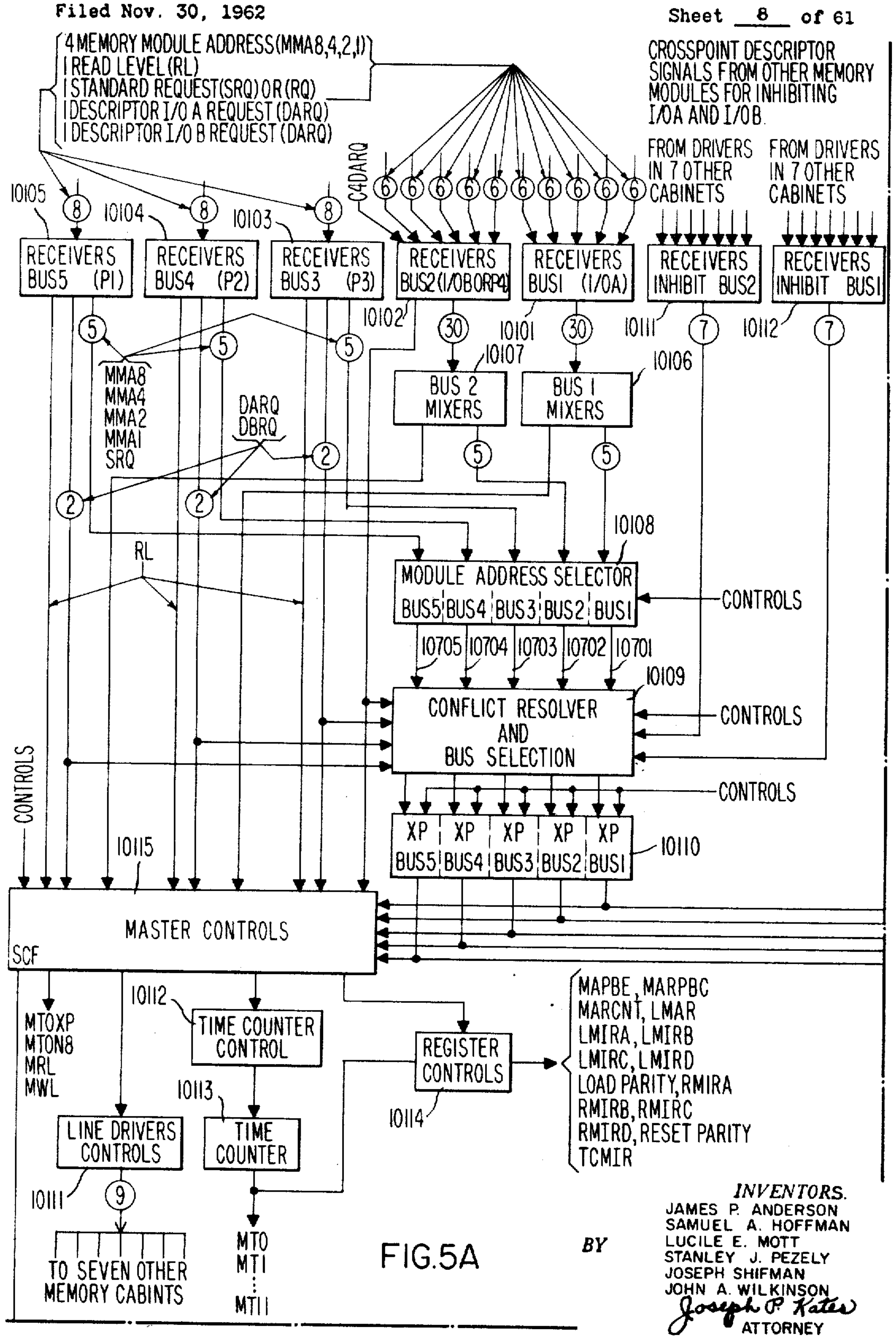
Figure 5B:
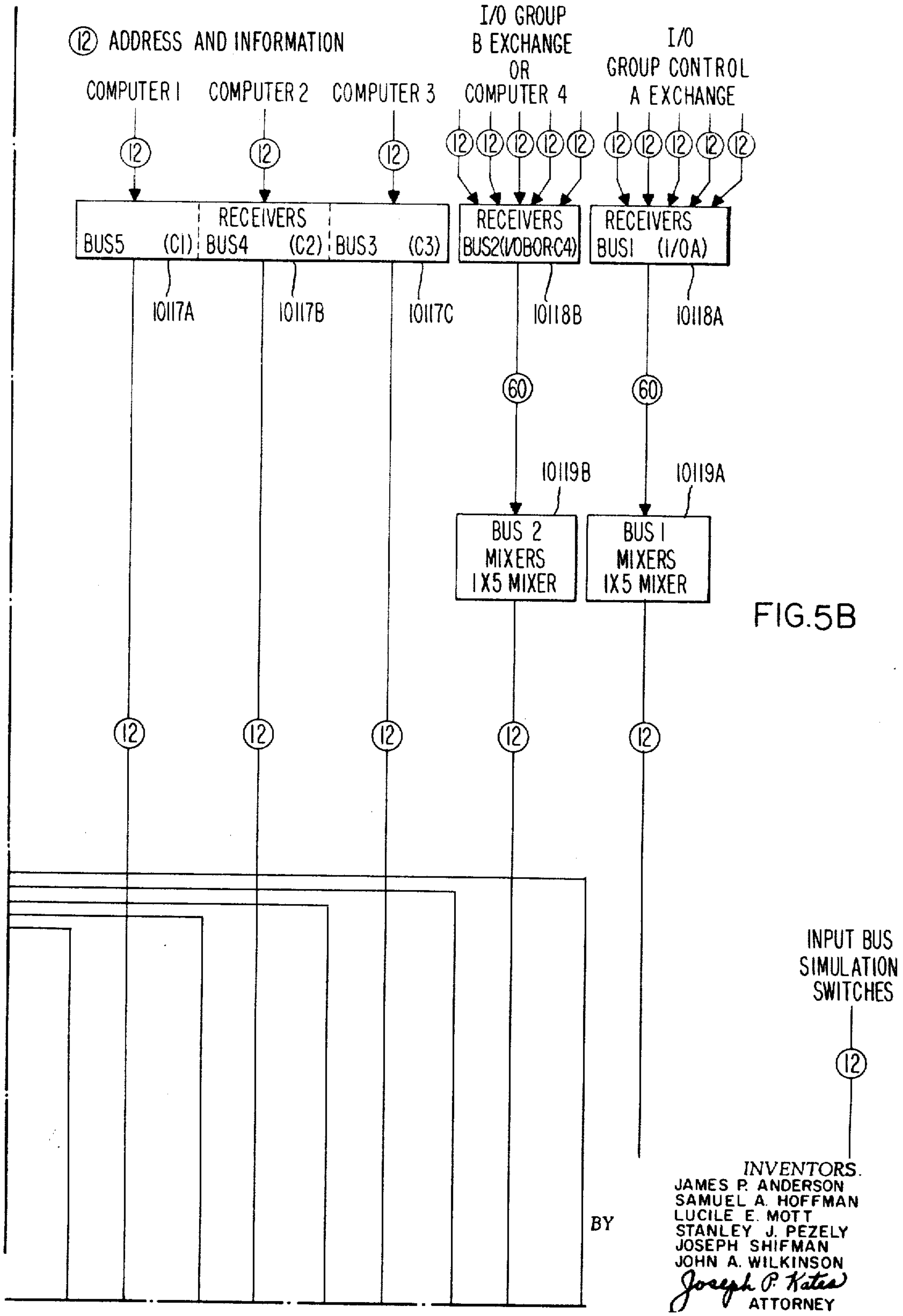
Figure 5D:
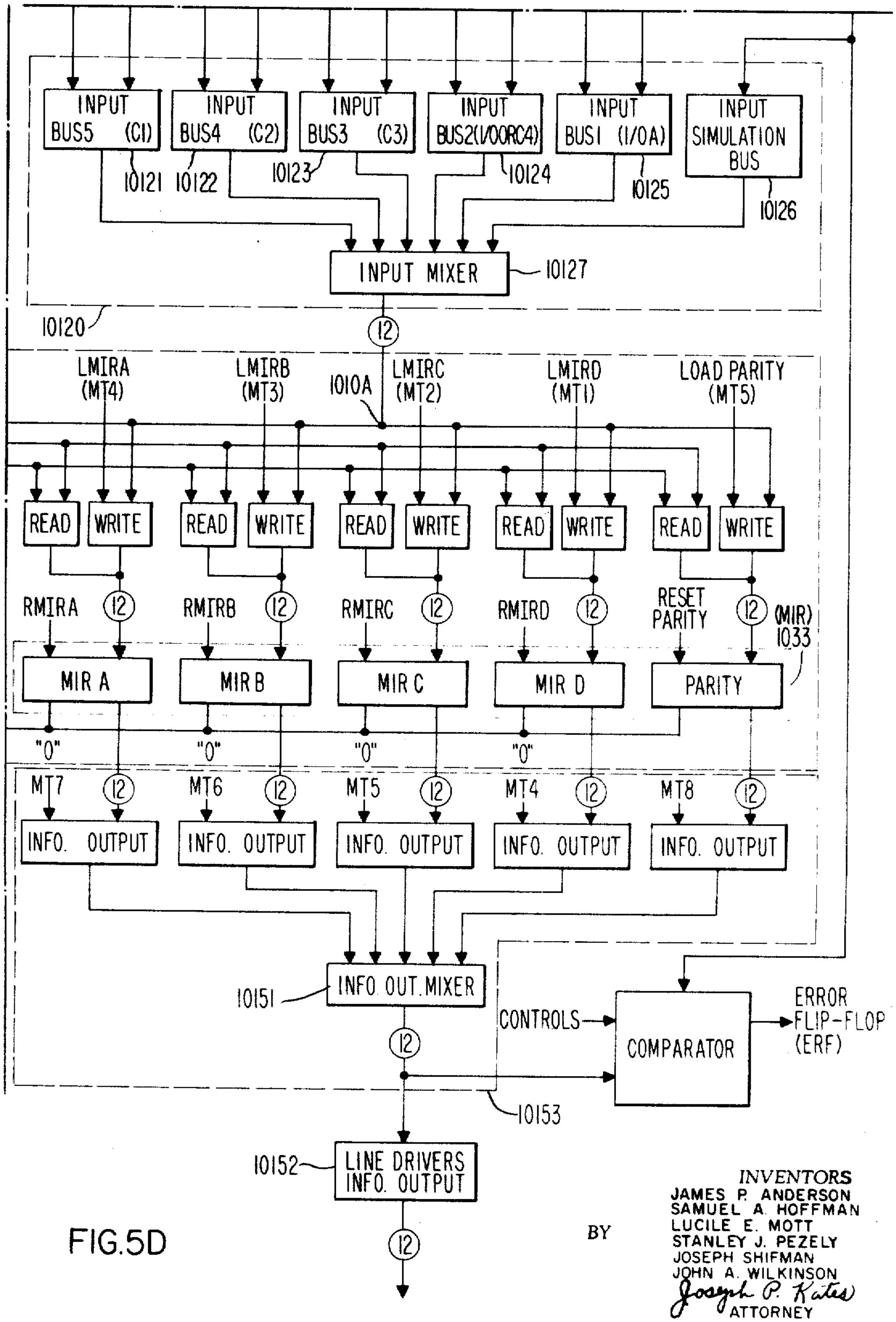
Figure 7:
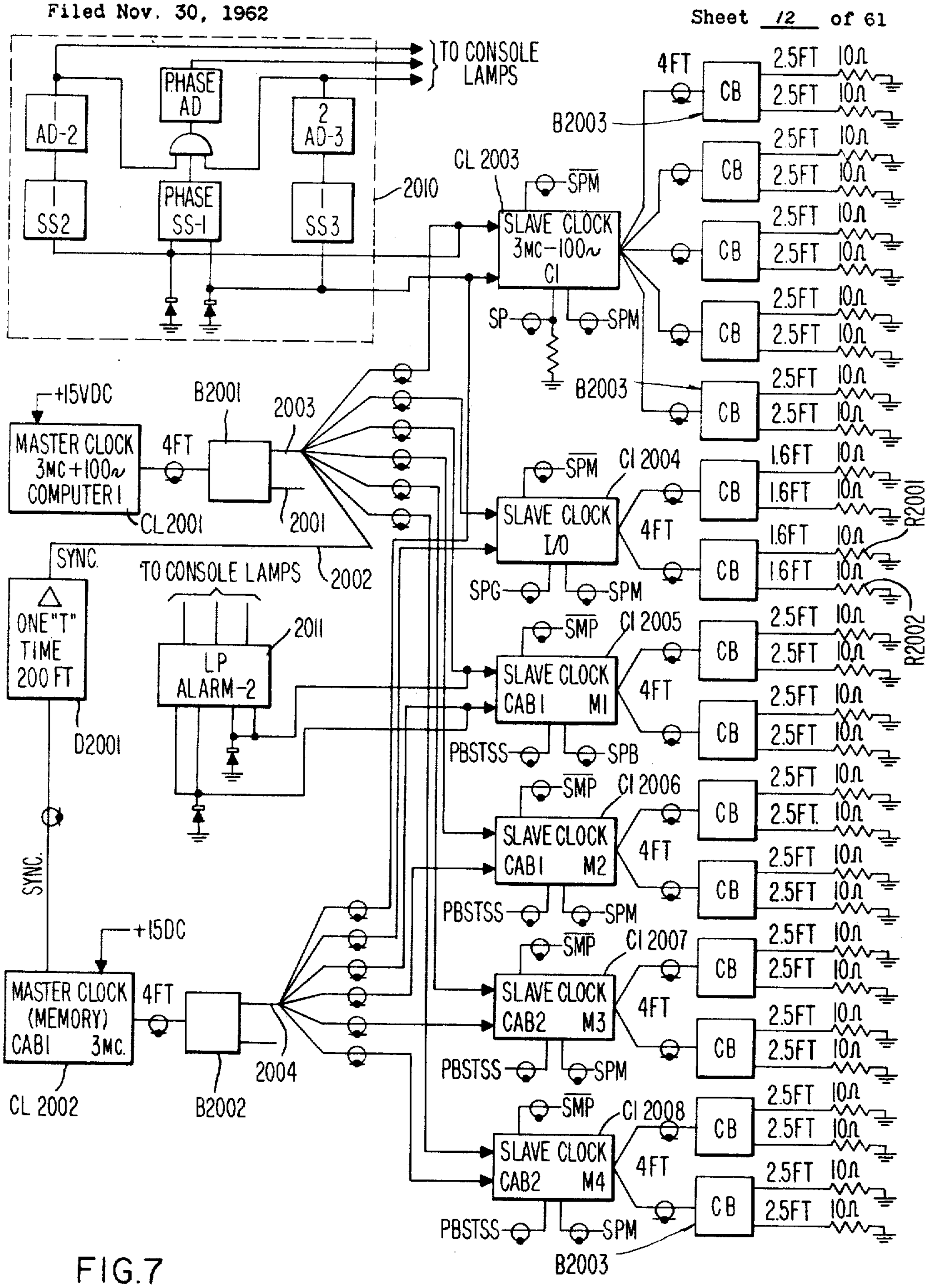
FIG. 7 is a partially block and partially schematic diagrammatic representation of the clock system of the illustrative embodiment of the invention showing for purposes of simplicity master and slave clocks and intercommunication for a less than complete system.
Figures 9, 9A, 9C:
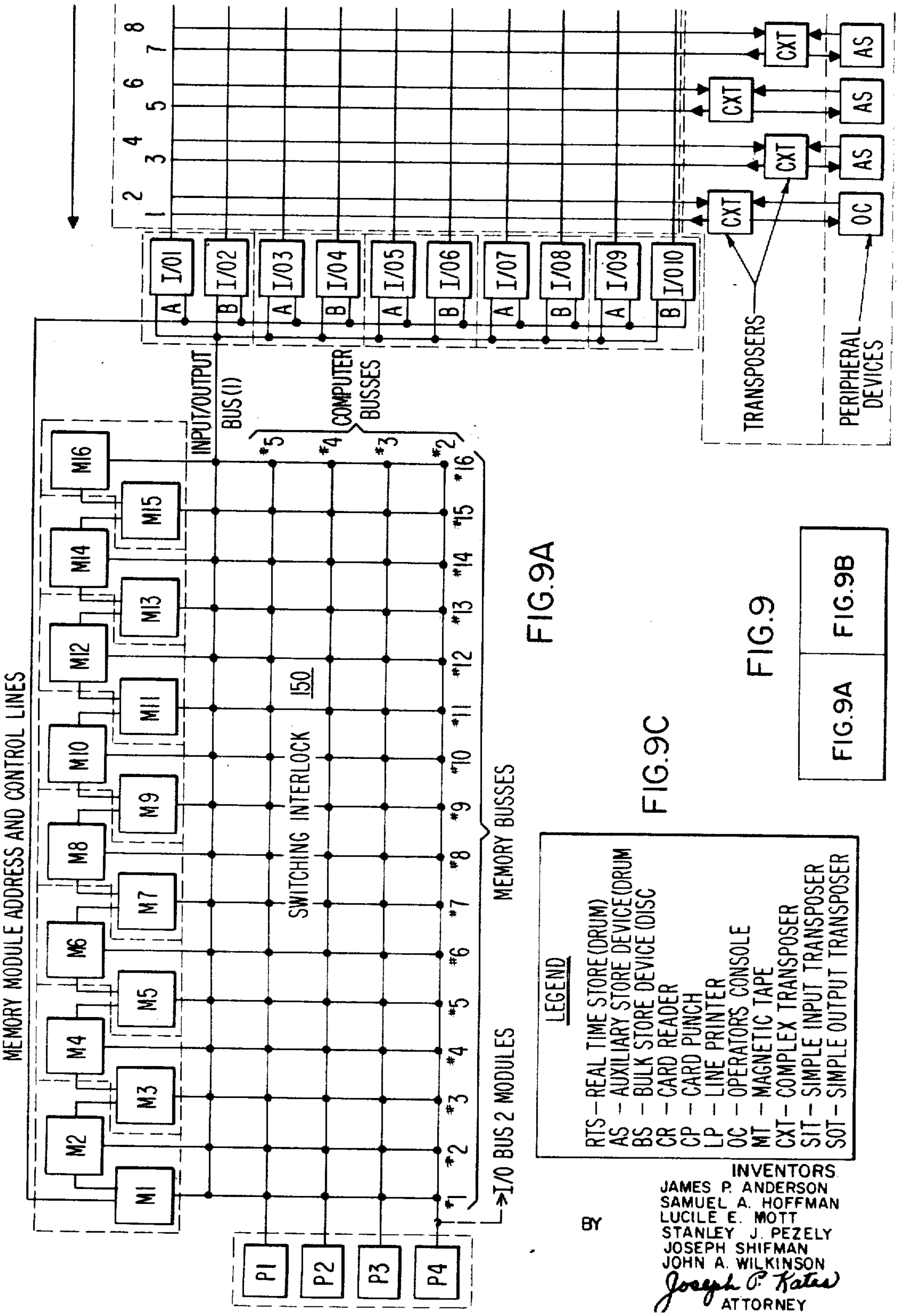
Figure 9B:
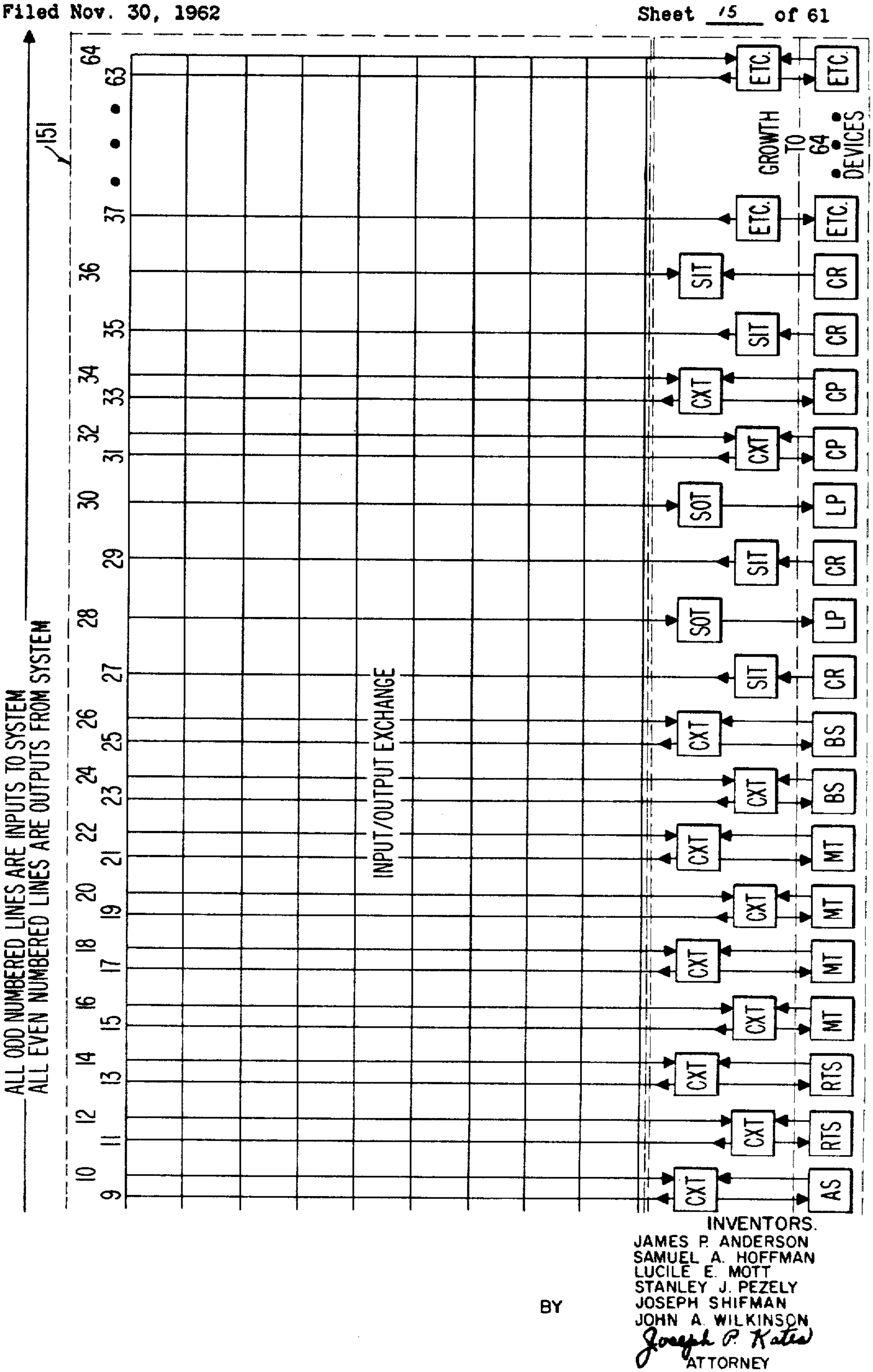
Figure 10A:
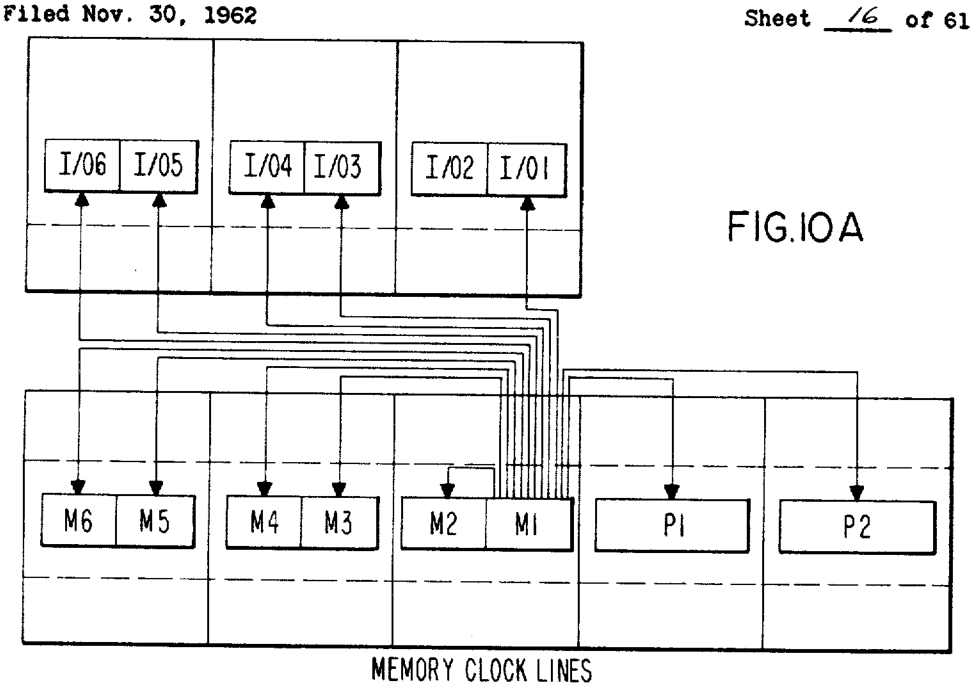
Figure 10B:
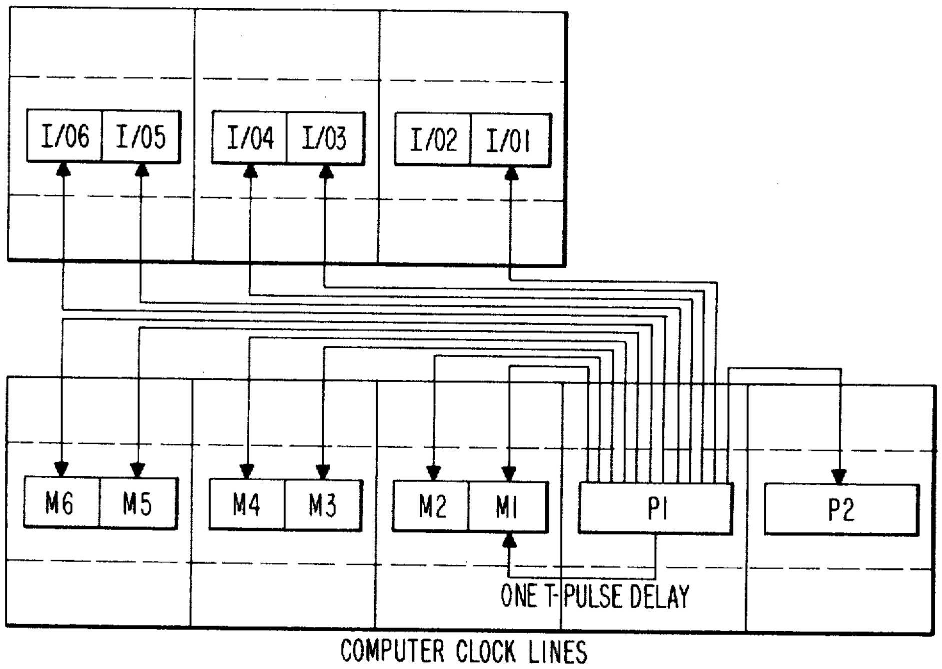
Figure 11:
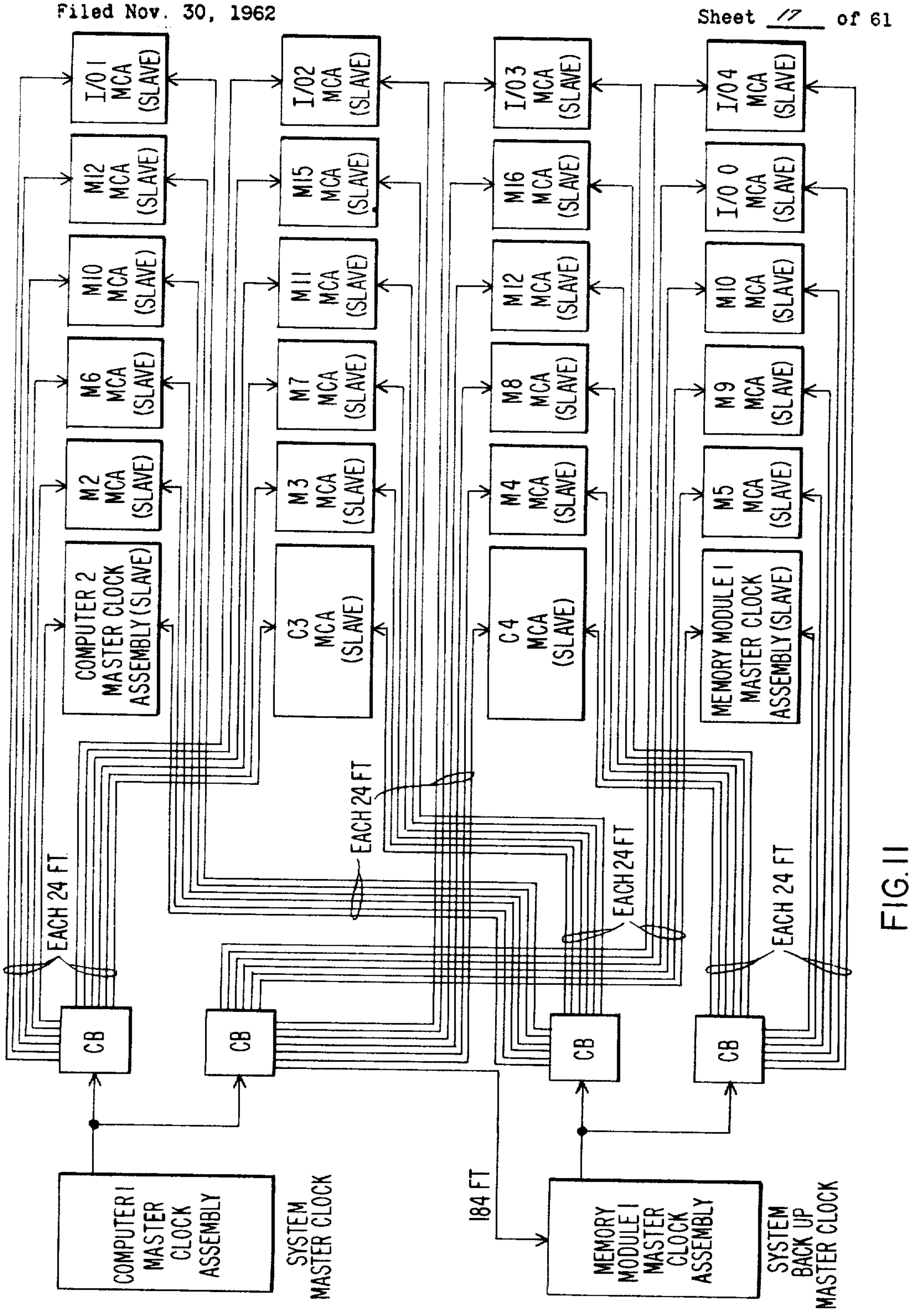
Figure 12:
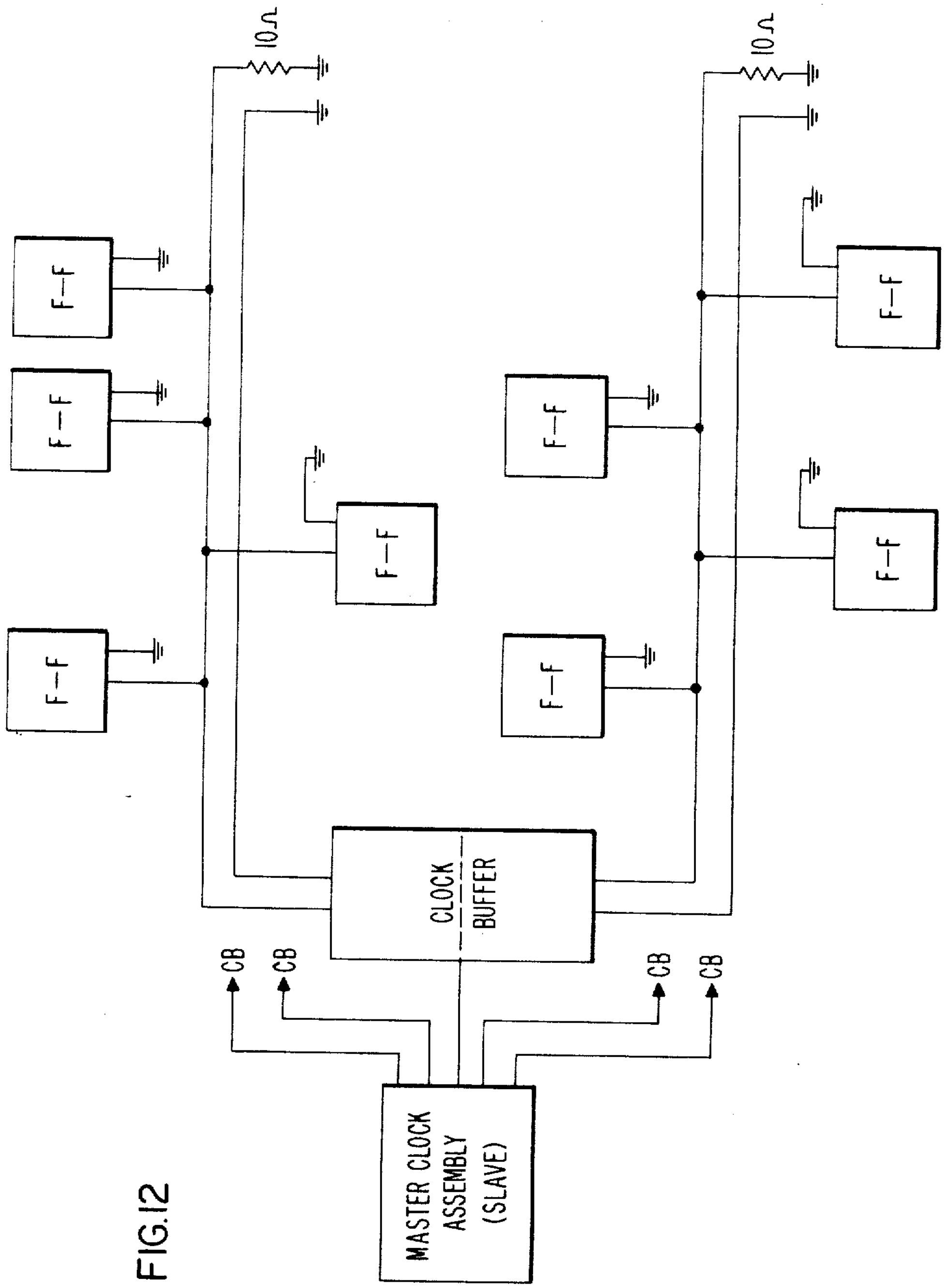
Figure 13:
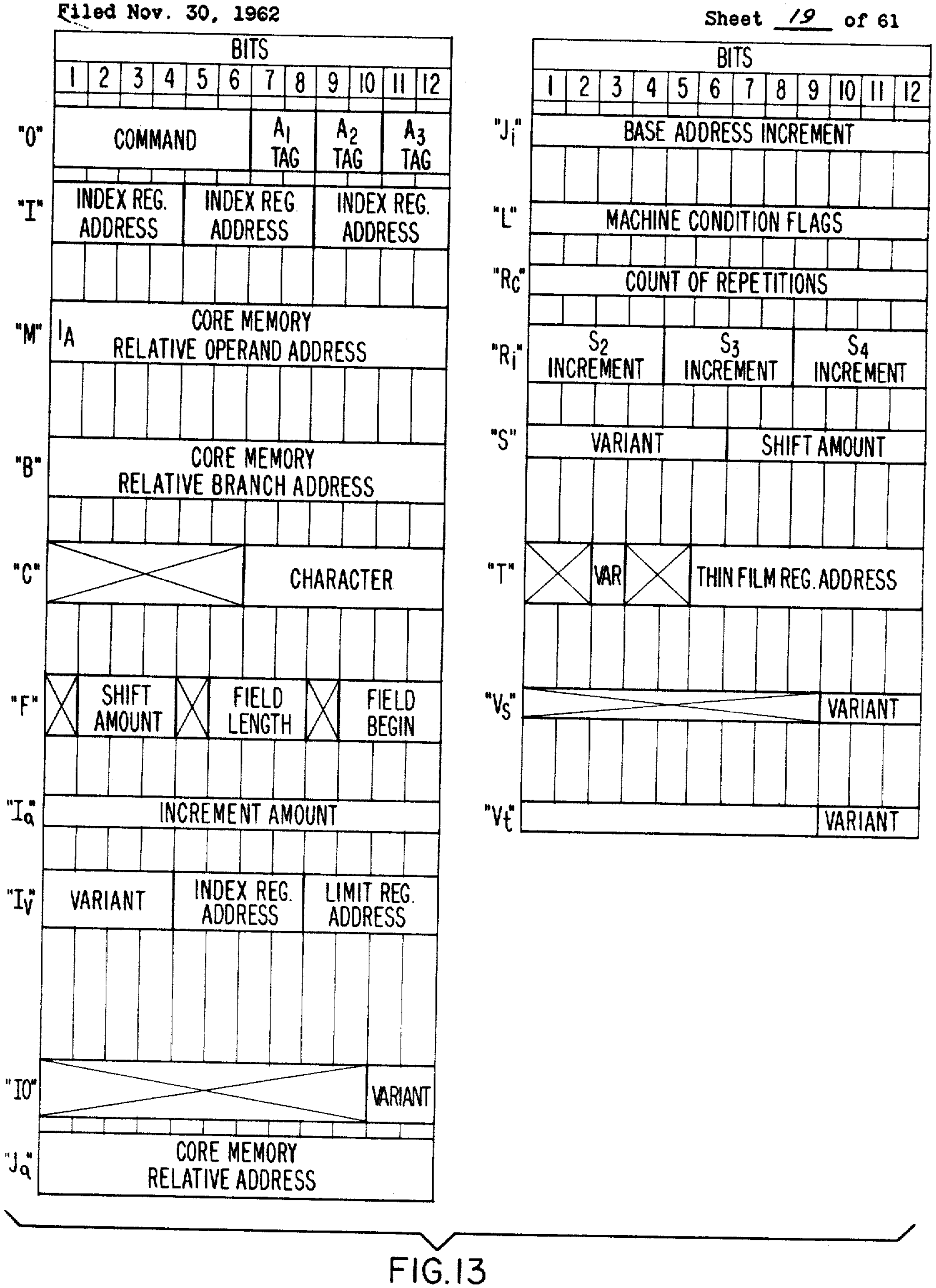
Figure 14A:
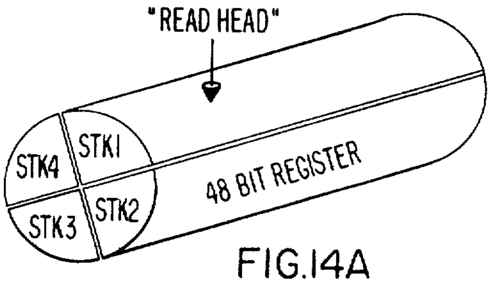
Figure 14B:
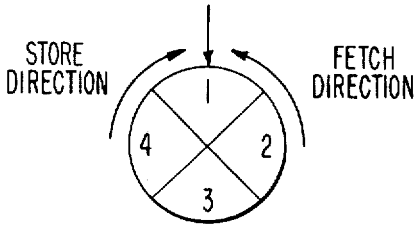
Figure 15:
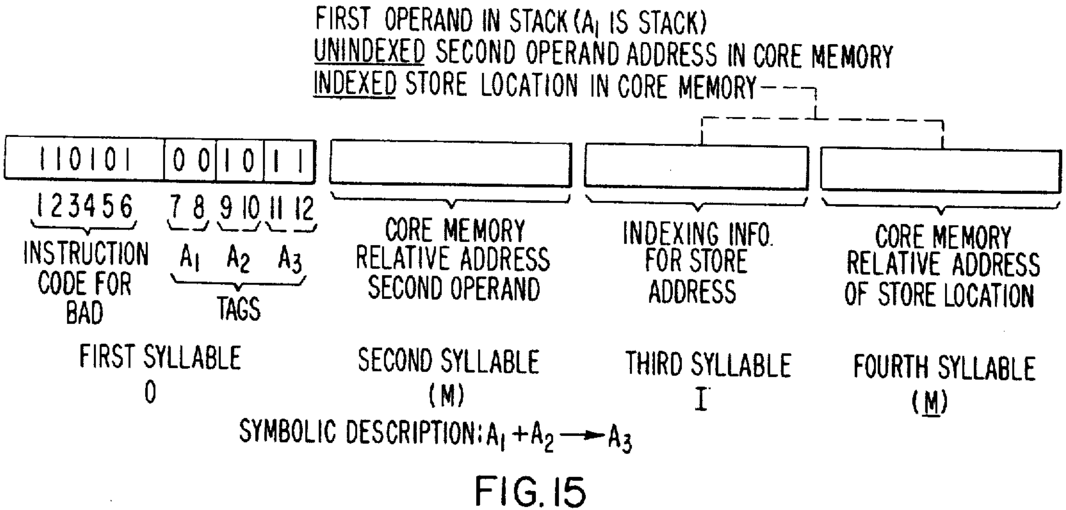
Figure 16:
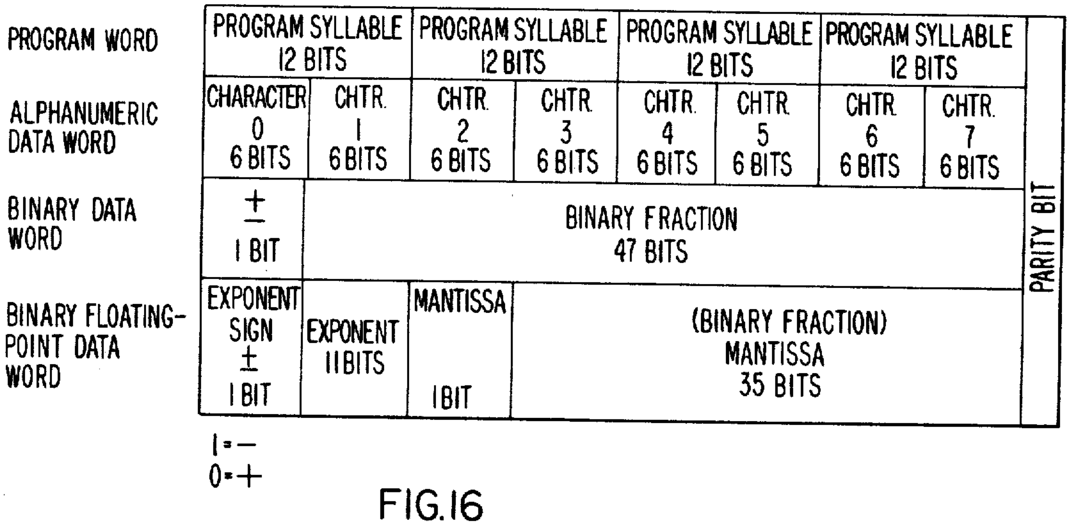
Figure 17:
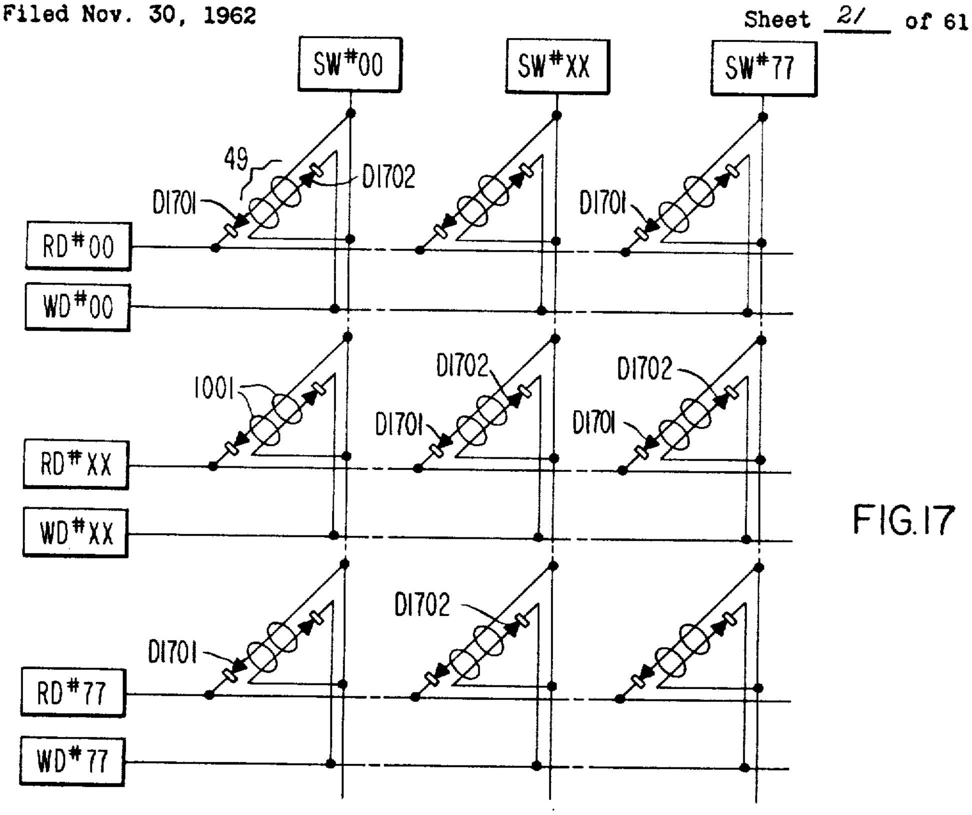
Figure 44:
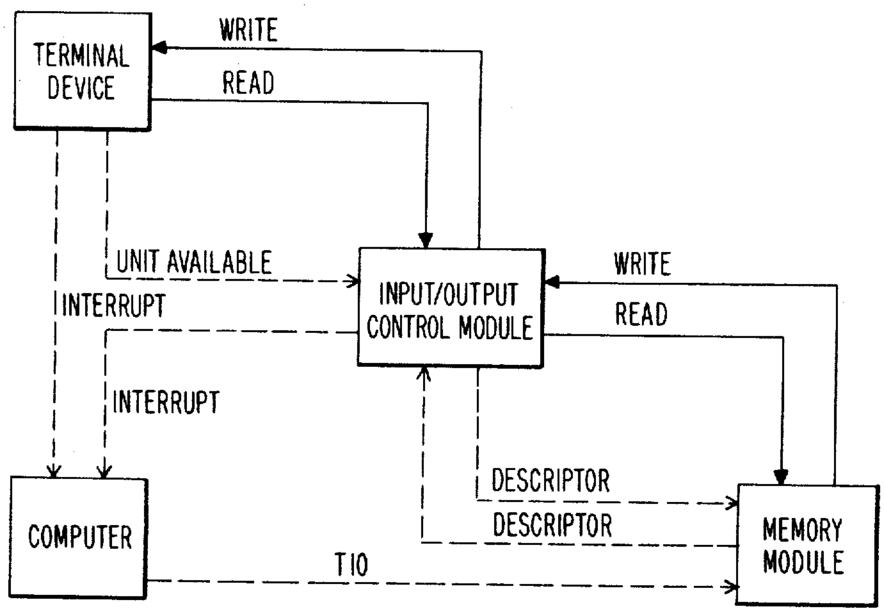
Figure 18:
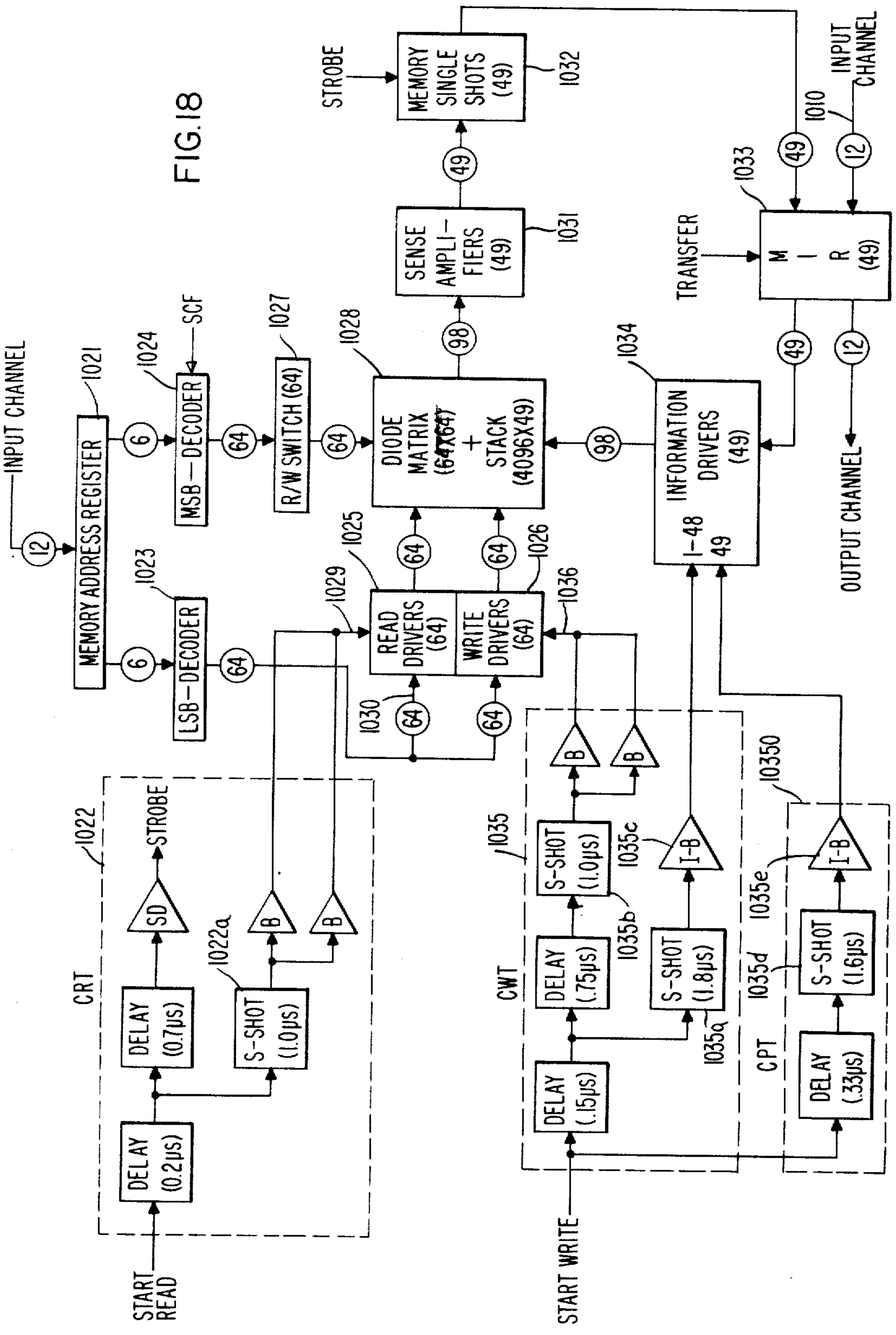
Figures 19, 19B:
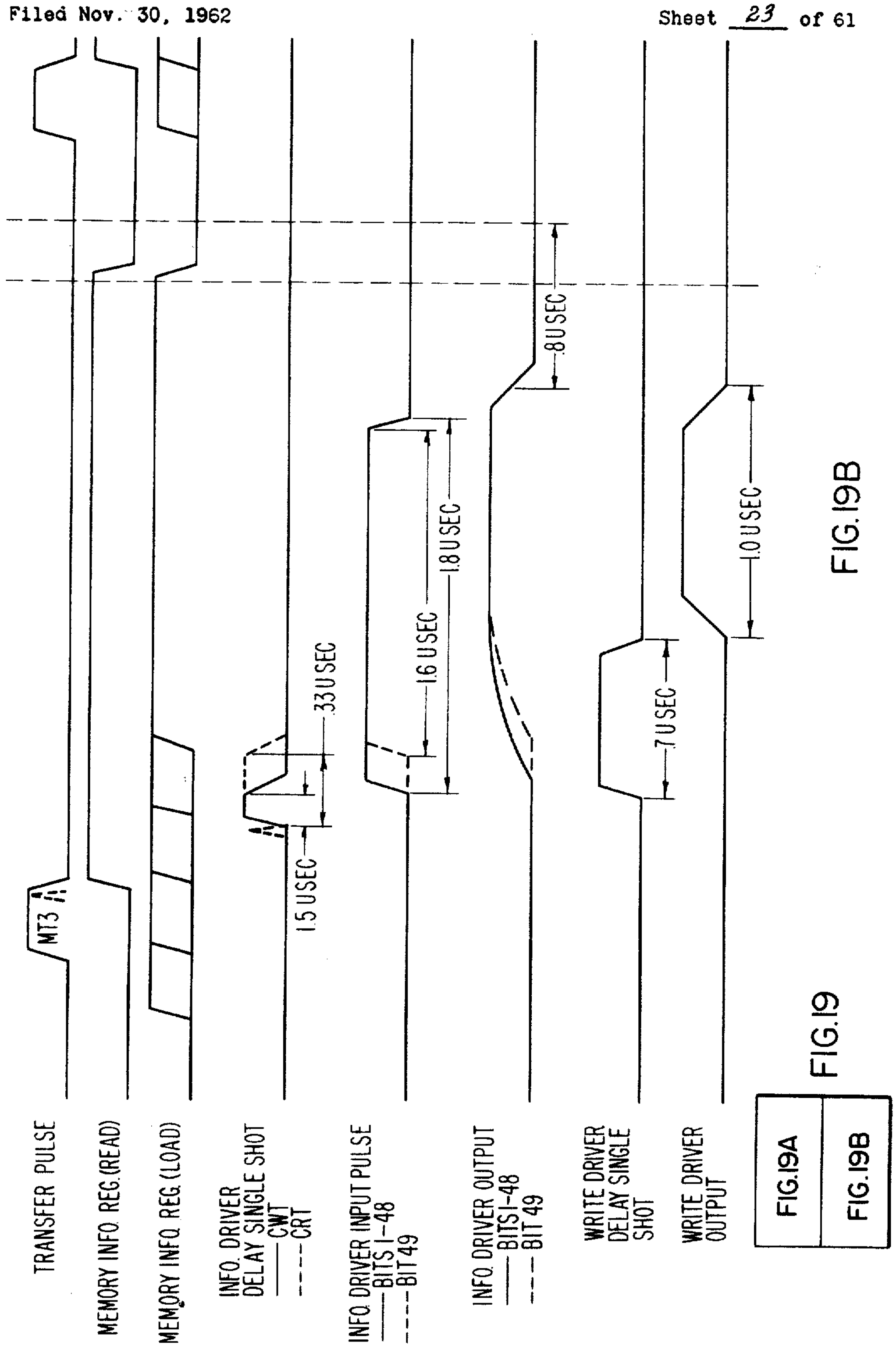
Figure 19A:
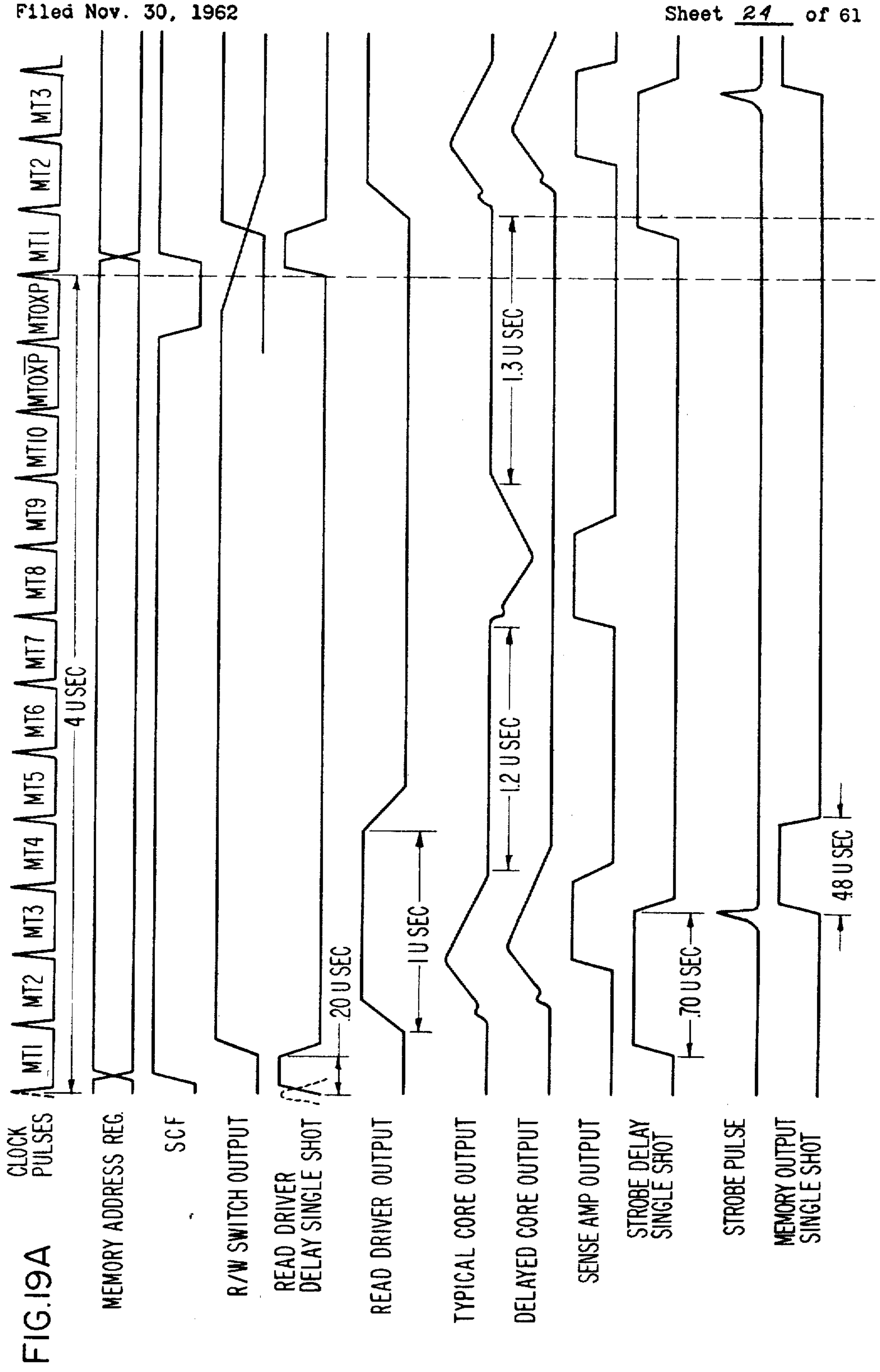
Figure 30A:
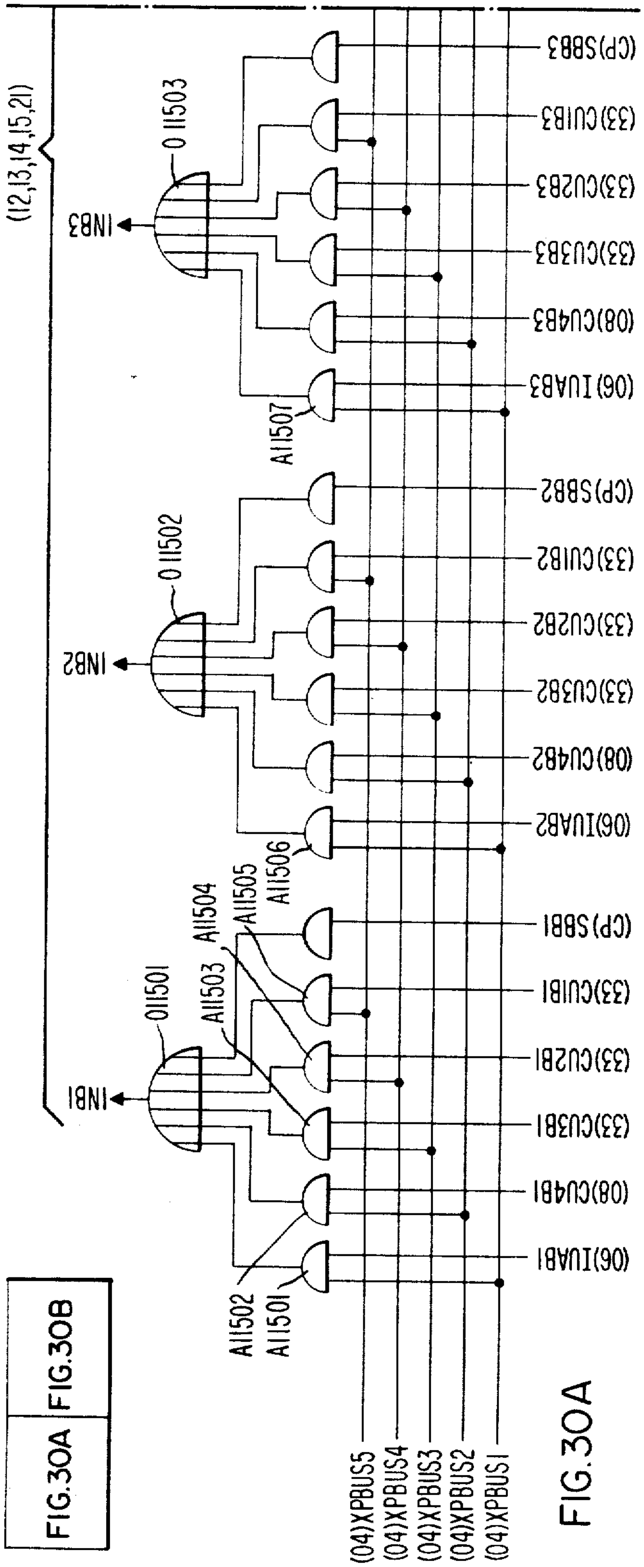
Figure 20:
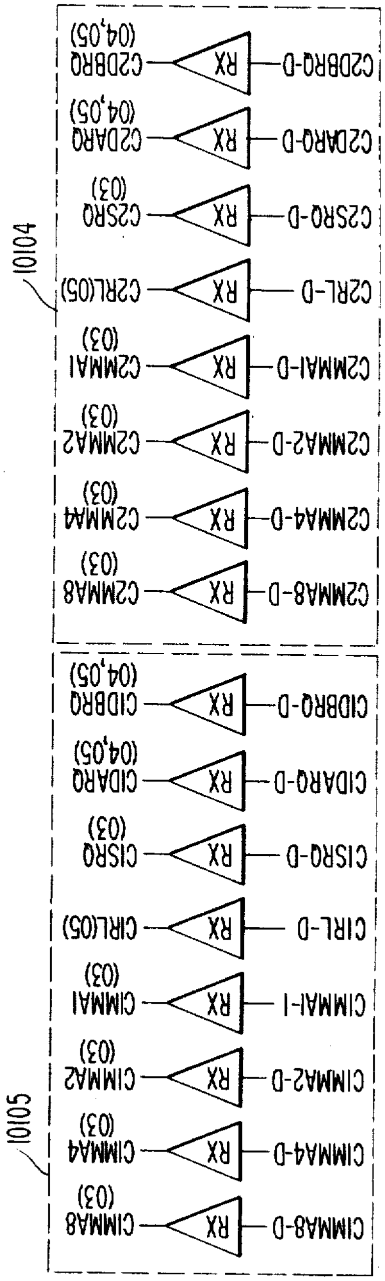
Figure 21:
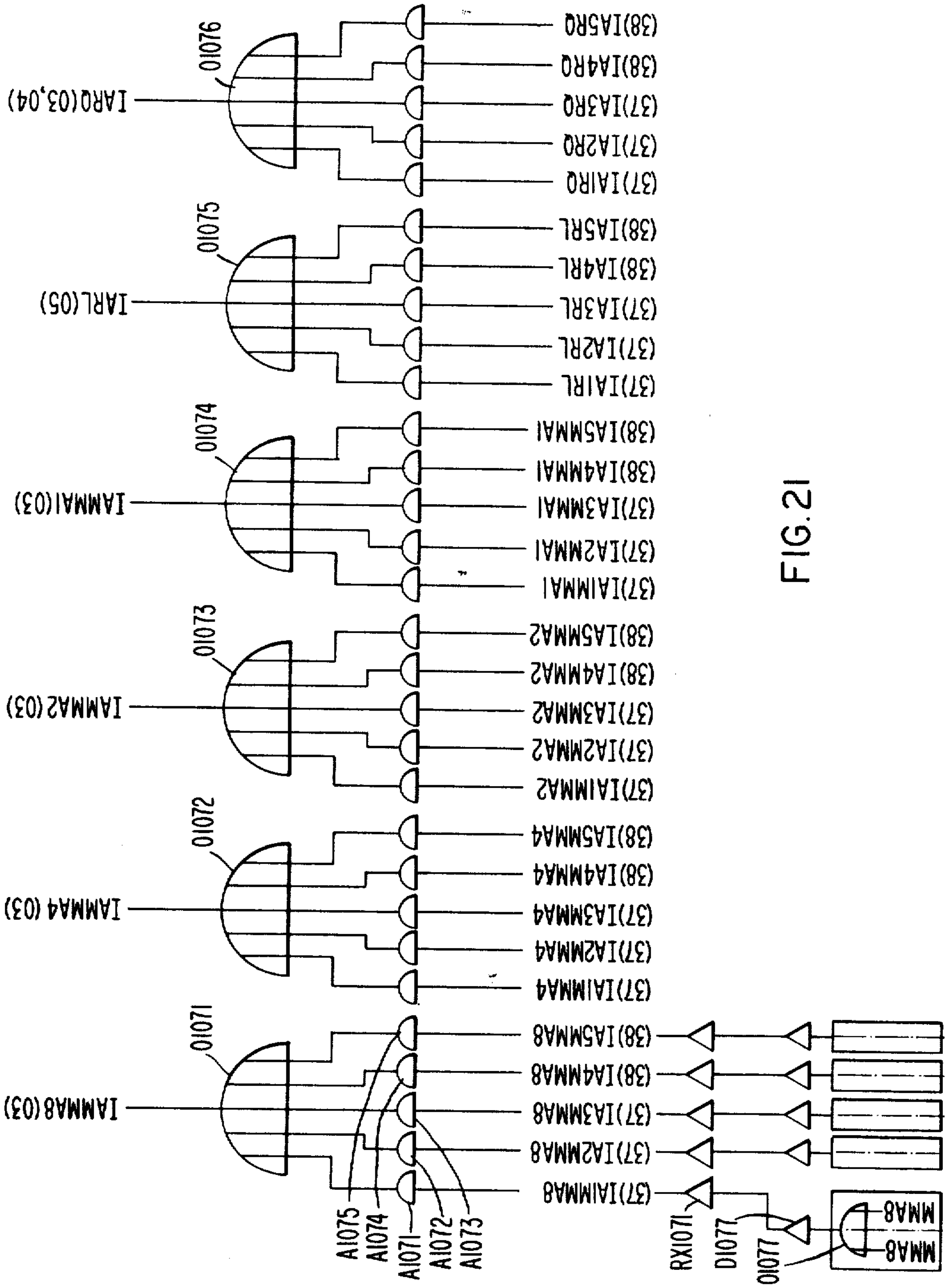
Figures 22, 22A:
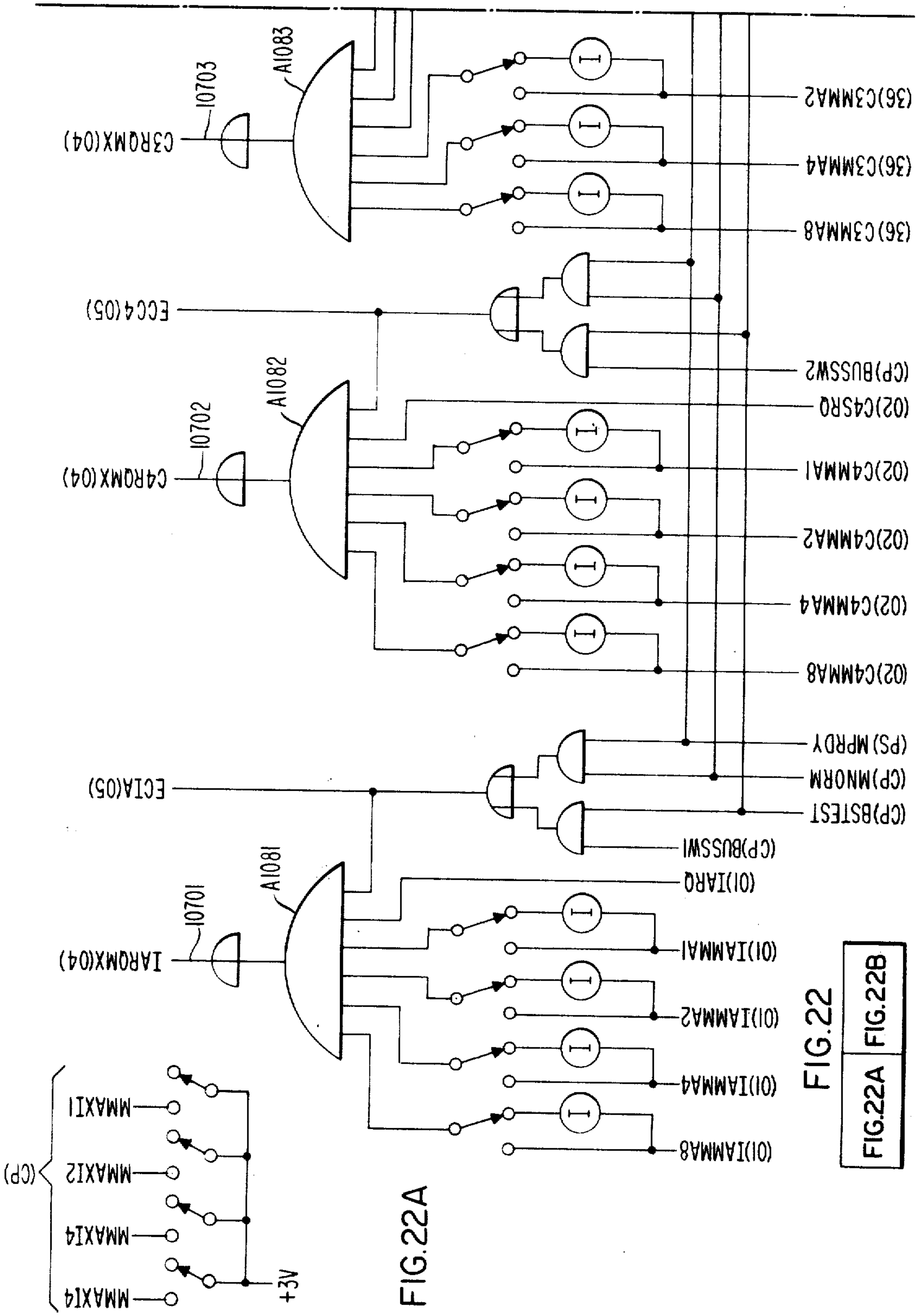
Figure 22B:
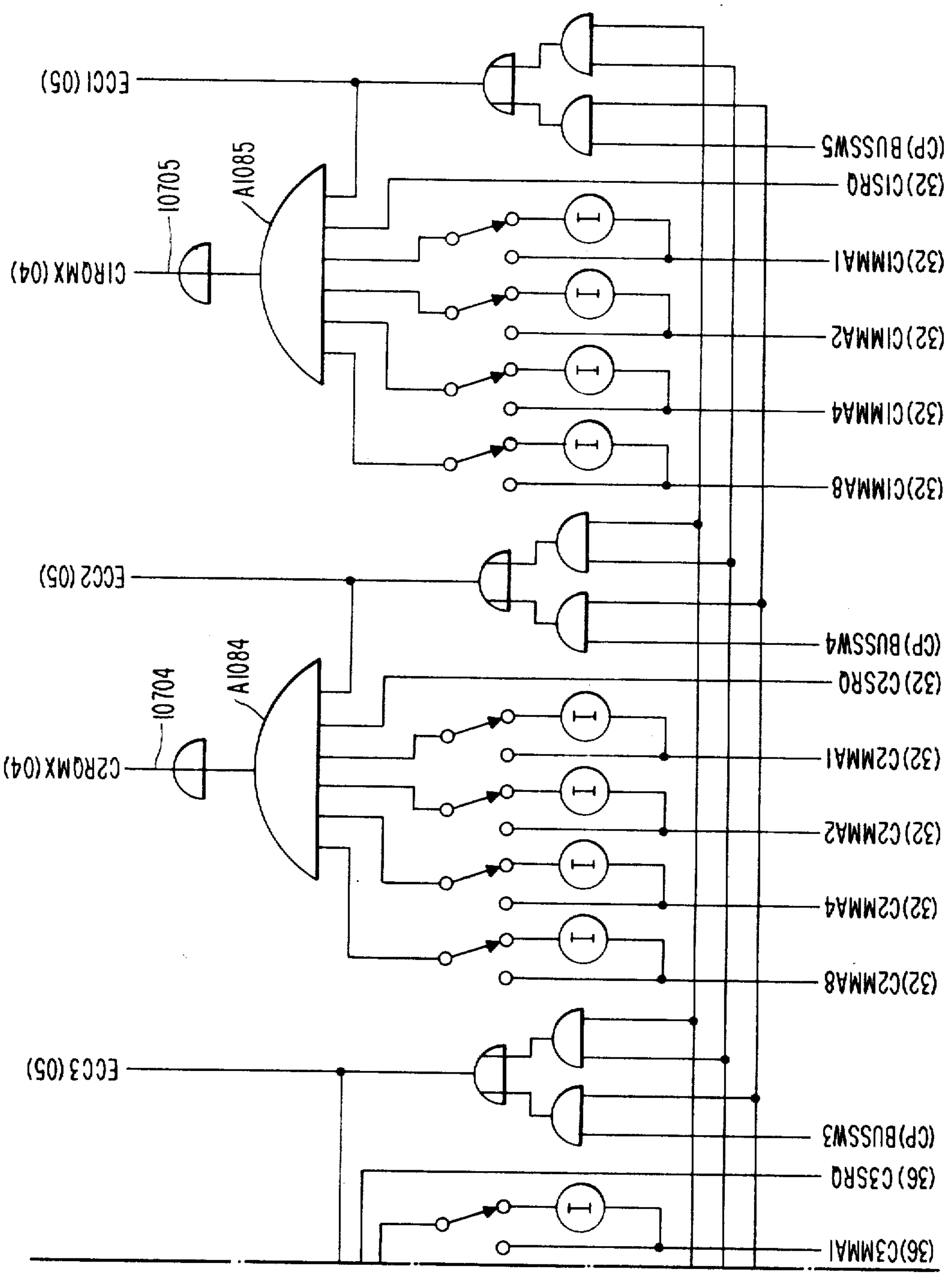
Figures 23, 23A:
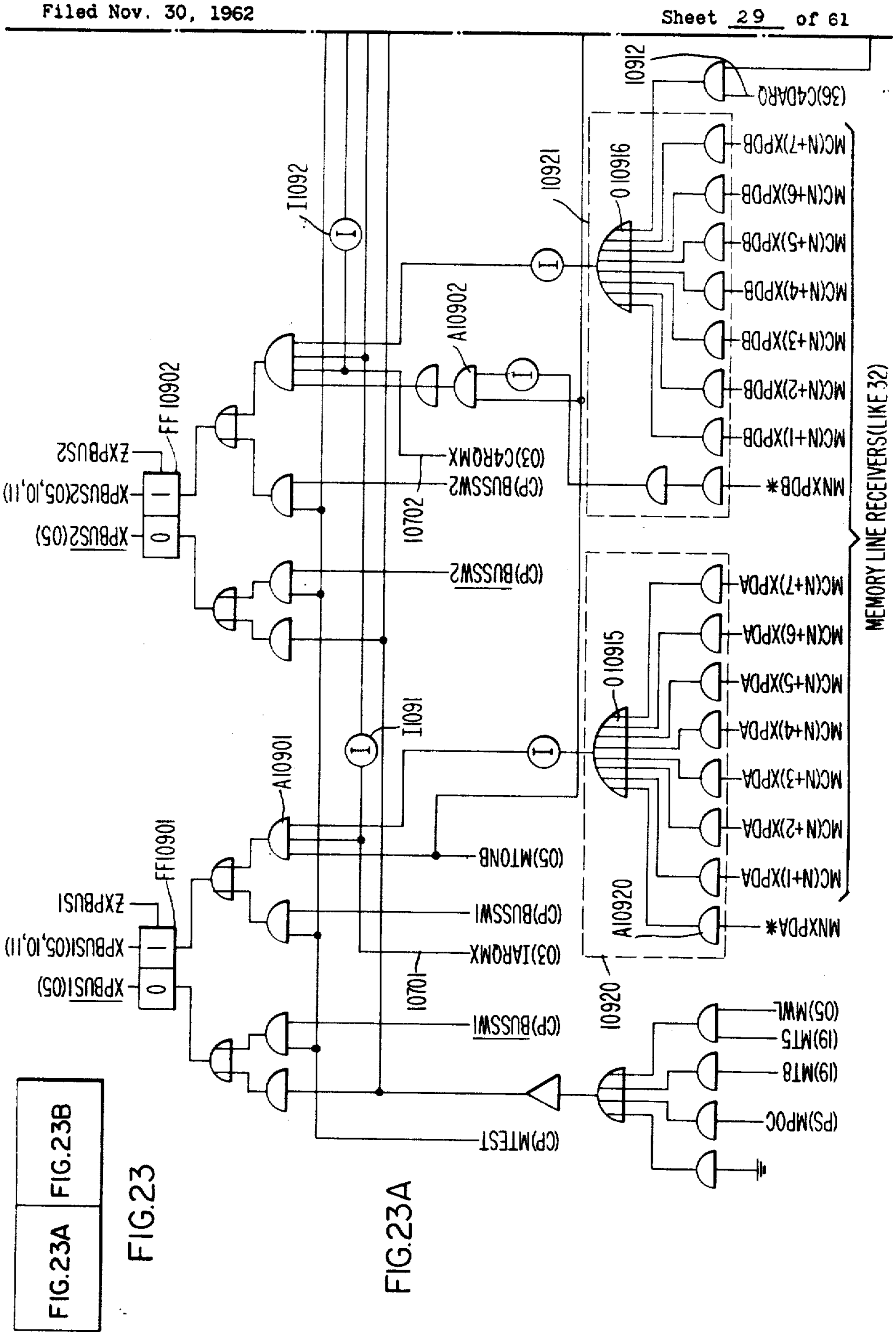
Figure 23B:
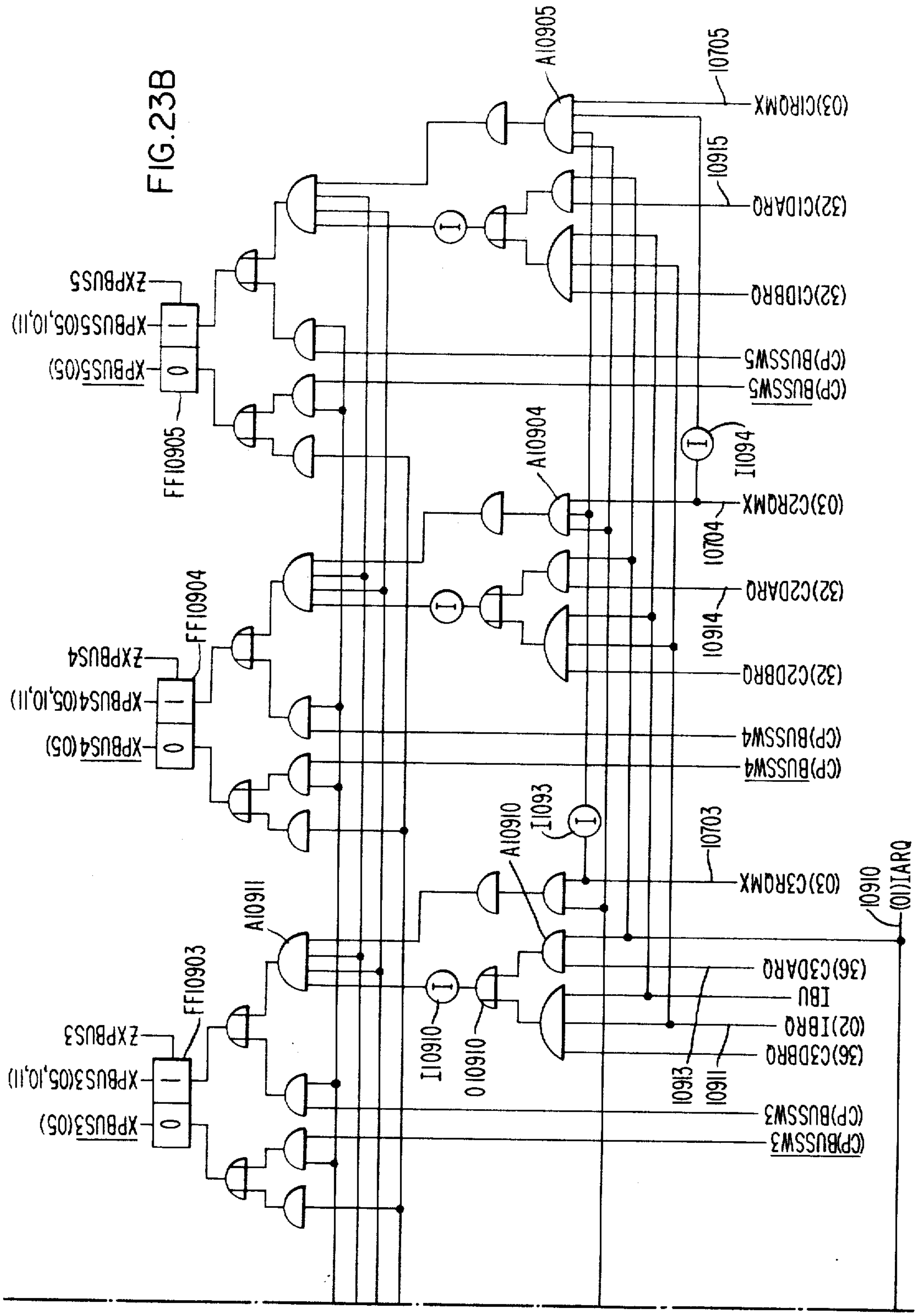
Figure 24A:
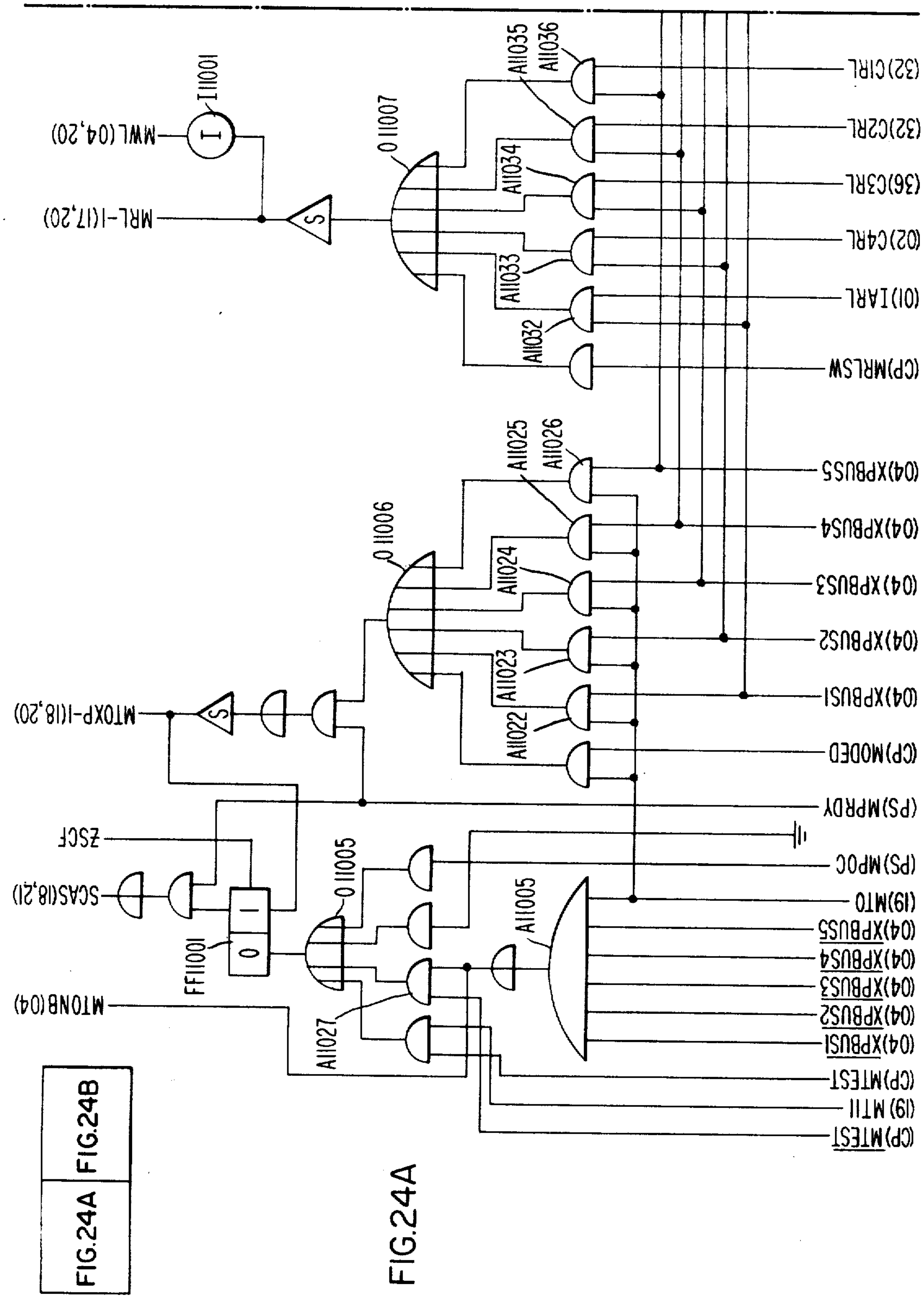
Figure 24B:
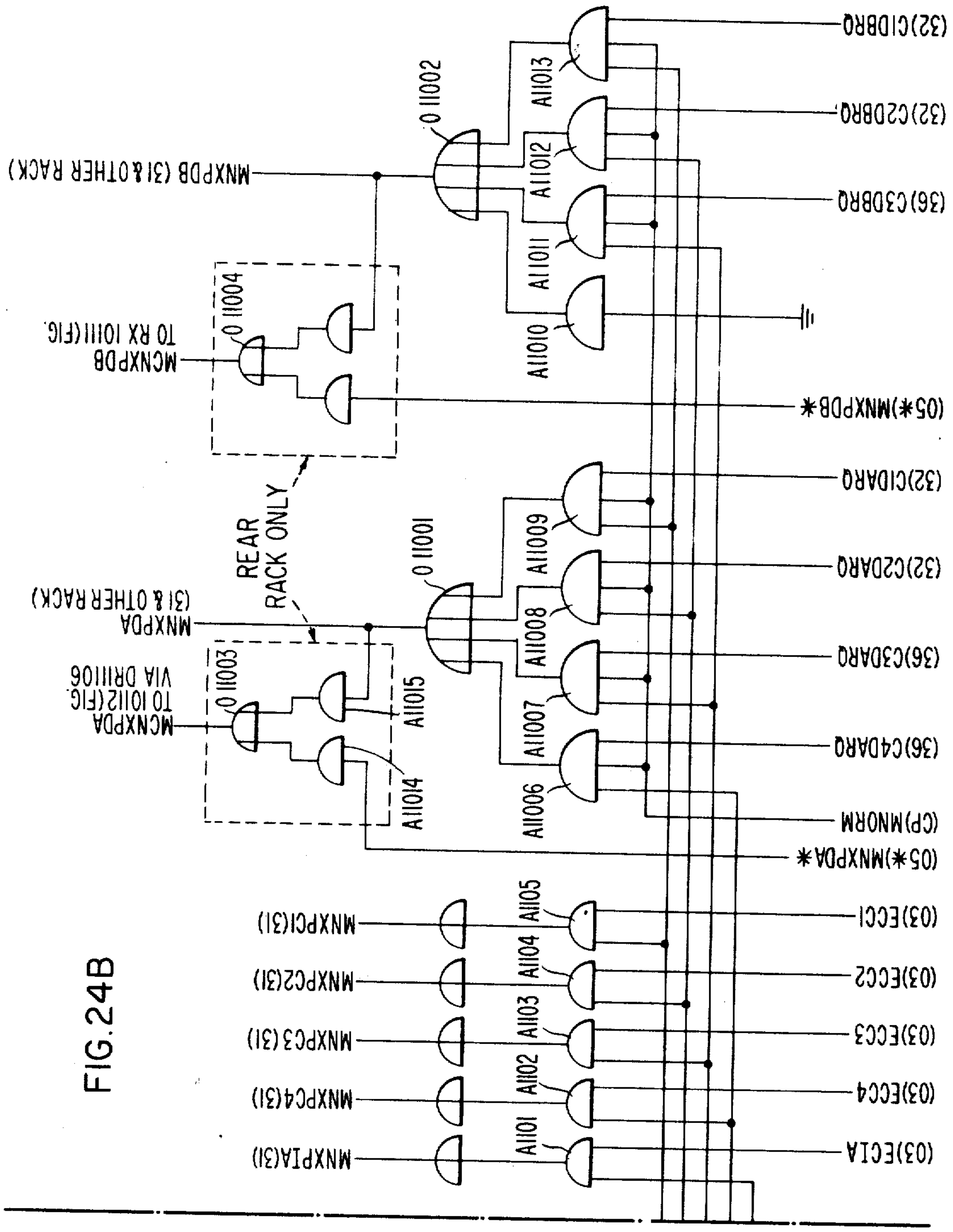
Figure 32:
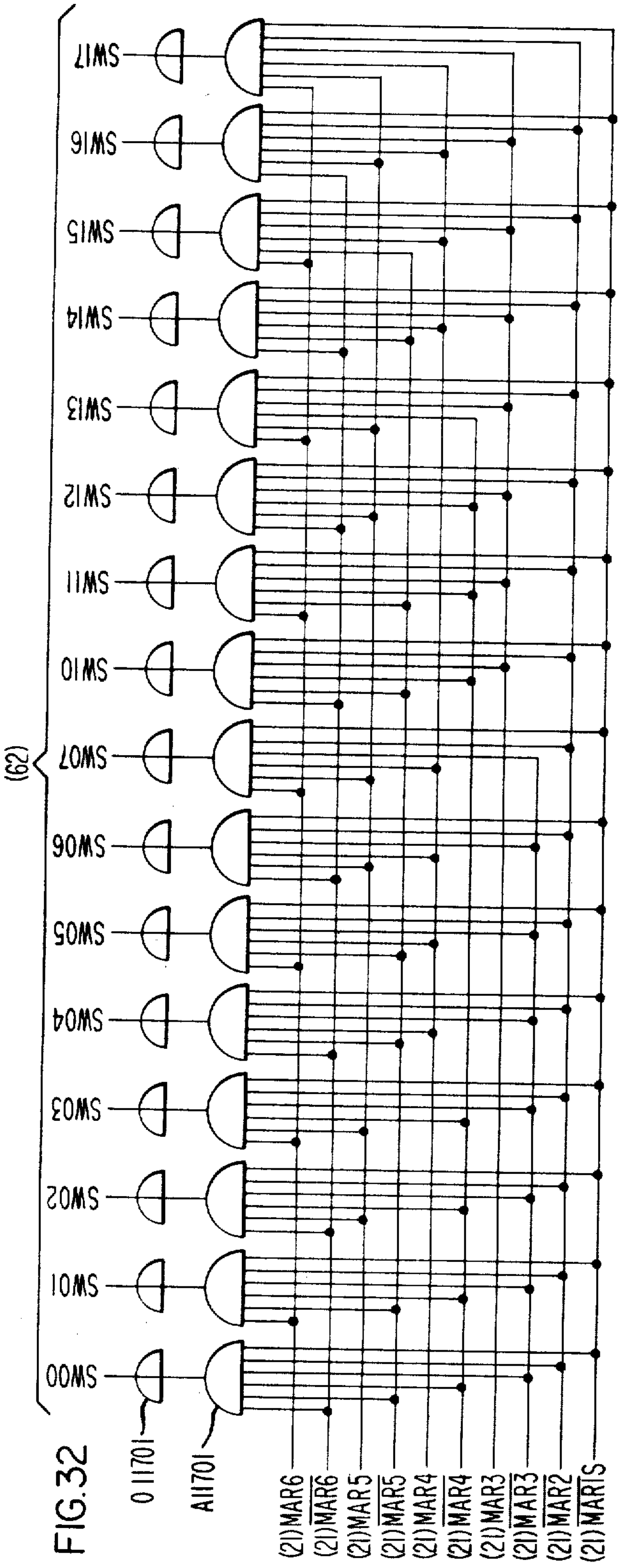
Figure 25:
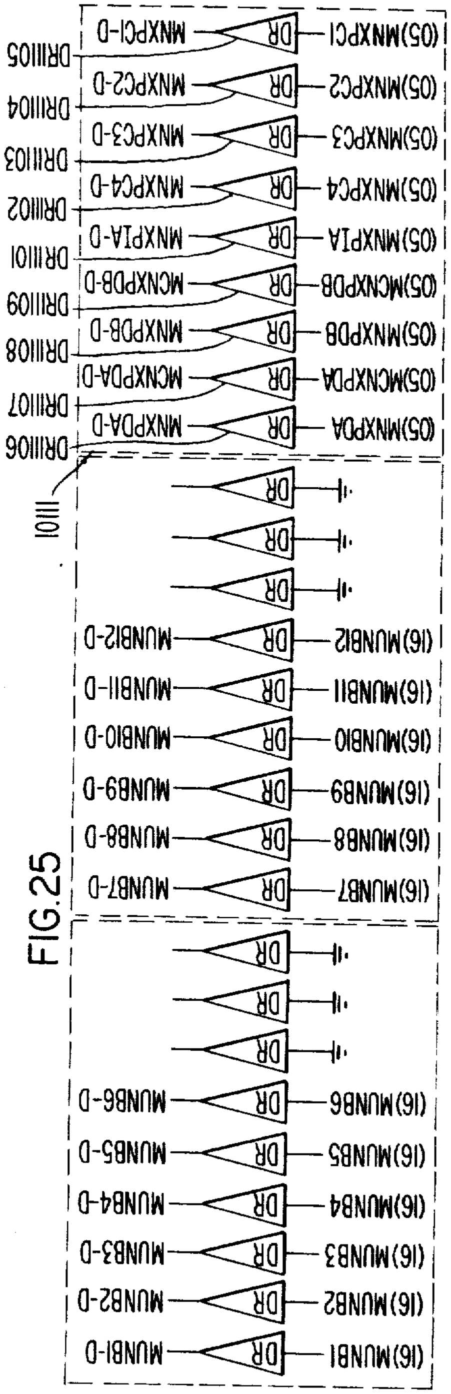
Figure 26:
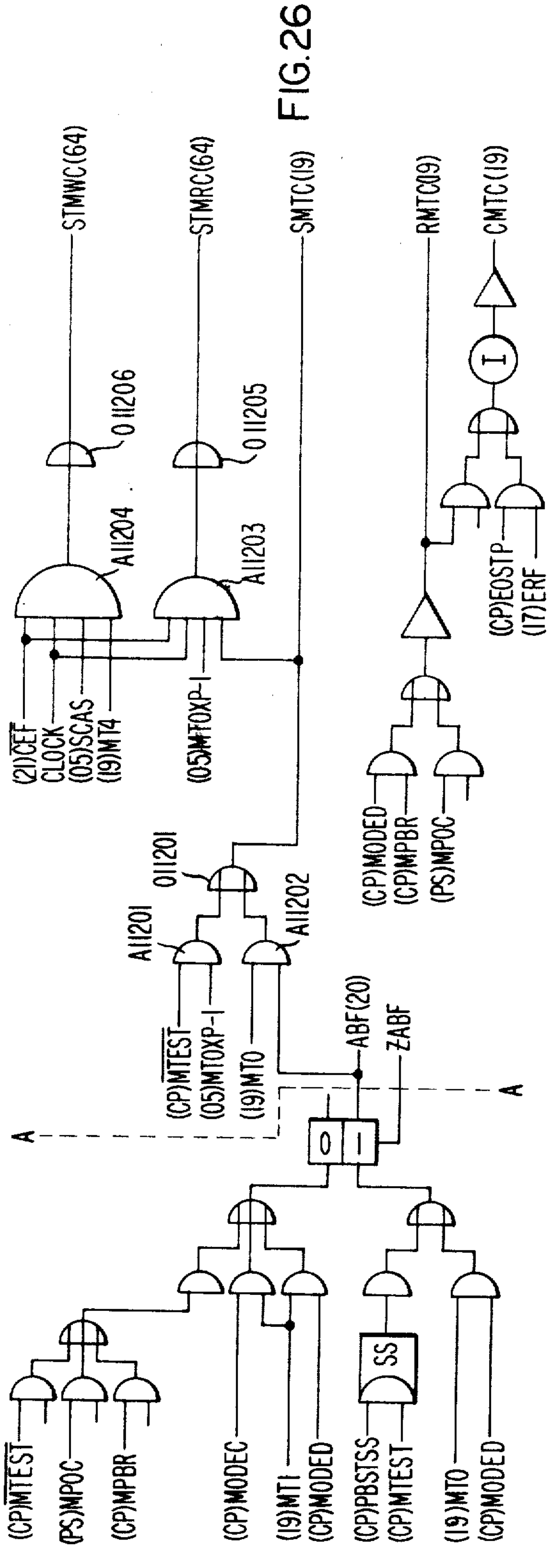
Figure 33:
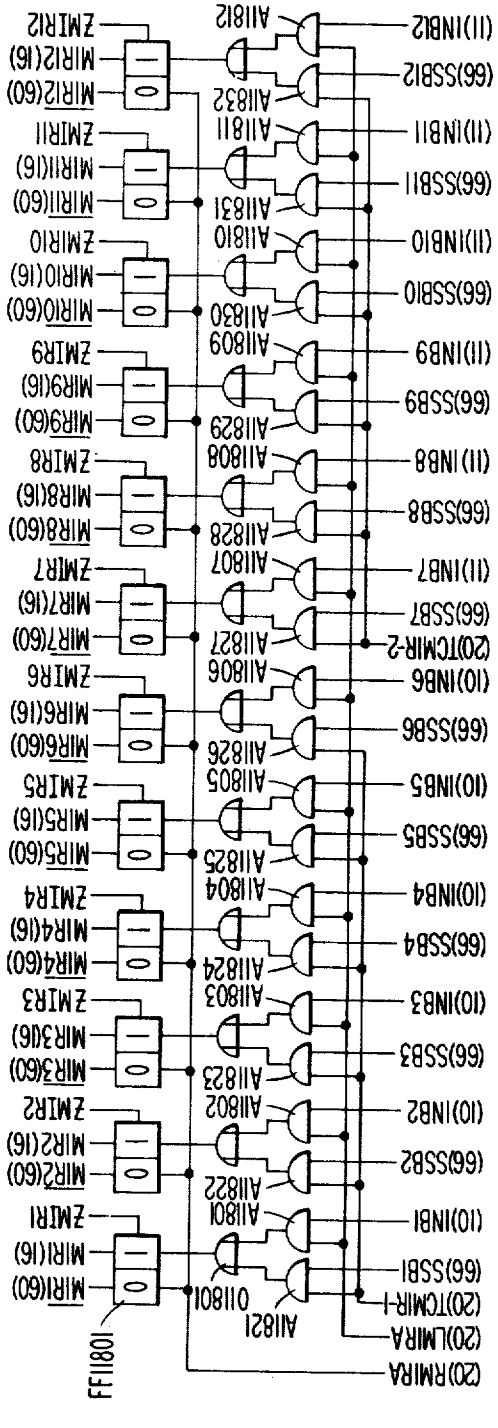
Figure 27:
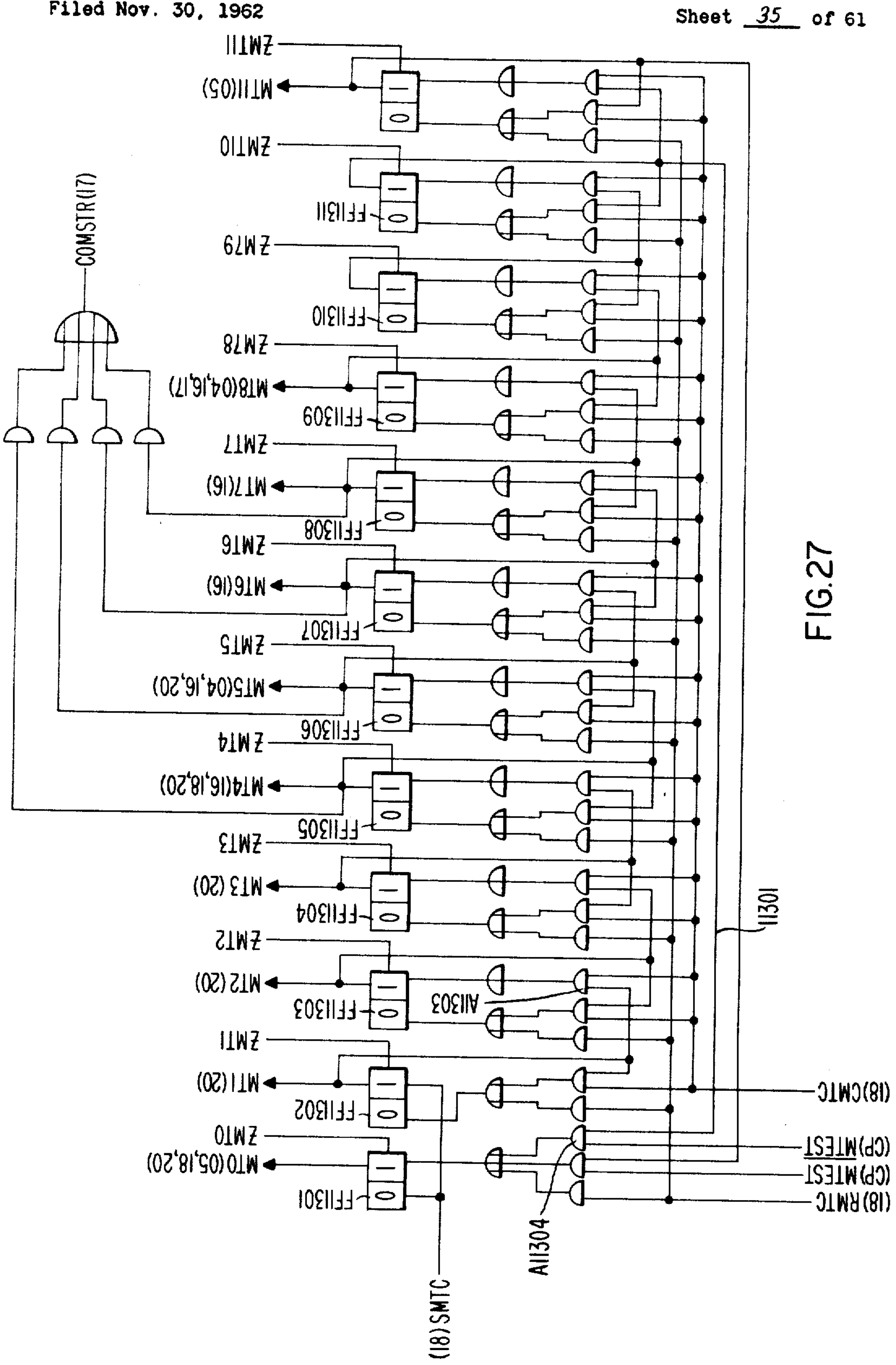
Figure 30B:
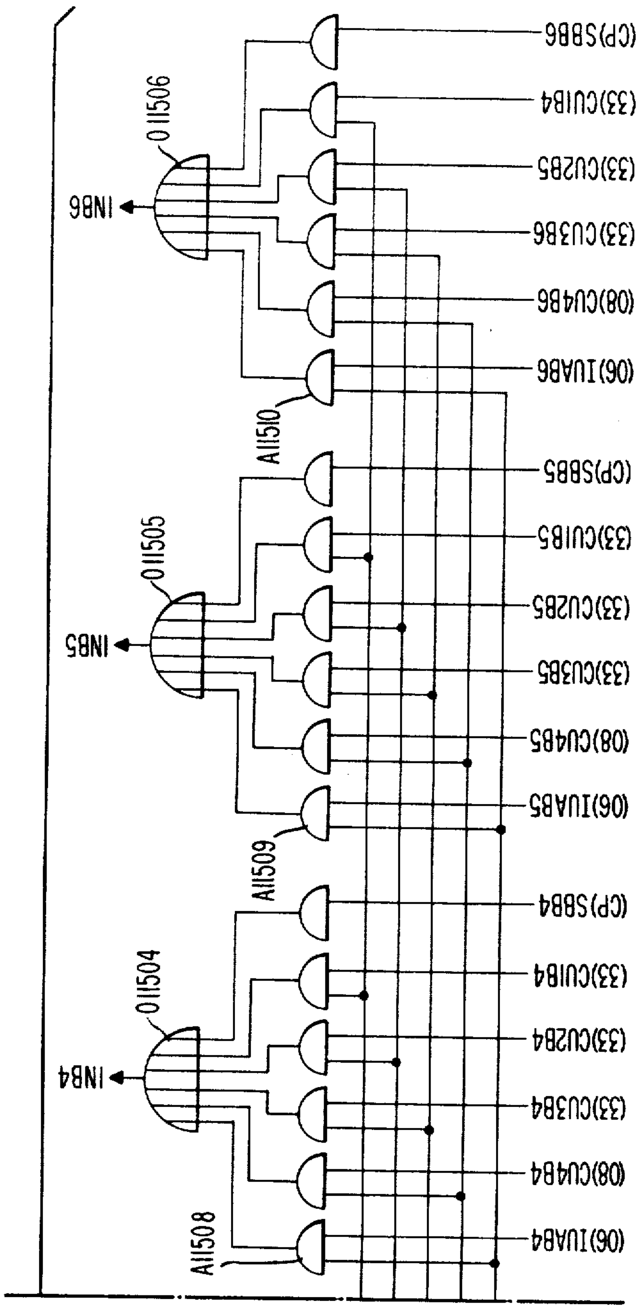
Figures 28A, 28B:
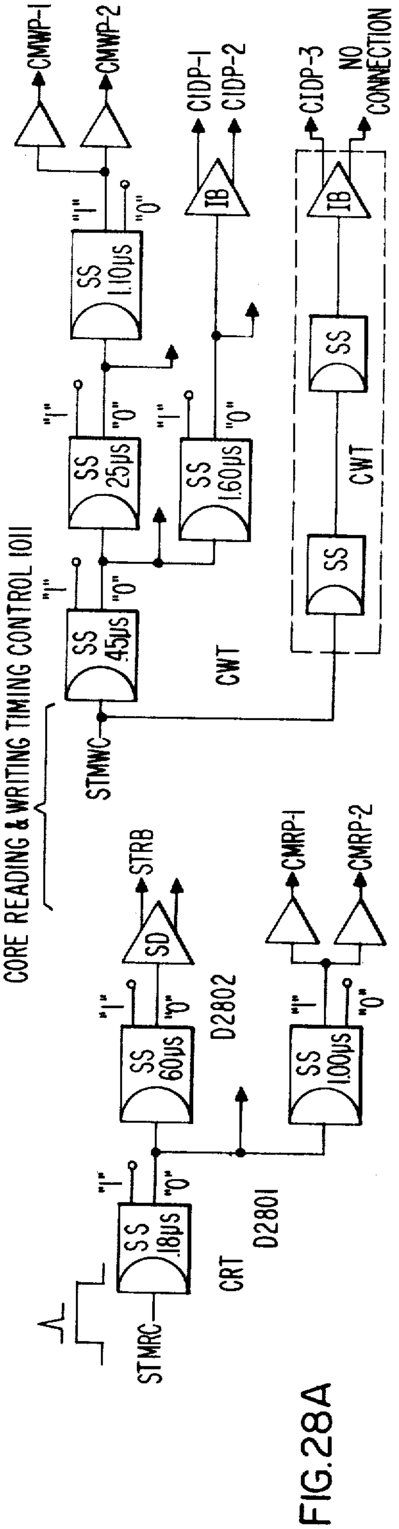
Figure 29:
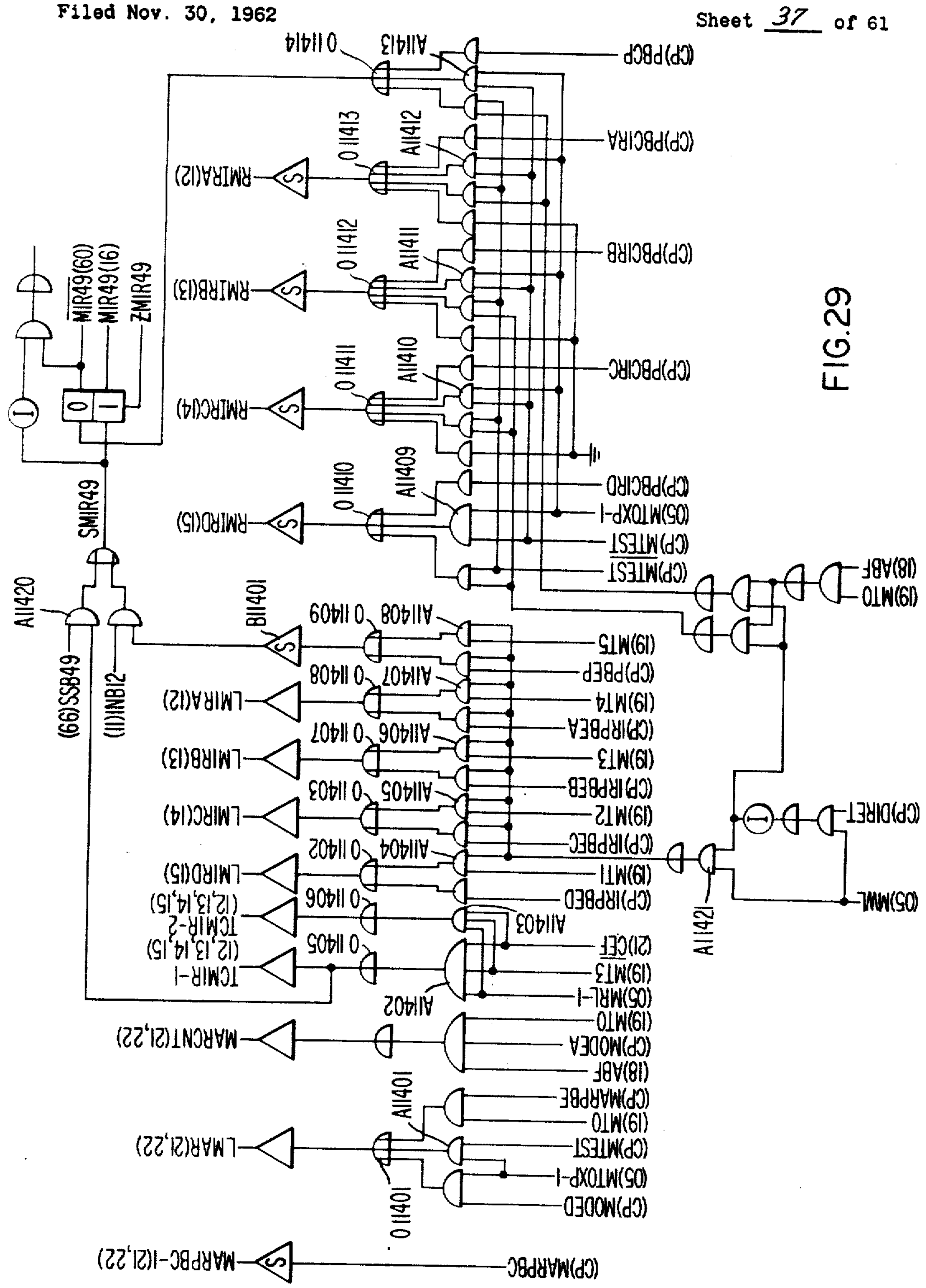
Figure 31:
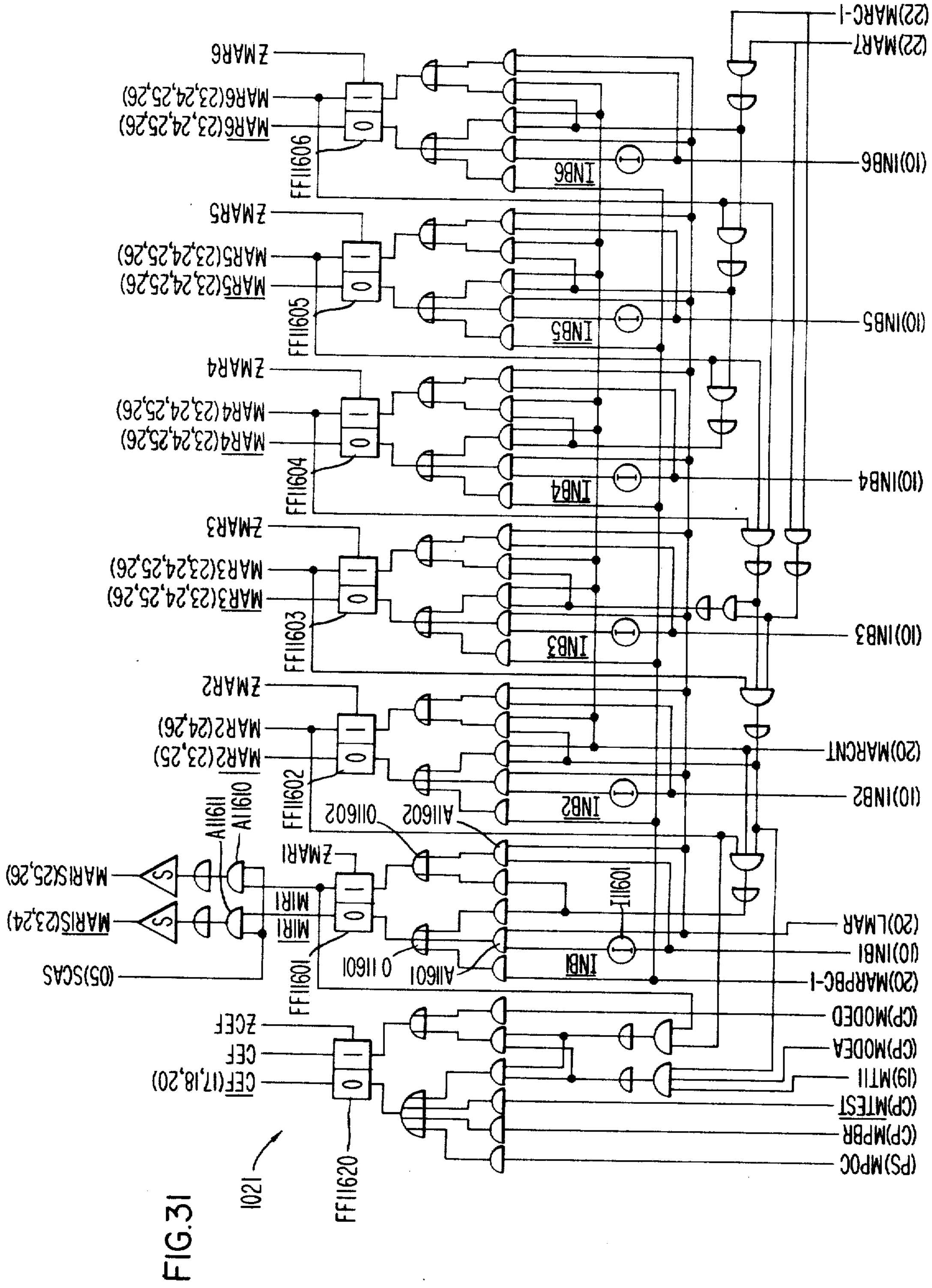
Figure 34:
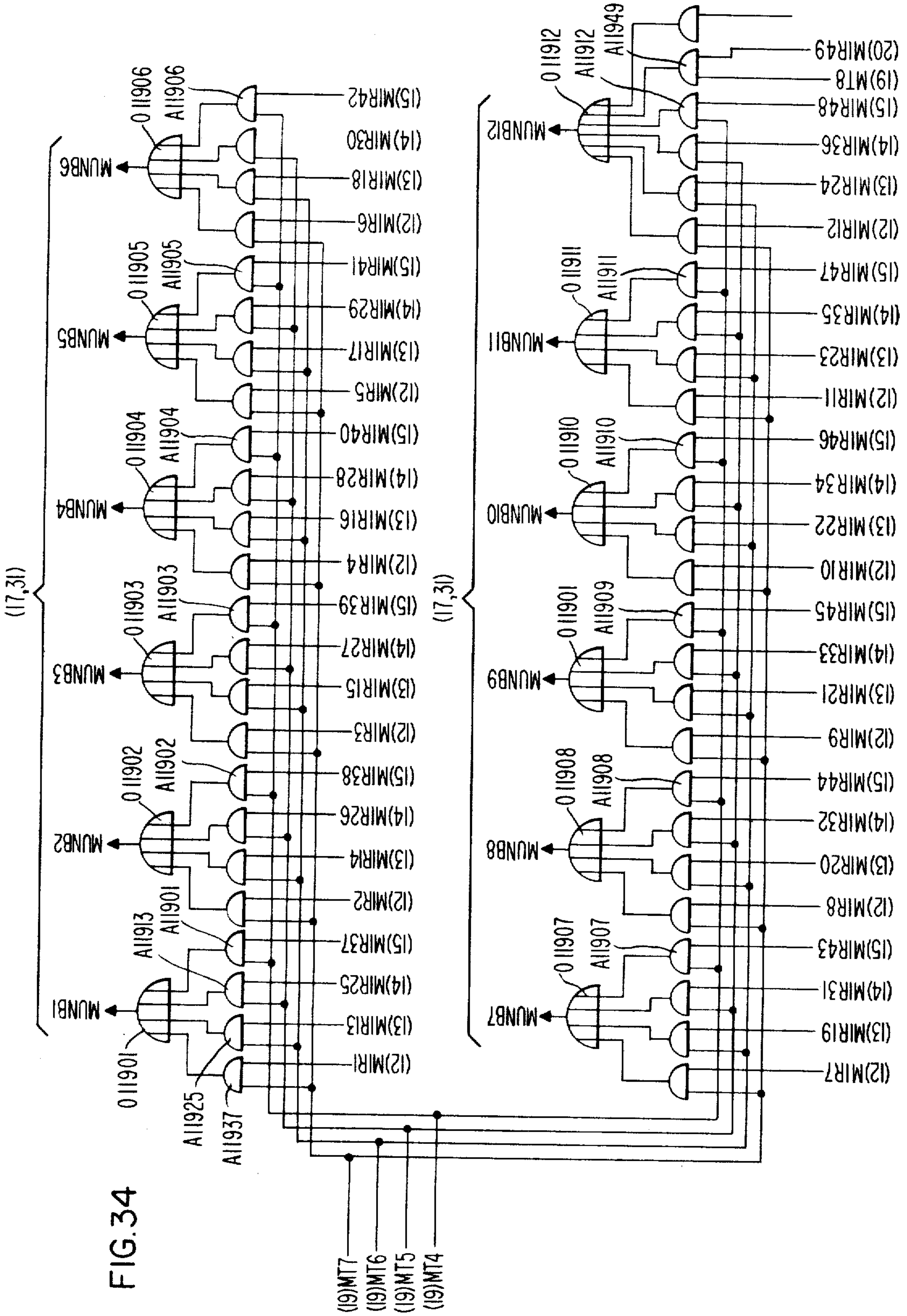
Figure 35:
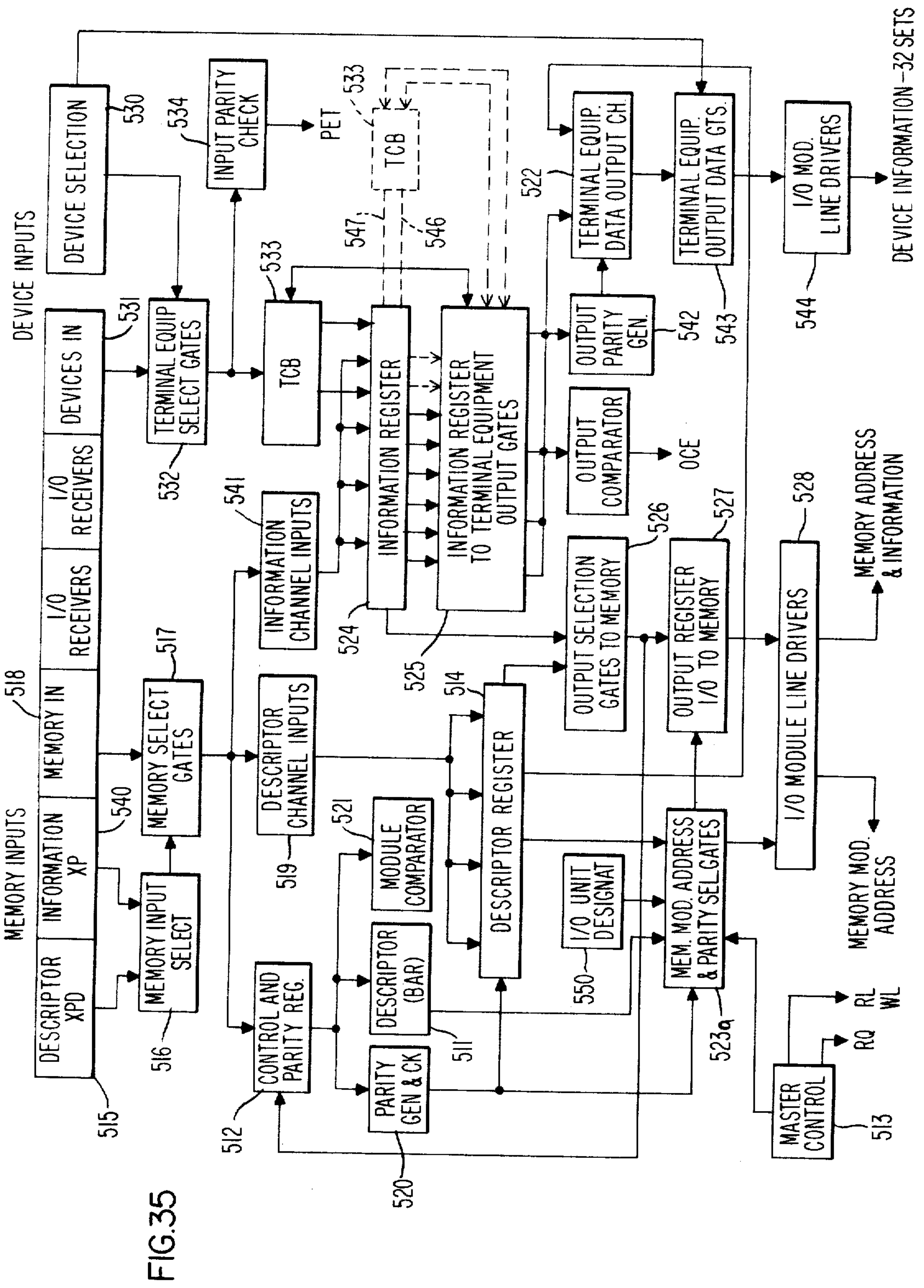
Figure 36:
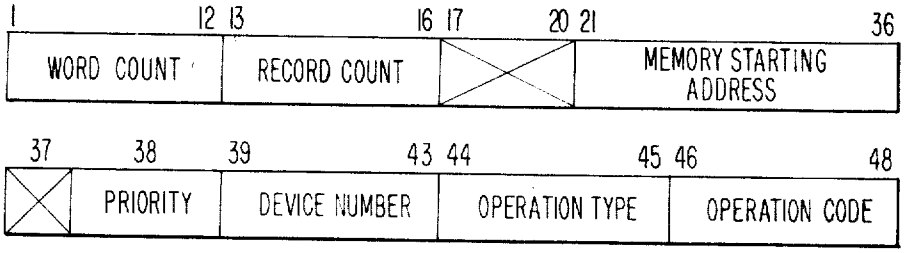
Figure 37:
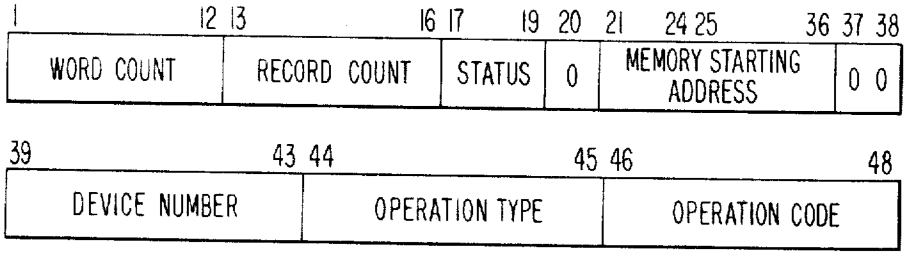
Figure 43:
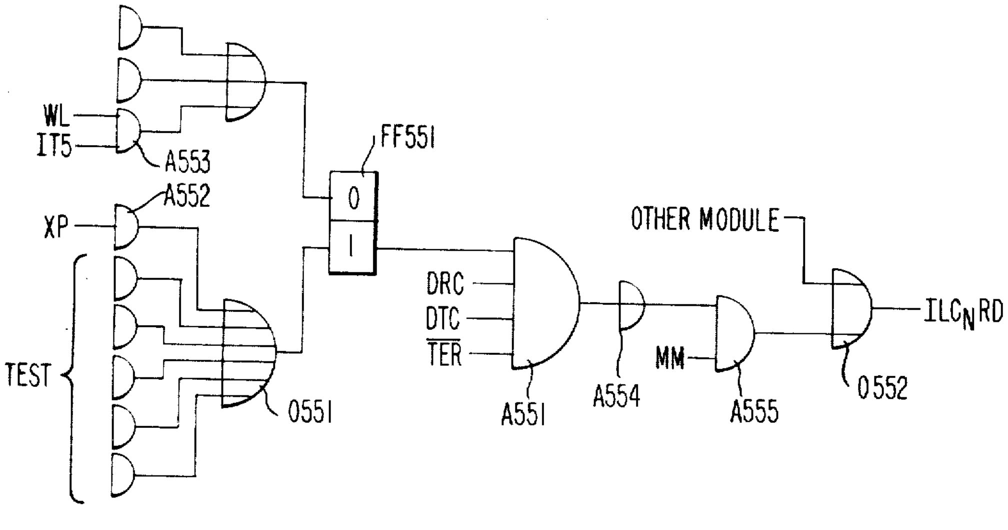
Figure 46:
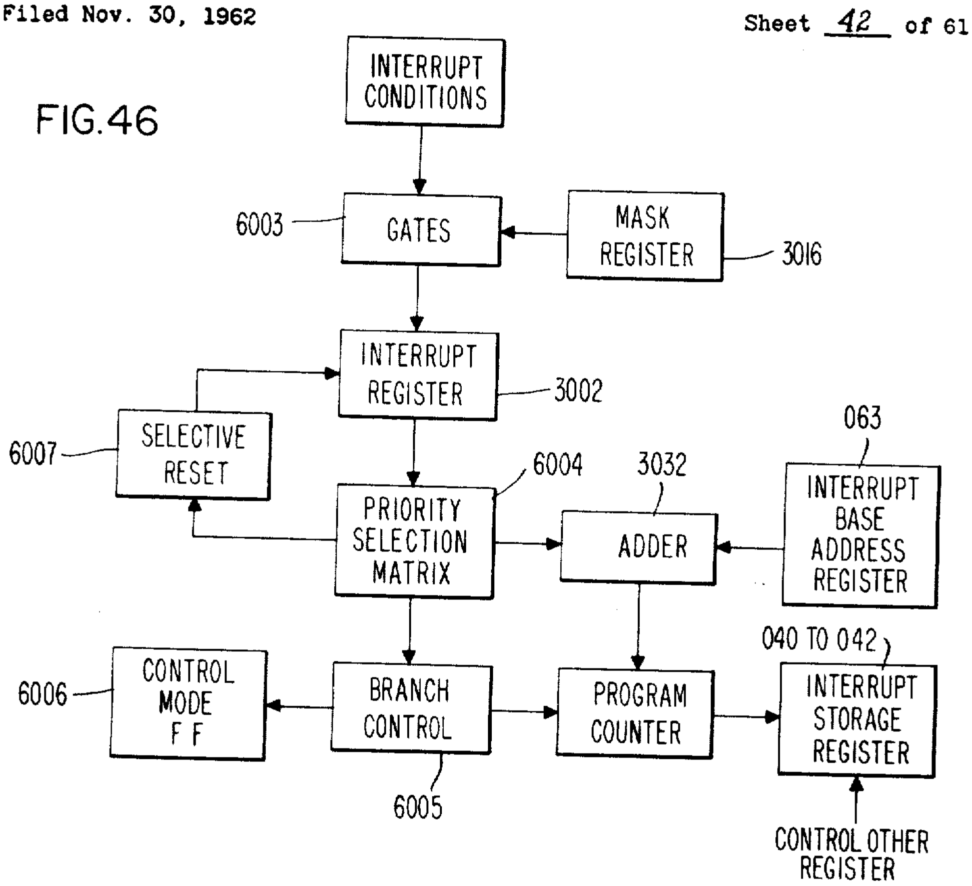
Figure 38:
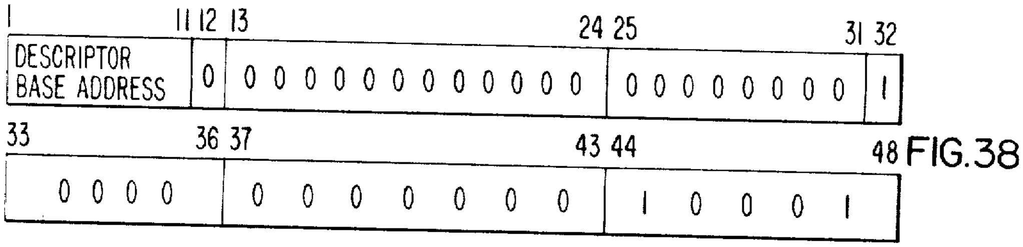
Figure 39:
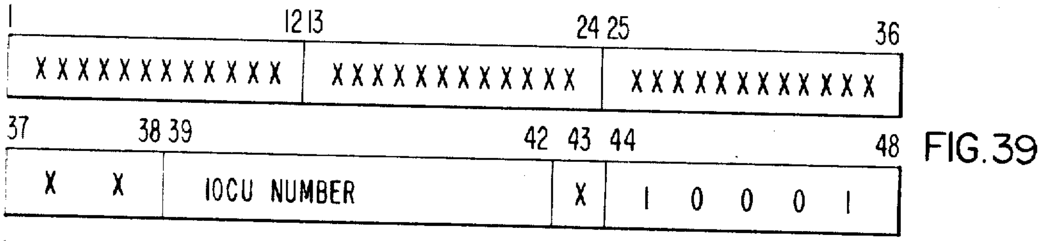
Figure 40:
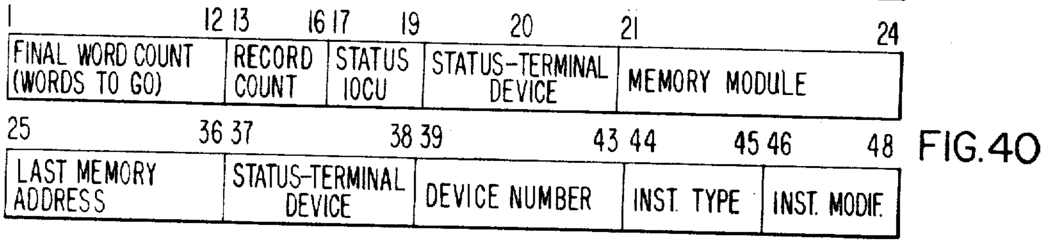
Figure 41:
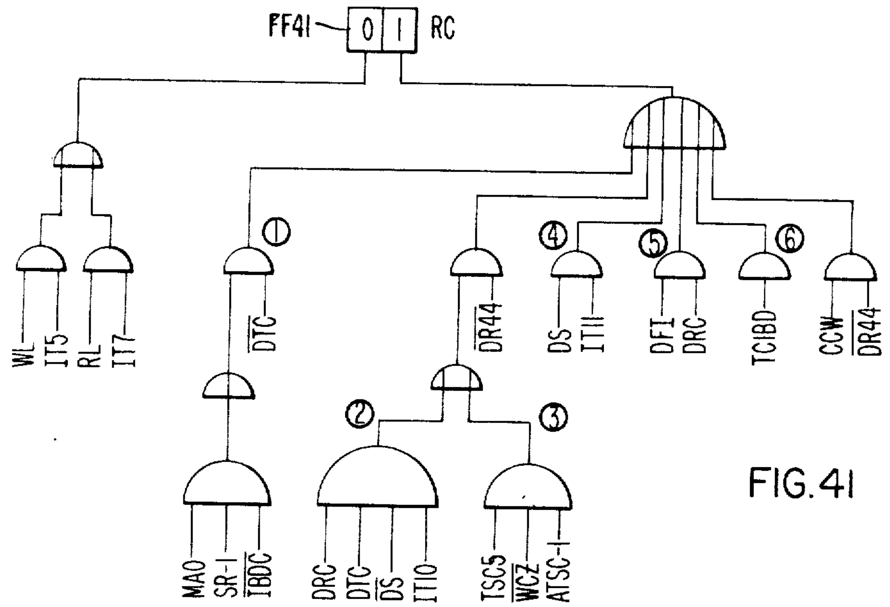
Figure 42:
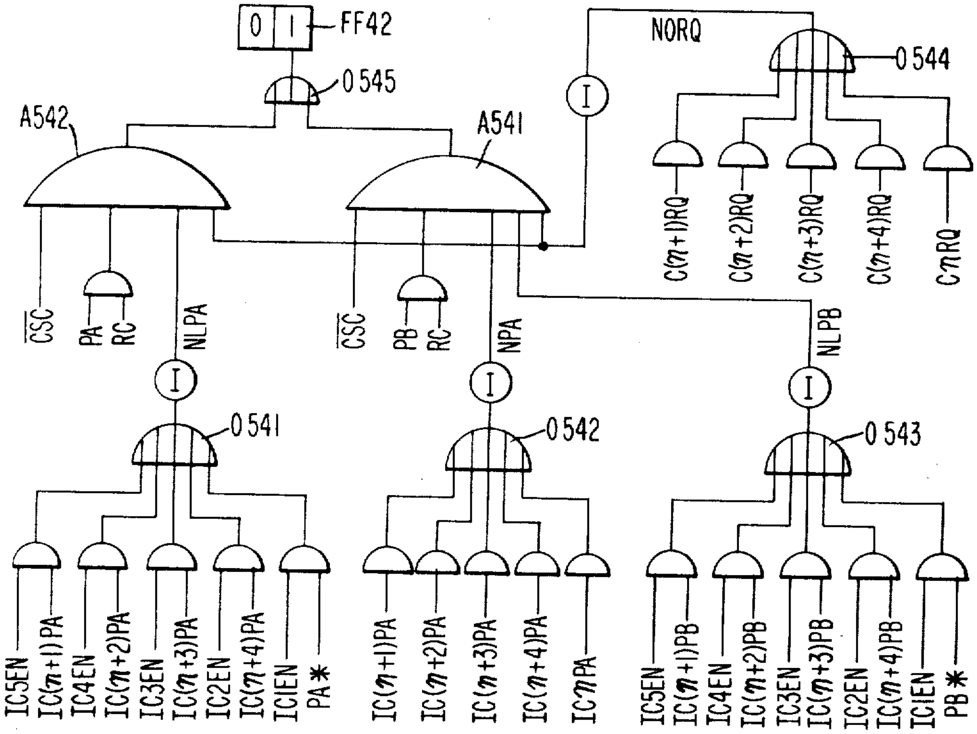
Figures 45, 45B:
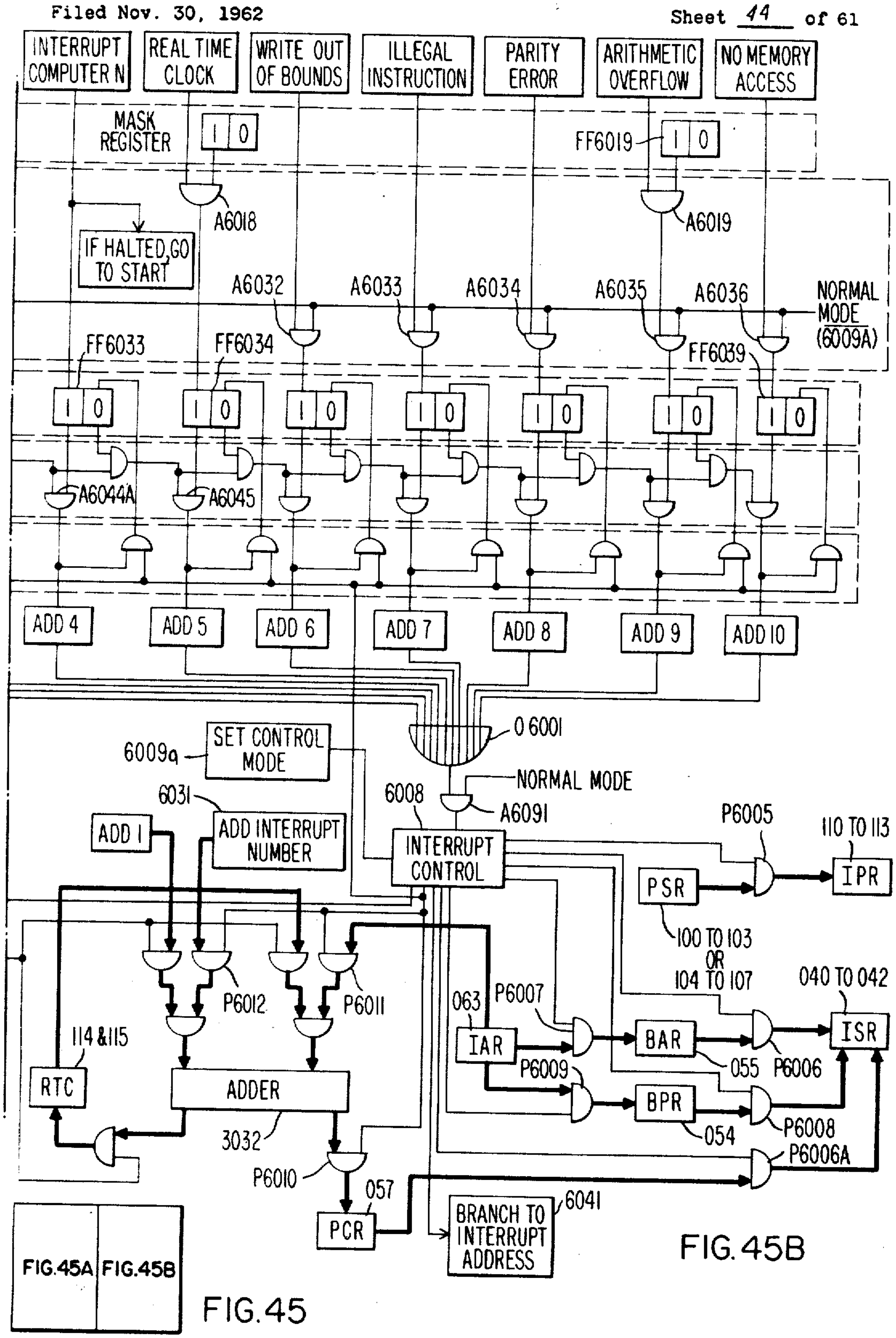
Figure 45A:
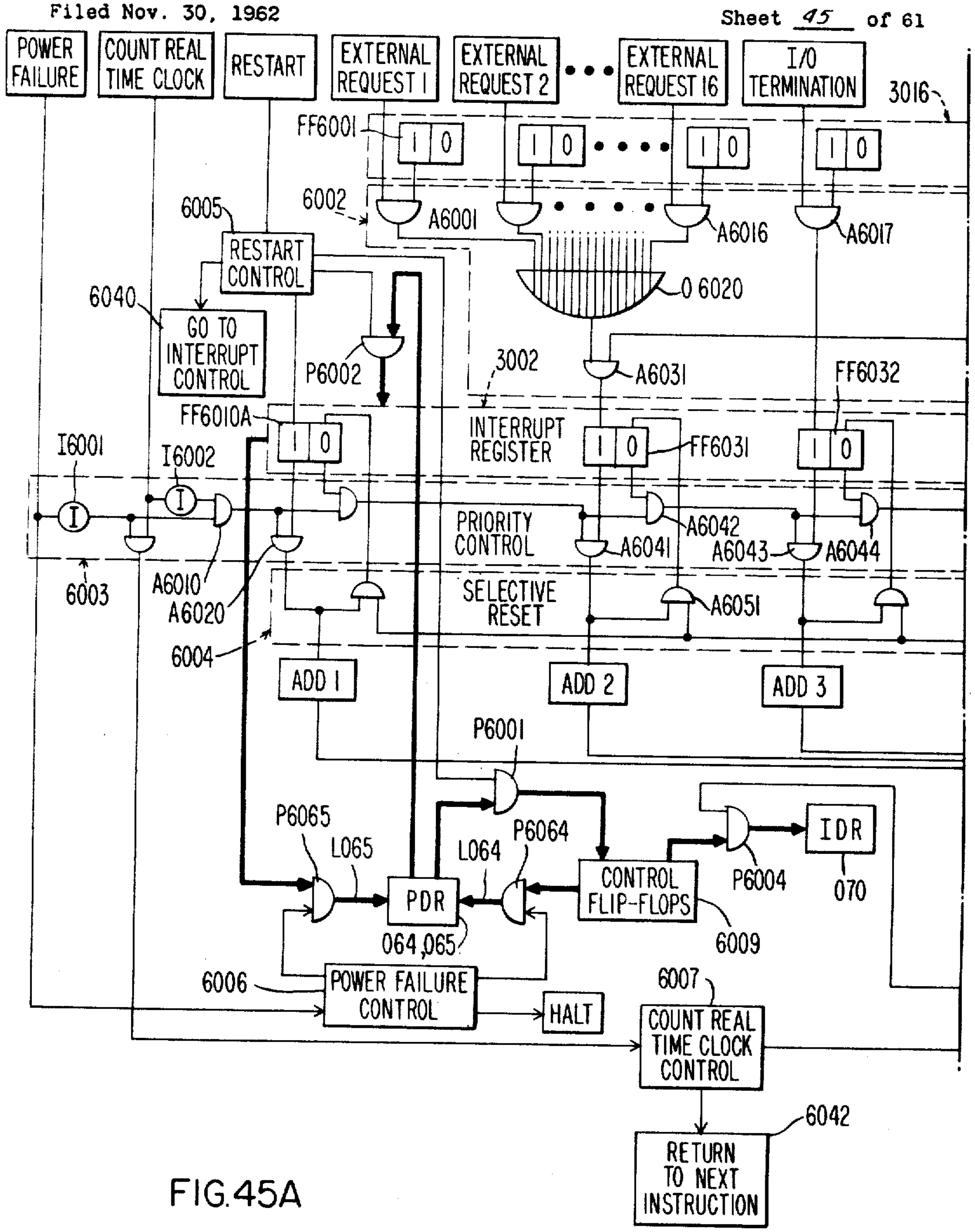
Figure 47:
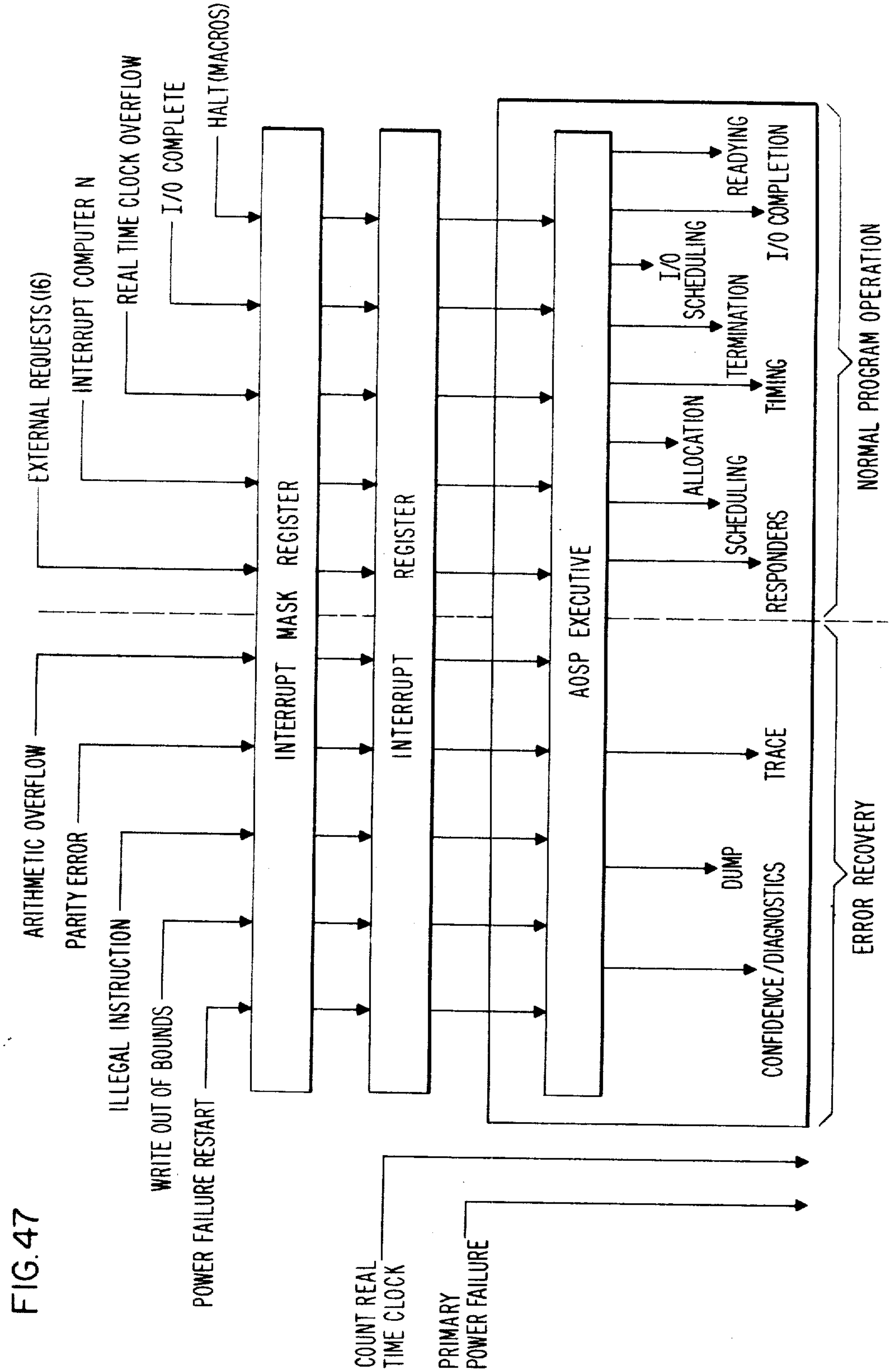
Figures 48, 49:
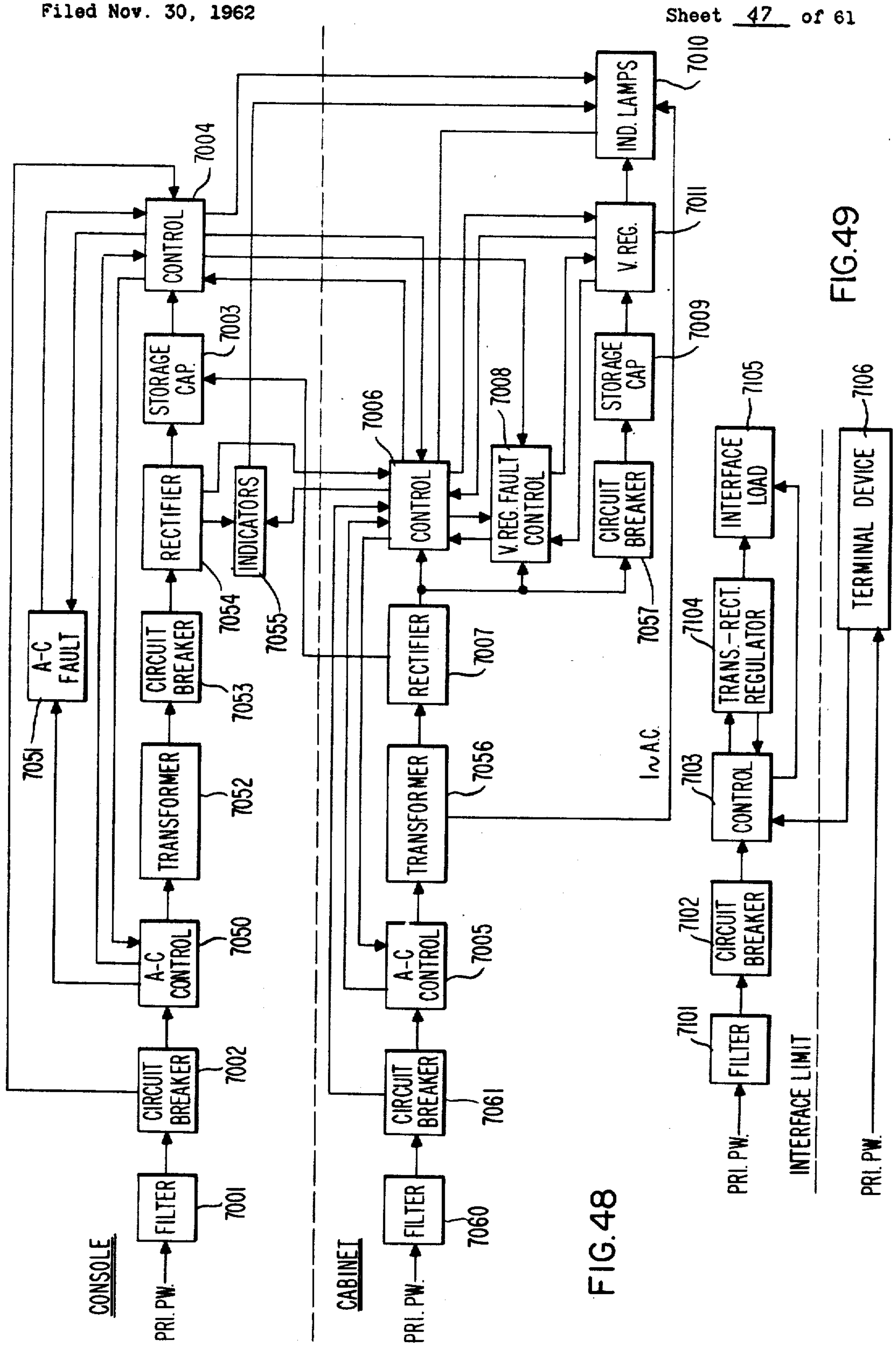
Figure 50:
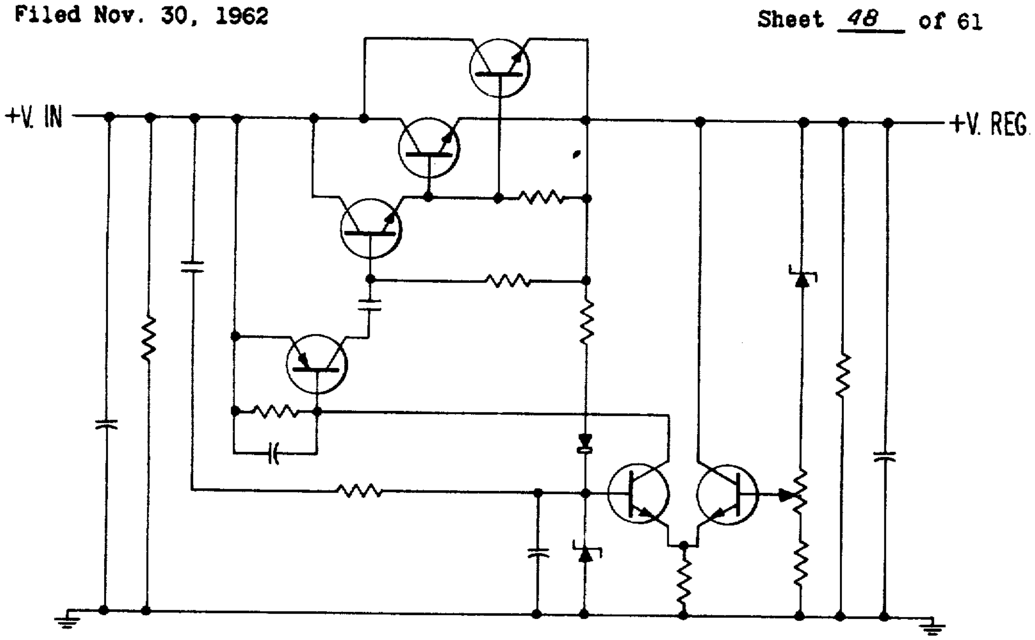
Figure 52:
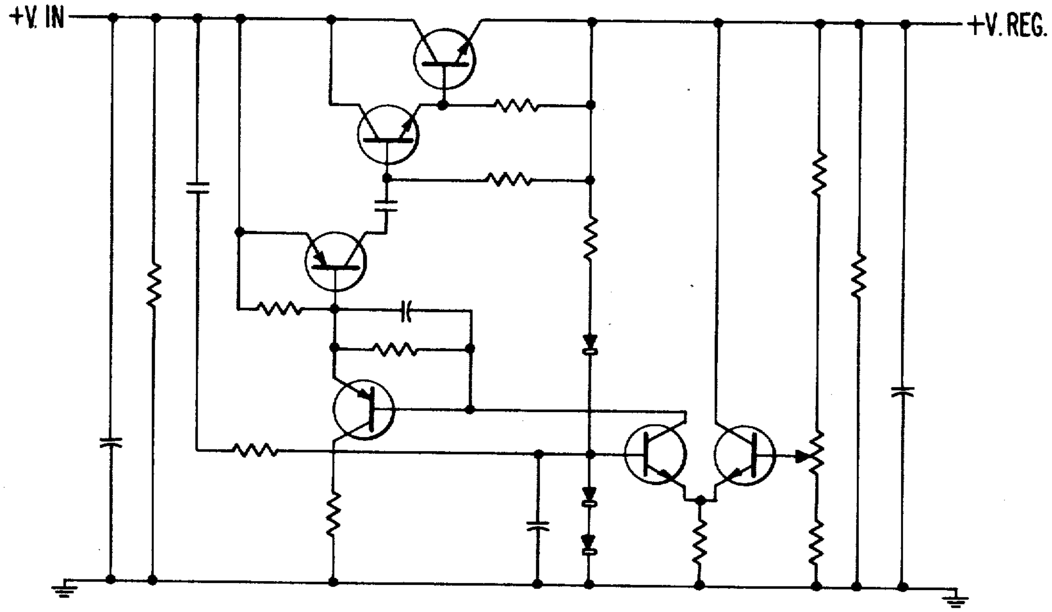
Figure 53:
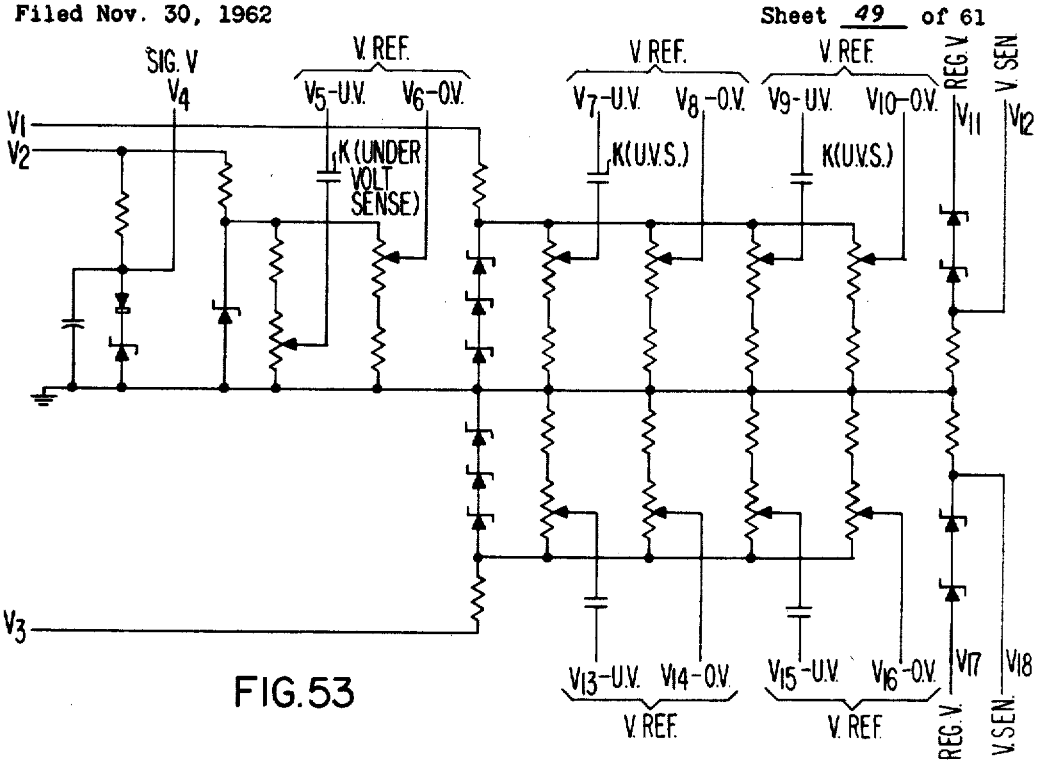
Figure 51:
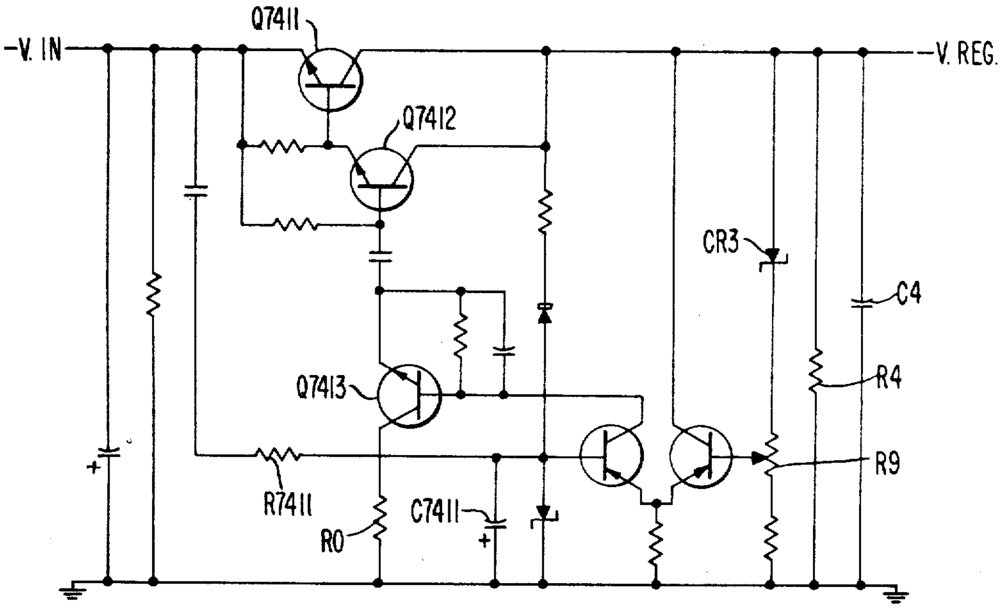
Figure 54:
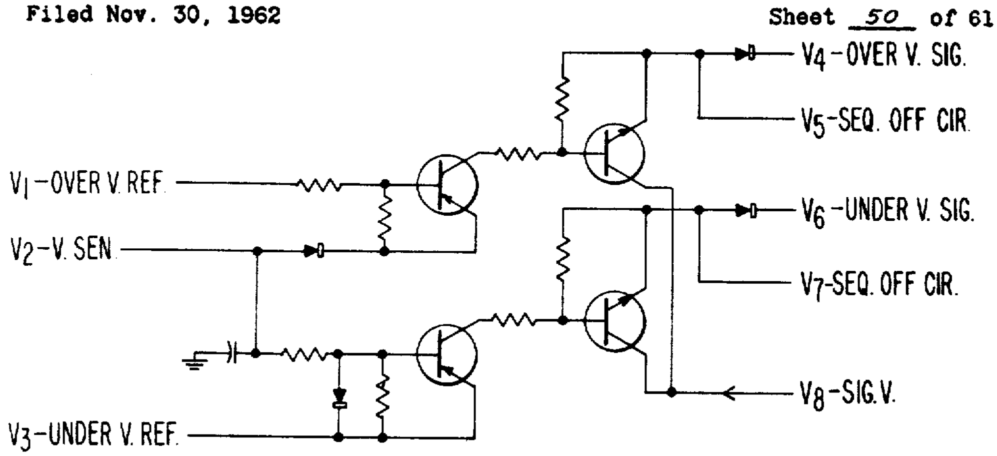
Figure 55:
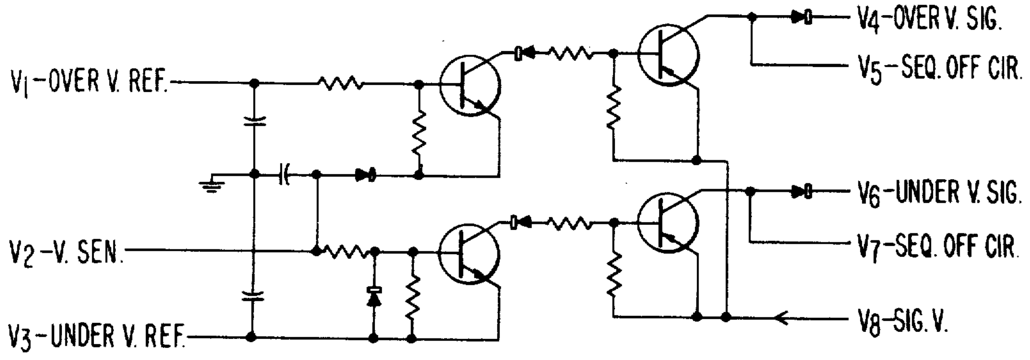
Figure 56:
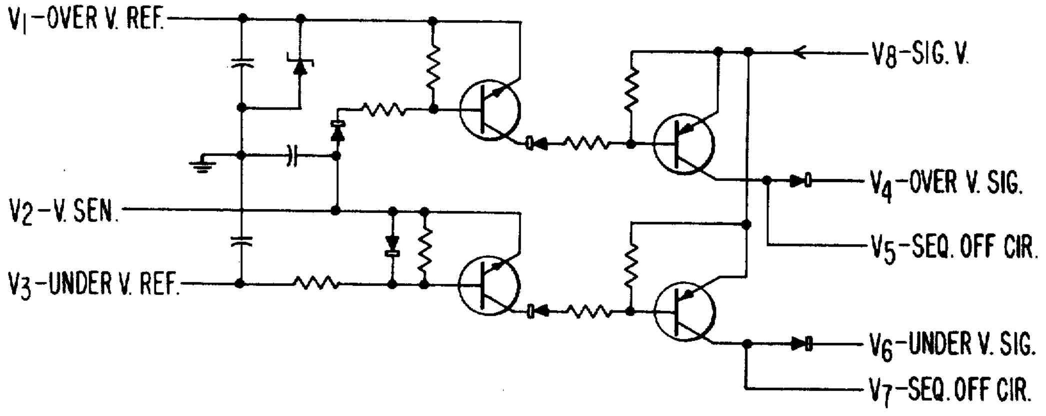
Figure 59:
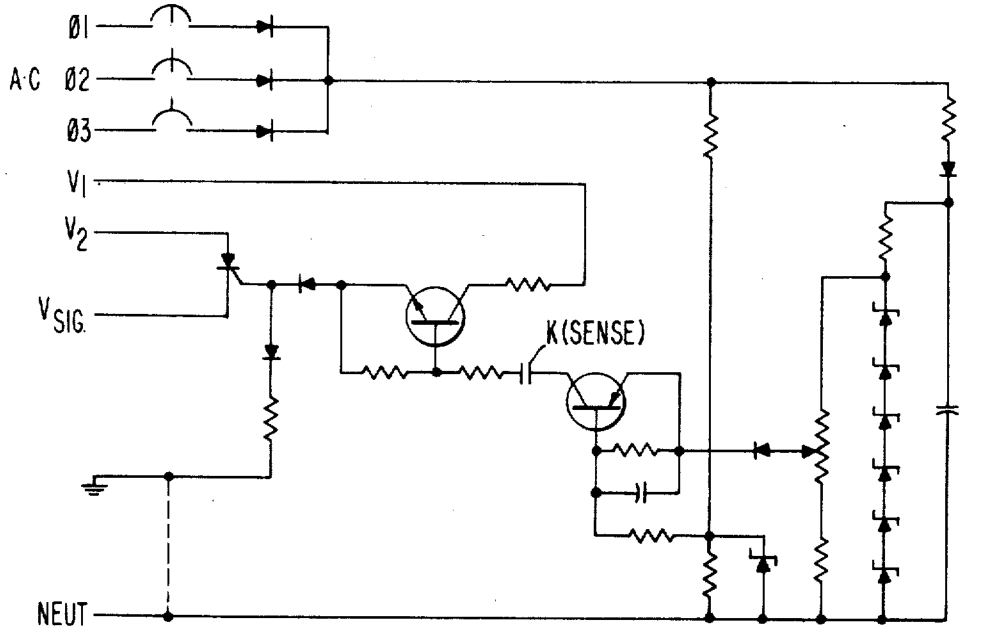
Figure 57:
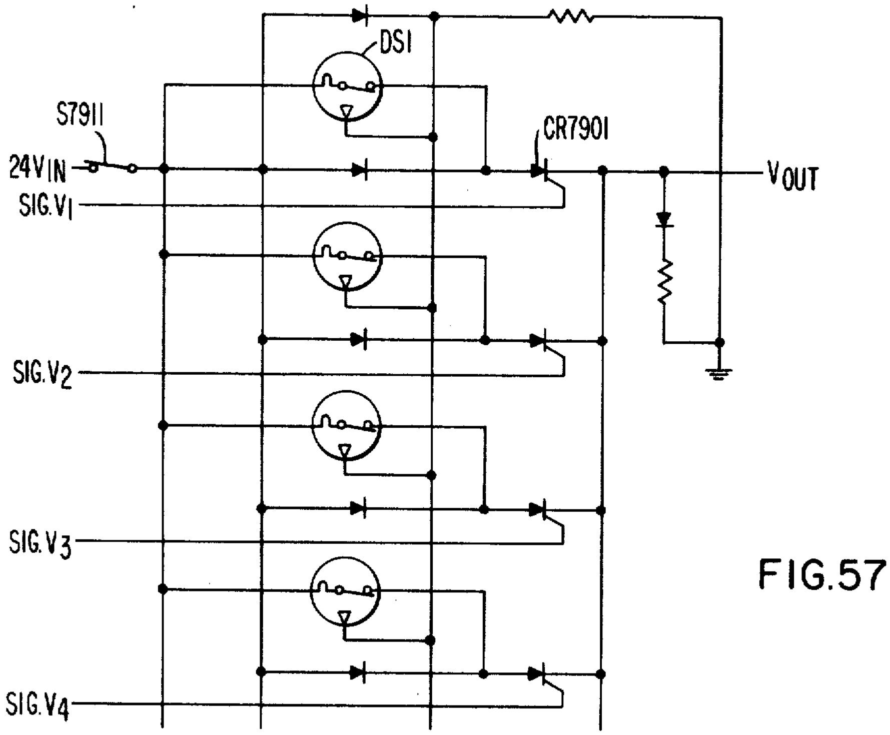
Figure 58:
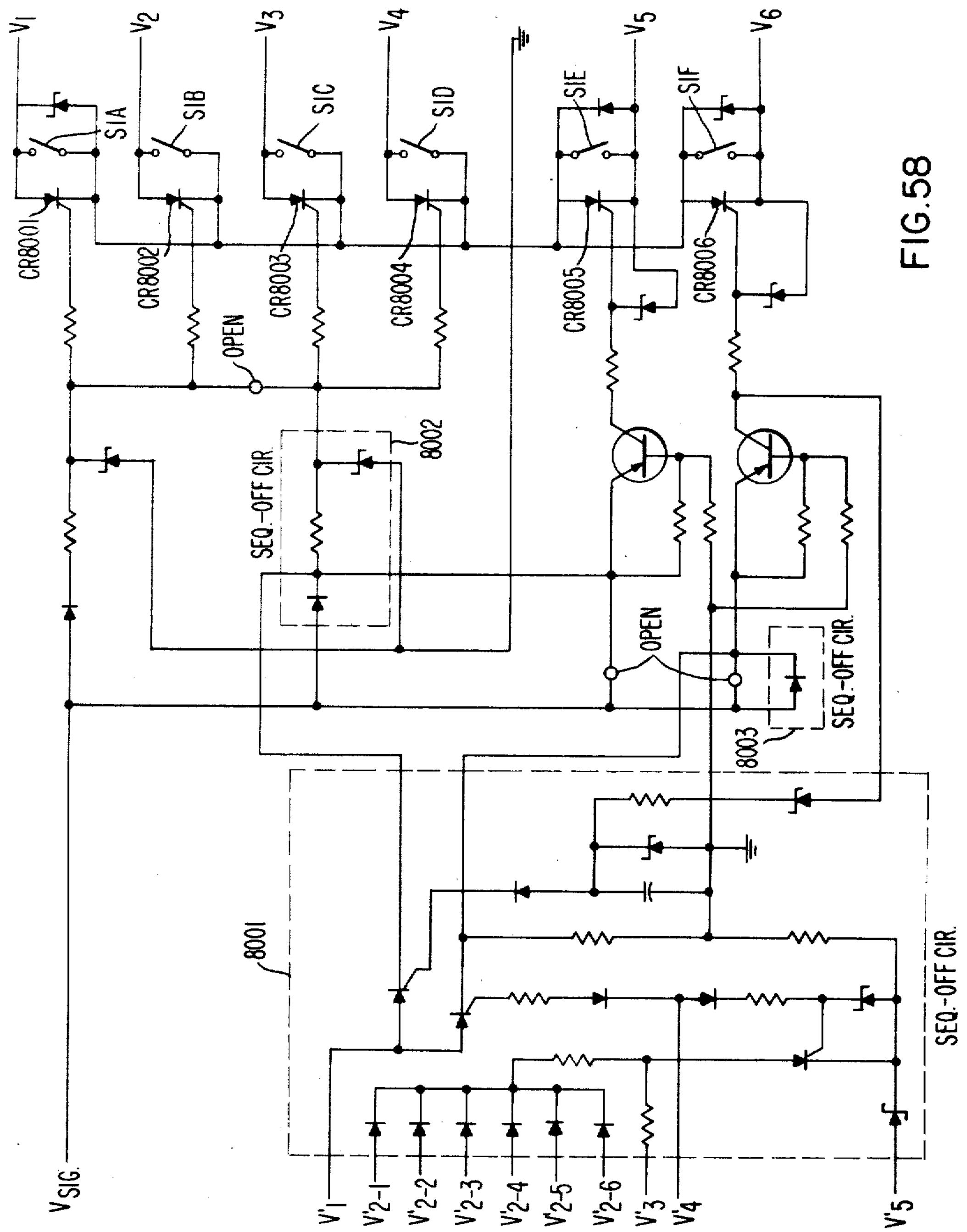
Figure 60:
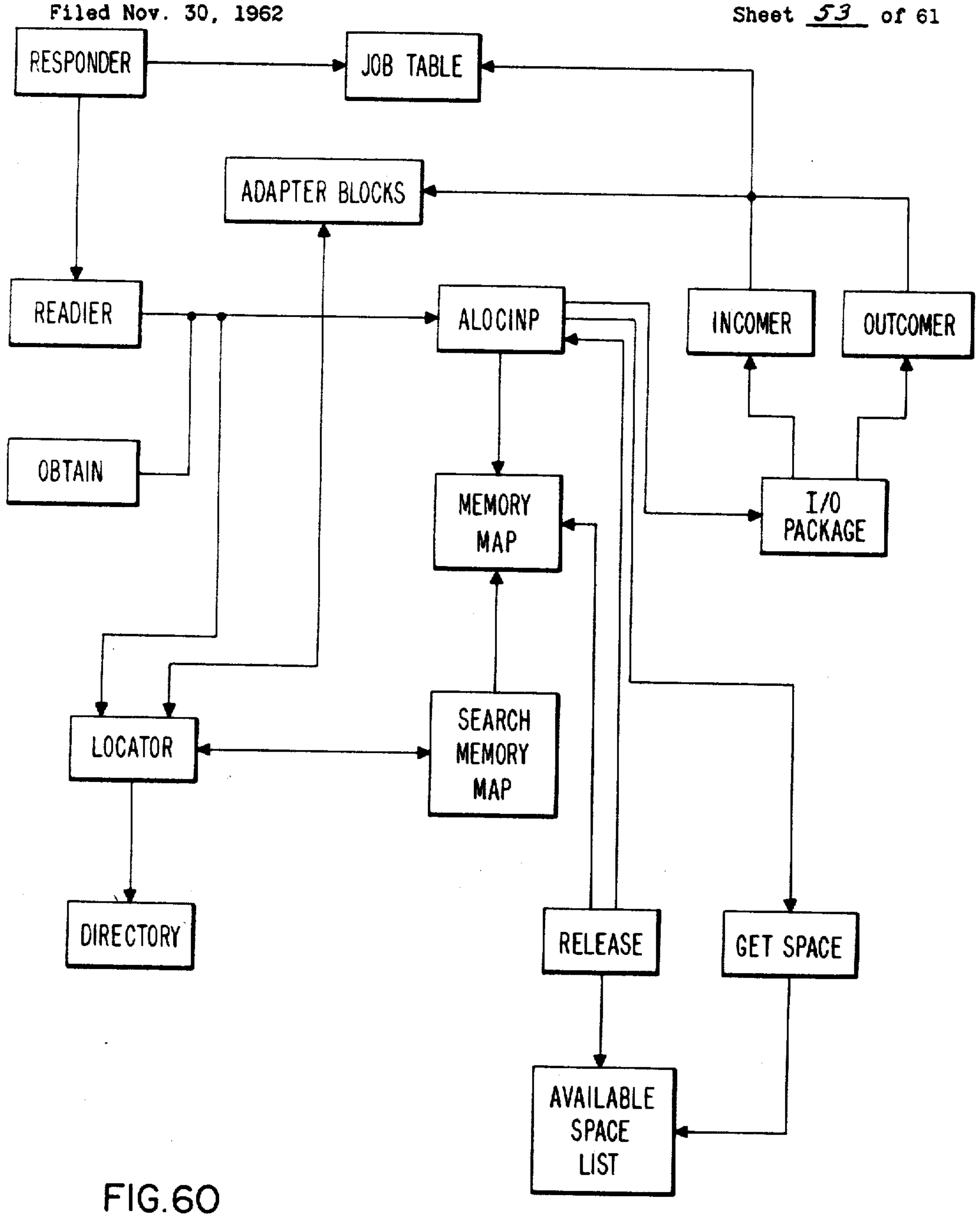
Figure 61:
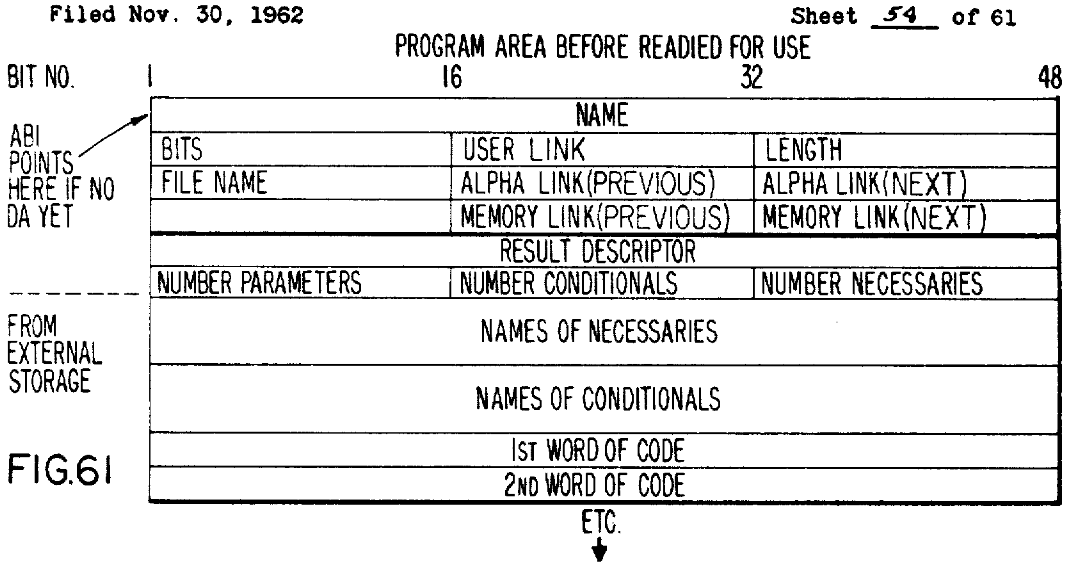
Figure 62:
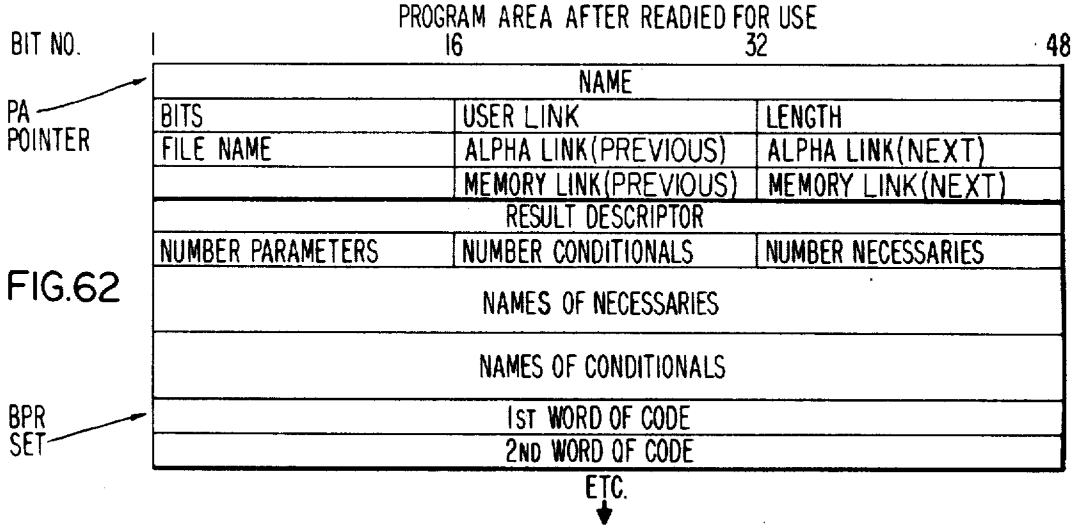
Figure 63:
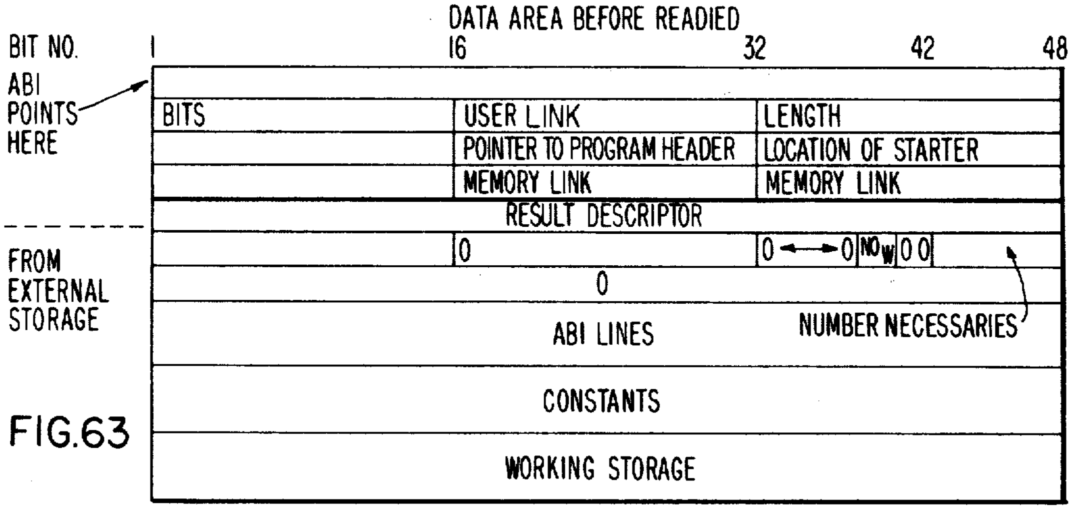
Figure 64:
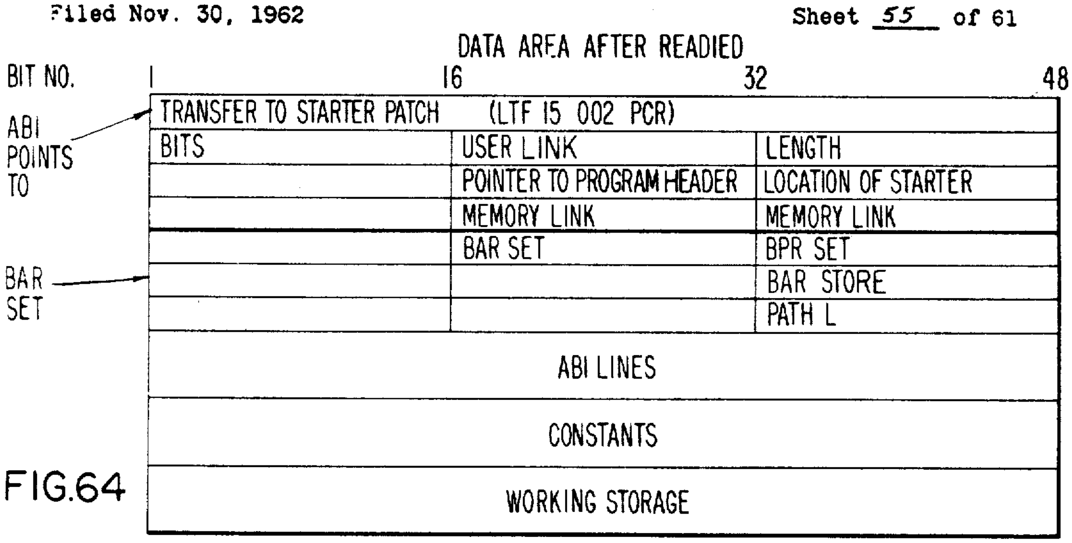
Figure 65:
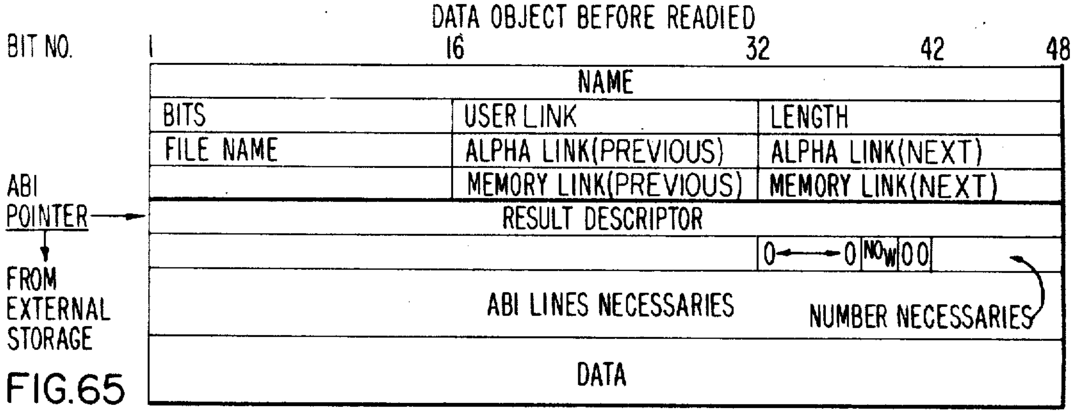
Figure 66:
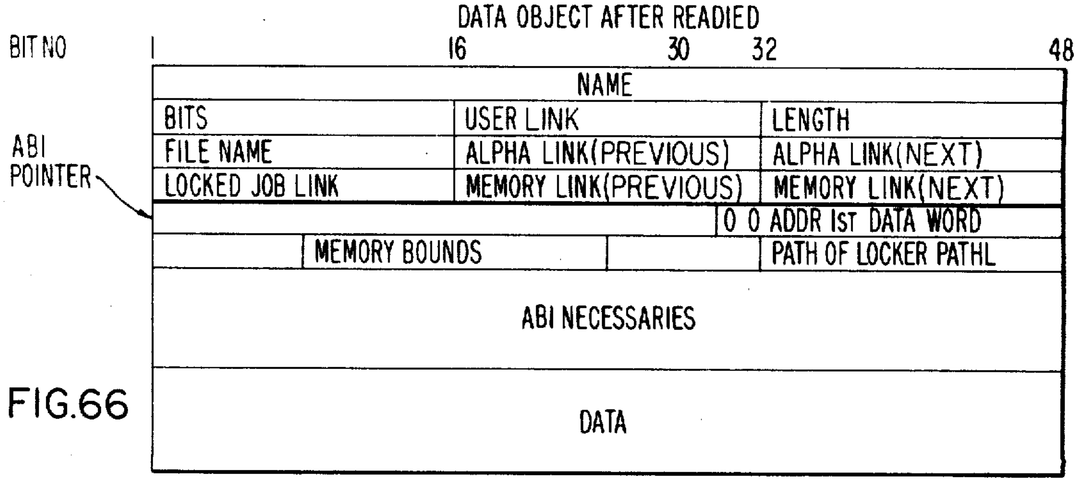
Figure 67:
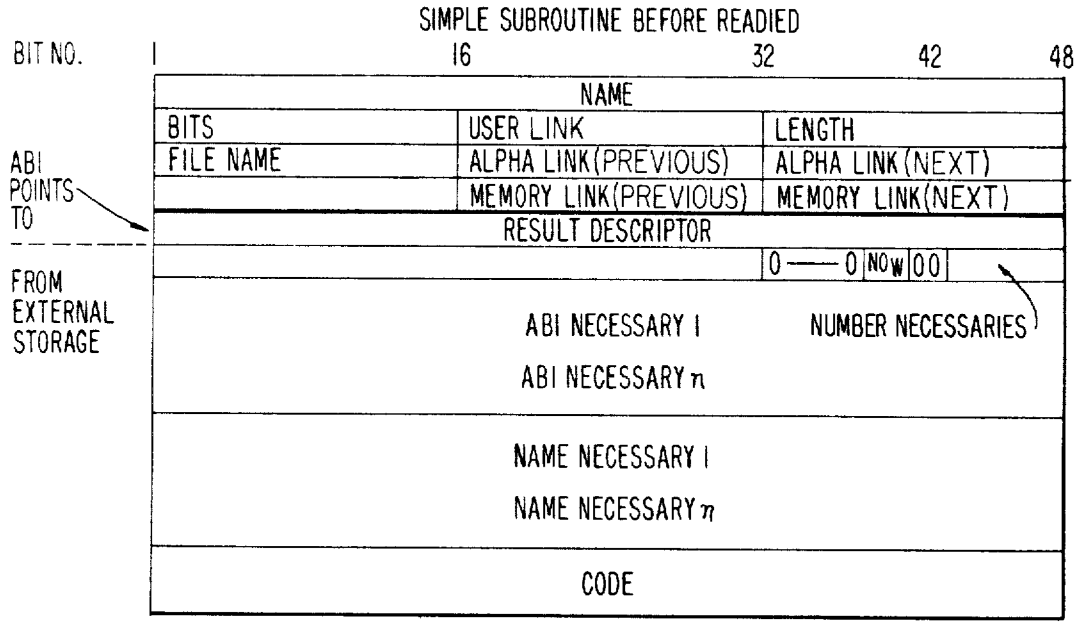
Figure 68:
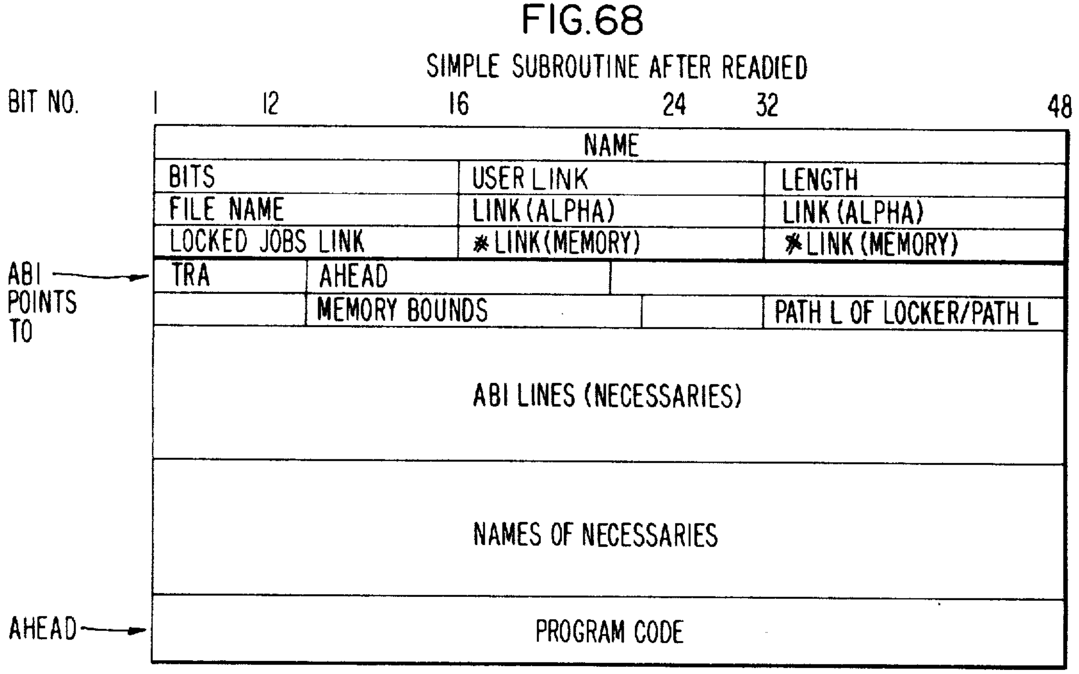
Figure 70:
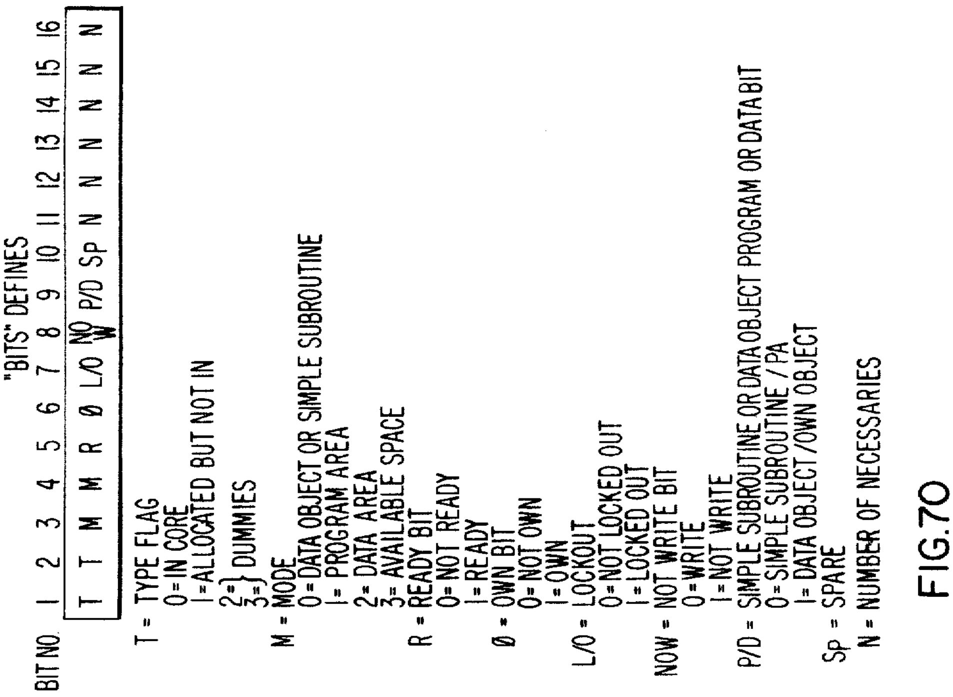

FIG. 9 comprises FIGS. 9A and 9B taken in side-by-side relationship with FIG. 9A placed to the left and further comprises the legend of FIG. 9C, FIG. 9A and FIG. 9B together comprising a block diagrammatic representation of the preferred illustrative embodiment system of FIG. 2 and its optional configurations, but showing the block representation in greater detail and also illustrating the input/output exchange and the transposers in block detail;

FIG. 10A is a block diagram showing the memory clock lines interconnecting the modules of an illustrative embodiment system for simplicity comprising fewer modules than the complete complement;

FIG. 10B is a block diagram illustrating the computer clock line's interconnection between the modules of the system of FIG. 10A;

FIG. 11 is a block diagram of the timing system of the preferred illustrative embodiment of the invention;

FIG. 12 is a block diagram representation to illustrate the local strip lines and interconnections into system flip-flops and termination for a clock system such as illustrated in FIG. 7 for clarity of presentation illustrating fewer than the total number utilized in a complete complement of units of the preferred illustrative embodiment;

FIG. 13 is a diagrammatic representation of the types of syllables utilized in the preferred illustrative embodiment system and particularly utilized in programming the illustrative embodiment computer;

FIG. 14A is a pictorial representation showing operation of the stack in the computer module of the preferred illustrative embodiment of the invention;

FIG. 14B is a logical representation further illustrating the operation of the stack of the computer module of the preferred illustrative embodiment of the invention;

FIG. 15 is a diagrammatic representation of an illustrative example syllable structure for a program instruction utilizable with the present invention;

FIG. 16 is a diagrammatic representation of the word structure utilizable in the computer system of the present invention;

FIG. 17 is a schematic representation of the memory diode matrix and stack in the memory module of the preferred illustrative embodiment of the present invention;

FIG. 18 is a partially block and partially schematic diagrammatic representation of the intrinsic memory portion of the memory module of FIGS. 5A, 5B, 5C, and 5D;

FIG. 19 comprises FIG. 19A and FIG. 19B in vertical tandem representation with FIG. 19A at the top, FIG. 19A and FIG. 19B together presenting a graphical representation of the timing diagrams for the memory timing relationship in the preferred illustrative embodiment of the computer system;

FIG. 20 is a block and logical diagrammatic representation of the receiver units in the memory module input section of the preferred illustrative embodiment memory module of FIG. 5;

FIG. 21 is a logical diagram of the bus mixer circuits of the memory module of FIG. 5 of the preferred illustrative embodiment of the invention;

FIG. 22 comprises FIGS. 22A and 22B in side-by-side relationship with FIG. 22A shown to the left, FIGS. 22A and 22B together presenting the module address selector of the preferred illustrative embodiment memory module of FIG. 5;

FIG. 23 comprises FIGS. 23A and 23B taken in side-by-side relationship with FIG. 23A to the left, FIG. 23A and FIG. 23B together comprising the conflict resolver and bus selection unit of the preferred illustrative embodiment memory module of FIG. 5A;

FIG. 24 comprises FIG. 24A and FIG. 24B in side-by-side relationship with FIG. 24A to the left, FIG. 24A and FIG. 24B together comprising the cross-point bus signal circuits of the preferred illustrative embodiment memory module of FIG. 5A;

FIG. 25 is a logical schematic diagram of the memory module drivers of the preferred illustrative embodiment memory module of the invention of FIG. 5;

FIG. 26 is a logical schematic diagram of the time counter control circuit of the illustrative embodiment memory module of FIG. 5A;

FIG. 27 is a logical diagrammatic representation of the memory time counter of the illustrative embodiment memory module of FIG. 5A;

FIGS. 28A and 28B are the core read and write timing control circuits of the illustrative embodiment memory module of FIG. 5C wherein FIG. 28A is a logical diagram of the start memory read cycle circuit and FIG. 28B is a logical diagram of the start memory write cycle circuit;

FIG. 29 is a logical diagrammatic representation of the register controls unit of the illustrative embodiment memory module of the present invention of FIG. 5A;

FIG. 30 comprises FIG. 30A and FIG. 30B in side-by-side relationship with FIG. 30A shown to the left, FIG. 30A and FIG. 30B taken together constituting the first 6 bits of the memory input matrix of the illustrative embodiment memory module of the present invention of FIG. 5D;

FIG. 31 is a logical diagrammatic representation of the memory address register of the illustrative embodiment memory module of FIG. 5C;

FIG. 32 is a logical diagrammatic representation of the 6 most significant bit circuits of the memory address register decoder of the preferred illustrative embodiment memory module shown in block representation in FIG. 5C;

FIG. 33 is a logical diagrammatic representation of the most significant 12 bits of the memory information register comprising memory information register syllable A (MIR A) of the memory module of FIG. 5D of the preferred illustrative embodiment of the present invention;

FIG. 34 is a logical diagram of the memory information output circuit including the syllable information output means and the information output mixer of the memory module of FIG. 5D of the illustrative embodiment of the invention;

FIG. 35 is a block diagram of an input/output control module of the preferred illustrative embodiment of the invention;

FIG. 36 is a diagrammatic representation of the format of a command descriptor;

FIG. 37 is a diagrammatic representation of the format of an in process descriptor;

FIG. 38 is a diagrammatic representation of the format of a set-up descriptor;

FIG. 39 is a diagrammatic representation of the format of a release descriptor;

FIG. 40 is a diagrammatic representation of the format of a result descriptor;

FIG. 41 is a logical diagram of the circuit for the I/O control module of FIG. 35 of the illustrative embodiment of the present invention, which circuit sets the state of the request conditions flip-flop for requested access of an I/O control module to memory and illustrating the six conditions involved in setting the request condition flip-flop;

FIG. 42 is a logical diagram of the request for memory access flip-flop logical circuit of the input/output control module of FIG. 35 of the illustrative embodiment of the present invention, which circuit provides means responsive to the existence of request conditions in the circuit of FIG. 41;

FIG. 43 is a logical diagram of a circuit of the input/output control module of FIG. 35 of the illustrative embodiment of the invention which circuit comprises the computer interrupt circuit for the I/O control modules of the illustrative embodiment of the present invention;

FIG. 44 is a control simplified flow diagram of flow of instructions and data between an input/output control module and the other types of modules and units in the illustrative embodiment system, the solid lines denoting flow of instructions and the dashed lines denoting flow of data;

FIG. 45 comprises FIG. 45A and FIG. 45B in side-by-side relationship with FIG. 45A to the left and wherein FIG. 45A and FIG. 45B, thus taken together present a diagrammatic representation partially block, partially schematic, and partially logical of the automatic interrupt system of the preferred illustrative embodiment of the present invention;

FIG. 46 is a simplified diagram of the automatic interrupt system of FIG. 45;

FIG. 47 is a chart diagram showing the interrupt operations in conjunction with the automatic operating and scheduling control process and system of the preferred illustrative embodiment of the invention, illustrating the interrupts into the system and further showing the responsive functions generated by the automatic operating and scheduling control;

FIG. 48 is a block diagram of the power system of the preferred illustrative embodiment of the invention;

FIG. 49 is a block diagram of the interface unit or transposer and the terminal device power system of the preferred illustrative embodiment of the present invention;

FIG. 50 is a schematic diagram of the positive voltage regulator circuits employed in the preferred illustrative embodiment power system of FIG. 48;

FIG. 51 is a schematic diagram of the negative voltage regulator circuits employed in the preferred illustrative embodiment power system of FIG. 48;

FIG. 52 is a schematic diagram of the positive low voltage regular employed in the illustrative embodiment power system of FIG. 48;

FIG. 53 is a schematic diagram of the voltage reference circuit employed in the preferred illustrative embodiment power system of FIG. 48;

FIG. 54 is a schematic diagram of the positive voltage fault sensing circuit employed in the preferred illustrative embodiment power system of FIG. 48;

FIG. 55 is a schematic diagram of the negative voltage fault sensing circuit employed in the preferred illustrative embodiment power system of FIG. 48;

FIG. 56 is a schematic diagram of the low positive voltage fault sensing circuit employed in the preferred illustrative embodiment power system of FIG. 48;

FIG. 57 is a schematic diagram of the recording circuit employed in the preferred illustrative embodiment power system of FIG. 48;

FIG. 58 is a schematic diagram of the protection circuit and high speed sequencing off protection circuit employed in the preferred illustrative embodiment power system of FIG. 48;

FIG. 59 is a schematic diagram of the AC fault sensing and signaling circuit employed in the preferred illustrative embodiment power system of FIG. 48;

FIG. 60 is a block representation illustrating a simplified functional flow diagram of the automatic operating and scheduling control process and system of the preferred illustrative embodiment of the present invention;

Each of FIGURES 61 to 70 hereinbelow set forth are format and bit definitions of the various headers required to be appended to the operational program and data operating in the preferred illustrative embodiment inventive system which are shown in preferred illustrative embodiment representation and wherein:

FIG. 61 is a format and bit definition of a header for the "Program Area" before being readied by the automatic operating and scheduling control system and process;

FIG. 62 is a format and bit definition of a header for the "Program Area" after being readied by the automatic operating and scheduling control system and process;

FIG. 63 is a diagrammatic representation of the format and bit definitions of a header for the "Data Area" before being readied by the automatic operating and scheduling control system and process;

FIG. 64 is a diagrammatic representation of the format and bit definitions of the header for the "Data Area" after being readied by the automatic operating and scheduling control system and process;

FIG. 65 is a diagrammatic representation of the format and bit definitions of the header for the "Data Object" before being readied by the automatic operating and scheduling control system and process;

FIG. 66 is a diagrammatic representation of the format and bit definition of the header for the "Data Object" after being readied by the automatic operating and scheduling control system and process;

FIG. 67 is a diagrammatic representation of the format and bit definitions of the header for the "Simple Subroutine" before being readied by the automatic operating and scheduling control system and process;

FIG. 68 is a diagrammatic representation of the format and bit definitions of the header for the "Simple Subroutine" after being readied by the automatic operating and scheduling control system and process;

FIG. 69 is a diagrammatic representation of the format and bit definitions of the header for the bit definition of the "Adaptor Block Line";

FIG. 70 is a diagrammatic representation showing the format and bits defined for the "Adaptor Block."

Figure 71:
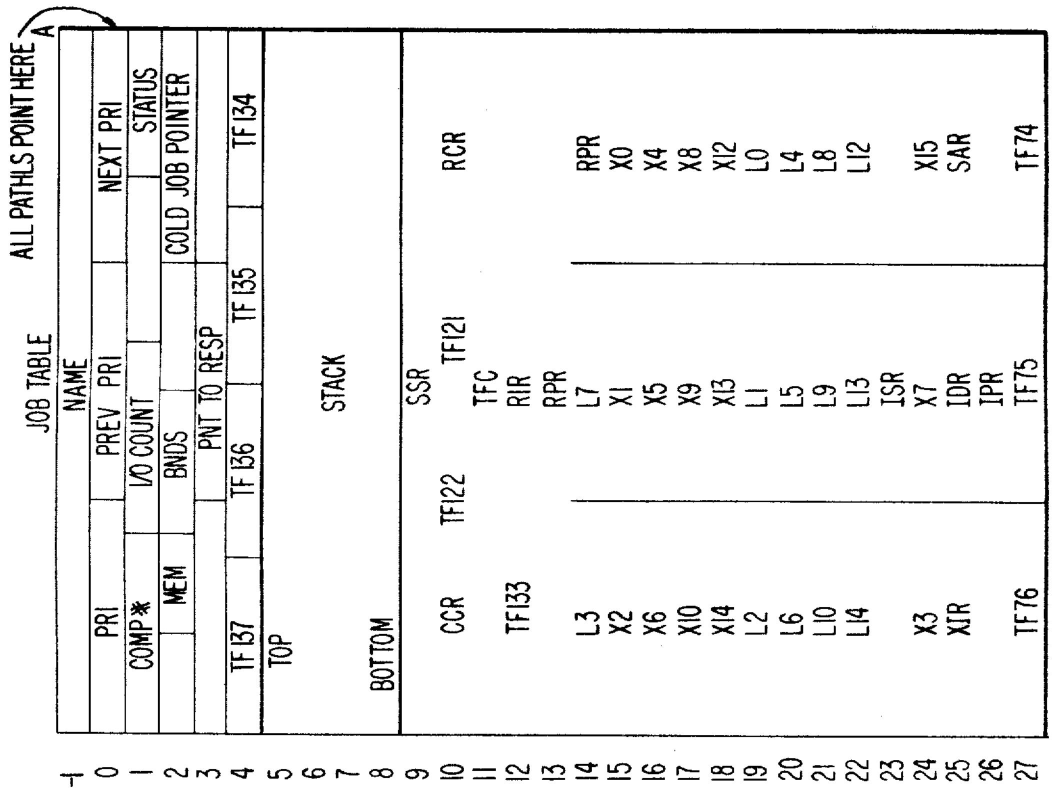
Figure 72:
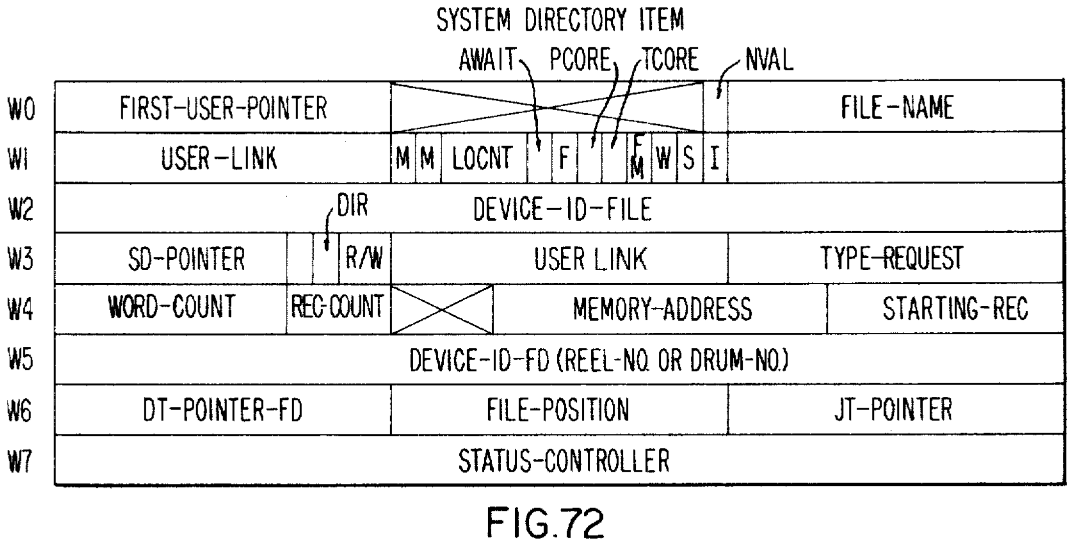
Figure 73:
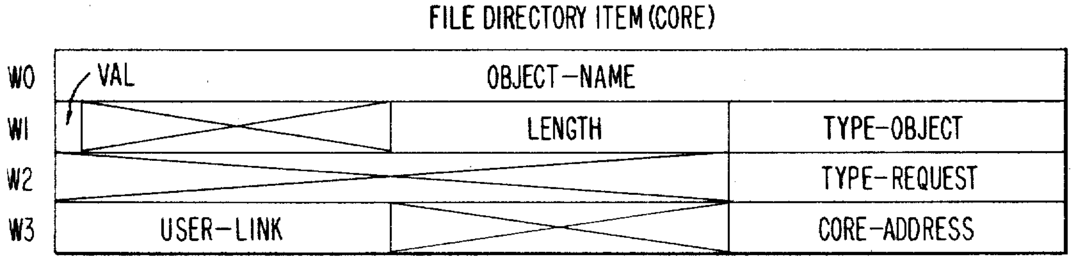
Figure 74:
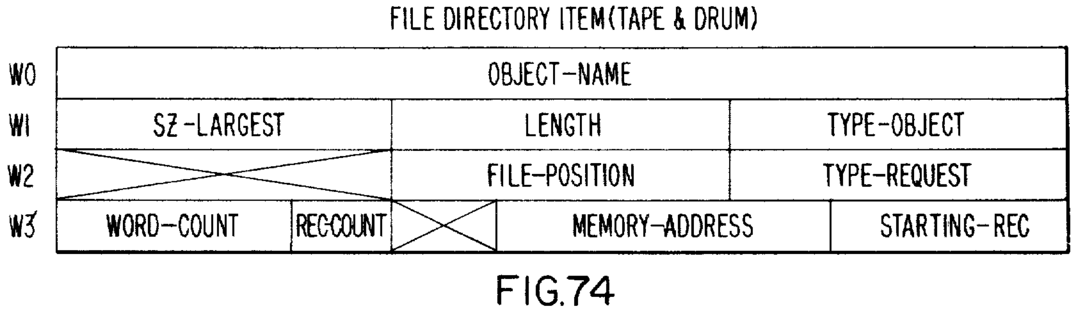

FIG. 71 is a diagrammatic representation of the format of the Job Table of the "Automatic Operating and Scheduling Control Process and System" of the preferred illustrative embodiment of the invention;

FIG. 72 is a diagrammatic representation of the format of the System Directory Item of the "Automatic Operating and Scheduling Control Process and System" of the preferred illustrative embodiment of the present invention;

FIG. 73 is a diagrammatic representation of the format of the File Directory Item (Core) of the "Automatic Operating and Scheduling Control Process and System" of the preferred illustrative embodiment of the present invention;

FIG. 74 is a diagrammatic representation of the format of the File Directory Item (Tape & Drum) of the "Automatic Operating and Scheduling Control Process and System" of the preferred illustrative embodiment of the present invention; and FIG. 75 comprises FIGURES 75A and 75B in vertical tandem relationship with FIG. 75A on top, FIG. 75A and FIG. 75B together illustrating the types of instructions, syllable layout, specific instructions and specific syllable layout of three-address, two-address, one-address, and no-address instructions, respectively utilized with the computer system of the preferred illustrative embodiment of the present invention.

Figure 1:
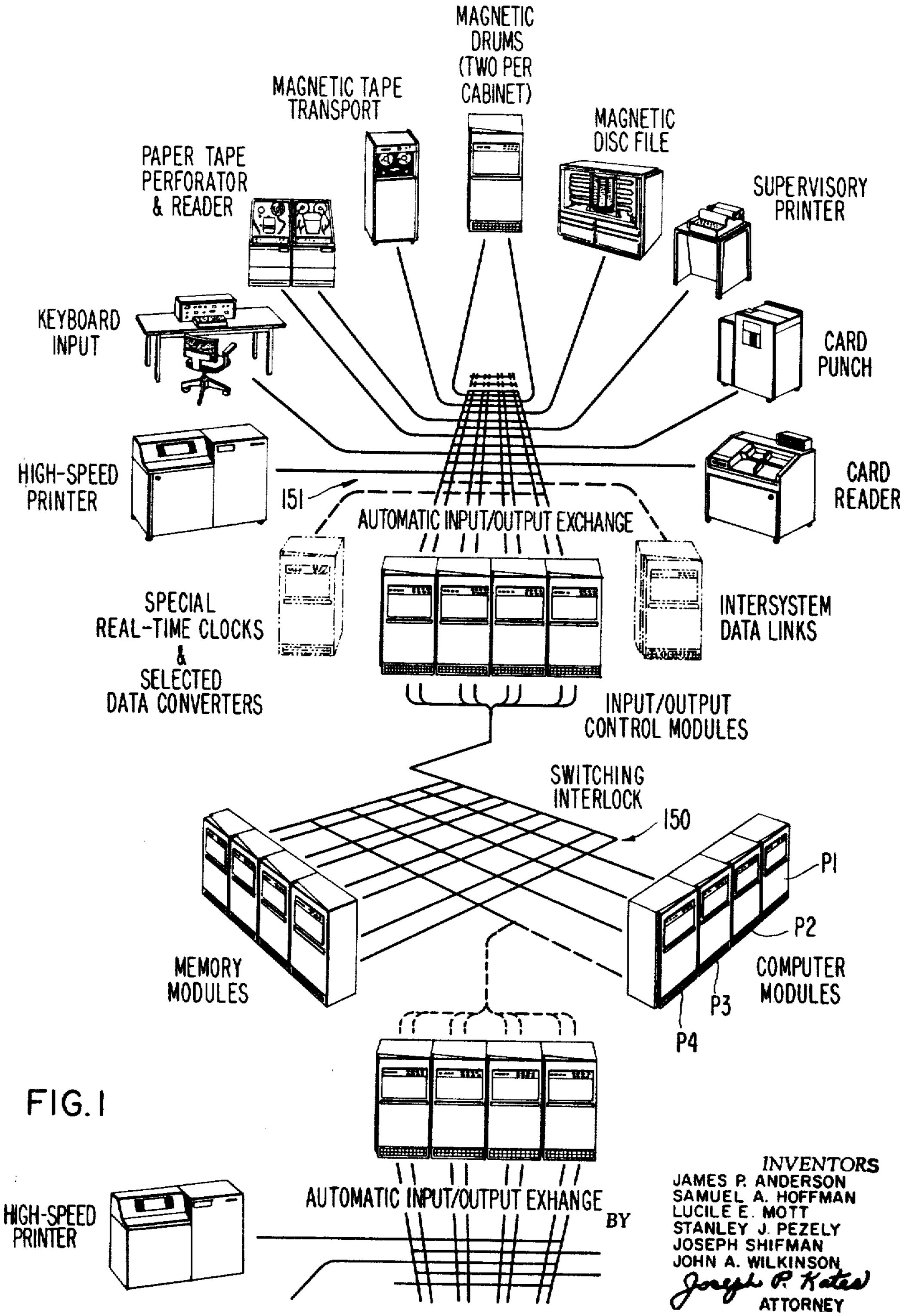
Figure 3A:
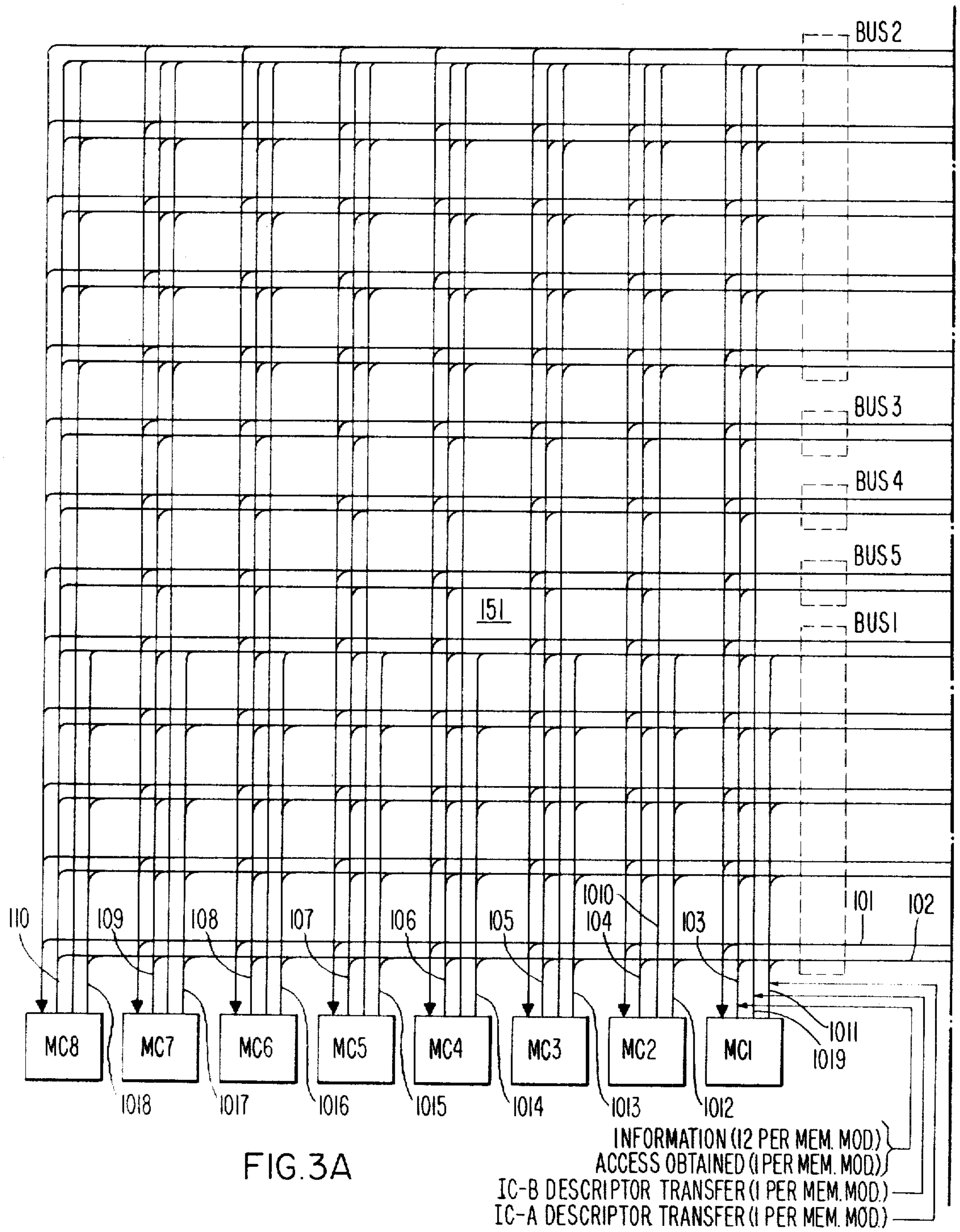
Figure 3:
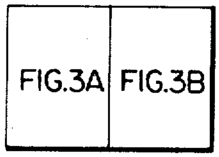

Now refer to FIGS. 1, 2, and 3 of the drawings. The illustrative embodiment systems are pictorially illustrated in FIG. 1, shown in block representation in FIG. 2, and system cabling and interconnection is shown in FIG. 3. In the preferred embodiment are provided four computer modules, P1, P2, P3 and P4, a switching interlock 150, sixteen memory modules M1–M16, ten input/output control modules IO 1–I/O 10, five connecting busses, bus 1–bus 5, a first input/output exchange unit 151, and a plurality of input and output units (not numbered). A second I/O control module group (not numbered) may optionally be connected into the systems in lieu of computer P4. The computer modules P1, P2, P3, and P4 communicate via switching interlock 150 with memory modules M1–M16. I/O control modules I/O 1–I/O 10 share bus 1 in common. I/O control modules I/O 1–I/O 10 also communicate via the switching interlock with the sixteen memory modules M1–M16. As shown by the dashed lines in FIG. 1 and as indicated in FIGS. 2 and 3, the fourth computer module P4 and its associated bus portion (not numbered) leading thereinto may be dispensed with and a bus provided by which a second plurality of ten input/output control modules (not numbered) communicate with the memory modules M1–M10. Disposed between the ten input/output control modules I/O 1–I/O 10, and the plurality of sixty-four input and output units (not numbered) is automatic input/output exchange 151. As shown illustratively, some of these input/output units may comprise a high speed printer, an operating console, a paper tape perforator and reader, a magnetic tape transport, a magnetic drum, a magnetic disc file, a supervisory printer, a high speed card punch, a card reader, and additional units of any of these.

Organization of the inventive system of FIGS. 1, 2, and 3A and 3B is based upon the automatic operating and scheduling method and means employing the information stored in the totally shared memory. The automatic operating and scheduling control is operated upon by each computer only as needed to determine work assignments. Each computer schedules itself, establishing temporary master-slave relationships with other computers for optimum handling of parallel operations.

The switching interlock 150 shown in essence in the above-mentioned patent application, Ser. No. 89,525, of Hopper, Pezely, Sichel, Lounsbury, and Zimmerman is the focus of data flow within the system. It provides automatic parallel routing and control of intermodule communications and interrupt signals.

In order to facilitate understanding, some introductory material concerning the computer modules is presented now.

The computer module arithmetic unit 3030 operates in parallel, but receives data from the switching interlock 150 in serial-parallel form. A thin-film register 3001 storage and operand stack 3099 in each computer module operates at a three megacycle clock rate and greatly reduces the required access into the memory modules M1–M16. The command list of the computer includes binary fixed and floating point arithmetic instruction with the computer organization oriented toward efficient floating point computation. As will be brought out further hereinafter, the addressing structure of the computer incorporates all of the power of a three-address computer, although less than the maximum of three addresses can be processed with each instruction, with commensurate savings in instruction time and program storage. Instructions are specified by use of strings of 12-bit syllables. A program instruction may consist either of a single operator syllable or a complex syllable string. Four program syllables are stored in each memory location for maximum program packing efficiency, but the individual instructions of the instruction string need not conform to normal word boundaries.

The memory module is a linear-select, word-organized, random-access, ferrite-core memory. Each module contains 4096 words of 48 bits plus parity. The fully expanded system of sixteen memory modules shown in the illustrative embodiment, provide sixty-five thousand five hundred and thirty-six words of memory. The I/O control modules, which will be covered more fully hereinafter comprise essentially control and data manipulation registers and associated decoding and timing circuits. Each is capable of controlling any device of the input-output complement, and there can be as many simultaneous input/output operations as there are input/output control modules. The input/output exchange automatically connects I/O control modules to specified Input and Output devices on command from the computer modules.

The inventive system adapts, instantly to real-time influence, to new programs, to changes in program priority, and to manual or automatic interrupt signals.

Each computer module has exclusive use of a data transfer bus of busses B1–B5 by which is can communicate, via the switching interlock 150 with any memory module in the system. The I/O control modules I/O 1–I/O 10 of an I/O exchange share a single bus. There are ten I/O control modules per I/O exchange in the preferred embodiment configurations of FIGS. 1, 2 and 3 and two I/O exchanges, each on a separate bus. The second I/O exchange being in place of a fourth computer is available as optionally included in this configuration.

Memory may be used concurrently by all computer and I/O exchange busses. If two or more busses simultaneously address the same memory module, the switching interlock 150 automatically resolves the conflict according to priority and queues the lower priority items. One functional bus gains immediate access while the other is delayed only until completion of the first memory transfer.

The program station which may comprise the console keyboard and supervisory printer is treated in the illustrative embodiment system as an input/output device. Inquiries from this station are handled by the interrupt procedures hereinafter described. Hence, the operator has access to the status of any operation, and all through the schedule of events can test and can use the input keyboard to enter information into the system. Automatic reporting of events can also be established, using the supervisory printer for reports to the operator.

The illustrative embodiment provides a binary data word of sufficient length (49 bits including sign and parity) for almost all computing problems, and for useful binary floating point computation, 36 bits of mantissa including sign, and 12 bits of exponent including sign. This provides considerable resolution for floating point arithmetic. The system alphanumeric data word contains eight characters.

Figure 4A:
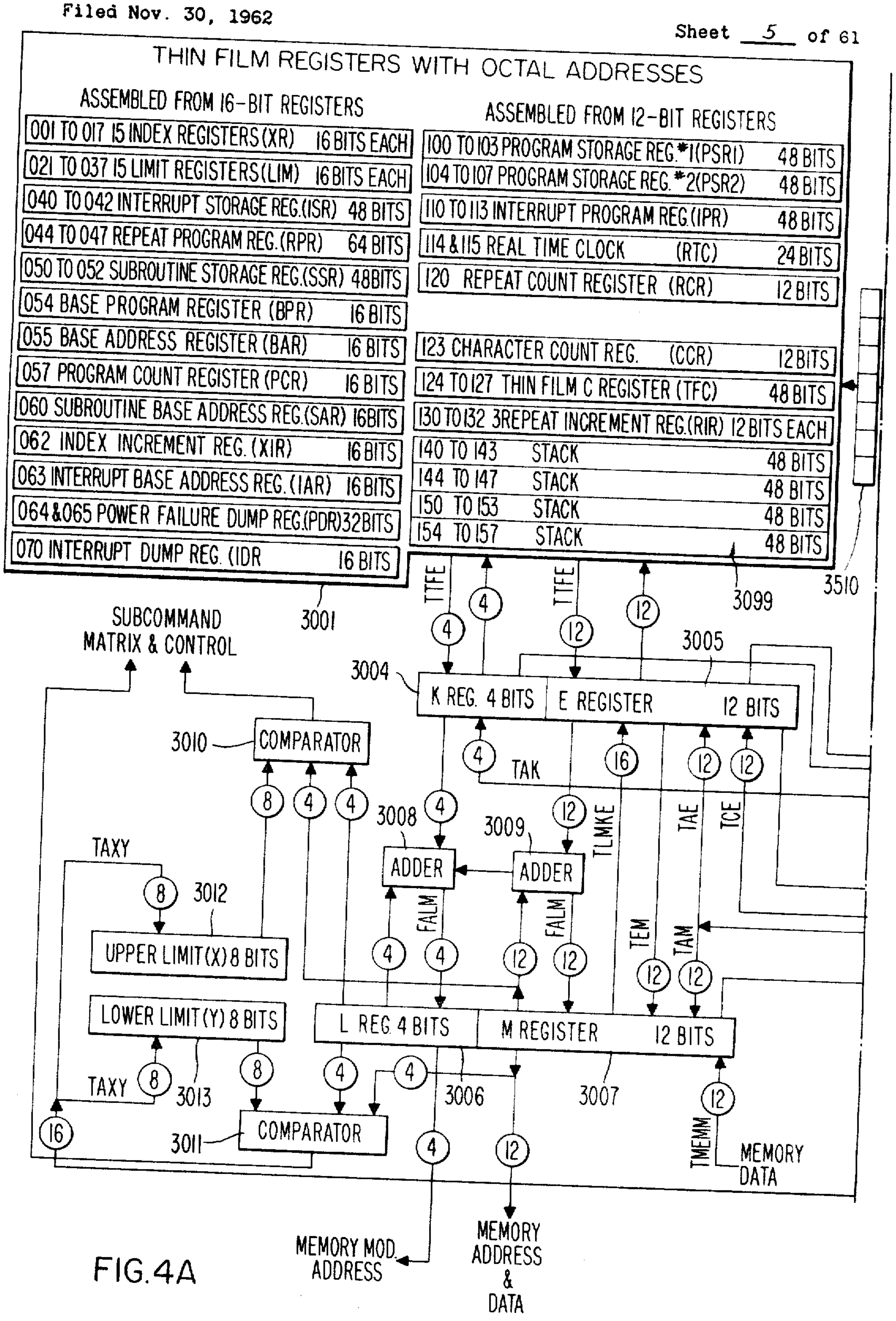
Figure 4B:
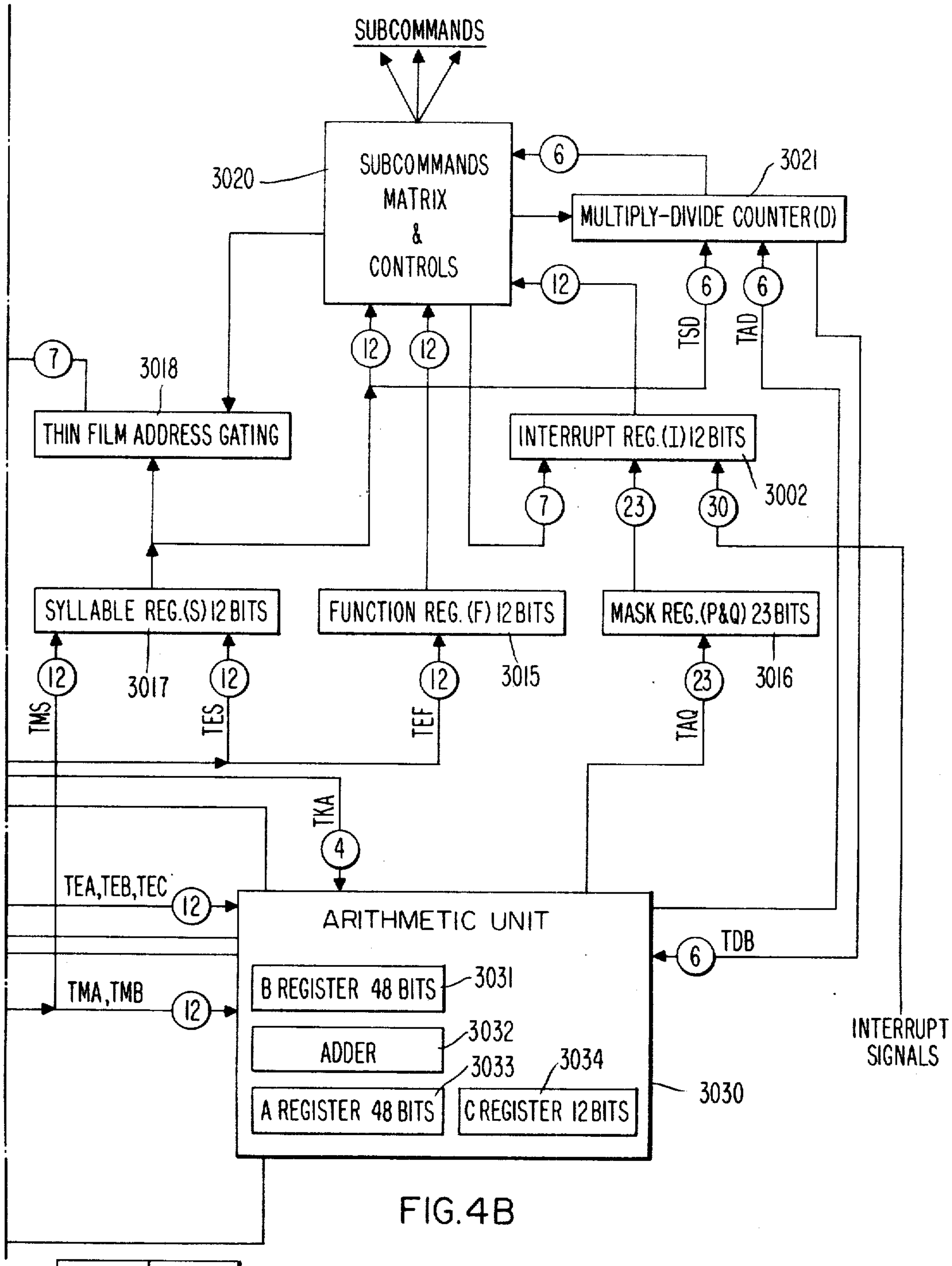
Figure 4:
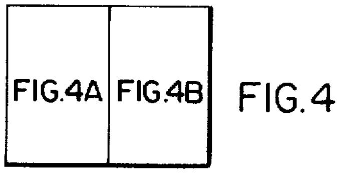

While the individual modules and their interrelationship will be described in greater detail hereinbelow a brief description of the modules of the system to orient the system presentation as follows:

Refer to FIGS. 4A and 4B the computer module block diagram. Operands may be called alternatively from memory or from a 4-position stack of operand registers 3099 within the thin-film storage 3001 of the computer. The results of operations can be stored in memory or in the operand stack 3099 for subsequent processing at the will of the program.

The operand stack 3099 of the computer is extremely useful in arithmetic and processing operations. It reduces the number of references to main memory by holding partial or intermediate results of computation. The stacks operate in two modes: normal and hold. In the normal mode, operation is analogous to the familiar plate stacks in cafeterias; when a plate is removed, the stack of following plates are moved up. In the hold mode, the top level of the stack 3099 is held preventing upward movement of the rest of the stack. The hold mode is useful for list manipulation and can be used for squaring numbers.

The first syllable of a program instruction supplies the operation code and three address indicators. The address indicators provides choice between fetching or storing in the operand stack or in the memory, and indicate whether if a stack, the stack operating mode is "normal" or "hold" and whether the memory address is to be indexed or not. Address syllables of the syllable strings follow the operator syllable for each memory access. Each memory address syllable contains an 11-bit literal address and an indirect address bit. The literal address is added to contents of a 16-bit base address register in the thin-film memory in order to refer to an area which may be designated as the direct-address area.

The contents of the direct-address area location may be either an operand or another memory address. Indirect addressing of any desired number of levels is available by this method.

Any of the three operand addresses which can be developed for each instruction may be modified by three of 15 thin-film index registers provided in the computer module. This capability coupled with the indirect addressing capability of this system, provides flexible address control.

An interrupt system provided is described more completely in the aforementioned copending application of Thompson, Perkins, Pezely, and Shifman, for "Automatic Interrupt System for Data Processor."

The interrupt system enables interrupting the "normal" data processing mode of operation of the computer system. It recognizes program and hardware-generated interrupt conditions caused by situations arising in the execution of the program; recognizes manually-initiated requests, and external requests for communication with the computer system; and also recognizes equipment faults such as parity errors, illegal operations, and primary power failure. Access to the interrupt system is gained via an interrupt register 3002 which has a bit for each unique interrupt condition. Each computer module has access to the interrupt register 3002 through a mask register, 3016. The interupt mask register 3016 in each computer module is adjustable by the automatic operation and scheduling control to indicate which interrupts each computer will process. When a computer senses a "ONE" in an interrupt register position through its mask register, it immediately processes the appropriate interrupt.

An interrupt condition causes transfer of control of the interrupted computer from the object program to the automatic operating and scheduling control. Interpreting the interrupt condition the automatic operating and scheduling control system transfers control to an appropriate process for hadling the condition, and when the interrupt condition has been satisfied, it returns control to the object program.

In the event of failure of primary power (when input AC voltages are detected as out of tolerance), storage circuits maintain the supply voltages at normal levels for a period of 500 microseconds following failure detection. During this time, the contents of all appropriate arithmetic and control registers, including all I/O descriptors are stored automatically for future recall. After power is restored, the object program is appropriately started again under the automatic operating and scheduling control means.

Interrupt conditions which occur simultaneously, are handled in a predetermined sequence, interrupt conditions occurring while an earlier interrupt is being processed being held in advance.

Interrupt conditions regonized include program-settable interrupt, external input requeste, termination of an input/output control unit operation, attempt to write into a proective memory area, arithmetical overflow and underflow completion of real-time clock count down, internal parity error, illegal instruction, and restart after primary power failure.

The logic circuitry of the system may employ hybrid transistor-diode logic. The thin-film memory may be a 128 word magnetic memory within the computer module in a word-organized array. The thin-film read/write cycle is 0.3 microsecond. The thin-film memory may be constructed in two planes of 1536 bits each. These planes have bits of nickel-iron alloy vacuum-deposited on glass substrates. Preferred orientation of the bits is established by deposition under the influence of a magnetic field. The films exhibit an almost perfectly square hysteresis loop in a preferred direction and almost perfect B-H proportionality at right angles to this direction.

Physically in the illustrative embodiment, the computer, common memory, and input/output control modules are housed in identical standard cabinets which may contain one computer module or two memory modules or two input/output control modules. Each cabinet has its own power supply. The basic cabinet may be a front opening steel weldment designed for maximum radio frequency interference shielding and component accessability and cooling. A cabinet may be 8" high, 39" wide, and 24" deep with a volume of 40.3 cubic feet. Individual cabinets are provided also for the transposers. The logic circuits may employ printed circuit cards. Voltage requlated plates are employed in the power supply on three subassembled racks per cabinet. Two racks contain logic and the third is the power supply in the subassembly. The logic circuit racks are identical and are pivoted on a common center to permit easy access to both the card insertion face and the back plane wiring face. The thin-film memory is made as a complete subassembly in the computer module. The core stack is a subassembly within the memory module. Modularized cooling may be provided by fans in each rack.

The illustrative embodiment system may comprise four computer modules, P1, P2, P3, and P4, each of which has its own bus. Alternatively, three computer modules P1, P2, and P3 and two groups of I/O control units I/O 1–I/O 10 (and ten additional I/O control modules not shown), may be provided.

Each computer module comprises five functional areas. The first is an arithmetic unit 3020 made up of an A register 3033, a B register 3031, a C register 3034 and an adder 3032 with associated controls. The second area is a set of registers octal code 001 to octal code 157 contained in a small thin-film storage 3001. The third functional area is the subcommand matrix and control area 3020 which includes capability for indexing, address accumulation, indirect addressing, phase operation, and timing circuits, and command and subcommand generating logic circuits. The fourth area is a memory exchange area comprising a thin-film buffer 3004, 3005, and a main memory buffer 3006, 3007 and adders 3008, 3009 and attendent circuits. A fifth area serves memory protection function and comprises limit registers 3012, and 3013, and comparators 3010 and 3011. The circuitry operates at a three megacycle clock rate. The central buffer register 3006, 3007 is provided as a multi-purpose register. To initiate a memory transfer, the memory address is transferred to the central buffer register 3006, 3007. This is the L and M register of the computer module. The portion of this address used to designate a memory module is sent as D-C levels to the switching interlock circuitry of the memory trunk. Address data for the memory module and information words entering the computer module from the memory module are transmitted through the central buffer register or L and M register 3006, 3007, 12 bits at a time.

The A register 3033, B register 3031, and C register 3034 are the working arithmetic registers of the computer module. The A and B registers 3033 and 3031 with associated complement and data circuitry perform the actual arithmetic operations.

MEMORY MODULE

The system can accommodate up to 16 memory modules. Thus, since each module has 4,096 49-bit words, the system storage capability is 65,536 word locations. Two complete memory modules with a common power supply are mounted in a single standard equipment cabinet. Each memory module includes associated addressing, sensing, and read/write circuitry. The actual stack of ferrite cores for each memory module may be a separate subassembly. The core stack may be comprised of 64 individual memory planes. Each memory plane may consist of a 64 x 51 matrix of ferrite cores. Two memory planes together comprise a core matrix or mat, 32 of which are contained in a memory module. The memory may operate at a 3-megacycle rate and may have a 4 microsecond read/write capability.

INPUT/OUTPUT CONTROL MODULE

The input/output control module provides the control signals, parity checks, timing interface, and data transformations required by the terminal equipment. The system accommodates up to ten I/O control modules per I/O bus. A total of twenty I/O modules are accommodated when the maximum of two I/O buses are used. However, when two I/O buses are used in the system, one computer module of the maximum system complement of four are not included in order that its data transfer bus may be used for the additional I/O bus. Therefore, in the illustrative embodiment system when two I/O buses are used, the maximum number of computers that are accommodated in the system is three. It is within the scope of the invention, however, that more I/O buses could be provided with additional modules.

Any I/O control module can control any of the terminal devices which are common to its I/O exchange. Two I/O modules are mounted in a single standard equipment cabinet. The I/O module comprises a descriptor register, and associated decoding circuitry, a full word data register and two character buffer registers and associated timing circuits.

An input/output control module controls one peripheral input/output device at a time with a limiting data rate of $12\times10^6$ bits per second in the switching interlock. The maximum data transfer rate of the illustrative embodiment system of the invention is enabled by the memory-bus characteristics to provide 250,000 computer words per second and over 12 million information bits per second. Few input/output equipments are capable of this rate. The I/O control modules I/O 1–I/O 10 utilize the capability of this data rate by permitting simultaneous operation of input/output equipments. In addition, the I/O control modules I/O 1–I/O 10 permit simultaneous input of raw data and output of process data.

Input/output operations in the system are initiated by computer module action but then proceed independently under the control of the I/O control modules. There can be as many simultaneously input/output operations as there are I/O control modules. Manipulation of data within the I/O module is limited to that necessary to transfer computer words into the terminal equipment format and vice versa. The I/O control module may be capable of driving coaxial lines with an impedance of 50 ohms and a length of up to 200 feet.

SWITCHING INTERLOCK

The switching interlock 150 provides the intercommunications between the memory modules and the I/O control modules and computer modules of the system. The switching interlock, also resolves all time conflicts resulting from simultaneous requests by computer modules and I/O control modules for access to the same memory module. The switching interlock comprises a crosspoint switching matrix which performs the actual switching, and a bus allocator, which defines and resolves all conflicts. To preserve the modularity of the system in the illustrative embodiment, each module contains its own portion of the system matrix and the bus allocator logic is repeated in each memory module.

Figure 3B:
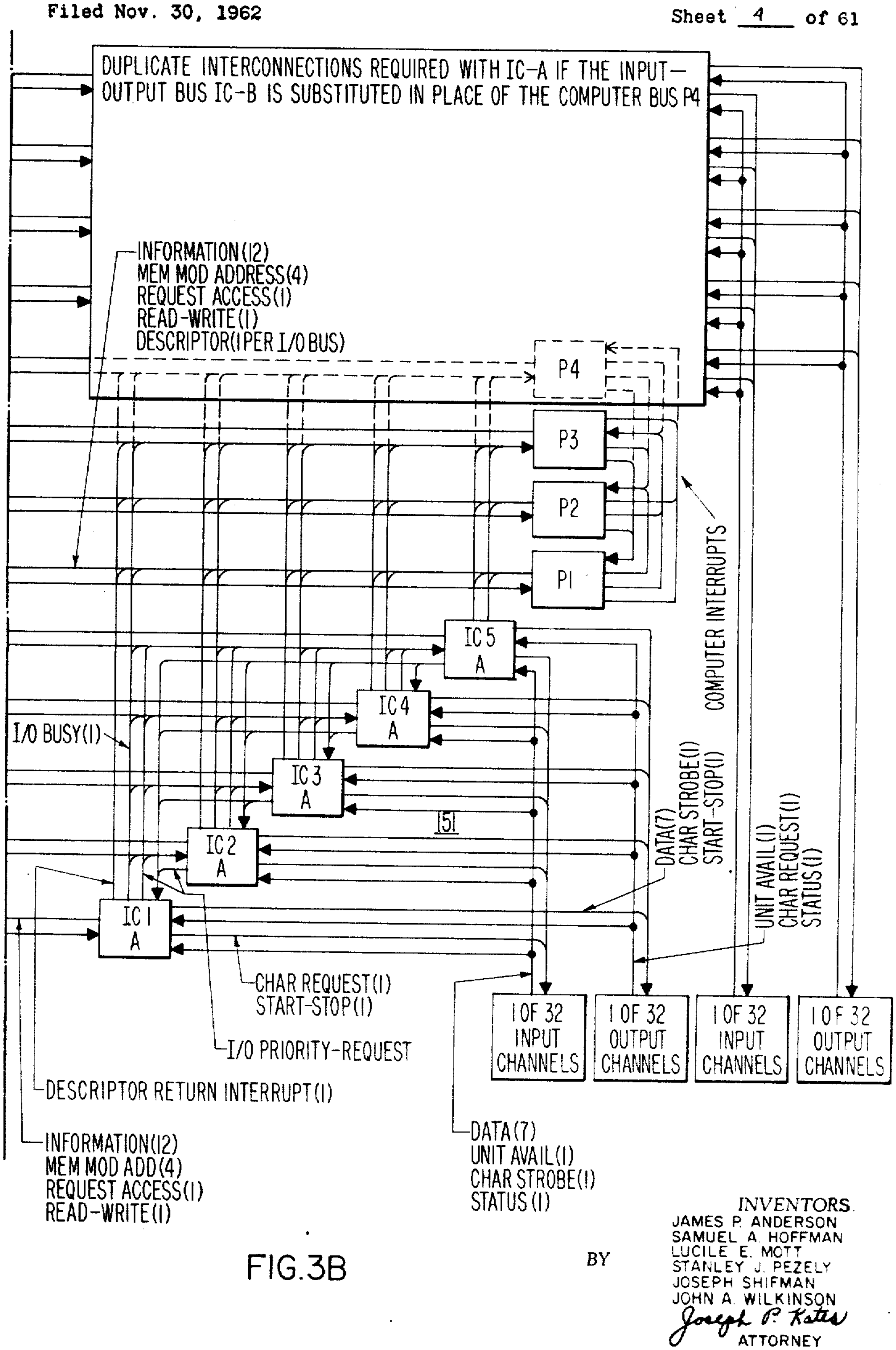

Refer to FIG. 3A and FIG. 3B of the drawings. A maximum of 5 data transfer busses are in the switching interlock; I/O bus A, I/O bus B, or computer P4 bus, computer P3 bus, computer P2 bus, and computer P1 bus. When two I/O busses are used in the system, computer P4 bus becomes the second I/O bus and a maximum of only three computers are then used in the system. Conflicting requests are lined up according to priority levels inherent with each request. The priority is pre-emptive in that a new request with a high priority will precede a low priority request already awaiting access. If a requesting module does not obtain access immediately, it waits until in-line access is awarded by the bus allocator.

INPUT/OUTPUT EXCHANGE

Refer to FIGS. 9A and 9B of the drawings. The I/O exchange permits one-way data flow per channel between any of the I/O control modules and any of the terminal devices connected to the I/O exchange through the transposers. A maximum of ten I/O modules, 32 input channels and 32 output channels are accommodated by the illustrative embodiment I/O exchange 151. Only one I/O exchange is accommodated per I/O bus. However, two I/O exchanges 151 can be used in the system when the maximum of two I/O busses are used. On command from the computer module the I/O exchange automatically connects I/O control modules with specified terminal devices.

The I/O exchange, to preserve system modularity, is distributed among the I/O module cabinets and the I/O transposers.

INPUT/OUTPUT DEVICES

Referring further to FIGS. 9A and 9B, any combination of input/output devices which do not use more than 32 input and 32 output channels may be accommodated per I/O exchange in the system. Some devices, such as magnetic tapes, require both an input and an output channel. The complement of terminal devices is comprised of magnetic tape transports, magnetic drums, card punches, and readers, paper tape perforators and readers, keyboard printers, high-speed page printers, selected data converters, real-time clocks, and intersystem data links. The keyboard-printer permits the operator to effect inquiries and manual interrupts.

TRANSPOSE

Refer to FIGS. 9A, 9B, and 9C. The transposers which interconnect the I/O control modules and into the terminal devices, are used to make the I/O devices compatible with the other modules of the system. A transposer, one of which is provided for each I/O device, receives data in a format fitted to the I/O device, alters the signal and logic levels when necessary, and performs any code transformation necessary for compatability of the system. Each transposer contains the logic circuitry necessary to translate the logical interface and control lines between the I/O control module and the I/O device. The complexity of the logic circuitry within the transposer depends upon the amount of control required. A description of the transposer is included in the aforementioned copending patent application for "A Data Processor Input/Output Control System," of Pezely, Sichel, Hallman, and Perkins.

BRIEF DESCRIPTION OF OPERATIONAL STRUCTURE

Referring to FIGS. 1 through 4 and 9, the illustrative embodiment system is a megacycle, synchronous, digital computer and data processing system. It can be organized in any combination of the following modules: 1 to 4 computer modules (1 per cabinet); 1 to 16 4096-word memory modules (2 per cabinet); 1 to 10 I/O modules per I/O bus (2 per cabinet); 1 to 32 input channels and 1 to 32 output channels per I/O exchange wherein some terminal devices require both an input and an output channel; and a tarnsposer for each terminal device.

Each computer modules has exclusive use of a data transfer but by which it can communicate, through the switching interlock with any memory module in the system. The 1 to 10 I/O control modules I/O 1–I/O 10 are connected to the switching interlock through a single I/O bus. Two I/O busses, each connected to a maximum of ten I/O modules may also be embodied. Different memory modules may be used concurrently by all computer busses and I/O control busses. Several input/output operations can occur concurrently in the system. There can be as many simultaneous I/O operations as there are I/O modules.

The computers in the system have two modes of operation, normal and control. In the normal mode of operation, a computer is executing a user machine language program. The control mode of operation takes over whenever the normal mode of operation of a computer is interrupted. In the control mode, the automatic operating and scheduling control means designates that a method of operating be performed to service the interrupt condition. The computer can be interrupted only when it is in the normal mode. The automatic operating and scheduling control method is performed on command from each computer module as needed to establish controlled operations and is completely passive until required. By means of the automatic operating and scheduling control system, each computer module schedules itself and establishes master/slave relationships with any other computer modules in the system when the automatic operating and scheduling control indicates branch suitable for parallel processing.

An automatic interrupt system is included as an integral part of the system to implement the mode of system control and to facilitate the recognition and diagnosis of failures. The interrupt system provides the facility for interrupting the normal data processing mode of operating of the system. The interrupt system recognizes programmed and hardware-generated interrupt conditions caused by situations arising during the execution of a program. It recognizes manually initiated requests and automated external requests for communication with the system and also recognizes equipment fault such as parity errors, illegal operations, and primary power failures. The interrupt condition stops the program being executed, stores sufficient registers to allow continuation of the interrupt program at a later time, and transfers control to the automatic operating and scheduling control means which then causes the interrupt to be serviced.

Hardware failures in the system do not prohibit normal operation of the system but only reduce the on-line equipment configurations while permitting the normal operations to continue at a reduced rate. The equipment with the failed element can be checked off-line. After the trouble is corrected, the equipment is returned to the on-line configuration. Centralized elements such as the common master clock, are protected against loss in a real-time environment by duplication. This will be described hereinafter.

As will be brought out hereinafter in the discussion of the computer, the machine language command list for the system may contain 53 different types of order codes, 50 of which are executed in both the normal and control modes, and the other three being executed only in the control mode. The program execution features a zero-, one-, two-, or three-address, variable instruction word length; multiple indexing up to a maximum of three for a given operand; relative and indirect addressing of memory; and controlled addressing in rotation of a four-level operand stack in the computer module. The basic word is 48 bits plus parity. However, instructions are built up as strings of 12-bit syllables. Instruction strings need not conform to normal boundaries. The instruction format consists of an operator syllable, followed by from 1 to 6 address or other program syllables. The word transfer capability of the system is serial-parallel in nature at a rate of 1 computer word per 4 microseconds per bus. The illustrative embodiment maximum data transfer rate of 250,000 computer words per second or 12,000,000 information bits per second, is limited by the memory cycle of time 4 microseconds. Because few input/ouput devices can operate at this rate, several I/O devices can operate concurrently, filling registers in their respective I/O control modules with data transfer between the I/O control modules and the memory modules occurring on a priority and time sharing basis.

Prime input power of three kva. (kilovolt amperes) may be supplied to each computer, memory, and I/O control module cabinet. These major system modules may require 60-cycle, 3-phase, (4-wire) 120/208-volt power. Some of the peripheral equipments require only 60-cycle, single-phase, 115-volt power. Acceptable tolerances for the input voltages should not exceed plus or minus 10 percent. Limits for the input frequency should not exceed 47 to 63 cps. Overvoltage-undervoltage detection circuitry to be explained in greater deail hereinbelow is incorporated to protect against line power failures. Upon the detection of a prime power failure, the power supply voltage regulators continue to supply rated voltages and currents for 500 microseconds after signaling a failure.

SIGNAL DISTRIBUTION AND INTERCONNECTION BETWEEN MODULES

Inside the system there are two signal distribution subsystems. One is a switch interlock such as described in the aforementioned copending application for "Computer System" of Hopper, Pezely, Sichel, Lounsbury, and Zimmerman. The switch interlock 150 interconnects the memory module, the computer modules, and the I/O control modules. The other is the I/O exchange 151 which interconnects the I/O control modules through the transposers with the input/output units or terminal equipment. There are some similarities between the action of the I/O exchange unit 151 and the switch interlock 150.

Figure 6:
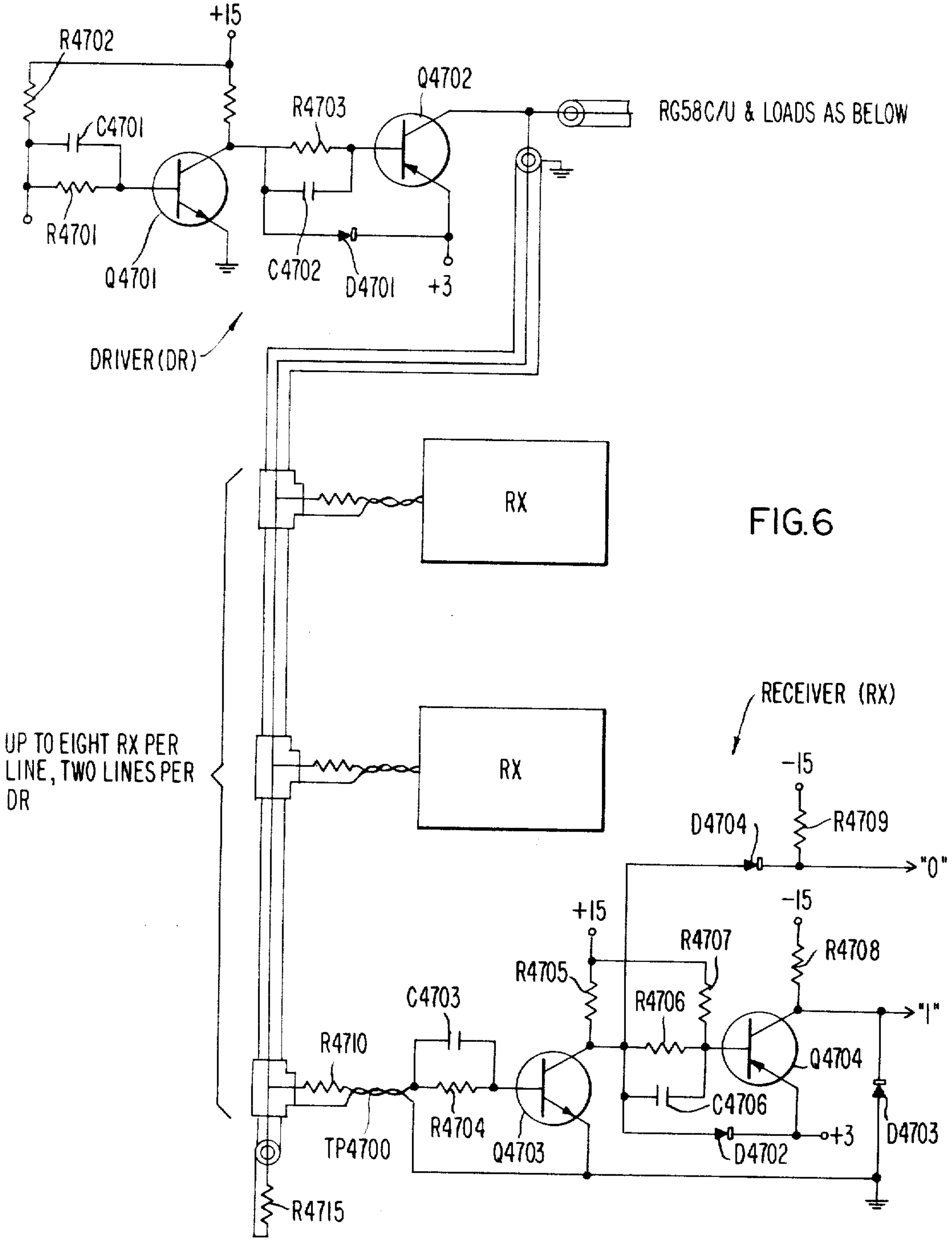
FIG. 6 is a schematic diagram of the circuit for intercommunication between driver units and receiver units and intercommunication between the modules of the preferred illustrative embodiment of the invention.

Refer to FIG. 6 of the drawings. In the intercommunication among modules, a key problem is involved in the necessity to drive a number of loads from a single source. Although this can be done by driving in a star arrangement whereby a single line from each source and for each signal is applied to each of the loads, it must be considered that time is of the essence, that this time is measured in nanoseconds, and also that the lines in some cases are as long as 40 feet long. Since the lines must be coaxial for purposes of low noise, if a star is used, the lines to each of the loads are in parallel which represents a very low impedance to the driver or the source. To drive a reasonable signal level at very high speeds into this type of load is difficult. There are also physical difficulties involved in having the large bundle of cable required where each load to signal source connection is a single wire.

The invention overcomes these difficulties and employs means wherein only two cables are driven from the source and there are a number of loads on each cable. Each line is terminated at the last load and each load is made to appear as a high impedance. However, looking into the transmission line, each driver sees the surge or characteristic impedance of the transmission line.

In a small system, only one line might be used. However, in the illustrative large system shown, each driver in the modules actually sees two coaxial lines, each of which is at the characteristic impedance of the coaxial transmission line. An overall problem is that the signal input to the drivers is a signal of certain specifications of high and low limits which correspond to a one and a zero respectively. The same logic signal levels at the levels of voltages which are the input to the drivers must appear at the receiver at the end of the signal line. It is also desirable to have that receiver signal restandardized. The signal at the start, normally at its lower level is at zero reference or ground reference voltage and its upper level is plus 3 volts. The maximum signal tolerance is within rather close limits. As the signal propagates through logic such as a chain of gates, either the high or low level can shift a maximum of $\frac{4}{10}$ of a volt in either direction. This is the type of signal which is fed to the driver. It is required that at the receiver there be a signal output which is at the original tolerance plus 3 for a "one" and zero for a "zero" signal. Restandardization therefore is required such that a signal output from the receiver is achieved which is at nominal levels of zero for the lower level and plus 3 for the upper level with a tight tolerance.

The coax lines are terminated in 50 ohm resistors so that they appear to the driver to present the characteristic impedance of 50 ohms for the RG 58 C/U coax cable used. A first major problem presented is that of distribution to eliminate the problem of too low an impedance presented to the drivers and too many lines. This is solved in this invention by the one of parallel coax lines which jump from cabinet to cabinet. In jumping from cabinet to cabinet, various ways of distribution are used which may be effected within the judgment of an assembler. For example, skipping between alternate cabinets first with one line, and then the other may be effected in any desired configuration. From some cabinets which may be centrally located, both lines may go into one close-by unit, then going to a second close unit, and then branching out to units further out. A second major problem is one of presenting a proper signal to the receivers in each of the units. This problem essentially occurs in taking the signals from the transmission line and bringing these signals into the input of the receivers. This was solved in the inventive system by means of providing T sections in the coax lines which branched out into 100 ohm resistors in series with twisted pairs which were presented to the input of the receivers. The coax lines themselves are terminated with approximately 50 ohm resistors which could be 51 ohm resistors exactly within a tolerance of about 1 percent. There are two reasons for the use of the 100 ohm resistors and the twisted pairs between the T connection of the coax and the input to the receivers. The first reason is to isolate the capacity of the twisted pair from the coax. This will prevent a short at high frequency due to the low capacitive reactance if the coax were to see a twisted pair and its inter wire capacitance directly. The second reason is to present the twisted pair with an impedance close to its own characteristic impedance. The twisted pair has a characteristic impedance of somewhere between 100 and 200 ohms. The 100 ohm resistor in series with the 50 ohms of the line presents an approximately optimum impedance match to the twisted pair. This gives the optimum signal to noise ratio. Between the twisted pairs and the base of the input transistor of a receiver, a 1500 ohm resistor is connected to isolate the base of the transistor from the current which is normally on the line. This resistor is fairly critical in value in that it must also be low enough so that sufficient current passes through it upon the occurrence of a 3 volt signal so that it can drive the input transistor. The 1500 ohm resistor is essential because of the logic input circuits to the driver and because of the logic output circuits from the receiver, which requires that the driver and receivers completely isolate the transmitted signal and prevent any noise whatsoever from appearing internally of the modules. The signal levels on the coax in the distribution system therefore, are not necessarily logic levels. They may be anything which will facilitate transmission of the signals accurately. The three volt nominal level is chosen because of losses due to drop across the driver transistor into the coax line, losses in the line itelf, and losses due to noise reflections back which are seen at each of the remaining receivers of the line. The receiver input transistor must be able to be triggered on to conducting state at a two volt level which the transistor will recognize as a high above which it will cause conduction. This transistor must be triggered off by anything below a half volt which is considered as a zero. This is because of noise on the ground or reference level which occurs in the system. In order to minimize these noises, the 100 ohm resistors at the T junction and the twisted wire configuration leading into the 1500 ohm resistors are used.

Two other things are desirable in order to eliminate noise. The first is a use of a unidirectional load. The unidirectional load mechanism effects current flow such that current must always flow from the driver source to the load. Any current in the other direction is considered as noise. The way this is done is to furnish a positive supply at the source at the emitter of the driver transistor which is a PNP transistor. On switching on the driver transistor drives current into the base of the receiver input transistor to the emitter. The input transistor is made an NPN transistor to insure current flow in this direction. This is not, therefore, a push-pull drive, but a uniderictional drive instead. This is the condition for current flow in the "one" state, that is from the driver collector into the receiver base. When the driver switches into the zero state, the line sees an open circuit at the source. The reason for the output circuit of the drivers appearing open to the coax lines when in the zero state is so that there is no reverse current drawn to alter the noise level when in the zero state. Alternatively, the zero state could have been a negative level. This is the push-pull operation which, if used, would have introduced switching transients upon switching-on and switching-off which might give rise to false signals. The inventive method involves driving the circut in the on state but not drving it off, the field merely collapses in the off state. Since there is only one driver and this driver can have current flow only in the direction from the driver into the coax since it is shut off at the end of such current flow, therefore, the reflected energy on the energy return path sees an infinite resistance at the collector of the input driver. Thus, the signal which is inverted upon the reflection toward the driver is not reinverted and rereflected in a second signal which would appear like the true signal. Therefore, this does away with false signals. This keeps the noise level on the "zero" level as low as possible.

Refer now again to FIG. 6 of the drawings wherein is shown schematically the means of the inventive system herein for typical intercommunication between modules. FIG. 6 shows by way of example, the circuit wherein a single driver drives two coax lines which in turn are shown connected to three loads. Actually, there are up to eight receivers per line and there are two lines per driver. There is one driver for each logical signal that leaves the module. The number of receivers depends upon the number of different modules which this particular driver signal is trying to address. Eight receivers per line with two lines per driver are provided for the 16 memory modules to be driven individually; that is, one receiver per signal per memory module. This is the most of any one type of modules which the illustrative embodiment system incorporates and is, therefore, the maximum number of receivers for any particular signal. Although there could be twenty I/O control modules in two I/O exchange groups, the I/O control modules are driven in pairs per cabinet and therefore in the case of the I/O control modules there is one receiver per signal per cabinet. That is, from a data standpoint, a computer would only address the 16 different memory modules on a data line and would require two times eight or sixteen receivers for its driver, per signal. In the case of memory data which is to be fed out to either an I/O control unit or a computer in one of the illustrative embodiment maximum configurations, there would be one receiver per signal for the two I/O control modules per cabinet and five cabinets per I/O exchange and two I/O exchanges which gives a total of ten receivers per signal for the twenty I/O control modules which would be addressed. In addition, there would be three computers which could be addressed by this memory or a total of 13 different sets of receivers per bit. In the case of memory, therefore, there are two lines per driver which may be divided into six receivers accessed to by one line and seven receivers accessed to by the other line for a maximum total of 13. There is flexibility therefore from 1 to 16; there could be one receiver per driver or there could be as many as 16 receivers per driver. Another limit imposed on this driving receiving system is that no more than eight receivers should be on any one line for optimum noise performance.

Refer again to FIG. 6 in detail wherein one of the driver circuits is shown. One of the two coax lines is shown fully. The other is shown in fragmentary view. The three receiver configuration with one of the terminations into a receiving module are shown. The driver may comprise an NPN transistor which may be a silicon planar transistor of the commercially designated type, 2N709.

The signal is fed into the babase of the driver transistor Q4701 through 1800 ohm base driver resistor R4701. Across resistor R4701 may be connected a fifteen micromicrofarad capacitor, C4701. A plus 15 volt supplied to the collector of transistor Q4701. A conventional collector resistor (not numbered) is disposed between the collector and the positive 15 volt supply. A 6800 ohm current supply load resistor R4702 is provided between the positive 15 volt supply and the input to the base resistor R4701. The emitter of transistor Q4701 may be at circuit ground. The transistor Q4701 provides amplification and inversion of the signal output from the transmitting module. A second inverting amplifier, transistor Q4702 supplies inversion and current gain. This transistor may be a PNP transistor and is incorporated for the purpose of providing a high speed switch. As stated hereinabove, a PNP type transistor is utilized in order to supply a positive supply only, switched onto the lines so that current will always be fed into the coax lines for an input signal. This transistor may be a 2N781 transistor, for example. An input base resistor R4703 which may be 300 ohms may be provided at the input to the base of transistor Q4702. Connected across the input base resistor R4703 is a capacitor C4702 which may be 120 micromicrofarad capacitor. The emitter of transistor Q4702 is supplied by a positive 3 volt supply supply. A diode clamp D4701 is connected between the collector of transistor Q4701 and the positive 3 volt supply at the emitter of transistor Q4702 so that the excursion of the collector of transistor Q4701 will not depart from +3 volts. The circuits of transistors Q4701 and Q4702 are non-linear for switching purposes. Both units switch from cut-off to saturation. The switching circuitry provides a signal-on condition or "one" condition of +3 volts and nominal "zero" condition for switching off. The coax line is grounded at its source but it is not grounded at the other end except through each of the twisted pairs and the remaining receiver circuitry.

At the other end of the transmission going into one of the receiving modules is a receiver (not numbered). Each receiver may comprise a pair of transistors, for example, transistors Q4703 and Q4704, in cascade. The receiver units are very similar to the driver units, in configuration. The first receiver transistor Q4703 has an input base driving resistor R4704 which may be 2400 ohms and a capacitor C4703 connected across resistor R4704. Capacitor C4703 may have a capacitance of 30 micromicrofarads. The transistor Q4703 may be a 2N709 NPN transistor. The collector of transistor Q4703 may be electrically connected to a positive 15 volt source. Transistor Q4703 may be provided with a collector voltage dropping load resistor R4705 which may have a resistance of 2400 ohms. The emitter of transistor Q4703 is grounded. Between the collector of transistor Q4703 and the base of transistor Q4704 is provided a base resistor R4706. Resistor R4706 may have a resistance of 2400 ohms. Across resistor R4706 is connected a capacitor C4706. Capacitor C4706 may be a 30 micromicrofarad capacitor. Each of the capacitors C4701, C4702, C4703, and C4706 connected across the base driving resistors are speed up capacitors which provides an initial transient current upon switching to increase the switching speed. Resistor R4707 which may be a 100 ohms resistor is connected between the positive 15 volts source and the base of transistor Q4704 to provide reverse bias current to compensate for collector leakage at the collector of transistor Q4704.

The transistors are required to have very fast switching time in operation. The positive 3 volts supply at the emitter of transistor Q4704 is connected to the collector of transistor Q4703 by a diode D4702 to clamp the excursion at the collector of transistor Q4703 to +3 volts. A diode D4703 clamps the negative excursion at the collector of transistor Q4704 to ground. A load resistor R4708 which for transistor Q4704 is connected to a negative 15 volts source. Resistor R4708 may have a resistance of 1500 ohms. The collector of transistor Q4704 provides the one ("1") logic output which is the true output of the same polarity as the input to the driver transistor Q4701. An inverted or zero ("0") output is provided from the collector of transistor Q4703 through a level shift diode D4704. A resistor R4709 is connected between a negative 15 volt supply and the cathode of diode D4704. The anode of diode D4704 is connected to the collector of transistor Q4703. Resistor R409 may have 5100 ohms resistance. Current supply to diode D4704 to insure that conduction is maintained, is provided from the negative 15 volt supply through resistor R4709 to the cathode of diode D4704. The coax lines, the 100 ohm isolating resistors, i.e., R4710, the twisted pairs, i.e., twisted pair TP4700, and the 51 ohm termination resistor R4715 at the end of all units have been discussed hereinabove.

The signal distribution system for the switching interlock should provide as its goal one clock time transfer in for each required signal. The total allowable logic time in the computer system is considered to be 300 nanoseconds. A remaining time of 30 nanoseconds is allowed for clock jitter and skew between modules. The 330 nanoseconds mentioned herein is the result of the 3 megacycle clock rate at which the logic of the illustrative embodiment computer system operates. It is desired to transmit the signals between modules, that is, from memory modules M1–M16 to computer modules P1–P4 as a typical example in as short a time as possible. For this purpose, the circuits of the switching interlock are designed to have minimum logic delays. Fifteen nanoseconds are allowed for propagation delay through the line driver, also referred to herein as the DR circuit. Twenty-five nanoseconds are allowed for the line receiver or RX circuit. Forty nanoseconds are therefore consumed in propagation time through the transmitting and receiving circuits. Using coaxial cable for signal distribution, two nanoseconds per foot are considered the maximum propagation time. In the maximum configuration of 21 cabinets for the illustrative embodiment system, 50 running feet of coaxial cable may be used. Thus, 100 nanoseconds could be consumed in the transmission over the line itself. The total delay through a maximum switching interlock therefore would be 140 nanoseconds. The method herein of driving current into a unidirectional load for the one state, and merely allowing the field to collapse for the zero state, for purpose of minimizing noise is a unique feature of this machine. Getting the signal from the edge of the cabinet where the "T" connection of the coax is located onto the card rack where the receiving circuitry is located by means of twisted pairs and the 100 ohm isolating resistors provides optimum impedance levels through the system and also in conjunction with the 51 ohm terminating resistor provides the feature which enables minimum loss and minimum noise level transmission between the cabinets which may be as much as 50 feet apart.

Refer to FIG. 7 which is the logical schematic representation of the clock distribution system of the invention.

There are two master clocks in the illustrative embodiment of the inventive system. A computer master clock *Cl* 2001 and a memory master clock *Cl* 2002. In the system, there is one master clock containing computer, computer P1 and one master memory clock retaining cabinet which comprises two arbitrarily selected memory modules. In addition, there are a plurality of slave clocks. There is a slave clock for each of the computers including one slave clock for the computer in which the master clock is contained. There is also a slave clock for each input/output control module. There is additionally a slave clock for each memory module which comprises two slave clocks for each of the memory cabinets including the memory cabinet in which the master memory clock is located. Since each I/O control module has a slave clock and an I/O control module containing cabinet comprises two modules, therefore there are two slave clocks per input/output cabinet. In FIG. 7 only the clock for a single computer, a single I/O module and four memory modules are illustrated for simplicity of an example showing. Actually, in the illustrative embodiment complete systems of FIG. 9, for example, the full quota of clocks are present.

The master clocks and the slave clocks each may comprise a crystal-controlled transistor blocking oscillator circuit. A circuit which can be used for clock circuit of the invention is shown in the phase lock oscillator of FIG. 8.

Each of the master and the slave oscillators is identical to the others. However, the actual tuned frequency of the master clock and the slave clock oscillators differ. The computer master clock *Cl* 2001 may be tuned to 3 megacycles plus a hundred cycles (3,000,100∼). The memory master clock *Cl* 2001 is tuned for an even three megacycles (3,000,000∼). Some tolerance in frequency due to the construction, nature, and the ambient conditions surrounding the crystal is permitted.

All slave clocks operate at 3 megacycles minus a hundred cycles (2,999,900∼). When the clock system is in operation, all other clocks should have their frequency dependent upon the actual frequency to which the computer master clock *Cl* 2001 is tuned. That is, upon actuation a phase locking system provides for locking each of the slave clocks *Cl* 2003, *Cl* 2004, *Cl* 2005, *Cl* 2006, *Cl* 2007, *Cl* 2008, and those not shown, and for locking the memory master clock *Cl* 2002 to the exact frequency at which the computer master clock *Cl* 2001 is operated.

Respective buffers B2001 and B2002 are provided and connected into the circuit to be responsive to the master clocks *Cl* 2001 and *Cl* 2002. For the reduced version of the complete system which is shown in FIG. 7, that is, which has one computer, one input/output control module and 4 memory modules, buffer B2001 provides 7 lines from buffer output line 2003, one to each of the slave clock units *Cl* 2003, *Cl* 2004, *Cl* 2005, *Cl* 2006, *Cl* 2007 and *Cl* 2008 in the system. In addition, one of the output lines from buffer B2001 is fed into the memory master clock *Cl* 2002. The buffers such as buffer B2001 are capable of driving 7 other output lines along line 2001, which in the complete system are fed to other of the slave units in the other modules. For the complete system the clock *Cl* 2001 has additional capability for providing additional output lines therefrom which feed into buffers such as buffer B2001, and which can each provide an additional 14 output lines to feed into the other modules. The FIG. 7 embodiment shows only a portion of the illustrative embodiment system thus simplified for purposes of understandability. The full system shown in FIGS. 3A and 3B offers a possibility of 98 total coax output lines from the buffers responsive to a master clock. This goes beyond the representative partial system of FIG. 1.

The output of buffer B2001 is applied also along output line 2002 to a one "T" time delay line D2001. A buffer B2002 is provided at the output of master memory clock *Cl* 2002. From delay means D2001, the output of buffer B2001 is applied to master memory clock *Cl* 2002 and thence to buffer B2002. Delay line D2001 could, for example, be plain coax line, 200 feet long and of the type commercially designated as RG58C/U. After passing through delay line D2001, the output of buffer B2001 is fed to the master memory clock *Cl* 2002. The length of delay in delay means D2001 is the time for 1 clock pulse 0.333 microsecond. That is, delay means D2001 is tailored such that the sum of its delay time plus the delay through memory master clock unit *Cl* 2002, plus the delay in the input of buffer B2002 together may take one clock pulse time from the time of exit from buffer B2001. Upon turning the master clock *Cl* 2001 on, the output therefore from buffer B2001 at line 2003 is locked to the output of buffer B2002 by the delay line D2001 in conjunction with the actual delay through the master memory clock *Cl* 2002 and the input line to buffer B2002 plus delay in buffer B2002, such that the output from buffer B2002 which appears at line 2004 is exactly synchronized in frequency with the output at line 2003, but is delayed substantially exactly one clock pulse or 0.333 microsecond from that output. Therefore, the output of line 2004 is slightly delayed in phase from the output of line 2003. Slightly in this case means about 10 nanoseconds. The signal outputs from lines 2003 and 2004 are applied to each of the slave clocks *Cl* 2003, *Cl* 2004, *Cl* 2005, *Cl* 2006, *Cl* 2007, *Cl* 2008, and to the other unit slave clocks (not shown) in the complete system. The two signals from lines 2003 directly and that through line 2004 and thence to the units are mixed in each of the slave clock units.

The master clock pulses from the master clock *Cl* 2001 present in each of the slave clocks *Cl* 2003, *Cl* 2004, *Cl* 2005, *Cl* 2006, *Cl* 2007 and *Cl* 2008 and the master memory clock *Cl* 2002 cause the slave clocks and the master memory clock *Cl* 2002 to be locked in frequency relationship with the frequency generated in the computer 1 master clock *Cl* 2001. This mixing in each of the slave clock units *Cl* 2003, *Cl* 2004, *Cl* 2005, *Cl* 2006, *Cl* 2007 and *Cl* 2008 serves to lock each of the slave clocks to the same frequency and phase.

By providing these two master clocks *Cl* 2001 and *Cl* 2002 and effecting operation in this manner, a fail-safe system is provided in that the loss of the computer clock will not effect a loss of even a single T-time. That is, in the event of failure of the master computer clock *Cl* 2001, the memory master clock *Cl* 2002 oscillates at its 3 megacycle rate and provides an output to each of the slave clocks *Cl* 2003, *Cl* 2004, *Cl* 2005, *Cl* 2006, *Cl* 2007, and *Cl* 2008, such that the slave clocks are synchronized immediately to the memory master clock *Cl* 2002 output in both frequency and phase. Therefore, the system will continue operating even though the computer master clock *Cl* 2001 is disabled, and this operation should continue without loss of even a single T-clock time. Similarly, if the memory master clock *Cl* 2002 becomes disabled, either by slow deterioration or by sudden complete disablement, for example, the computer master clock *Cl* 2001 takes over and locks each of the slave clocks to its own output frequency and phase. That is, computer clock *Cl* 2001 continues to operate in the normal fashion, and provides synchronization with its exact frequency and phase as before, except that in this case it does not, of course, take over the memory master clock *Cl* 2002. The deterioration meant is not in frequency. What is meant is that deterioration might be slow or in the alternative, a sudden complete disabling could occur. These two situations are taken care of by the fail-safe system provided by having two master clocks *Cl* 2001 and *Cl* 2002.

Assume a fault in the synchronization line from output line 2002 of buffer 2001, including the delay unit D2001. In such case both master clocks *Cl* 2001 and *Cl* 2002 would be out of synchronization. This is a slight possibility, since the reliability of the coax line 2002 is very high. However, even should these get out of synchronization, a phase alarm detector 2010 is provided for the computer master clock *Cl* 2001 and a second phase alarm detector 2011 is provided for the memory master clock *Cl* 2002. This may be displayed on the console. Also displayed on the console may be a visual indicator which indicates loss of either the memory master clocks *Cl* 2002 or the computer *Cl* 2001. The alarm unit 2010 and the alarm unit 2011 and their associated circuitry are each made such that they will show the disabling of either clock as an indication in the computer module and the memory module alone in which the master is housed. This is done so that if the power is off in either the memory or the computer or it is out of the system for another reason, the display continues whether or not one of the master clocks has been disabled. That is, if either the master clock containing computer or the master clock containing memory module are disabled, the phase display in the unit which is disabled is disabled also, but the indication of loss of the unit does not appear on the console.

As stated, following mixing, the outposts of each of the slave clocks *Cl* 2003, *Cl* 2004, *Cl* 2005, *Cl* 2006, *Cl* 2007, and *Cl* 2008 are synchronized substantially both in frequency and in phase. Each of the slave clocks *Cl* 2003–*Cl* 2007 are capable of driving 7 lines, but as shown, they are driving only the needed lines for each of the modules illustrated in FIG. 7. These clocks drive the buffers at their outposts B2003. In turn buffers B2003 drive strip lines shown schematically by the resistors in their output lines, for example, resistors R2001 and R2002. Actually the strip lines are really parallel conductors, one line of which is grounded and the other being the high line and the two being terminated at their ends by a 10 ohm resistor. The cold side is electrically cemented along its total length to ground. Off of the strip lines, such as that of resistors R2001 and R2002 and each of the other strip lines (not numbered), are tapped inputs to each of the flip-flops in the computer system, that are triggered or enabled by the 3 megacycle pulses.

Thus, all the flip-flop in the entire system which are responsive to the 3 megacycle clock rate, are tied together in time and each of the flip-flops in this system is tied together in phase since each of the buffers B2003 responsive to the slave clocks are in phase at their outputs. At the end of any of the strip lines from the clocks, therefore, the requirement is met that they are within 30 nanoseconds of the output from any other strip line. For this reason each of the flip-flops is in phase within 30 nanoseconds of any of the other flip-flops insofar as the 3 megacycle input is concerned. The illustrative embodiment system shown enables operation within a 10 nanoseconds tolerance. The 4 foot lengths are shown because this is the worst possible case of the actual length of cable necessary to run between any of the units and any of the buffer cards which are provided. From the output of the buffer B2002 to the slave units *Cl* 2003, *Cl* 2004, *Cl* 2005, *Cl* 2006, *Cl* 2007, and *Cl* 2008 there is exactly 24 feet of coax cable of type RG58C/U. The same is true in the case of the outputs from buffer B2001 each wire of which is 24 feet of RG58C/U cable into each of the slave clock units. That is, each of the cables is made identical in length to each of the other cables in order to insure correct phasing. It is understood, of course, that in a system wherein the worst case is a longer or a shorter distance between cabinets that the longest length necessary will be used for each of the connections.

For debugging purposes, both master clocks *Cl* 2001 and *Cl* 2002 may be disabled and in such case each of the slave clocks *Cl* 2003–*Cl* 2008 run asynchronously, but tuned to the 3 megacycle minus 100 cycles frequency. A plurality of pulse inputs (not numbered) may be provided to each of the clock units for test purposes.

Refer to FIGS. 10A and 10B. FIG. 10A shows the memory clock lines intercommunications between the computer clocks and the memory clocks and between the memory master clock and the I/O control module slave clocks for memory timing. FIG. 10B illustrates the computer master clock lines and the lines to the slave clocks in the system of FIG. 10A.

For purposes of simplification in FIGS. 10A and 10B, 2 computers, 6 I/O control modules, and 6 memory modules are shown. As shown in FIGS. 10A and 10B each of the computers has its own cabinet, and 2 memory modules and 2 I/O control modules respectively share single cabinets. The one clock time (T-pulse) delay from the master computer clock *Cl* 2001 to the master memory clock *Cl* 2002 is disposed in memory module M1, for example, is shown in FIG. 10B.

Refer to FIG. 11, the timing system diagram for the illustrative embodiment complete system which contains a complement of 4 computers, 16 memory modules, and the ten I/O control modules in 5 cabinets.

Because of the totally modular system concept used in this inventive system, unique timing problems exist which must be overcome through synchronization to effect efficient system operation. As stated, hereinabove, each computer, memory, and I/O control module has its own timing counters. All of these timing counters must be synchronized with each other for the proper and orderly execution of system operation. As stated in the description of FIG. 7, a memory master oscillator *Cl* 2002, which serves as a backup master oscillator, is provided in the system. As shown in FIG. 11 one of the memory module master clock assemblies is selected as the backup to the prime master clock assembly. The outputs of the backup master assembly are routed to all the other clock assemblies in the system except the prime master clock assembly. This is shown also in FIG. 7. This backup feature of master timing is used so that the system may continue to operate in the event that the computer module containing the prime master clock assembly is disabled.

The computer master clock *Cl* 2001 transmits a single pulse every 333 nanoseconds or every 0.3 microsecond, through a coaxial line, approximately 184 feet long (shown in FIG. 7 as delay D2001 in conjunction with line 2002 and which as shown therein would be 200 feet depending upon delay also in clock *Cl* 2002, buffer B2002 and the connection therebetween). That synchronizes the operation of the memory modular master clock *Cl* 2002 to that of the computer master clock *Cl* 2001. Transmission of the sync pulse through the approximately 184 coaxial line provides a delay of 333 nanoseconds. Therefore, when the memory master clock *Cl* 2002 receives its first sync pulse, the computer master clock *Cl* 2001 is transmitting the second sync pulse. The sync pulses from the computer and memory master clocks *Cl* 2001 and *Cl* 2002 are OR'ed at the phase input of the master clock slave circuits.

All master clock slaves operate at the computer's clock frequency, and thus, phase-clock each master clock slave to each other. The memory master clock buffer, B2002, provides input to every master clock slave, i.e. clocks *Cl* 2003–*Cl* 2008 in FIG. 7. The lines from the master clock buffer B2001 to each master clock slave are of the same length to insure concurrent clock pulses.

Each master clock slave drives a 3,000,100 cycle input to local strip clock buffers. This is described in the following description of FIG. 12.

Refer to FIG. 12. FIG. 12 shows the local strip lines which are shown in schematic representation in FIG. 7 and supplements FIG. 7 by showing tapping off into the system flip-flops. The strip lines are flat copper, sandwich strips insulated by glass epoxy between the strips, which run between the rows of printed circuit cards to distribute the clock pulses. The lines from the master clock slave to each local clock buffer are of equal length also. Each strip line buffer is capable of driving via a strip line 12 flip-flop cards which comprise 48 flip-flops.

Refer again to the alarm system of FIG. 7. The alarm system contains three indicators two of which are on the output lines marked "To console lamps" and the third is not shown. These indicators are the computer master clock alarm, the master memory clock alarm, and the clock phase alarm to indicate failure and malfunction of the master clocks. In the event that computer master is disabled, the computer clock alarm indicator lights. The memory master clock *Cl* 2002 detects the absence of the transmitted sync pulse and continues operating at a three megacycle rate rather than its 3,000,100 cycle. Similarly, if both the computer master clock *Cl* 2001, and the memory master clock *Cl* 2002 are disabled, the computer and memory clock alarm indicator lights and the master slave clocks independently continue operating at a rate of 2,999,900 cycles, but asynchronous to each other. If the master clocks *Cl* 2001 and *Cl* 2002 are out of phase, the clock phase alarm indicator lights.

Figure 8:
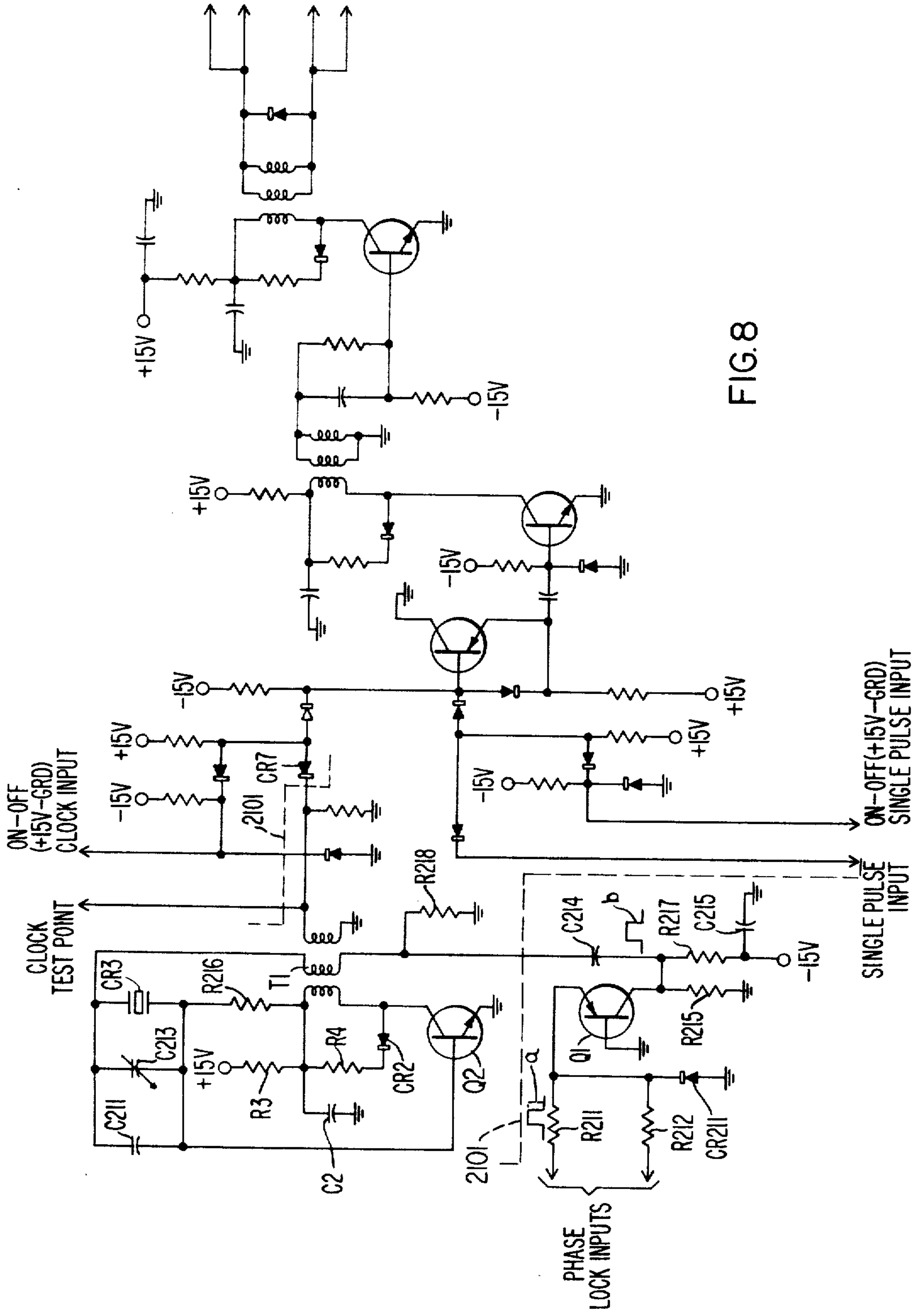
FIG. 8 is a schematic diagram of any of the clock oscillators of the invention illustrating the circuits for either the master clock or the slave clocks of the preferred illustrative embodiment of the invention and as shown in block representation in FIG. 7.

In all six modes of operation, both the computer and memory master clocks *Cl* 2001 and *Cl* 2002 are operative. In the single pulse mode, the master clock slaves are disabled. As shown in FIG. 8 hereinbelow described, all master clocks (masters and slaves) are crystal controlled blocking oscillators and are directly interchangeable providing they are adjusted to the proper designated frequency. The computer master clock *Cl* 2001 is adjusted to three megacycles plus 100 cycles, the memory master clock *Cl* 3002 to three megacycles, and all slaves to 3 megacycles minus 100 cycles.

Now refer to FIG. 8 of the drawings which shows a representative oscillator circuit usable for either the master clocks or any of the slave clocks. The identical circuit is used except that in the case of the master clock units the phase lock input resistors R211 and R212 which are provided are left dangling. In the case of each of the slave clocks the input to resistor R211 is the pulse output of the master clock *Cl* 2001 shown in FIG. 7, and the input to resistor R212 is the output of the master memory clock *Cl* 2002. In the case of the memory master clock *Cl* 2002, the input at resistor R211 is the computer master clock, *Cl* 2001 output and the input at resistor R212 is left dangling.

The clocks will be described for each of the slave clock units *Cl* 2003–*Cl* 2008. Assume that an output from master clock Cl 2001 is applied at the input to resistor R211 and an output from the memory master clock *Cl* 2002 is applied at the input to resistor R212 (see FIGS. 7 and 8). The dashed line 2101 on the drawing of FIG. 8 indicates the dividing line between the clock circuitry and the gating and buffer circuitry which are provided responsive to each of the clock outputs.

A pair of transistors, comprising of an input transistor Q1 and an oscillator transistor Q2 are provided. Transistor Q2 is a blocking oscillator which has the primary winding of a transformer T1 connected to its collector. Across the primary winding of transistor T1 is a resistor R4 which may be 47 ohm resistor and a diode CR2. Positive voltage is applied to the collector of transistor Q2 through a voltage divider network from a plus 15 volt supply through resistor R3 which may be 100 ohms and a capacitor C2. Capacitor C2 may be a .1 microfarad capacitor and is grounded on its opposite plate. Feed-back is provided for the oscillator between its collector and its base by timing resistor R216, the crystal circuit comprising crystal CR3 and the variable tuning capacitor C213 in conjunction with capacitor C211, both capacitors being connected in parallel across crystal CR3. Resistor R216 may be a 22,000 ohm resistor. Crystal CR3 may be a 3 megacycle crystal. The timing resistor R6 and the crystal CR3 are in series between the side of the primary of transformer T1 opposite the transistor Q2 collector-connected side and the base of transistor Q2. A secondary output winding of transformer T1 applies input to the gating circuit through a crystal diode CR7, and into a clock test point. A tertiary feed-back winding of transformer T1 to provide blocking oscillations of high amplitude is provided between the 3 megacycle crystal CR3 and the emitter of transistor Q1 through output emitter coupling capacitor C214. Capacitor C214 may be a 150 micromicrofarad coupling capacitor. A resistor R218 is provided which may be 100 ohms to insure that the lower half of the tertiary winding of transformer T1 is not at DC ground. The transistor Q1 has its base grounded. A voltage divider from a negative 15 volts supply is provided by a collector resistor R217 which may be 300 ohms and resistor R215 which may be a 1000 ohm resistor. Decoupling is provided by a capacitor C215.

Operation of the circuit for phase locking the slave clocks *Cl* 2003–*Cl* 2008 to the master clocks *Cl* 2001 and *Cl* 2002 occurs as follows:

Upon the occurrence of a 3 megacycle plus 100 cycles input from computer clock *Cl* 2001 at resistor R211 and a 3 megacycle input from memory master clock *Cl* 2002 applied at resistor R212, these signals are mixed at the emitter of transistor Q1. Since the incoming signals are out of phase only by one coming in because of the delay circuit D2001 and the remaining circuitry tying the computer master clocks Cl 2001 with the memory master clock Cl 2002 shown in FIG. 7, the signals will normally be within 10 nanoseconds of each other. Since the signals are each 40 nanoseconds long, they occur coincidentally throughout at least a portion of their duration (see waveform *a* in FIG. 8). The first pulse which comes in either through resistor R211 or resistor R212, triggers the transistor Q1. When applied at the input of transistor Q1, the first pulse causes a difference in potential across the input diode comprising the grounded base and the emitter of transistor Q1. This causes a positive going pulse output (see waveform *b*) in synchronism with the first of the pulses coming into the resistors R211 and R212 to appear at the collector of transistor Q1. This positive going pulse is applied across coupling capacitor C214 into the tertiary feed-back winding of transformer T1. This provides synchronism of the feed-back such that feed-back is coupled in synchronism therewith through the capacitors C211 and C213 back to the base of transistor blocking oscillator Q2. This positive synchronising pulse applied to the tertiary in this manner enables pulling the 3 megacycle crystal CR3 off frequency just the exact amount required to pull the slave clock pulse outputs into synchronism with the master clock inputs. This circuitry enables phase locking of the slave clocks to the master clock inputs.

The resistor R211, which is a 47 ohm resistor enables correct termination of the coax. The circuit thus enables matching the impedance of the coax lines. This termination provided by resistor R211 provides for optimum impedance matching between the clocks and hence, for maximum power input into the grounded base circuit of transistor Q1. By this means the maximum amount of buffers may be driven and economy is provided in the system. This is also provided by resistor R212 which is 47 ohms. In this manner, the circuit of FIG. 8 provides unexpected advantages in that correct impedance matching is provided which would not be provided if the coax were grounded. Thus, the coax is not grounded but is utilized in the transistor Q1 circuit.

The diode CR211 not only limits overshoot, but in addition it takes care of the negative impedance termination for the coax lines to provide maximum efficiency. The transistor Q1 with its grounded base and its input resistors R211 and R212 takes care of the correct termination for the positive-going input pulses.

SYSTEM INTERCOMMUNICATIONS

Intercommunications among the major modules of the invention system are divided into the following areas: (a) input/output, memory, and computer module data busses; (b) input/output, memory, and computer control-line busses; and (c) external request lines.

*Input/output, memory, and computer control data busses*

Refer to FIGS. 3A and 3B of the drawing. In the maximum system shown therein there is an option available in the system module configuration. The illustrative embodiment system may comprise five input/output control cabinets containing ten I/O control modules, I/O 1–I/O 10, four computer modules, P1–P4 and eight memory cabinets comprising sixteen memory modules M1–M16. The other option for a maximum illustrative embodiment system comprises ten I/O cabinets which hold twenty I/O control modules I/O 1–I/O 10 and I/O 11–I/O 20, three computer modules P1, P2 and P3, and eight memory cabinets comprising sixteen memory modules M1–M16. Where the 4 computer system is selected only one data bus is available for input-output operations. This bus, I/O bus A, can service five I/O control cabinets containing 10 I/O control modules. If the ten I/O cabinet system is selected, two I/O busses are required for system operation. The second I/O bus, I/O bus B, replaces the fourth computer P4 bus and services the ten added I/O modules I/O 11–I/O 20. Therefore only 3 computed modules P1–P3 can be utilized in a two-I/O bus system. System cabling is shown in FIGS. 3A and 3B.

Each I/O cabinet data bus, Bus 1, Bus 2, Bus, 3 Bus 4 and Bus 5, is made up of 18 cables. These 18 cables are routed to every memory module M1–M16 in the system. The 18 cables provide 4 lines for memory module addressing, one line to determine whether the I/O operation is a read or write operation, one line to identify the I/O cabinet requesting access to the memory and 12 lines to transfer data from the I/O control cabinet. This is shown in detail hereinbelow also in the description of the individual modules and particularly in the description of the memory and I/O control modules.

Every computer module P1–P4 in the system has a computer data bus made up of twenty cables. These twenty cables are routed to every memory module M1–M16 of the system. The twenty cables provide four lines for memory module addressing, one line to determine whether the computer module is to store data in the memory or to request data from the memory, one line to identify the computer module requesting access to memory, twelve lines to transfer data from the computer module and two lines to identify which I/O bus, A or B, the computer module is requesting for a descriptor. In a two-I/O bus system both of the last-mentioned lines are used.

Every memory module M1–M16 in the system has a memory data bus made up of 13 lines. These 13 lines are routed to every computer P1–P4 and I/O control cabinet IC1–IC5 in the system. Twelve lines are used to transfer the data from the memory module. One more line (the thirteenth) is used to carry a crosspoint or access obtained signal from every memory module M1–M16.

*Input/output, memory and computer control line busses*

In addition to the data busses in the system, control line busses have to be used to enable the different modules making up the system to operate as a single system. These control line busses are as follows: The I/O request control bus, the I/O priority A control bus, the I/O priority B control bus, the I/O busy control bus, the I/O descriptor return control bus, the computer interrupt bus, and the memory descriptor inhibit control bus. The busses are indicated by title in FIGS. 3A and 3B.

For an I/O control module to request access to memory, two conditions must be satisfied. They are: (a) no other module has access, and (b) the module must have the highest priority of those requesting access.

Once an I/O control module gains access to the I/O bus for memory operation, a level is generated by this module and transmitted to all other control modules on the I/O control request bus. This level is used to inhibit all conflict, and priority resolution until the access to memory by the I/O control module is complete.

The conflict in priority resolution logic to determine which module gains access to memory can only operate when all levels on the request control are zero.

There are two levels of priority that an I/O control module may have in requesting access to the memory module. The two levels of priority are called priority A and priority B. Each I/O control module on one I/O bus receives the priority levels from every other I/O control module on the I/O bus. The priority levels are routed to all the I/O cabinets by the I/O priority A control bus and the I/O priority B control bus. These priority control busses are used in the system to resolve any time conflicts when two or more I/O modules simultaneously request access to the memory. All priority A requests are granted access to memory before any priority B requests. The lowest numbered I/O module with a priority A request is next granted access to the memory. In a two-I/O bus system, the I/O priority A and I/O priority B control busses are duplicated one set for each I/O bus.

The I/O busy control bus is made up of five lines which are routed from each I/O cabinet IC1, IC2, IC3, IC4, or IC5 to all computer and I/O cabinets IC1–IC5 in the system. In a two-I/O bus system, there are two independent busy control busses. These signals are used in the system to select the first non-busy I/O control module.

An I/O descriptor return control bus has five lines. Each I/O cabinet connected to one I/O bus routes a signal to every computer module P1–P4 in the system. In a two-I/O bus system, there are two independent I/O descriptor return control busses, one for each I/O bus, A and B. The I/O descriptor return control signals are used in the system to provide paths to notify one or more computer modules via the interrupt system that an I/O operation is completed.

The computer interrupt control bus is made up of signals from each computer module P1, P2, P3 or where present P4, going to all other computer modules P1–P4 in the system. This control bus is used in the system to allow any computer module to interrupt itself or any other computer module in the system.

The memory descriptor inhibit control bus is used in the system to signal to the other memory modules in the system that a descriptor is being sent to an I/O bus. During this period, all I/O requests for this bus will be held in abeyance. In a two I/O bus system, there are two independent memory descriptor inhibit control busses, one for each I/O bus.

*External request lines*

Each computer module P1–P4 in the system is capable of receiving interrupt requests from 16 external devices (see FIG. 4B). One external device is capable of requesting all computers in the system to interrupt. If the corresponding mask in any computer P1, P2, P3 or P4 is set, the request will cause an automatic interrupt in that computer.

Discussion of the switching interlock and of each of the computer modules, the memory modules, and the input/output control modules follows:

SWITCHING INTERLOCK

Refer to FIGS. 1, 2, 3A and 3B, and 9A and 9B.

A switch interlock suitable for incorporation with the inventive system herein described is provided in the aforementioned copending application, Ser. No. 89,525, for Computer System of Hopper, Pezely, Sichel, Jr., Lounsbury, and Zimmerman. However, in the present system, some modifications are made. For example, in the present system, the number of gates are reduced from 49 (48+1) to 12 and serial-parallel transfer is effected in four syllable transfers of 12 bits each and a fifth transfer of a parity bit. The 48 data bits and a 49th parity bit were parallelly transferred in the Ser. No. 89,525 patent application system. In the present invention also, in place of a centralized switching interlock unit, the switching interlock is divided up and made to interfit in the modules of the systems so that the system will be truely modular. The system of patent application Ser. No. 89,525 described the switching interlock both as a centralized system and recognized possibility of a decentralized system.

That portion of logic in each module that provides interconnection control of computer, memory, and I/O control modules is referred to as the switching interlock.

The switching interlock must: Provide transfer gates for the appropriate control signals for inter-cabinet data communications; provide clock-phasing control signals for all modules during inter-cabinet communications; provide sufficient inter-cabinet signals to resolve conflicts inherent to a modular computing system and provide the above such that system modularity is preserved.

SYSTEM REQUIREMENTS

*Computer-memory, and I/O-memory communications*

Computer modules P1–P4 and I/O control modules I/O 1–I/O 10 (and where present I/O 11–I/O 20) communicate with memory modules M1–M16. Since the computer and I/O control modules "request," access to the memory modules M1–M16, the computer and I/O control modules P1–P4 and I/O 1–I/O 10 are termed "requestor" units.

There are five basic operations which require the switching interlock: (1) A computer module seeks access to a memory module to write a word residing in the computer into memory; (2) a computer module seeks access to a memory module to read a word from memory and receive it in the computer; (3) a computer module seeks access to a memory module to read a word constituting an I/O descriptor from memory and have it transmitted to the I/O control modules; (4) an I/O control module seeks access to a memory module to write the word residing in the I/O control module into memory; and (5) an I/O control module seeks access to a memory module to read a word from memory and to receive it in the I/O control module.

*Control timing*

The basic timing for the system as stated hereinabove, is provided by a free-running three megacycle clock. Each unit in the system operates from the common master clock C/2001. Thus, the system is synchronous although generally the module operating cycles are not in phase, since the units operate independently.

When modules are interconnected and operating in unison, they must be in phase as well as in synchronism. That is, interconnected modules must procced in proper time relation to each other.

There are two basic categories into which fall all operations in which phasing is controlled by the switch interlock. These are: (1) The requestor module is put in phase with the preselected memory unit during a read or write operation; and (2) the I/O control modules accepting a descriptor are put in phase with the memory module transmitting the descriptor during an I/O descriptor transfer operation.

*Conflict resolution*

The modular organization of the inventive system permits concurrent computation and input/output execution. That is, multiple transfer busses in the switching interlock may be used simultaneously. The switching interlock preserves order in the event of the following conflicts: (a) A requestor module seeks access to a busy memory module; (b) two or more requestor modules seek simultaneous access to the same memory module; (c) two or more I/O control modules seek simultaneous access to the transfer bus to the memory module complex; (d) a computer module seeks to send a descriptor to the I/O control module while an I/O control module is used in another memory module; and (e) an I/O control module seeks access to a memory module while a descriptor is being sent to the I/O control modules from another memory module.

ORGANIZATION AND INTERFACES

*Information transfer signals*

The transfer bus interconnecting requestor and memory modules are constructed such that simultaneous operation of all requestor units is permitted. Computer modules require extremely frequent access to memory whereas I/O control modules do not. An I/O control module communicates with peripheral equipment in terms of 6-bit characters, and must assemble a group of 8 characters before requesting memory access. Thus, the data rate between an I/O control module and memory is relatively low. This justifies the use of an I/O time-shared transfer bus between the I/O control modules and memory. Each computer module P1–P4 has its own transfer bus.

Inter-cabinet data (48 bits plus parity) transmission is done on 12 lines in the following serial transfers: (1) 12 least significant bits; (2) 12 second least significant bits; (3) 12 third least significant bits; (4) 12 most significant bits, and (5) 1 parity bit on least significant bit line.

Prior to each data word transfer, in the illustrative embodiment a 16-bit memory address is transmitted from the requestor to the memory. The four most significant bits comprising the memory module address are sent on separate lines. The least significant 12 bits, which comprise the memory internal address are sent over the same lines as is the data.

*Information transfer control signals*

Accompanying a memory address, the requestor must generate a request level and a read/write level. In response to memory request, the memory transmits an "access obtained" signal called cross-point. In the case where a computer module requests a descriptor to be sent to the I/O control modules, the computer must also generate a descriptor-request level. The memory module responds with an "access obtained for a descriptor" signal, called a set up descriptor to the I/O control modules.

*Inter-memory signal*

Each memory module M1–M16 sends to every other memory module M1–M16 a signal that indicates that a descriptor is being sent to the I/O control modules I/O 1–I/O 10.

*Inter-I/O signals*

Each I/O control module I/O 1–I/O 10 sends 4 control signals to every other I/O control module I/O 1–I/O 10; 2 priority levels and a request level that are used to establish an order of use for the I/O bus to memory, and a busy level signal that is used to determine which I/O shall act on the next command descriptor.

FUNCTIONAL DESCRIPTION

In general there are two areas in which the switch interlock is active. One is concerned with access to requestor modules to memory. The other is concerned with maintaining order on the time-shared I/O transfer bus.

*Access to memory consideration*

When examining the memory modules; in the switching interlock 150, all I/O control modules on a single bus (A or B) can be considered as a single module with the ability to decide which of the component modules is to use the I/O bus. Each requestor bus can present a request level and a memory module address to the memory module complex at any time, without regard to other requestors. Each memory module "looks" at all requests present at its input gating each time the memory is in its non-busy state. When the requestor's 4-bit memory module address corresponds to that of the subject memory, one requestor is selected for service. The memory then accepts or transmits the addressed word to the requestor.

Each requestor module is assigned a cross-point flip-flop in each memory module. A memory module grants access to a requestor's cross-point flip-flop (XP). All data transfers to and from memory modules M1–M16 are controlled by cross-points, but all control is exercised at the inputs to a module. A memory responds with an XP to the requestor when access is obtained for the requestor. During memory-read, the crosspoint serves to notify the requestor that data is forthcoming from the requested memory. During memory-write, the cross-point is used to notify the requestor that data should be sent. The XP signal is also used to synchronize the requestor with the memory. Each time-dependent control within both requestor and memory is referenced to the setting of the memory crosspoint.

All conflict situations are then handled most easily within the memories by assigning a logic to that portion of the memory that is used to set the crosspoints.

The fundamental rules upon which a memory sets its crosspoints are as follows:

(1) In each memory, only one crosspoint may be set at any given time.

(2) Crosspoints may become set only when the memory is in, or returns to, the non-busy state.

(3) When more than one requestor seeks access to the same non-busy memory, the order of service is:

(a) Bus one: I/O module A (highest priority);
(b) Bus two: I/O module B or computer P4;
(c) Bus three: computer P3;
(d) Bus four: computer P2; and
(e) Bus five: computer P1 (lowest priority).

(4) When an I/O control module is requesting any memory module, a computer requesting a descriptor be sent to the I/O control modules must be inhibited until the I/O control modules are not requesting.

(5) When a computer has gained access to any memory module to send a descriptor to the I/O control modules, all I/O requests for any memory must be inhibited until transmission of the descriptor is completed.

In the event that one of the modules goes off line, modularity is maintained and the switching interlock continues to function, because each module contains only that portion of the switching interlock which is needed for operation of the module.

*I/O bus considerations*

In the previous section on the memory portion of the switching interlock, the I/O control modules were considered as one requestor. Insofar as the memory modules M1–M16 are concerned, this is a true picture. In the I/O section of the switch interlock there must be a logic which causes the I/O modules to time-share the I/O bus. This logic is required to:

(1) allow only one I/O control module I/O 1–I/O 10 or where present one of I/O 11 to I/O 20 to use the bus to memory at any given time.

(2) Give access to the bus according to the following order:

(a) Priority A requests-highest
(b) Priority B requests
(c) In case of conflicting requests of the same priority, give access to that module with the lowest number. Each I/O control module on the bus is assigned an I/O module number from 1 to 10. This number is fixed and is not program alterable.

(3) Cause the first non-busy (lowest numbered I/O control module I/O 1 to I/O 10 is the first I/O control module), I/O control module to accept command descriptors sent on the I/O bus.

(4) Recognize priorities when included in a descriptor by the program.

(5) Should be modular in that each I/O control module contains all logic needed for its share of the switching interlock.

(6) Take zero time. That is, the logic should add no delay to the normal requestor-memory cycle.

The basis upon which the I/O control modules I/O 1–I/O 10 or I/O 11 to I/O 20 share their bus is simply to use a bus unless inhibited by another I/O control module. Each I/O control module receives from every other I/O control module, the I/O signals that indicate that an I/O control module is using the bus or that an I/O module (with priority A or B) requires use of the bus. If an I/O control module can satisfy the following conditions it uses the bus:

*Case I.*—Subject I/O control module has "A" priority.

(1) No other lower-numbered I/O control module with priority "A" requesting access to the bus.
(2) No other I/O control module is currently using the bus.

*Case II.*—Subject I/O has a "B" priority.

(1) No other I/O control module requesting the bus has an "A" priority, (2) No lower numbered I/O control module with priority "B" is requesting access to the bus, and
(3) No other I/O control module is currently using the bus.

Modularity is conserved by including only inhibit signals from I/O control modules currently in the system. Deciding which I/O control module is to accept command descriptors is mechanized similarly. Each module receives busy signals from each lower numbered I/O control module on its bus. If all lower-numbered modules send a busy signal, the subject module then accepts the next command descriptor.

The I/O portion of the switching interlock is accomplished in effectively zero time because all conflicts are resolved within a single clock time prior to an I/O control module setting its memory request flip-flop.

A detailed description of each of the types of modules follows:

COMPUTER MODULE

Now refer again to FIG. 4A and FIG. 4B, the computer module block diagram. The computer system which includes this computer is designed to operate with a binary data word of sufficient length (49 bits including sign and parity), for almost all computing problems and for floating point computation including 36 bits of mantissa and 12 bits of characteristic. Operands may be called from memory or from a four position stack of operand registers within a thin-film storage provided in this computer. The results of operations are stored in memory or in the operand stack for subsequent processing at the will of the programmer.

The operand stack comprises four 48-bit registers 140–143, 144 to 147, 150 to 153, and 154 to 157. Each register consists of four syllables of 12 bits each, for example, the first stack register consists of syllable 140, 141, 142, and 143, the second stack register consists of 12-bit syllables 144, 145, 146, and 147, etc. The operand stack 140 to 143, 144 to 147, 136 to 153, 154 to 157 is a device which is extremely useful in arithmetic and processing operations.

This operand stack reduces the number of references to main memory by holding partial or intermediate results of computation. The stack operates in two modes: normal and hold. The hold mode is useful for list manipulation and for repeated use of a number.

The first syllable of an instruction supplies the operation code and three address indicators. The address indicators provide choice between fetching the operand from the stack or the memory and indicates whether the stack mode is normal or "hold" and whether the memory address is to indexed or not. Address syllables or syllable strings follow the operator syllable for each memory access called out. Each operand memory address syllable contains an 11-bit literal address and an indirect address bit. The thin-film memory is numbered 3001. A base address register 055 is provided in the thin-film portion 3001. The literal address is added to the contents of the 16-bit base address register 055 in order to refer to an area of memory known as the direct-address area.

The contents of the direct address location may be either an operand or another memory address. Indirect addressing of any desired number of levels is available by this technique.

Fifteen index registers, octal 001 to 017 are provided in thin-film memory 3001. Any or all of three operand addresses which can be developed for each instruction may be modified by the contents of three of the 15 thin-film index registers 001 to 017.

As stated, the system of FIG. 3 can accommodate up to four of the computer modules shown in FIG. 1. Rather than the aforementioned five functional area division, each computer module may also be considered to consist of three functional areas, arithmetic, thin-film memory and control. The first functional computer area, the arithmetic unit, 3030, is made up of three registers, an A register 3033, a B register 3031, and a C register 3034, and associated controls and an adder 3032. The second functional area is a set of 53 registers (later individually described and numbered), contained in a small thin-film magnetic storage unit 3001. The third area is the control section which includes capability for indexing, address accumulation indirect addressing, and a command and subcommand matrix and control unit 3020.

*Operand stack*

One of the features of this invention is the thin-film fast-access operand stack 3099 (registers 140 to 143, 144 to 147, 150 to 153, and 154 to 157 of thin-film memory 3001 of FIG. 1). The operand stack of this invention is used to temporarily store as many as four data words which might be either intermediate results or data words which are to be used repeatedly. These operands which are used again and again and the intermediate results can be kept in the stack 3099 and addressed in a shorter time than required to get an operand out of main memory (the memory modules comprising the ferrite core memory modules of 4096 words each and associate register and controls). However for a read operation, only the top of the stack 3099 is accessible at a given instant. For a write operation either the top of the stack or the next level is accessible. The programmer must be aware of what values are at each level of the stack 3099 and which level is currently accessible. The stack 3099 is effectively a four word circular memory with an addressing counter. One of the four words is always being pointed at (is under the "read head"). Operation of this circular concept and the pointer "read head" at the top of the stack are shown in FIGS. 14A and 14B.

Whenever access is had to the stack 3099, there is an option of either holding the stack or circulating the stack one step. Normal operation is to step the stack with each stack reference. The four stack representations shown in FIGS. 6A and 6B are respectively the stack registers shown in thin-film memory portion 3001 of FIG. 1 as respective stack registers 140 to 143, 144 to 147, 150 to 153, and 154 to 157. For purposes of illustration, consider stack register 1 (140 to 142) as the one which is in position to be read out at a particular instant.

As stated, whenever access is made to the stack 3099, there is an option of either holding the stack or circulating the stack one step. As further stated, normal operation is to step the stack 3099 with each stack reference. The stepping operation follows all fetches from the stack 3099 and proceeds the deposit made in the stack 3099. That is, a read operation is a fetch from the stack 3099, and stepping operation follows such a read or fetch from the stack 3099. A write is a deposit made in the stack 3099 and the stepping operation precedes the deposit made in the stack 3099. As illustrated in FIGS. 14A and 14B, this stepping action is counterclockwise following a fetch or read and clockwise preceding a deposit. As will be further described hereinbelow, address tag values in the operator syllable (see description of operator syllable in Column 44 hereinbelow) 00 and 01 designate the stack 3099 as the intended operand or result source or store place. Codes 10 and 11 refer to the memory as the source or store place of operands or a result. Indicator code 00 designates normal stepping of the stack and indicator code 01 designates that the stack be held and not be stepped. As later described herein, by instructions, step stack up, step stack down, and reverse stack the stack may be rotated so that the start register to which access is desired will be in "top of stack" position.

The illustrative embodiment ferrite-core main memory modules store 48 bits of information plus a parity bit at each memory address. The information or data comprises a four syllable (48 bits) operand or result, or a program word of four program syllables. The total time required to compute the address and to fetch four syllables from the core memory of the illustrative embodiment and to store those syllables in the appropriate register is 5.33 microseconds and the time required to compute the address and to store four syllables is 4.33 microseconds. As stated, to reduce the time required to fetch or store operands, the thin-film memory operand stack 3099 is provided. The time rquired to fetch an operand from the stack is 2.00 microseconds and the time to store a result is 1.67 microseconds, values considerably lower than those for the ferrite-core memory. The stack feature enables temporary storage of intermediate results so that when the later described arithmetic unit A register contents are to be reused they may be contained in the stack register at the top of the stack and the 2.00 microseconds required for stack, read-out is reduced to 0.33 microsecond.

It has been brought out that the operand stack comprises four 48-bit, thin-film registers, stack registers 140–143, 144–147, 150–153, and 154–157 shown in FIGS. 4A and 4B. These members, octal 140, 141, 142, 143, 144, 145, 146, 147, 150, 151, 152, 153, 154, 155, 156, and 157, each holds a 12-bit syllable of an individual 48-bit stack register. There are four syllables in each stack register. The stack registers 140–143, 144–147, 150–153, 154–157 may be visualized simply as a steppable four-word circular memory shown in FIGURE 14A and FIGURE 14B. When the stack is addressed to fetch (read an operand), the operand in the register currently under the read head is fetched following which the stack may be stepped in the fetch direction or held (not stepped). When the stack is addressed to store (write) an operand, the stack is first either stepped in the store direction or held (not stepped), following which the operand is stored (written) in the register under the read head. An operand is thus fetched from, or a result stored in, the top of the stack. Stepping the stack is defined as a "stack normal" operation, while not stepping the stack is defined as a "stack hold" operation.

If an operand or result is referenced to the operand stack, no memory address need be computed since the operand so referenced is always fetched from or stored in one "address"—the top of the stack. Accordingly, an operand or result referenced to the stack requires no memory address syllable in the syllable string.

The computer module structure shown in FIGS. 4A and 4B is described in detail hereinafter after the following description of the structure of program syllables used in computer instructions. In the description of program syllable structure hereinbelow, the operation of a stack fetch or store will be described in relation to the operator syllable.

*The structure of program syllables*

There are 18 types of syllables used in the machine language programming of the illustrative embodiment computer. These types include the operator syllable, index syllable, the memory and the branch address syllables, thin-film address syllable, index increment variant and index increment amount syllables, shift syllable, transmit variant syllable, logical machine condition syllable, field definition syllable, character syllable, subroutine jump address and increment syllables repeat-count, and increment syllables, I/O syllable and special register and computer interrupt variant syllable.

Now refer to FIG. 13 which illustrates the structure of each type of syllable. The operator syllable comprises command bits 1 through 6 which specify the fundamental operation desired, the next six bits comprise address tags $A_1$, $A_2$, and $A_3$ of two bits each which indicate how many syllables follow the operator syllable. The six bits represent the octal number for the command desired and the three address tags of two bits each are the remaining six bits which with the six command bits make up the twelve bit syllable.

The operator syllable is the only one required for every instruction. It identifies any syllables that may follow and any stack usage for the instruction. This type of syllable is not indexable. The $A_1$, $A_2$, and $A_3$ codes identify the three possible "addresses" of the instruction as follows:

| Code: | Definition |
|---|---|
| 00 | Stack (or no address). |
| 01 | Hold stack. |
| 10 | An unindexed syllable follows. |
| 11 | An indexed syllable follows (index syllable followed by any other syllable to which it is applied). |

That is, to indicate the number of syllables in the syllable string following the operator syllable, three two-bit address tags $A_1$, $A_2$, and $A_3$ are included as the second half of the 12-bit operator syllable. The first six bits are the octal equipment of the particular instruction. the complete list of instructions by name and octal number are given in the instruction index shown herein in Columns 44 and 45.

Restating each of the two-bit tags, $A_1$, $A_2$, and $A_3$ has four possible configurations. The address tag is ignored if the address is not used for an instruction. The four possible binary configurations are:

00 Operand referenced to stack: No memory address syllable relating to operand is contained in syllable string. Stack to be stepped normally ("stack normal").

01 Operand referenced to stack: No memory address syllable relating to this operand is contained in syllable string. Stack to be held ("stack hold").

10 Either memory syllable which is part of program or operand referenced to core memory: Indexing not used. Memory address syllable relating to this operand appears in syllable string. Alternatively, unindexed special syllable in syllable string.

11 Operand referenced to core memory: Indexing used. Index syllable precedes syllable in syllable string. Alternatively, special syllable in syllable string preceded by index syllable.

*Variable-length instructions*

Many fundamental computer operations such as binary add, for example, require three addresses. A single-address computer furnishes fixed-length, single-address instructions for which the programmer assembles the sequence of instructions needed to perform a desired fundamental operation such as binary add. The computer of this invention eliminates the assembly process by specifying in a single variable-length (polysyllabic) all the information necessary to perform a desired fundamental operation. For example, "binary add" in a single-address computer requires programmer assembly of three single-address instructions, each using a separate storage location. These instructions are (1) clear A register and add data from memory from memory address $A_1$ to A register, (2) transfer data from memory address $A_2$ and add to A register, (3) store the A register (sum) at memory address $A_3$. In the computer of the present invention, only one polysyllabic instruction is required for binary add. This is binary add the data at memory address $A_1$ to the data at memory address $A_2$, and store the sum at memory $A_3$.

For fundamental computer operations requiring less than three addresses, the number of addresses in the inventive machine instruction is correspondingly reduced so that only the needed information appears. Examples of 2-, 1-, and no-address instructions of the machine of the present invention are given below:

(1) Two-address "logical complement": logically complement the data at memory address $A_1$ and store at memory address $A_2$. This instruction comprises an operator syllable and up to two memory address syllables.

In a single address computer, this logical complement instruction requires three instructions. (a) Clear A register and add data from memory address $A_1$ (b) complement the A register, and (c) store the A register at memory address $A_2$.

(2) One address "unconditional transfer": branch to the instruction at memory address $A_1$. This is a two-syllable instruction comprising the operator syllable and a branch address.

(3) No-address "step stack down": this instruction says count stack counter in store direction. It comprises one syllable, and operator syllable.

It is thus seen above that each instruction comprises a string of 12-bit syllables, the exact number (from 1 to 7) of syllables in the string depend upon the number of addresses in the instruction and several other factors to be discussed hereinbelow:

There are five basic types of syllables in the machine;

(1) Operator syllable: Specifies the fundamental operation to be performed and the number of syllables in the string following the operator syllable, itself.

(2) Memory address syllable: Specifies the relative address of the operand to be fetched from or stored in the main (ferrite-core) memory.

(3) Branch address syllable: Specifies the relative address in main memory of the instruction to which branching is desired.

(4) Special syllable: Specifies the control data essential to the execution of an instruction.

(5) Index syllable: A memory address, branch address, or special syllable may be indexed.

When indexing is desired, an index syllable is inserted into the syllable string (instruction) just preceding the syllable to be indexed. The index syllable itself contains the addresses of three index registers (selected out of the 15 index registers available) whose contents are to be added serially to the syllable immediately following.

FIG. 15 illustrates a typical instruction (string of syllables) of the present invention. The operator syllable specifies the fundamental operations as "binary add" (BAD) and includes the three address tags $A_1$, $A_2$, and $A_3$. The instruction code for binary add 110101 is equal to the octal number 65 (sixty-five is the octal number for the binary add instruction). The $A_1$ tag, 00 (the seventh and eighth bits of the first syllable which is the operator syllable), indicates that the first operand (augend) is taken from the top of the stack; hence no memory address syllable relating to the first operand appears in the syllable string. Thus, there is no first syllable following which would correspond to a memory address for the first operand. The $A_2$ tag 1 0 (the ninth and tenth bits of the operator syllable), indicates that the second operand is to be taken from the core memory using the unindexed memory address syllable ($A_2$) which is the second syllable in the string (i.e., that following the operator syllable). Each syllable is a 12-bit syllable. The operator syllable is the first 12 bits consisting of 6 bits for the instruction code for octal 65 and 6 bits of which two each are $A_1$, $A_2$, and $A_3$ tags, respectively, for a total of 12 bits. The second operand address in this particular word follows directly and is the 12 bits in the second syllable.

Address tag $A_3$, 1 1, indicates that the binary sum is to be stored in the core memory using indexed memory address syllable $A_3$ whence the third syllable in the string is an index syllable shown as index third syllable I which is a 12-bit syllable indexing information and the fourth syllable is the memory address syllable. Where indexing is used, the index syllable precedes the syllable to which it applies.

*Word structure*

FIG. 16 illustrates the word structure appliable in the illustrative embodiment of the present invention. The basic word is 48 bits in length followed by a 49th parity bit. It may constitute: (1) four 12-bit program syllables; (2) eight 6-bit alphanumeric data characters from character 0 to character 7; (3) a 48-bit binary data word consisting of one 47-bit fixed-point binary fraction prefixed by a sign bit; and (4) a binary floating-point data word comprising an 11 bit exponent prefaced by a sign bit and followed by a 35-bit binary fraction mantissa prefaced by a sign bit. Sign-bit convention used is 0=plus, 1=minus, although the opposite could readily be used without departing from the principles of the invention.

*Syllable structure*

The structure of each different type syllable of the illustrative embodiment is shown in FIG. 13.

*Operator syllable (0)*.—The operator syllable of the instruction word has been described hereinabove. The top column bits 1 through 12 are the bit positions for each syllable. As shown in the first row, which shows the operator syllable "0," the command bits are bits 1 through 6 and specify the fundamental operation desired. Address "tags" $A_1$, $A_2$, and $A_3$ indicate how many syllables follow the operator syllable.

*Index syllable (I)*.—The index syllable "I" is shown in the row below the operator syllable row of FIG. 13. The index syllable used optionally with any syllable except the index syllable itself, the operator syllable, or any syllable used in a repeated instruction. The contents of the three thin-film address registers whose addresses are given in the three 4-bit groupings of the index syllable may be added to or subtracted from the syllable to be indexed. If subtraction is desired, the index register or registers contain the 2's complement of a number. An index register address of zero signifies no index. When indirect addressing is used in conjunction with indexing, the index register contents are applied to the last-level address only (i.e., indirect addressing is completed first, then indexing).

When a syllable is indexed, it is immediately preceded by an index syllable. The contents of up to 3 index registers can be added to the contents of this syllable.

*The core memory relative address syllable (M)*.—This syllable illustrated in the row next to M in FIG. 13 is used to address the ferrite core memory to fetch an operand or store a result. Bits 2 through 12 form a relative address which must be added to the 16-bit base address contained in the thin-film base address register 055 (see FIG. 4A) in order to form a core memory direct address (16-bit). Bit 1, IA, is an indirect address indicator. If bit 1=ONE, the relative address in bits 2 through 12 is the address of an address. In this case, the relative address plus base address register 055 contents is used to fetch a next-level address from the core memory. If the 16 bit next-level address fetched is preceded by a ONE in bit 17, it is in turn, an indirect address and is used to fetch the next-level address from core memory without adding the contents of the base address register 055. The indirect addressing "chain" continues until bit 17 is a zero. The last-level address is used with or without indexing to fetch an operand or store a result in the core memory. An underlined memory syllable M, represents a store address. A memory syllable in parentheses, (M), represents an optional core memory address which may be replaced by an operand stack reference.

*Branch address syllable (B)*.—The branch address syllable shown on the fourth syllable row of FIG. 13 adjacent to the letter "B" is used to address a program (four-syllable) in the core memory. The 12-bit relative address is added to the 16-bit contents of the thin-film base program register 054 (see FIG. 1A), to form a 16-bit direct address used to fetch the program word from memory whenever branching is desired.

In all cases, where a branch is used, the first syllable of the 48-bit memory location, thus addressed, must be the operator syllable of the next instruction to be performed. When a branch is made, the program count register 057 is automatically loaded with the address of the branch.

*Character search syllable (C)*.—Refer to the syllable in the row adjacent the letter "C" in FIG. 8. This syllable is used in the character search instruction. The routine for this instruction is described hereinbelow in the description of FIG. 53. Bits 7 through 12 form the 6-bit character to be searched for.

*Field definition syllable (F)*.—Refer to the row adjacent to F in FIG. 13. The field definition syllable is used in field-defined instructions. A field is basically made up of from 1 to 8 physically adjacent 6-bit characters in a 48-bit word. To define a specific field, it is necessary to specify the character with which the field begins and the length (number of characters) of the field. Bits 10 through 12 specify the number (0 through 7) of the beginning character. Bits 6 through 8 specify the field length (1 through 8 characters). Bits 2 through 4 specify the amount by which the result of the field operation is to be shifted.

*Index increment amount syllable* ($I_a$).—Refer to the row adjacent to $I_a$ in FIG. 13. This syllable is used in the index limit compare instruction described in the description of FIG. 77 hereinbelow. The index increment amount syllable indicates the amount to be added to or subtracted from the index register contents.

*Index increment variant syllable* ($I_v$).—Refer to the FIG. 13 syllable adjacent "$I_v$." This syllable is used in the index limit compare instruction shown in the flow chart of FIG. 77. Variant bit 1 in combination with bit 2, or 3, or 4 specifies the comparison condition desired as shown following:

S1—decrease index specified before comparing $\overline{S1}$—increase index specified before comparing

| S2 | S3 | S4 | |
|---|---|---|---|
| 0 | 0 | 1 | Compare for index equal to limit. |
| 0 | 1 | 0 | Compare for index greater than limit. |
| 0 | 1 | 1 | Compare for index greater than or equal to limit. |
| 1 | 0 | 0 | Compare for index less than limit. |
| 1 | 0 | 1 | Compare for index less than or equal to limit. |
| 1 | 1 | 0 | Compare for index unequal. |
| 1 | 1 | 1 | Compare for index unequal or equal. |

Bits 5 through 8 specify the index register address. Bits 9 through 12 specify the limit register address.

*Input/output syllable (IO)*.—Refer to the FIG. 13 syllable adjacent "IO." This syllable is used with a transmit input/output instruction to select the input/output bus and to control the I/O descriptors. This instruction is described in the description associated with FIG. 73.

*Subroutine jump address syllable* ($J_a$).—Refer to the syllable adjacent "$J_a$" of FIG. 13. This syllable is always used with a subroutine jump instruction described with the description of the flow chart of FIG. 70. The 12-bit relative address given is added to the 16-bit subroutine base address in the subroutine base address register 060 (see FIG. 1A) to obtain the core memory direct address (16-bit) of the word which contains the start of the subroutine address.

*Subroutine jump increment syllable* ($J_i$).—Refer to the $J_i$ syllable of FIG. 13. This syllable is always used with the subroutine jump instruction. The 12-bit relative address given is added to the 16-bit base address of data in the thin-film base address register 055 to obtain the base address of subroutine data.

*Logical machine condition syllable (L)*.—Refer to the "L" syllable of FIG. 13. This syllable is used with a branch on condition instruction. This syllable specified the condition under which the branch is made.

*Repeat count syllable* ($R_c$).—Refer to "$R_c$" of FIG. 13. This syllable is used with the repeat instruction. It specified the number of repetitions to be performed on the instruction to be repeated.

*Repeat increment syllable* ($R_i$).—This syllable is shown opposite "R" in FIG. 13. This syllable is used with the repeat instruction. Bits 1 through 4, 5 through 8, and 9 through 12 specify the amounts by which the second, third, and fourth syllables of the instruction being repeated are to be incremented for each repetition.

*Shift syllable (S)*.—Refer to "S" syllable in FIG. 13. This syllable is used with the shift instruction. Variant bits 3 through 6 specify the particular manner in which the shift of information in the "A" register 3033 alone, or in the A register 3033 and the C register 3034 of the arithmetic unit 3030 (see FIG. 1) is to be performed as follows: Bit 3: ONE=double length shift of data in A register 3033 and of data in thin film C register 124 to 127 (using C register 3034), ZERO=single length shift of data in A register 3033 only; bit 4: ONE=shift right, ZERO=shift left; bit 5: ONE=logical shift (shift bits 1 through 48), ZERO=arithmetic shift (shift bits 2 through 48); bit 6: ONE=end-off (read least significant bit into "space"), ZERO=end-around (read least significant bit to most significant bit position of A register 3033 according to bit 5); bits 7 through 12 specify the amount of shift desired.

*Thin-film address syllable (T)*.—Refer to syllable "T" in FIG. 13. This syllable is used with the store thin film instruction or load thin-film instruction. The store thin-film instruction causes a transfer of information from thin film and storing of this information, and the load thin-film instruction causes a transfer of information into thin film. Variant bits 3 and 6 specify the type thin-film register address as follows:

Bit 3: ONE=multiple-syllable thin-film register addressed,
ZERO=single-syllable thin-film register addressed,
Bit 6: ONE=16 bit/syllable thin-film register addressed,
ZERO=12 bit/syllable thin-film register addressed.

Bits 6 through 12 form the address of the thin-film register desired. If a multiple-syllable register is addressed, the address given in bits 6 through 12 is for the first syllable.

*Special register and computer interrupt variant syllable* ($V_s$).—This syllable is shown adjacent the row of "$V_s$" in FIG. 13. The syllable is used with the load special register instruction which is octal code 31. Variant bits 10 through 12 are interpreted as follows:

Bit 12: ONE=load mask register,
Bit 11: ONE=load eight least significant bits of A into memory lower bounds register, load next eight least significant bits into memory upper bounds register. A means the A (accumulator) register 3033.
Bit 10: 1=interrupt the computer designated by bits 46, 47 and 48 of the A (accumulator) register 3033.

*Transmit variant syllable* ($V_t$).—This syllable shown opposite "$V_t$" in FIG. 13 is used with the transmit modified instruction. This instruction specified sign modification and rounding as follows:

Bit 10: ONE=round off data

| Bit 11 | Bit 12 | | Variant |
|---|---|---|---|
| ZERO | ONE | = | Set sign positive. |
| ONE | ZERO | = | Set sign minus. |
| ONE | ONE | = | Change sign. |

*Modular description*.—Refer again to the block diagram of the computer module of the illustrative embodiment of the inventive system of FIG. 4A and FIG. 4B. A computer basically has three functions: arithmetic, control, and memory. It also receives input and gives off output. The computer of the invention in conjunction with its thin-film memory and the shared memory and other system units accomplishes these functions. However, the computer module may be thought of also as divided into five functional units: (1) thin-film memory; (2) memory protection; (3) memory exchange; (4) control; and (5) arithmetic.

used (program storage register 100 to 103 or 104 to 107) when an interrupt occurs. A 24-bit real time clock (RTC) 114 and 115 is provided. This is a counter which is incremented every 10 milliseconds. The incrementing is done by an oscillator which brings out its contents every 10 milliseconds, adds to them logically, and puts them back into the real time clock register 114 and 115. A 12-bit repeat count register (RCR) 120 is provided for implementation of the repeat instruction in a program. It contains the number of times the program is to be repeated.

A character count register (CCR) 123 of 12 bits is provided in thin-film memory 3001 to implement the character search instruction. It keeps the character position being compared in a character search where scanning is effected to keep track of which character is currently looked at in the scanning process. A thin-film C register (TFC) 124 to 127 comprising assembled 12-bit registers 124 to 127 for a total of 48 bits is provided. The arithmetic unit to be described hereinafter has a 12-bit flip flop C register 3034. The thin-film register 124 to 127 is used in conjunction with the C register 3034. Each time 12 bits are accumulated in the C register 3034, they are transferred into the thin-film C register 124 to 127 and the C register 3034 then proceeds to accumulate the next 12 bits. At the end of an arithmetic operation, a full word or total of 48 bits will have been accumulated in the thin-film C register 124 to 127.

Three 12-bit repeat increment registers (RIR) 130 to 132 are provided for implementation of a repeat instruction. They hold the increment added to each of the memory syllables of the repeated instruction.

Four stack registers of 48 bits each, 140 to 143, 144 to 147, 150 to 153, and 154 to 157 are provided in a thin-film memory stack circulator end around arrangement 3099. This is the stack 3099 which has been described in detail in the description of FIGS. 6A and 6B and in the description of the operator syllable hereinabove. These 48-bit stack registers 40 to 143, 144 to 147, 150 to 153, and 154 to 157 form stack 3099 to provide a scratch pad memory which is addressed only alternatively to addressing main core memory during the course of an instruction. Although only four words at a time are stored, the stack 3099 finds considerable repeated use in providing a fast access memory which speeds up to the machine operation considerably.

A K and E register 3004 and 3005 of which the K register portion 3004 contains four bits and the E register portion 3005 contains 12 bits, is provided in the computer module. The K and E register 3004 and 3005 is primarily a read-write register for the thin-film memory (3001). An L and M register 3006 and 3007 comprising 4-bit L register 3006, and 12-bit M register 3007 is provided to facilitate computer transfer to and from the memory modules. L and M adders 3008 and 3009, respectively, comprising a 4-bit adder 3008 and a 12-bit adder 3009 are provided for adding the contents of the K register 3004 and the L register 3006 together and the E register 3005 and the M register 3007 together, the result being put into the L register 3006 and the M register 3007 respectively. The primary function of adders 3008 and 3009 is that of performing address arithmetic. This is used to add the memory syllable to the program address register 054 or base address register 055 contents to provide the true address in memory. Adders 3008 and 3009 are also used for incrementing the program count register 057.

The 128-word thin-film memory of the illustrative embodiment is used for control and data registers. As shown in aforementioned copending application, Ser. No. 226,895 of Albert M. Bates for Magnetic Memory System, thin-film memory is logically divided into two sections: 64 words of 16 bits and 64 words of 12 bits. Octal addresses 000 through 077 address the 16-bit words and 100 through 177 address the 12-bit words. The K/E register 3004, 3005 provides a 16-bit buffer for data and the 7-bit film address register 3510 (see FIG. 4A) provides address storage. However, since the thin-film memory is being used as separate registers, each address must be computed when it is needed. Some single-address registers, such as base address register 055, require only the direct encoding of the 7-bit address. Multi-address registers (e.g., the stack 3099), require incrementing of the address until the whole word is read out. To use the thin-film memory 3001 as a random word memory, provisions must be made to transfer in a 7-bit address. Registers are provided to feed into the encoder and comprise a 3-bit program syllable address register, 2-bit stack address register, 2-bit syllable counter and 2-bit input syllable counter (each not shown). As shown in FIGS. 4A and 4B, syllable register 3017, which comprise three 4-bit portions (scan), 5-bits, or 7-bits, and the thin-film address switches 3510 fed the encoder also.

When each thin-film register is addressed with a subcommand the 7-bit thin-film address register 3510 is accordingly set in its film address register, bits 1 to 7 to address the particular thin-film register in thin-film memory 3001 called for by the address.

A ONE set in any thin-film address bit is enough to initiate the thin-film cycle as long as the computer is not operating in normal mode and trying to address the interrupt base address register 063, a special subcommand, or any transfer into E register 3005. A thin-film insert flip-flop (not shown) is provided and when set, determines a write; and when reset, determines either read from thin-film or thin-film not being used. Initiate thin-film command indicates that a write is desired and the thin-film insert flip-flop (not shown) is set. However, unless an address subcommand is given, the thin-film cycle is not initiated. Otherwise the thin-film insert flip-flop (not shown) is reset and a read occurs if the thin-film cycle is initiated.

*Memory exchange unit*

The memory exchange unit comprises a buffer register to thin-film memory, the 16-bit K and E register 3004 and 3005 and an L and M register 3006 and 3007 plus address adders 3008 and 3009 interposed between the registers (K/E 3004, 3005 and L/M 3006, 3007). The unit has two major functions: (1) computing a direct address to be used when communicating with the main "ferrite-core" memory; (2) handling information when communicating either with the main memory or the thin-film memory 3001.

A 16-bit direct address is needed whenever information is to be fetched from the main memory to the computer or stored in the main memory from the computer. Basically, the 16-bit direct address is computed by transferring the 12-bit memory relative address syllable to the L and M register 3006, 3007 and a 16-bit base address from a thin-film base address register 055 to the K and E register 3004, 3005. A 16-bit direct address is then formed by adding the relative and base addresses (adding K and E register 3004, 3005 contents to L and M register 3006, 3007 contents) and storing the result in the L/M register 3006, 3007. The function of the memory exchange unit during indirect addressing and/or indexing is discussed subsequently. The four most significant bits of the resulting 16-bit direct address, which appear in the L register 3006 portion of the L/M register, 3006, 3007, represent a memory module address, while the 12 remaining bits, which appear in the M portion 3007 represent an in-module address.

To fetch a word (48 bits plus parity bit, represented as four 12-bit syllables plus parity bit) from the main (ferrite-core) memory to the computer, the direct address is first computed and stored in the L/M register 3006, 3007 as discussed above. Access to memory is then

*Thin-film memory.*—The computer module comprises a thin-film temporary memory section 3001 employing a thin-film vacuum deposited memory element which contains thin-film storage sufficient to store one hundred and twenty-eight words. These thin-film words are provided with octal addresses from 000 to 177. Addresses 000 to 077 comprise 16-bit words and addresses 100 to 177 comprises 12-bit words. It should be understood that in the thin-film memory herein which comprises a number of word locations, these words are grouped, addressed by the computer, and structurally assembled with relation to the computer as register, and this term registers will be used herein also to describe these thin-film words. Structure is provided whereby each of these words constitute either a register or a portion of a register or a spare register. Thus, some of the 16-bit, thin-film words form a portion of larger registers of 32 bits, 48 bits, and 64 bits divided into 16-bit syllable register sections; some of the 12-bit thin-film words are a portion of larger registers of 24 bits, 36 bits, and 48 bits divided into 12-bit syllable register sections. Whenever accessing thin-film memory, it should be understood that when addressing a register of more than one thin-film word, each portion of either 12 bits or 16 bits of that register is addressed sequentially.

The thin-film registers include 15 index registers of 16 bits each numbered 001 to 017 in the octal system. In the octal system the least significant digit is taken as such and added to the next least significant digit multiplied by eight to the first power, and then added to the next least significant digit multiplied by eight to the second power. Therefore, register 017, 7 plus $(1\times8^1)$ plus $(0\times8^2)=15$. There are 15 limit registers of 16 bits each which are registers 021 to 037 in the octal system. A 48-bit interrupt storage register is provided and comprises three, 16-bit words 040 to 042. Three 16-bit registers comprising a base program register 054, a base address register 055, and a program count register 057 are provided in thin-film memory 3001. In the event of interrupt of the system, the contents of the base program register 054, the base address register 055, and program count register 057 are stored in the interrupt storage register 040 to 042. A repeat program register of 64 bits which comprise octal addresses 044 to 047 is provided for implementation of the repeat instruction. During the repeat instruction, the instruction to be repeated is stored in the repeat program register 044 to 047 instead of in the two program storage registers PSR1, 100 to 103, and PSR2, 104 to 107. A subroutine storage register of 48 bits which comprises thin-film memory 16-bit octal words 050 to 052 is provided. Its use is similar to that of the interrupt storage register in that in the event of a subroutine jump instruction, it stores the information contained in the base program register 054, the base address register 055 and the program count register 057.

The base program register (BPR) 054, the base address register (BAR) 055, and the program count register (PCR) 057 are provided to store the respective bases of a program and data and for sequencing of addresses in memory. The program count register 057 sequences through the program being run by the computer. In the event of any jumps in the program the jump address is obtained by adding the relative branch address called for in the program to the contents of the base program register 054. In the event of data fetches from memory, the data address is obtained by adding the relative memory data address to the contents of the base address register 055.

A subroutine base address register (SAR) 060 of 16 bits is provided for implementation of a subroutine jump. A memory syllable is added to the contents of the subroutine base address register 060 to obtain an address, which address contains the location of the starting word of the subroutine. An interrupt base address register (IAR) 063 of 16 bits is provided for the interrupt system.

A 16-bit index increment register (XIR) 062 is provided in the 16-bit portion of thin-film memory 3001 to implement the index limit and compare instruction. It contains the increment to be added to the index register. When using the index limit compare instruction, the contents of the index increment register 062 are added to one of the fifteen index registers 001 to 017, and then comparison for less, equal, or greater is made with one of the fifteen limit registers 021 to 037 designated by the program and branching occurs if the condition tested for is met.

When an interrupt occurs, a delta or increment corresponding to the interrupt is added to the interrupt base address register 063 contents to determine the address in memory that contains an unconditional transfer instruction to an area in the program which services the particular interrupt. A 32-bit power failure dump register (PDR) 064 and 065 is provided for power failures. In the event of power failure a sensing device on the primary power lines sends a signal to the computer indicating power failure interrupt. This is described in aforementioned patent application S.N. 224,344 of Fegley for High Speed Alternating Current Sensing Circuit, filed Sept. 18, 1962. This power failure signal allows 500 microseconds to the computer to finish the instruction in process and to store in the power failure dump register the necessary information to restart the computer automatically from the point of interruption. This information includes the state of certain control flip-flops and of the interrupt register 3002.

A 16-bit interrupt dump register (IDR) 070 is provided. Its use is similar to that of the power failure dump registers 064 and 065 except that it contains the control flip-flops which are dumped into it in the event of a normal interrupt as contrasted with a power failure. All of the above registers from 001 to 070 are assembled from 16-bit registers. In all of the 16-bit registers, the first octal digit is a zero as numbered hereinabove. That is, the octal numbers designating the 16-bit registers in thin film memory 3001 range from 001 to 070. In addition there are a plurality of thin-film registers which are assembled from 12-bit registers. These range from octal number 100 to octal number 157. In each 12-bit register, the most significant bit of the three-bit octal addreses is a one (1). In addition to the 16-bit registers from 001 to 070, there are spare 16-bit registers numbered up to register 077 (octal 077). In addition to the 12-bit registers shown, there are spare 12-bit registers so that the total number of 12-bit registers is register octal 100 to register octal 177, inclusive. Program Storage Register PSR1 of 48 bits comprising syllable registers 100 to 103 and program storage register PSR2 of 48 bits comprising syllable registers 104 to 107 are provided. That is, program storage register 1 comprises 12-bit registers 100 to 103 and program storage register 2 comprises 12-bit registers 104 to 107.

The first operation that has to be performed by the computer is to load the program into the memory modules of the system. The computer utilizes the program storage registers for this as will be explained hereinafter.

Normally, program storage registers PSR1 100 to 103 are the only ones used. However, in the event of a long instruction where the memory addressing logic is not to be used in the execution of the instruction, an "overlap" is performed.

The "overlap" means that during the execution of a long instruction, when the memory addressing logic will not be used in the execution of the instruction, another program word is brought from memory and stored in program storage register #2, 104 to 107. This is the only way in which a program word can be stored in program register #2, 104 to 107.

An interrupt program register (IPR), comprising 12-bit registers 110 to 113 for total contents of 48 bits is provided. The interrupt program register 110 to 113 is used to store the program storage register contents being requested. When access is granted by a particular memory module addressed (i.e., the module whose 4-bit address is contained in L register 3006) its memory address register accepts the 12-bit in-module address (from the M register 3007) and a memory read cycle is initiated. The addressed memory word is sensed and transferred into the memory information register (not shown) in the M memory in parallel. The word is transferred into the L/M register 3006, 3007 at four sequential clock times with the least significant syllable entering first. The three remaining syllables are transferred to the M register 3007 at times $n+1$, $n+2$, and $n+3$. As each syllable following the least significant is transferred into M register 3007, the syllable preceding is transferred from the M register 3007 to a computer "destination" register as will be described. During a fifth clock time, transfer to check parity is accomplished.

To store word (48 bits plus parity bit) in the main memory, a 16-bit direct address is formed and access is requested as in a fetch operation. When access is granted, the write portion of the memory read-write cycle is initiated. The least significant syllable, which has been placed in the M register 3007, is transferred to the memory information register of the memory module and is written first. The remaining syllables are successively transferred from the computer "source" register to the M register 3007 and thence written into memory. Parity is sent as a fifth syllable and written last.

Communication with the thin film memory 3001 requires no address computation. To fetch from thin film, the particular thin-film register whose contents are required is directly addressed by the subcommand matrix 3020. The address is a 7-bit word. A 12- or 16-bit word is then transferred from the register in the thin-film which was addressed to the K and E register 3004, 3005. In the case of multiple-syllable thin-film registers, the least significant syllable is transferred to the K and E register 3004, 3005 first, followed by successive transfers of the remaining syllables, each syllable requiring an updated address supplied by the sub-command matrix 3020. As each syllable following the least significant syllable is transferred from thin-film memory to the K and E register 3004, 3005, the preceding syllable is transferred from K/E register 3004, 3005 to the computer "destination" register. To store in thin-film, the 12- or 16-bit word to be stored is placed in the K/E register 3004, 3005 and the particular thin-film register in which storage is desired is addressed by the subcommand matrix 3020. In the case of multiple-syllable words, the least significant syllable is stored first, followed by storage of the remaining syllables. Each syllable requires an updated address from the subcommand matrix 3020.

*Control unit*

Refer to FIG. 4A and 4B. The control unit furnishes timing and control for computer module operation. A timing distributor supplies the basic clock pulse used to operate the computer. When reference is made to the main memory to fetch or store, the particular memory module temporarily slaved to the computer for the reference is operated by a memory time counter (TM). A phase distributor enables selection of the order in which the operational phases (1 through 6) occur. The multiply divide counter 3021 controls the number of shifts to be executed during an instruction (in particular, the number of add or subtract cycles during multiply or divide operations).

*Function register*

A 12-bit flip-flop function (F) register 3015 is provided to hold (store) the operator (instruction) syllable of the program. The operator (instruction) syllable actually comprises a 6-bit instruction field plus three 2-bit address indicators. The 12-bit function register 3015 holds the operator syllable which is written by "ONES" transferred from the E register 3005. A 12-bit flip-flop syllable (S) register 3017 holds (stores) the program index syllable in the event of indexing. When not being used to retain index syllables it is used to retain variant (special) syllables which are program syllables used to modify the program instruction at the time being held in the function register 3015. The syllables are written in full parallel transfer from the E register 3005 or the M register 3007.

*Interrupt register*

An interrupt register 3002, responsive to external and internal interrupt conditions, is provided. A bit of the interrupt register 3002 is set whenever its interrupt condition occurs. More than one interrupt bit may prove to be set when the interrupt register is interrogated. Any single bits set in the interrupt register 3002 (ITE) sets the interrupt flip-flop (not shown) which causes the computer to enter the control mode. The most significant set bit of the interrupt register 3002 is reset when the subcommand (TINEM), transfer interrupt register to M register, is given while the interrupt is being serviced.

The 12-bit flip flop register, interrupt register 3002, is used to indicate interrupts of various kinds. When an interrupt occurs it causes an interrupt routine jump to be effected. This is similar to a subroutine jump which transfers control to another program area. Upon setting of this interrupt register 3002, operation, as will be described in detail hereinafter, is effected in the control mode rather than in he normal mode.

*Mask register (P&Q)*

The 23-bit mask register 3016 is provided and connected between the arithmetic unit 3030 and the interrupt register 3002. It comprises a P register and a Q register. The Q register is a 16-bit register and the P register contains the additional 7 bits to make up a total of 23 bits. The 23-bit mask register 3016 (P&Q) screens out predetermined bits of the interrupt register 3002. The Q register or External Interrupt Register masks out 16 external request lines for external interrupt. TAQ, a ONES transfer signal transfers bits A21 through A36 of A register 3033 into bits E1 through E16. Signal RQ resets the P section of register 3016.

The 12-bit mask register 3016 holds mask bits for certain interrupt conditions. Only 5 masks are provided. Bits 3, 5, 9, 11, and 12 (mask for input/output descriptor return, real time overflow, arithmetic overflow, and two spares). A signal TAQ transfer A to Q transfers bits A39, 41, 47, and 48 into corresponding Q3, 5, 9, 11, and 12 respectively of the mask register 3016. These bits are reset by RQ command. Each of the 16 bits in the Q register is a flip flop, the output of which is AND'ed and an AND gate together with a particular external request line. All 16 of these AND gates are OR'ed together to set one interrupt register bit in interrupt register 3002. There is only one external request flip flop bit in the interrupt register 3002. An output signal is provided from as many of the 16 bits of the Q register as are in the set state, to be added together with the 16 external request lines. In the event that any external request line is not to be serviced for an interrupt, the particular corresponding flip flop to this external request line in the Q register portion of the mask register 3016 is reset so that an output does not occur from its AND gate even in the presence of a signal on the corresponding external request line. The setting or resetting of the bits of the mask register is program settable. In order to find out which interrupt did actually occur, the incoming signal on the external request lines are stored with a variant of the load special register instruction which is one of the instructions concerned with the automatic operating and scheduling method and means. This storage may be effected in stack or in any place in memory. The 7-bit P register in the mask register 3016 is used only for certain of the bits of interrupt register 3002. There is a one for one correspondence with the P register, there being an interrupt register 3002 bit for each of the bits in the P register of mask register 3016. Therefore all 16 bits in in the Q register or mask register 3016 are utilized in determining a single one of the 12 bits of the interrupt register 3002, but each of the 7 bits in the P register of mask register 3016 has a corresponding bit in the interrupt register 3022. Thus, a total of 8 bits (7 for P plus 1 for all 16 of Q), of the interrupt register 3002 are fed from the mask register 3016.

*Multiply divide counter*

Between the subcommand matrix unit 3020 and the arithmetic unit is connected a multiply-divide counter (D) 3021. Multiply-divide counter (D) 3021 is a 6-bit flip flop register. It is used in the mechanization of various arithmetic instructions. One of its primary functions is a shift counter during shift operations. As its name implies, multiply-divide counter 3021 also serves to count the number of additions or subtractions in the respective multiply and divide operations. The multiply-divide counter 3021 can count down in multiples of 1, 6, and 12. This is in accordance with the ability of the A register 3033 in the arithmetic unit 3030 to shift to the right either one, six, or twelve bits at a time. The multiply-divide counter 3021 counts up one at a time. The A arithmetic register 3033 can only shift left one bit at a time.

The thin film address gating 3018 is a 7-bit address encoder. On receiving signals from the subcommand matrix 3020 it encodes the 7-bit address from the matrix 3020 and uses the encoded output to address the thin-film memory. There are seven lines at the output of the thin-film address gating encoder 3018 which feed into the thin-film address register 3510.

The interrupt system register 3002 provides storage for data in the operational registers in the event of an interrupt. The thin-film interrupt base address register 063 contains the base address of the interrupt routines; the contents of this register are protected during the normal operation mode. The thin-film interrupt storage register 040 to 042 holds interrupt return information (i.e., the former contents of the base address register 055, base program register 054, and program count register 057). The thin-film interrupt program register 110 to 113 provides storage for the contents of the program storage register 100 to 103 or 104 to 107 in use upon interrupt. The thin-film interrupt dump register 070 holds the contents of the control flip flops (see FIG. 4) and the interrupt register 3002 in the event of a power failure.

An over-under voltage detector (see aforementioned applications of Fegely) detects and signals excursions of primary power between fixed voltage limits. The out-of-tolerance signal causes the computer module of the invention to store sufficient information to restart the program without loss of data. Provision is made for automatic program restart by automatically reloading stored data into the flip flop registers. The power supplies themselves have a sufficiently long time constant to protect the hardware, program, and data from all primary transients and failures and to allow continuation of the program when stable primary power is restored.

The automatic interrupt system utilized with the computer module of the present invention is described in aforementioned copending application for Automatic Interrupt System for Data Processor, Ser. No. 241,225. The remainder of the subcommand matrix 3020 is made up of decoders which make use of the timing distributor, the phase distributor, the memory timing counter and the decoded output of the function register 3015 to generate subcommands for implementation of the instructions.

The subcommands, made up mainly from the function register and the three timing distributors, implements the commands in the program. At the interrupt signals input, which is 30 lines into the interrupt register 3002, 16 of these are the external interrupt signal lines already discussed. The interrupt register 3002 also obtains the remaining 14 interrupt signals from external units and receives 7 internal lines comprising parity error lines, no access to memory, and other automatic interrupt lines responsive to automatic interrupt conditions within the system.

*Subcommand matrix*

The subcommand matrix 3020 is that body of logic which, taking inputs from control registers such as the phase register, timing register, multiply-divide counter 3021, interrupt register 3002, etc., makes up the subcommands needed to execute a particular instruction.

*Phase distributor*

Of the 7 operating phases, phases PH0, PH1–PH6, all but PH0 are represented by flip flops. PH0 is defined when all other phases are off. Only one phase is set at a time. Moving from phase to phase is accomplished by giving a jump subcommand. The jump subcommand is timed in accordance with the instruction being executed. Whenever a jump subcommand is given, the reset phase signal occurs providing the reset input to each of the phase flip flops and in particular, the exit phase—that is, the phase just executed—and the entry phase, phase next to be executed, are present.

*Timing distributor*

The timing distributor consists of 15 flip flops which provide the T time intervals from T1 to T15. As in the phase distributor, only one of the flip flops is set at a time. The timing distributor is normally stepped sequentially unless a jump to some other T is required.

*Operational phases*

In execution, each instruction is implemented using at least one and not more than six phases. Each phase takes care of executing a portion of an instruction so that the total instruction is fully executed in this given number of phases from one to six. The usual procedure is to progress from phase one, to phase two, to phase three, to phase four, to phase five and then to phase six, if six phases are necessary. All computer instructions are executed using a minimum of one phase in the case of a no-address instruction and a maximum of six phases for certain three-address instructions. In general, the phase functions are as follows:

(1) *Phase zero* (*PH0*).—This is the state assumed by the computer immediately after the power on or clear button has been depressed. If the automatic program start switch is on, the computer will attempt to start automatically. This phase is used mainly for manual read-from or write-into thin film memory 3001 in setting up the program.

(2) *Phase one* (*PH1*).—In general, this phase is used to fetch the operator syllable from the program storage register (PSR) 100 to 103 or 104 to 107 and to store this operator syllable in the function (F) register 3015 (see FIG. 4B). Subsequent coding of this syllable in the function register 3015 determines the instructions to be executed. As shown in FIG. 4B, this syllable transfer occurs through the E register 3005 into the function register 3015.

(3) *Phase two* (*PH2*).—Depending upon the instruction, this phase is used to (a) fetch an operand (48-bit data word) from the main memory or from the stack 3099 and store this operand in the A register 3033 (see FIG. 4B); (b) store a result (48-bit data word) in the main memory or the stack 3099; (c) fetch a branch program word from the main memory and store this branch program word in the program storage register (PSR #1 or 2, 100 to 103, or PSR 104 to 107); (d) fetch a special syllable from the program storage register 100 to 103 or 104 to 107 (PSR #1 or PSR #2) and store this special syllable in the appropriate working register.

(4) *Phase three* (*PH3*).—Reserved for "execute" portion of some instructions.

(5) *Phase four* (*PH4*).—Similar to phase two except that the second operand fetched from the main memory or the stack 3099 is stored in the B register 3031, (see FIGS. 1 and 2).

(6) *Phase five* (*PH5*).—This phase is also reserved for the "execute" portion of some instructions.

(7) *Phase six* (*PH6*).—Depending upon the instruction, this phase is used to: (a) store a result from the A register 3033; (b) fetch a branch program word from the main memory and store this branch program word in the program storage register (PSR #1 or PRS #2) 100 to 103 or 104 to 107. The progression from phase one to phase six is shown by the phase distributor (not numbered). This indicates each of six phase flip-flops which are set for the corresponding phase operations by the successful completion of the previous phase.

In each phase the timing distributor (not shown) is used to implement each sequential step of the phase. At the end of each phase, the timing distributor is reset to time $T_1$. The timing distributor comprises a shift register of 15 flip-flops which correspond respectively to times $T_1$ to $T_{15}$. The timing distributor operates at the computer clock rate of three megacycles and hence each T time is one-third of a microsecond long. However, it may be desired to remain at $T_1$ time for a period longer than one-third microsecond and, in fact, as long as desired. For example, it may be desired to remain in $T_1$ in order to jump into a memory cycle to fetch a program word and store the program word in one of the two programs storage registers 100 to 103, or 104 to 107. In order to hold up in $T_1$, the timing distributor shift register is inhibited from shifting for the desired number of clock pulses necessary to accomplish the execution of the particular function desired. This is done automatically by the wiring of the sub-command matrix 3020. In the case of fetching a program word from memory, for example, the memory timing counter is used in conjunction with the timing distributor 3502. The memory timing counter is an actual counter and each time it counts up to one, the time is decoded from the memory timing counter itself as time TM1 through time TM28. Entry into memory timing counter 3503 may be effected at any one of the twenty-eight TM times involved and will depend upon the particular operation to be performed.

*Character selection logic*

A 48-bit word may be considered as eight 6-bit characters numbers 0 through 7 respectively as follows:

| Bits: | Character |
|---|---|
| 1, 2, 3, 4, 5, 6 | 0 |
| 7 . . . 12 | 1 |
| 13 . . . 18 | 2 |
| 19 . . . 24 | 3 |
| 25 . . . 30 | 4 |
| 31 . . . 36 | 5 |
| 37 . . . 42 | 6 |
| 43 . . . 48 | 7 |

The field syllable (F) defines the field to be selected. This field is kept (Strip) or eliminated (Insert) depending on the instruction execution.

Bits 10 to12 of the field syllable (F) define the starting position of the field. Bits 6, 7 and 8 of the field syllable define the character length of the field.

The field length and starting position are encoded to chose a particular character or set of characters. The character(s) comprising the defined field may be reset, or, the character(s) outside the defined field may be reset, the two possibilities being termed "insert" and "strip" respectively. Resetting the defined field inserts a hole of ZERO's into the eight character field. Resetting characters outside the defined field strips away to ZERO all information surrounding the defined field.

*Memory module*

Now refer to FIG. 5 comprising FIGS. 5A, 5B, 5C, and 5D, FIG. 17, FIG. 18 and FIG. 19 comprisings FIGS. 19A and 19B, and FIGS. 20–34 wherein is shown the drawings of and associated with each of the memory modules of the present invention. FIGS. 5A, 5B, 5C, and 5D taken as shown in FIG. 5, together constitute a block diagram of the illustrative embodiment memory module of the invention. FIG. 17 is a schematic diagram of the core matrix, including the two diodes for each word, the switches, and the read and write drivers. FIG. 18 is an enlarged and detailed block representation of the intrinsic memory portion of a memory module. FIG. 19 comprises FIGS. 19A and 19B which present graphically the memory timing pulses and circuit timing relationships. Each of the 16 memory modules is identical to the others substantially except that one contains the memory master clock. FIGS. 20 to 34, inclusive are logical diagrams of memory units of FIG. 5.

The basic unit for high speed storage in the system is the random access core memory. A core memory module consists of 4,096 words of 49 bits each, of which 48 bits are information bits and the 49th bit is a parity bit. The cycle time of the memory is 4.0 microseconds and the access time is 1 microsecond.

Refer to FIG. 17. The memory is a word organized type, 4 wire, 30–50 mil cores. The drive windings are arranged in a 64 x 64 matrix, employing two diodes per word to provide a memory which is organized in a 64 x 64 matrix arrangement from octal code 00 to octal code 77 and designated 10150 in FIG. 5C, A read driver from read drivers RD00 to RD77 and a write driver from write driver WD00 to WD77 and a switch from switch SW00 to switch SW77 are provided for each memory word, respectively. The numbers in switches SW00 to SW77 and in read and write drivers WD00 and RD00 to WD77 and RD77 are numbers in octal code which actually refer to 64 decimal code numbers. The memory modules may be designed to operate with no special thermal compensation, over a temperature from 0 to 50 degrees centigrade. The illustrative embodiment system provides for up to 16 memory modules which may be housed two modules per cabinet. Each of the memory modules is identical to the others. Where two memory modules per cabinet are provided, they may share one memory power supply.

Refer to FIG. 5 comprising FIGS. 5A, 5B, 5C and 5D. FIGS. 5A, B, C, and D, taken together provide a block diagram of the entire memory module. A memory module comprises an intrinsic memory which consists of a stack plus the associated circuits. In the illustrative embodiment an intrinsic memory is provided. The intrinsic memory is shown as the section labeled 1010 and outlined in dashed lines in FIGS. 5C and 5D. The remainder of the memory module comprises all of the logic necessary to operate the intrinsic memory plus the circuits to provide communication with all of the modules. The intrinsic memory 1010 is shown in more detailed form in FIG. 18. FIG. 17 actually represents the actual matrix arrangement of the core memory and the diodes and the input lines thereto. The timing diagram of the core memory operation is shown in FIGS. 19A and 19B.

Referring again to FIG. 17 which shows the memory structure. A 64 by 64 matrix represented by the octal column and row numbers from 00 to 77 is provided. The inputs shown in the column at the left side of FIG. 17 comprise read and write inputs to the matrix. For example, read driver RD00 and write driver WD00 provide respectively the read and write inputs for the first word in the memory module. Switching input to the first word is provided by switch SW00. Each of the pairs of read and write drivers RDXX and WDXX provide input to one word of a row of 64 words. Each of the memory switches SW00 through SW77 (octal code) provides input to a column of 64 memory words.

Only two cores are shown at each intersection to simplify the diagram. However, as designated by the bracket in FIG. 17, to which the number 49 refers, the word actually comprises 49 such cores. Any combination of a read and write driver and a switch selects one word. The 64 x 64 matrix provides the 4,096 words in each memory.

During the read operation current flows from the read driver RD#XX through the cores of the selected word and into the operating switch SWXX. During the write operation, the current flows out of the write driver WD#XX through the write wire of the selected word and into the selected switch SWXX. The designation XX in RDXX, WDXX and SWXX designates the octal code numbers from octal 00 to octal 77 representing 64 decimal numbers. This current flow occurs when a read or a write driver RDXX or WDXX is selected and the corresponding switch for the selected word is closed to permit current flow therethrough. There are two inputs to each of the drivers. One input is a logical input from a decoding matrix (decoder DE10110 in FIG. 5C), which is a level. The other input comprises a train of pulses common to all drivers which occurs for each memory cycle (from core read and write timing control 1011 shown in FIG. 5C). The purpose of the two diodes D1701 and D1702 in each memory word is to prevent sneak paths in the memory matrix. That is, diodes D1701 and D1702 prevent current flow in the reverse direction through the diodes D1701 and D1702. Without diodes D1701 and D1702 this reverse current flow could energize an unselected memory word. Upon energization by an appropriate read driver RDXX and a selected word switch SWXX being closed, each of the cores 1001 in the selected word are driven into the zero state. That is, each of the cores are read out from the "one" state into the "zero" state.

SW#XX or SWXX in this discussion refers to any one of the switches including the switch labeled SW00 and SW77 and refers to the selected switch.

The readout is destructive, that is, all cores of the "one" state are changed to the "zero" state upon the read operation. As will be described in detail hereinafter, the original word is recycled back into the same memory word bits selected to re-establish the word in memory (carbon copy) after the readout has occurred. This is so for each cycle in the memory in which it is desired to read out the information and then to carbon copy or regenerate the word back into the memory. The other two memory elements (not shown in FIG. 17) involved in the memory core stack 1010 are the sense and the information windings. There are 49 sense windings. Each sense winding threads the 4,096 cores of the memory module. For example, one given sense winding threads the first core of each of the 4,096 words. Correspondingly, a second sense winding threads each of the 4,096 second cores. Similarly, the 49th winding senses the 49th core of each of the 4,096 words in memory. Since only one word at a time is sensing, only one word can be selected and therefore there can be only one signal in the sense winding at any one time. There are 49 information windings and their routing is exactly the same as the sense windings.

The function of the sense winding is to carry the voltage from the cores to the appropriate sense amplifier (see FIG. 5C, sensing amplifier S1012). The function of the information windings is to carry the necessary bias current to add or subtract to the write current of the selected word during the write cycle.

There are three current levels involved in the memory operation. The read current is sufficient magnitude to switch all of the cores of the selected word. The write current is two-thirds of the magnitude required to switch each of the cores of the selected word. The information current is one-third of the magnitude required to switch each of the cores of the selected word. The information current can flow in either one of the two directions, added to or alternatively subtracted from the write current. Transformer action occurs in that the drive winding in each core is actually at right angles to the information winding, two-thirds of the current being provided by the drive winding and one-third of the current being in the information winding and being in a direction either to add to the two-thirds or subtract from the two-thirds the amount necessary to change the state of the core provided by the write winding.

Thus, to write a "one," the one-third current will add to the two-thirds current to provide the full current necessary to change the state of the core to the "one" state. To write a "zero" the core is left in its "zero" state rather than any writing occurring. In this latter case the current in the information winding is in such direction as to subtract from the two-thirds of the total current necessary to change the core state provided by the write driver so as to leave only one-third of the current necessary to change the state of the core. Therefore, the "zero" remains and the core state is not changed.

FIG. 18 is the block diagram of the random access memory which is the intrinsic portion of the memory module. The timing diagram of FIGS. 19A and 19B shows timing waveforms associated with each of the sections of the intrinsic memory shown in FIG. 18.

Referring to FIG. 18, the intrinsic random access memory diagram, in a memory cycle starting at time $T_0$, the following operations will occur. When a requestor module seeks memory, a 12 bit address is transmitted through the input channel into a memory address register 1021. Simultaneously a start read signal is applied to a core read timing circuit 1022. When the memory address is received in the memory address register 1021, the address is decoded logically by halves, the six least significant bits being decoded in the least significant bit (LSB) decoder 1023 and the six most significant bits of the address being decoded in the most significant bit (MSB) decoder 1024. An SCF signal is applied to most significant bit decoder 1024. The SCF signal is a logical signal to indicate that the memory is in operation. The LSB decoder 1023 supplies a true level to one read driver of the 64 read drivers 1025 and to the corresponding write driver of the 64 write drivers generally denoted by numeral 1026. One pair of drivers of the read drivers 1025 and the write drivers 1026 is associated with each of the 64 combinations provided by the six least significant bits of the address from the LSB decoder 1023. Similarly, there are 64 read/write (R/W) switches 1027 in the read-write (R/W) switch unit 1027 which correspond to the 64 combinations provided by the six most-significant bits received in the MSB decoder 1024. In a manner similar to the operation of the LSB decoder 1023, the most significant bit (MSB) decoder 1024 selects one of the 64 R/W switches 1027. The diode matrix and stack unit 1028 is shown illustratively in FIG. 17. This is the 64—64 diode matrix in the stack of memory cores and diodes of FIG. 17. As explained in the description of FIG. 17 at the intersection of the selected read and write driver 1025 of drivers 1025 and 1026 and the selected read/write switch of read/write switches 1027 will be a 49 bit selected word.

The start read signal applied to core read timing unit 1022, after a short delay, triggers a multivibrator 1022*a*, which provides a pulse of the correct duration to trigger the read drivers 1025. This pulse is applied at the output line 1029. The coincidence of the output of multivibrator 1022*a* which output appears on line 1029 and the level supplied to the read drivers 1025 at line 1030 causes the selected read driver to apply the current output to the selected word in the diode matrix 1028. The effect of this read current applied through the selected word causes that word to be read out of the cores. A sense amplifier unit 1031 comprising 49 sense amplifiers connected to the output of diode matrix and stack unit 1028 is provided. All 49 bits are read out together and applied to all 49 sense amplifiers of sense amplifier unit 1031. The 98 lines shown in the circle between the diode matrix 1028 and the sense amplifiers 1031 are two for each of the 49 sense amplifiers 1031, one for feeding into each of the sense amplifiers 1031, and the other being for return. Each sense amplifier of sense amplifiers 1031 provides a pulse output for a signal representing a "ONE" in its input. There is a sense amplifier for each of the 49 sense windings described hereinabove in conjunction with the description of FIG. 17. A sense amplifier will not produce a pulse for a "zero" signal input.

At this time the start read signal applied to core read timing circuit 1022 is utilized to produce a special signal referred to as a strobe. This strobe is utilized to sample the output of all the sense amplifiers 1031. A plurality of 49 single shot multivibrators in memory single shot multivibrator unit 1032 are responsive to the output of the 49 sense amplifiers of unit 1031. This strobe is applied to each of the 49 single shot multivibrators 1032 and in the presence of a simultaneous output from one of the sense amplifiers 1031 and the strobs output of start read unit 1022 an output results from one of the single shot multivibrators 1032. The function of the single shot multivibrators 1032 is to produce a true level of the output of the sense amplifiers 1031 which true level may be applied to activate the memory information register 1033. The true level output of the single shot multivibrators 1032 which are applied to the memory information register 1033 must be of sufficient duration. This duration is provided by the single shot multivibrators 1032 in order to bracket timewise the next clock pulse since information is transferred into the memory information register 1033 only at clock time.

In most operations it is desired to replace the word which has been destructively read out from the diode matrix 1028. Therefore the single shot multivibrator 1032 levels are transferred into the memory information register 1033. In the operations in which replacing a word back into the diode matrix 1028 or carbon copying back the word into the diode matrix 1028 a transfer signal is provided which is applied to the input designated transfer in FIG. 18. This "transfer" input into the memory information register 1033 causes the information to be read out over the 49 output lines from the memory information register 1033 and applied to the 49 information drivers of the information driver unit 1034. That is, each of these 49 output lines from the memory information register 1033 are applied to the information drivers 1034. All 4096 memory words are energized from the signal output from the information drivers 1034 which signal output is responsive to the output of the memory information register 1033. However, upon transfer, only one of the word lines of stack 1028 will simultaneously have a write signal applied. Therefore, only one of the 4096 groups of 49 cores, corresponding to the word which has been read out, has current simultaneously flowing though it which is added to the current from the information drivers 1034 to write in the word from the memory information register 1033. The information current from the 49 drivers of information drivers 1034 flows into the cores of each of the remaining 4096 words but this current is of insufficient magnitude to set the coes without the write current applied. At a time 1⅓ (1.333) microseconds from $T_0$ at which the start read signal was initiated, a "start write" signal is applied to the core write timing unit 1035. This signal, after a slight delay, triggers several multivibrators, one of which is applied at line 1036 to all of the write drivers 1026. This signal causes the write driver which was selected by the least significant bit decoder 1023, to provide an output to the selected word in the stack 1028. This is the same word which was originally selected and read out of core memory 1028. Single shot multivibrator **1035*a* is triggered also by the about 15 microsecond delayed start write signal applied to core write timing unit 1035. The output of single shot multivibrator 1035*a* is amplified by information buffer (I-B) 1035*c* to produce a signal of sufficient magnitude to trigger all 49 information drivers 1034. This action occurs simultaneously with the action of the write drivers 1026. This signal output from information buffer 1035*c* is applied to and drives only 48 of the 49 information drivers of information driver unit 1034 omitting the parity information driver (not shown). The parity information driver is driven from a separate single shot multivibrator 1035*d* and a separate information buffer 1035*e*. These are located in a provided core parity timing card 10350**.

When it is desired to write new information into a selected word in core memory the new data word is first placed into the memory information register 1033, 12 bits at a time from the input channel. The input channel input is shown coming into the memory information register 1033 along line 1010 shown at the lower right hand portion of FIG. 18.

A read operation of these 12 bits is performed as described hereinabove. That is, the old word is read out of the selected memory location just as in the case when the memory address register 1021 has been addressed. Simultaneously with reading a word out of the diode and stack matrix 1028, a new word may be written in through the memory information register 1033 into the diode matrix and stack 1028. Reading information into the memory information register 1033 does not affect the remainder of the circuit. The memory address register 1021 comprises 12 flip-flops. The memory information register 1033 comprises 49 flip-flops. The information read from the memory information register input channel along line 1010 into the memory information register 1033 is read 12 bits at a time into each of the first through 12th, then the 13th through 24th, then the 25th through 36th and then the 37th through 48th flip-flop of the memory information register 1033, following which a 49th bit is written into the 49th flip-flop of the memory information register 1033 (see FIG. 5D). This is five series transfers of information, the first four transfers being made 12 bits at a time in parallel into the memory information register 1033 and a fifth transfer of one parity bit being made into the 49th flip-flop of the memory information register 1033. To enable the new information which had previously been loaded into the memory information register 1033 from the input channel line 1010, the old information which was coming from the single shot multivibrators 1032 will not be transferred into the memory information register 1033. Thus, during the write cycle the new information which has been loaded into the memory information register 1033 is rewritten back into the memory through the information drivers 1034. This occurs in the manner described for carbon copying the read out words by initiation of a start write signal into core write timing unit 1035 and the parity signal generated by core parity timing card 10350. The entire operation can occur cyclically once for every four microseconds time period.

The four microsecond period and the signals generated are shown on the core memory timing diagram of FIGS. 19A and 19B. The clock pulses MT1, MT2, MT3, etc. occur at a 3 megacycle rate. The times of activation of the various units are apparent from the timing diagrams of FIGS. 19A and 19B.

The requestor modules comprise computers P1, P2 and P3, computer P4 when incorporated into the embodiment system, first I/O exchange I/O control modules I/O 1–I/O 10 and where present second I/O exchange I/O control modules I/O 11–I/O 20.

Refer to FIG. 5 and its comprising portions FIGS. 5A, 5B, 5C and 5D which illustrate any one of the sixteen memory modules. Refer now particularly to the inputs into the memory modules indicated at the top of FIG. 5A. Each requestor module when requesting access to memory sends a 4 bit memory module address which designates the particular memory module from which it will seek or to which it will send the required data. Bus receivers 10105, 10104 and 10103 comprise receivers provided for the first three buses, which are the buses for the computer P1, computer P2, and computer P3 modules, respectively. When addressed, each of bus receivers 10105, 10104 or 10103 receives an 8-bit address, four bits of which are the memory module address, which correspond to an 8, 4, 2, 1, code designating which of the 16 memory modules is being requested. One of the 8 bits is the read level bit, which tells whether a read from memory or a write into memory is to be effected. One bit is a standard request bit which is sent with requests by the requestor modules, both computer and input-output control modules, to show when a standard request (not a descriptor request) is being sent. Two bits of the 8 incoming bits come from the requesting computers only. These two bits inform whether or not the request being made is a descriptor I/O request. The first of the latter two bits indicates whether the descriptor request is from I/O control modules of the I/O exchange A, and the second of the bits indicates whether the request is a descriptor request for the I/O control modules on the I/O "B" exchange.

Receivers 10101 in the memory module connected to bus 1, the group of I/O control modules associated with the I/O A exchange unit, and receivers 10102 connected to bus 2, the group of I/O control modules associated with the I/O B exchange are provided. Receiver 10102 and receiver 10101 each receives 6 bits from the memory access requesting I/O control module cabinet.

Of the 6 bits received by receivers 10101 and 10102 on bus 1 and bus 2, from the respective I/O control modules in the respective I/O exchanges I/O A and I/O B, the first four of these 6 bits indicate the address of the particular memory module of the 16 memory modules which is being addressed. Receivers 10101 and 10102 also receive a read level bit to show whether the operation is a read from memory or a write into memory operation. The 6th bit received by receivers 10101 and 10102 is the standard request bit. The I/O control modules can only make a standard request and cannot send a descriptor.

In the case where a fourth computer P4 is provided, instead of the second group of I/O control units and the corresponding I/O Exchange Unit "B," the address received at receiver 10102 is a seven bit address. The latter 7 bit address comprises four memory address bits, a read level bit, a standard request bit, and a descriptor bit to indicate whether or not the request is a descriptor. Each request made has a standard request bit, which is a high. In the case of a descriptor request, an additional high in the descriptor bit position indicates that this is a descriptor request.

On each of the incoming lines to the receivers at the particular requestor modules, a driver is supplied at the output to apply the high level, where the signal requires the high level. For example, at the output of each of the requestor modules there are 8 drivers feeding into the bus 5 input at receiver 10105 in the memory module of FIG. 5. Each of receivers 10105, 10104, and 10103 comprises 8 receivers for respective busses 5, 4, and 3. Receiver 10102 comprises 7 or 6 groups of receivers, respectively, depending upon whether bus 2 has a computer (computer P4) or an I/O control module exchange (I/O Exchange B) connected. There are 6 receivers in bus 1 receiver unit 10101. It is understood, of course, as indicated by the circled number 30, at the outputs of bus receiver units 10101 and 10102 that there are actually 30 receivers in each bus receiver unit, 6 for each of the 5 I/O cabinets in an I/O exchange I/O control module group. There are only 8 receivers totally in the bus receiver unit 10105, because input can be received into receiver unit 10105 only from one computer, computer P1. This applies also to the bus receivers 10104 and 10103. However, in the case of the input-output control module responsive receiver configurations, there are two I/O control modules in each I/O module containing cabinet. There are 5 cabinets per I/O exchange group. There are 5 receivers for each I/O cabinet of two I/O control units (30 receivers total) in the receivers unit 10101 and 30 receivers in receivers unit 10102 when used as a receiver unit for I/O Exchange B. When used for computer P4, receivers unit 10102 comprises 8 receivers total.

Referring to FIG. 20, FIG. 20 shows a typical line receiver unit which in the example shown comprises the 8 receivers per receivers unit for each of computers 1 and 2. This diagram illustrates that the first 4 bits of the signal C1MM8, C1MM4, C1MM2, and C1MMA1, for example, refers to the particular memory being requested in binary digital fashion. The first receiver (and driver) is the eights column, the second receiver is in the fours column, the third receiver is the twos column, and the fourth receiver is the ones column, so that in binary counting any number from memory 1 to memory 16 may be designated. The fifth receiver shows the read level input line from computer P1. The receivers are actually double inverter units. When the fifth receiver input is a high level, the output of the receiver is high and this indicates a "one" in that bit place. The standard request descriptor I/O A request and descriptor I/O B request are provided at the inputs to the receivers, which inputs respectively are labeled C1SRQ, meaning computer P1 standard request, C1 DARQ, meaning computer P1 descriptor request for I/O bus A, and C1 DBRQ which indicates that computer P1 has a descriptor request for I/O bus B.

Refer back to FIG. 5A. There are 30 outputs from the bus 1 receivers unit 10101, whcih comprise 6 outputs for each of the 5 cabinets in the I/O A configuration, each cabinet holding two I/O control modules. These 30 outputs are fed to the bus 1 mixers 10106 from bus 1 receivers 10101. Similarly, when I/O Exchange B and its I/O control modules are incorporated, 30 outputs from bus 2 receivers 10102 are applied into bus 2 mixers 10107.

FIG. 21 illustrates the bus 1 mixers unit 10106. Each of the OR gates O1071, O1072, O1073, O1074, O1075, O1076 refers to one of the six bus mixer circuits which are respectively provided for each of the I/O control module cabinets in the I/O Exchange A unit. Five AND gates, for example, AND gate A1071, A1072, A1073, A1074, and A1075 are provided for each of the OR gates, such as OR gate O1071 for one of the 6 input lines from each of the 5 cabinets, one line from each cabinet being provided from each of the OR gate circuits. For example, refer to the circuit of OR gate O1071.

In the input/output control modules themselves, in the I/O control module cabinets there is provided circuitry so that only one at a time of the ten I/O control units in each exchange configuration, for example I/O exchange configuration A, is allowed to request a memory module. Therefore, only one of the ten I/O control modules at any one instant can be on the air for communication with memory. Of course, other I/O control modules in the same I/O exchange unit group may be communicating with terminal equipment. However, interleaving in the sense that in turn selection of communication connection of different I/O control modules with memory may be provided. The restriction is that the same exact instant in time necessary for communication between an I/O control module of, for example, group A and the memory module group M1–M16, only one I/O control module of modules I/O 1–I/O 10 may be in communication with any memory module M1–M16. As shown in FIG. 21, in the I/O cabinet representation of OR gate O1077, only one of the two I/O control modules in any one cabinet can communicate with the bus 1 mixers 10106. The output therefrom may be OR'ed in OR gate O1077, and after being applied through driver D1077 and received in the appropriate receiver in receivers unit 10101, designated in FIG. 21 as RX1071, the request will come into one of the group of AND gates A1071, A1072, A1073, A1074, or A1075. For example, assume that one of the two I/O control units of the first cabinet is providing an input/output control request into receiver R1071 along the line labeled IAMMA8. Because of circuit requirements, an OR gate must have an AND gate preceding it so that the AND gate A1071 provides the correct input to the OR gate O1071. With input from AND gate A1071, OR gate O1071 provides an output along the OR gate O1071 output line IAMMA8, which is fed to the module address selector unit 10108 in the bus 1 section (see FIG. 1A).

Refer again to FIG. 5. Each of the 5 line outputs from the bus 1 mixer 10106 is therefore one of the five OR gates O1071, O1072, O1073, O1074, or O1076. The sixth OR gate O1075, also receives input from each of the 5 cabinets and the output provided from OR gate O1075 is applied from the bus 1 mixers 10106 into the master controls unit 10115 for a purpose which will be described hereinafter.

The module address selector unit 10108 into which the five lines from mixer 10106 are introduced is shown in FIG. 22. Referring to FIGS. 22A and 22B in conjunction with unit 10108 of FIG. 5A, the module address selector 10108 receives 5 lines of input from the bus 1 mixers 10106, from the bus 2 mixers 10107, and also from each of the receivers units of buses 3, 4, and 5 of receiver units 10103, 10104 and 10105. These 5 input lines represent 4 bits for a memory module address and a request line from each of receivers 10101, 10102, 10103, 10104 and 10105. Each of OR gates O1071, O1072, O073, O1074 respectively handle one bit of the four bit memory module address and OR gate O1076 receives the standard request line. The five line outputs of each of the mixers 10106 and 10107 and of each of the three receivers for the respective computer modules contain these four memory modules address bits and the standard request bit, which is received along the line corresponding to the respective bus from the respective requestor module.

Refer again to FIGS. 22A and 22B, the modular address selector unit. The circuits of AND gates A1081, A1082, A1083, and A1084, and A1085, respectively receive the input lines from the respective buses 1, 2, 3, 4 and 5. Refer, for example, to the circuit of AND gate A1081. The input to this portion of the mdoule address selector 10108 is applied through respective lines IAMMA8, IAMMA4, IAMMA2, IAMMA1 and IARQ. The lines refer respectively to the four bits of the memory module address received from the bus 1 mixers 10106 and the standard request bit from mixer 10106. These are respectivley applied through respective inverters (not numbered) in the input circuits to AND gate A1081 via the 4 switches shown. The switches (not numbered) are provided to enable facility in changing the particular modular address when desired and are normally pre-set at a desired module address. Actuation of AND gate A1081 by the 4 memory address signals plus the request signal indicates that it is the input/output control unit from bus 1 that is requesting memory. Similarly, in the case of respective AND gates A1082, A1083, A1084 and A1085, the activation of these respective AND gates indicates that memory is being addressed and a standard request is being made from respective buses 2, 3, 4 and 5, indicating that either the I/O control unit B or computer P4, computer P3, computer P2, or computer P1, respectively, are requesting access to memory.

The channels ECIA, ECC4, ECC3, ECC2 and ECC1, normally provide an input to the respective AND gates A1081, A1082, A1083, A1084 and A1085 and are used merely for test purposes.

Refer agian to FIG. 5 in conjunction with FIGS. 22A and 22B. The output 10701 of FIGS. 22A and 22B appears at the output of module address selector 10108 bus 1 and is labeled 10701. The output 10702 appears at the module address selector 10108 output labeled 10102 in FIG. 5A. Similarly the outputs of the other three module address selector bus outputs 10703, 10704 and 10705 indicate which bus output is being applied to the input of the conflict resolver and bus selection unit 10109.

Refer to FIGS. 23A and 23B. FIGS. 23A and 23B together present the logic diagram for the conflict resolver and bus selection unit 10109. By way of orientation, the inputs 10701, 10702, 10703, 10704, and 10705 are shown in FIG. 23A and FIG. 23B as applied to the inputs of the conflict resolver. Assume, for example, that an I/O unit in the automatic exchange configuration A requests memory and via receivers 10101, bus 1 mixers 10106 and bus 1 module address selector 10701 presents a high signal at input 10701 to the conflict resolver (see FIG. 23A). Access to the memory module of FIG. 5 is gained only when the switch positions of the pre-set switches in the input circuitry to the respective AND gates A 1081, A 1082, A 1083, A 1084 and A 1085 of the module address selector 10108 of FIGS. 22A and 22B are set to receive the plurality of outputs of the specific requester modules in accordance with the address requested by them. As shown in the positions set in the switches of FIG. 22A and FIG. 22B, there is zero input on each of the four input lines from each of the requestor modules to each of the respective AND gates A 1081, A 1082, A 1083, A1084 and A 1085. Where desired to change the memory module address to a different address member, the switches (not numbered) may be set accordingly. For example, if desired to designate the memory module as memory module M16 or binary 1111, each of the switches would be set in the reverse direction from that shown in FIGS. 22A and 22B so that 4 high level signals or 4 ones would be required at the output from a particular requestor module in order for this requestor module to be accepted by the memory module address selector unit 10108 of this memory module. There are 16 possibilities of positions settings of the switches including the position 0000 shown by way of illustration in the particular module address selector 10108 of FIGS. 22A and 22B of the memory module of FIG. 5. For any of the lines 10701, 10702, 10703, 10704 or 10705 to be at a high level, it is necessary that the requesting module request the particular memory module of FIG. 5.

Assume that this memory module, for example, memory module M1, is being requested. Four conflicts must be resolved before any of the I/O control or processor units P1–P4 or I/O 1–I/O 20 may gain access to the memory module. First there is a priority sequence for simultaneous requests. This sequence in the illustrative embodiment is any I/O module of I/O Exchange group A, which receives priority over any I/O module of I/O Exchange group B, which in return receives priority over the third computer P3 which third computer receives priority over the second computer P2 and all of the requestor modules receive priority over the first computer P1. Restated, bus 1 has priority over bus 2, which has priority over bus 3, which has priority over bus 4, which has priority over bus 5. This is taken care of by the four inverters I1091, I1092, I1093, and I1094 (see FIGS. 23A and 23B). If any request appears on line 10701, which is the highest priority bus 1 line from the I/O control modules of I/O exchange unit A, AND gate 10901, as will be seen hereinafter, permits access to the bus 1 cross point flip-flop FF10901. Therefore, the first of the four types of conflicts are conflicts where two requestor busses seek access to the same memory module simultaneously. Should any of the other requestor modules of lower priority seek to gain access to the memory module, they will be inhibited from doing so.

The second conflict situation arises when a bus of lower priority has already gained access and then a bus of higher priority attempts to gain access. For this situation, we have the signal, for example MT0, not busy labeled MT0NB, at the input to AND gate A10901 and to the other AND gates for each bus, AND gates A10902, A10903, A10904, and AND gate A10905. This signal remains low until any bus gains access. This signal inhibits any of these AND gates A10901, A10902, A10903, A10904 and A10905 until the MT0NB input signal is high. The high signal indicates that this memory module (of FIG. 5) is not busy. Once the memory module has become busy, no other requestor module may gain access. This takes care of the second conflicting situation, that is, no requestor module which is communicating with memory can be interrupted.

The third and fourth cases involve the sending of descriptors. The third case arises upon simultaneous occurrence of a descriptor, etc. request to a first memory module to transfer information from that memory module to an I/O bus, and at the same time that I/O bus is busy by virtue of information being transferred between that particular I/O bus and a second memory module. That is, conflict arises upon any I/O bus being communicated with by a descriptor or information request from a computer at the same time that the I/O bus is sending or receiving information from a different memory module. This occurs when an I/O control unit is attempting to communicate with a first memory module and a computer is trying to send a descriptor concerning that I/O exchange from a second memory module. To resolve this conflict, an I/O request is made sufficient to inhibit a descriptor request of a computer. This is done (see FIG. 23B) for bus A by means of the circuitry including AND gate A10910 responsive to the input at line 10910, and for bus B by the circuitry responsive to the input at line 10911. In the discussion as to this circuitry it is assumed that there are two I/O exchanges so that the configuration of FIG. 1 is utilized wherein there are two groups of ten or less I/O control units.

The input of line 10190 is described as exemplary of the operation in both cases.

Continue to refer to FIG. 23A and FIG. 23B. Whenever an I/O of the I/O bus 1 exchange A configuration is requesting, a high appears from bus 1 which is applied to line 10910. Whenever a descriptor request is made from one of the computers, a high corresponding to that computer appears on one of the lines 10912, 10913, 10914 or 10915. This is for the four computer case, the computer request on 10912 occurs only where there are 4 computers instead of 3. The coincidence of highs on the input lines, for example, 10910 indicating I/O request of this memory module and 10913 indicating that a descriptor is being sent from computer P3 causes AND gate A 10910 to present a high at its output. This high appears at the output of OR gate O10910 and is inverted acros sinverter I10910, presenting low input to AND gate A10911. This turns off AND gate A10911. Upon turning off AND gate A10911, the flip-flop FF10903 is inhibited from being set so that the descriptor request is inhibited.

This is the third case where the I/O is requesting and it is desired to hold off descriptor requests from any of the computers.

The fourth conflict situation arises when a descriptor request has gained access and request is made of an input/output control unit on the same bus of A for a different memory module. This situation is taken care of by the units outlined by dashed lines 10920 and 10921 (see FIG. 23A).

When a descriptor request has gained access to any memory module, a signal is sent from that memory module to every other memory module in the system. These signals are applied to the memory module receivers inhibit bus 2 unit 10111 and receivers inhibit bus 1 unit 10112, respectively. These units are shown in FIG. 5A. The output of these receivers inhibit bus units 10111 and 10112 are fed to the conflict resolver and bus selection unit 10109 designated in FIG. 23A as units 10921 and 10920, respectively. This causes a high signal output from the OR gate O10915 or from the OR gate O10916. That is, where the request is a descriptor request for bus A, the OR gate O10920 has a high output. Similarly, in the presence of a descriptor for bus B, the OR gate O10921 presents high output. In the case of two descriptors, one for each bus, occurring simultaneously, both OR gates O10920 and OR gate O10921 present high outputs. When due to the descriptors being sent and the memory modules indicated condition indicate this, for example, when there is a high output from OR gate O10920, this high output is inverted and inhibits AND gate A10901, thereby preventing setting of flip-flop FF10901. With flip-flop FF10901 prevented from being set, I/O control module Bus one is prevented from access to memory. Similarly, the flip-flop (not numbered) for OR gate O10916 will prevent I/O access for Bus B when a high appears at the output of OR gate O10916. This is the fourth situation.

Referring back to FIG. 5A, at this point it is seen that the conflict resolver and bus selection unit 10109 resolves all possible conflicts between the requestor modules and takes care of the situation when an I/O communication is being effected simultaneously with a descriptor request.

Referring again to FIG. 23A and FIG. 23B, the five flip-flop FF10901, FF10902, FF10903, FF10904, and FF10905 outputs when set into the one state send back the signal to the respective requestor modules to indicate that access to memory has been received.

Refer to FIG. 24A and FIG. 24B, the signal outputs of the 5 flip-flops shown in FIG. 23A and FIG. 23B, flip-flops FF10901, FF10902, FF10903, FF10904, and FF10905 appear on FIG. 24A and FIG. 24B as the inputs XP Bus 1, XP Bus 2, XP Bus 3, XP Bus 4, and XP Bus 5 (see unit 10110 in FIG. 5A). XP Bus 1, XP Bus 2, XP Bus 3, XP Bus 4, and XP Bus 5 stand for cross point bus, 1 through cross-point bus 5, respectively. These flip-flop FF10901–FF10905 outputs in FIG. 23A and FIG. 23B provide inputs in FIG. 24A and FIG. 24B to respective AND gates A1101, A1102, A1103, A1104, and A1105. Respective ECI inputs (enable communication input signals) ECIA, ECC4, ECC3, ECC2, ECC1 are also applied to AND gates A1101 through A1105, respectively as enable communications signals for the I/O control bus of the A exchange, and for each of the computers P1, P2, P3, and P4 (in the four computer configuration), respectively. Instead of the computer P4, the signal is sent back to I/O exchange B where that configuration is utilized. These are the signals which appear from FIG. 22A and FIG. 22B. These signals are in the same line as applied in the normal mode also as a high to the 6 x 1 (six by one) AND gate of FIG. 21, and applied to respective AND gates A1101 through A1105, inclusive, in FIG. 24B. The outputs of the respective AND gates A1101 through A1105 inclusive, are sent to respective drivers shown in FIG. 25. These outputs are designated in FIG. 24*B* as MNXPIA, MNXPC4, MNXPC3, MNXPC2, and MNXPC1.

Refer to FIG. 25. Respective drivers DR11101 through DR11105 inclusive are provided into which are fed the MNNXPIA, MNXPC4, MNXPC3, MNXPC2, and MNXPC1 outputs of AND gates A1101 to A1105 of FIG. 24B. From the drivers DR11101–11105, the signals are sent back to the receivers in the associated modules to indicate that access has been obtained into memory by a respective requestor module.

If a computer is requesting that a descriptor be sent to an I/O control module of an I/O exchange A or B, the I/O control modules of that exchange must be informed that a descriptor is coming in order to open the proper gates.

In the I/O control modules later described herein, there are two registers involved, a descriptor register and an information register. Information coming from the memory may go into either of the two registers. Which register is entered is determined by the fact that a cross point from MNXPIA of FIG. 25 comes over as a result of the I/O request to the memory to send something. If an I/O control module is requesting, it must be requesting information. If an I/O control module is not requesting, then the input from memory must be to the descriptor register. Therefore, the P1, P2, P3 or P4 processor which is sending the descriptor, when it gains access to the memory must cause the memory to inform the I/O control module that the inputs to the descriptor register are to be set so that the information from memory will flow into the descriptor register in this case. The way the memory informs the I/O control module is by means of the cross point bus signal circuitry of FIGS. 24A and 24B comprising the AND gates A11006, A11007, A11008, A11009, and the OR gate O11001 responsive to these AND gates. The inputs to these respective AND gates A11006, A11007, A11008 and A11009 are descriptor requests C4DARQ, C3DARQ, C2DARQ and C1DARQ from respective computers P4 (where a four computer system is utilized) P3, P2 and P1 (in some cases herein designated as computers C4, C3, C2, and C1 instead of corresponding P designations). The other input to AND gates A11006 through A11009 is a signal indicating normal operation which occurs on the input line MNORM. The third input to each of these gates is the cross point of the respective busses, that is, the inputs XP Bus 2 (where Bus 2 is connected to computer module P4, XP Bus 3, XP Bus 4, and XP Bus 5 (see FIG. 24A). With all three inputs to any of AND gates A11006 through A11009 inclusive, the OR gate O11001 will be enabled producing the signal MNXPDA, which goes to driver DR11106 in FIG. 25. The output of driver DR11106 in FIG. 25 is sent to the I/O Exchange Bus A indicating that a descriptor is coming. Where a second I/O exchange and I/O control modules B are provided, the AND gates A11010 through A11013 and the OR gate O11002 (see FIG. 24B) provide the function for this group of I/O control modules in a similar manner to that for the I/O exchange group A. These will not be explained inasmuch as the operation is identical to that for group A.

The circuitry responsive to OR gate O11002 (and the corresponding circuitry not numbered) in the adjacent dashed line bordered unit responsive to OR gate O11002 shown in FIG. 25, is used for the above described conflict case wherein a computer has requested and gained access with a descriptor request and the I/O request must be inhibited.

Remembering that there are two memory modules for each cabinet, when access has been obtained to a particular memory module M1–M16, it is required to send a signal to each of the other fifteen memory modules that this memory module is sending a descriptor. This signal is generated for each of the cabinets (2 memory modules per cabinet). The signal input MNXPDA* is generated on the memory module on the front rack of the cabinet (see FIG. 24B). When applied to the input of the gate A11014 signal input MNXPDA* enables the OR gate O11003. When enabled OR gate O11003 provides output to inform the other memory modules that the descriptor is being sent. This causes the other memory modules to hold off their I/O requests to the same I/O exchange bus, in this case, the bus for I/O Exchange A. Not shown in FIG. 24B, but shown in FIG. 23A (see OR gate O10915 circuit and input to AND gate A10920) is that when the MNXPDA* signal is being sent out, it also goes to the rear rack memory to inform that memory module that a descriptor is being sent and to hold off a rear rack memory module I/O request to the same input/output bus. Refer again to FIG. 24B. The signal output of OR gate O11003 is applied to a driver D11107 (see FIG. 25). The output of driver D11107 is sent to all other memory cabinets to inform the memory modules to hold off the I/O requests for this I/O control bus A. The circuit of OR gates O11004 acts similarly for the input/output control bus B.

Referring also to FIG. 5, the circuitry shown in FIG. 24B which has been just described is a portion of the master control 10115 leading from the cross-point busses 10110. Master Control means 10115, in turn, sets the line drivers controls 10111.

Refer to FIG. 5A and FIG. 25. The line driver control 10111 shown in FIG. 25 has 9 outputs, one of these outputs being a signal which is sent to the other 7 memory cabinets to inhibit the I/O request. This is the case where a descriptor request is being handled for an I/O control module and another I/O control module is trying to request the memory module at the same time. Seven of the outputs of the line driver controls 10111 are the outputs of drivers DR11101 through DR11107, inclusive. The remaining two drivers, DR11108 and DR11109 perform functions similar to drivers DR11106 and DR11107, respectively, except that they apply the signals to the I/O control modules of I/O bus B instead of I/O bus A. These are the nine control drivers 10111.

Now refer again to FIG. 5A and in particular to the master controls means 10109. A discussion follows as to the times involved in generating the signals which are sent to a time counter 10113 and to register controls 10114. These circuits are shown in detail in FIG. 24A. An OR gate O11005 is provided and its circuit generates the MT0NB memory time zero (not busy) signal which is used to permit the control of the second type of conflict where a memory module is already busy servicing a request and a higher priority request then attempts to gain access to the same memory module. Now refer to the circuit of OR gate O11006. If a requesting module has gained access, one of the cross point flip-flops are set and hence, one of the signals XP Bus 1, XP Bus 2, XP Bus 3, XP Bus 4, or XP Bus 5 is high. These signals are ANDed together with the signal MTO, which is the quiescent state signal when the memories are not busy, to enable the gate and provide output from one of the AND gates A11022, A11023, A11024, A11025 and A11026, and thereby enable OR gate O11006 to provide an OR gate O11006 output. The signal generated from OR gate O11006 is ANDed with the memory power ready signal to provide an output on the line MT0XP–1. This MT0XP–1 line output indicates that the time is time $T_0$ and that a cross point has been set. On the next clock time the flip-flop FF11001 is set. As shown in FIG. 24A the flip-flop FF11001 is set in its ordinary state. The occurrence of a high output from the OR gate O11006 resets the flip-flop FF11001. In the absence of a request, flip-flop FF11001 is normally in the reset state, that is, in the not busy memory state of the memory module. When the signal from OR gate O11006 arrives at the "one" input of flip-flop FF11001, flip-flop FF11001 becomes set on the next clock pulse time. Flip-flop FF11001 is the switch control address flip-flop. The switch control address strobe flip-flop FF11001 serves to delay so as to cause the start of decay of the switches S10101 to prevent overlapping of switch outputs. Flip-flop FF11001 becomes reset with the MT0NB signal, which is the not busy signal return to AND gate A11027. There are two T0 states. One is when at T0 memory is not busy, which resets flip-flop FF11001 and the other state is the state when a requesting module has just gained access at T0 and the memory is busy. This is shown at MT0XP–1 output. This same signal output MT0XP–1 goes to the time counter control 10112 shown in FIG. 5A.

The circuit of OR gate O11007 in FIG. 24A determines whether the operation is a read-out-of memory or a write-into memory. AND gates A11032, A11033, A11034, A11035 and A11036 receive the cross point bus respective inputs XP Bus 1–XP Bus 5 which tell that a requestor module has gained access. On the other side of the respective AND gates A11032–A11036 appears the read level from requestor modules when a read-out-of memory operation is desired. When such a read level request occurs, the output of OR gate O11007 becomes high to generate memory read level signal MRL–1 at its output. By means of inverter I11001, if the signal is a read level signal, the output at MRL–1 is high, and if it is a write signal, the output at MWL after inversion of the signal through inverter I11001 is high. Therefore, the circuit is normally in the write condition and remains in the write condition, unless a read indication comes along.

Now refer to FIG. 26 which shows the time counter control circuit 10112 of FIG. 5A. The circuits shown under the dashed line A—A are test circuit. The input to AND gate A11202 is used for tests only. The AND gate A11201 is responsive to the MT0XP–1 signal which indicates that the cross point in the particular memory module has been set and access has been obtained. The $\overline{\text{MTESTS}}$ signal indicates that testing is not being effected. Therefore, upon the conditions being present that access has been obtained and the memory module is busy, the output of OR gate O11201 is high. This is the SMTC signal output which starts the memory time counter 10113 of FIG. 5A. This time counter is shown in FIG. 27 and will be described hereinbelow.

The high output of OR gate O11201 also provides one of the inputs to AND gate A11203 necessary to activate this AND gate. Another input to AND gate A11203 is the MT0XP–1 input, indicating that the memory module of FIG. 5 is busy and is in the T0 state. The AND gate A11203 to be enabled, also requires input from the core enable flip-flop not signal $\overline{\text{CEF}}$ and is activated upon the occurrence of a clock pulse. This is the clock pulses generated in memory. Upon enabling of AND gate A11203, the signal from OR gate O11205 appears on the output line STMRC, which is the start memory read cycle pulse output signal. Similarly, with the core enable flip-flop not $\overline{\text{CEF}}$ signal and at clock pulse time, upon enabling of the switch control address strobe signal from flip-flops FF11001 of FIG. 24A and at MT4 time AND gate A11204 is enabled.

The occurrence of these four signals enables AND gate A11204 which in turn enables OR gate O11206 to provide an output. This output of OR gate O11206 is the start memory write cycle signal STMWC. The switch control address strobe is the output of flip-flop FF11001 shown in FIG. 24A and is part of the master controls circuit 10115 (see FIG. 5A)

The start memory read cycle STMRC and start memory write cycle STMWC outputs from respective OR gates O11205 and O11206 are applied to the input of the circuit shown in FIG. 28A, the logical diagram of the start memory read cycle circuit, and to the input of the circuit shown in FIG. 28*b*, the logical diagram of the start memory write cycle circuit. The start the memory read cycle signal SWRC is the signal that goes to the read drivers and into the single shot strobe input. The STMWC or start memory write cycle signal is fed to the write drivers and to the memory information drivers.

Referring again to FIG. 26 the output of OR gate O11201 is the start memory time conuter signal SMTC shown at the extreme left of FIG. 27. FIG. 27 is a logical diagram of the memory time counter 10113 of the invention (see FIG. 5A).

This signal SMTC is applied to the "zero" side of flip-flop FF11301 and to the "one" side of the flip-flop FF11302. The flip-flops FF11301, FF11302, FF11303, FF11304, FF11305, FF11306, FF11307, FF11308, FF11309, FF11310 and FF11311 comprise the flip-flops of the memory time counter 10113 of FIG. 5A. The SMTC signal (start memory time counter signal) resets the MT0 flip-flop FF11301 and sets the FT1 flip-flop FF11302. On the next clock pulse time via the output of the one side of flip-flop FF11302 and the AND gate A11303, the flip-flop FF11303 is set to the one state. This counts off the MT2 signal output of flip-flop FF11303. In a similar manner, the "one" is shifted along the ring counter of FIG. 27 through successive stages FF11304, etc. the "one" progressing down the line, until flip-flop FF11311 becomes set into the "one" state. On setting flip-flop FF11311 into the "one" state at time MT10, recycling then occurs through line 11301 to enable AND gate A11304. This again sets the one side of the flip-flop FF11301 to provide MT0 output. Upon setting of FF11301, it remains set in the one stage until the occurrence of another start memory time counter pulse at the input of a zero side.

In summary, upon setting of a cross point by gaining access to memory, this causes the start memory time clock cycle which causes the counter to count from MT0 to MT10, and again set the flip-flop FF11301, which remains in set condition until another cross point becomes set allowing the memory time counter 10113 to again count.

FIGS. 28A and 28B are logical diagrams of the core read and write timing control circuit 1011 (see the intrinsic memory section of FIG. 5C). The time counter 10113 which is shown in FIG. 27 can be considered as a part of the master controls 10115 shown in FIG. 5A, and the SCAS output as shown in FIG. 5C, enters into the core read and write time control circuit 1011 of FIGS. 28A and 28B. The start memory read cycle signal is an input to a single shot delay D2801. The start memory read cycle signal causes the single shot D2801 to fire and activates the strobe and the read pulse timing signals. The STRB or strobe pulse is applied to the single shots 1032 (see FIG. 5C and FIG. 18). There are 49 single shots in unit 1032. These single shots carry the information from the cores 1028 and the associated sense amplifiers 1031 to the memory information registers MIRA, MIRB, MIRC, MIRD, and parity (see FIG. 5D). The MIRA, MIRB, MIRC and MIRD registers actually form a single memory information register of 48 information bits, 12 bits being in each of memory syllable sub-registers MIRA, MIRB, MIRC, and MIRD and in addition a 49th parity bit. The CMRP core memory read pulse are applied to the read drivers 1025 (see FIG. 18) of drivers D10106 (see FIG. 5C). The core memory write pulse or CMWP signals are applied to the write drivers 1026 of drivers D10106 (see FIG. 18 and FIG. 5C). The D10106 drivers comprise 64 read drivers 1025 and 64 write drivers 1026. These drivers D10106 are enabled from the decoding memory arithmetic register, memory address register decoders 1023 and 1024, shown in FIGS. 5A and 18. Therefore, the start memory read cycle signal enables the delay lines D2801 and D2802 to cause a strobe output STRB. Strobe output STRB is applied to the single shots 1032 and generates the core memory speed pulses applied to the read drivers 1025 in drivers unit DR10106. Similarly, the start memory write cycle signal applied to the single shots **1035*b* and 1035*c* of FIG. 18. This causes the core memory write pulse (CMWP) to be applied to the write drivers 1026 and the core information driver 1034 pulses to be applied to the information drivers 1034 shown in intrinsic memory 1010** of FIG. 5C.

Refer to FIG. 29, which is a logical diagram showing the register controls unit 10114 (see FIG. 5A).

AND gate A11401 is enabled (in the absence of a test) by the MT0XP–1 (memory time zero from the cross point gates signal) generated in the master controls 10115. This circuit is designed to generate a load MAR (load memory address register) signal to transfer into the memory address register, the memory address requested by the requestor module. The LMAR signal is shown in FIG. 5A at the output of Register Controls Unit 10114. The LMAR signal is applied into the memory address input and counting unit 10116 (see FIG. 5C). This signal is generated in the register controls and parity circuit of FIG. 29 upon enabling AND gate A11401.

Generation of the load MAR signal enables the requestor module to send 12 bits through the corresponding appropriate circuitry receivers 10117A, 10117B, 10117C, 10118A, or 10118B as will be explained hereinbelow. The register controls circuitry 10114 also generates TCMIR signals, that is, transfer from the cores to the memory information register signals. These latter signals arise at MT3 time by the MT3 signal from the time counter 10113 which is ANDed with the memory read level signal and with the core enable flip-flop not set, to generate an output from AND gates A11402 and A11403 which respectively cause OR gates O11405 and O11406 to provide the TCMIR outputs.

At MT3 time with a memory read level signal and with the core enable flip-flop in reset condition and for a read operation wherein the MRL (memory read level) is high, AND gate A11402 provides a high output. The AND gate A11401 output providing the load memory address register signal LMAR is the signal in FIG. 29, which goes to the memory address register 1021. The remaining signal outputs of the FIG. 29 circuit go to the memory information register 1033 (see FIG. 5D). The first of these signals is the transfer core to memory information register signal applied through OR gate O11405 and OR gate O11406.

When not in test, the right hand input to AND gate A11421 is high. To enable AND gate A11421, the memory write level must be high indicating that the operation is a memory write. In this case, AND gates A11404, A11405, A11406, A11407, and A11408 each have their right hand inputs high. At time MT1, the signal from the time counter 1013 enables AND gate A11404 causing OR gate O11402 to provide a load memory information register syllable D output on the line LMIRD (see FIG. 5D). Similarly, at time MT2 the time counter 10113 enables AND gate A11405, which causes OR gate O11403 to provide a load memory information register syllable C output (LMIRC). In similar fashion at times MT3, MT4, and MT5, the time counter 10113 provides corresponding signals to enable respective AND gates A11406, A11407, and A11408 to cause generation of respective outputs respectively indicating load memory information register B (LMIRB), load memory information register A (LMIRA), and load parity bit. The buffer B11401 (see FIG. 29) is a re-standardizing buffer, which may comprise a double inverter circuit. The right hand portion of FIG. 29, including the circuits of AND gates A11409, A11410, A11411, A11412, and A11413, provide the re-set signals to re-set the D, C, B, A, and parity syllable subregisters of the memory information register. Each is responsive to a not-testing input plus a memory time zero cross-point signal MT0XP–1 which causes the respective AND gates to be high, causing a high output from respective OR gates O11410, O11411, O11412, O11413, and O11414. Enabling of these OR gates provides respective re-set memory information register syllable D output (RMIRD); re-set memory information register C output (RMIRC); re-set memory information register B output (RMIRB); re-set memory information register A (RMIRA); and re-set parity bit output signals.

Thus FIG. 29 illustrates generating the signal LMAR for loading the memory address register 1021. During read operations the transfer core to memory information register signals (TCMIR) are generated to allow the information from the cores to be transferred to the memory information register 1033.

During write operations, the loading of information into the memory information register 1033 (see FIG. 5D) from the requesting module is controlled (on a syllable basis) by the signals LMIRD (at MT1), LMIRC (at MT2), LMIRB (at MT3), LMIR (at MT4), and load parity (at MT5).

At MT0 crosspoint time (MT0XP–1) the entire memory information register 1033 is reset, via the respective reset memory information signals RMIRD (syllable D), RMIRC (syllable C), RMIRB (syllable B), RMIRA (syllable A), and reset parity bit.

Now refer again to FIG. 5.

The inputs to the receivers for buses B1, B2, B3, B4, and B5 have been discussed for the control signal input. In addition a plurality of receivers 10117A, 10117B, 10117C, 10118A, 10118B are provided to accept address and information bits from the respective requestor modules P1–P4 and I/O 1 and I/O 20. There are twelve receivers for each of the computer buses and there are sixty for the I/O control module buses. This is twelve receivers from each of the five cabinets of containing two I/O control modules for bus 1 corresponding to I/O exchange A and bus 2 corresponding to I/O exchange B. The receivers restandardize the signals coming into the memory module cabinets, by a double inversion technique involving a pair of inverters. The inputs to receivers 10118A and 10118B are fed into respective bus 1 mixer 10119A and bus 2 mixer 10119B. Bus mixers 10119A and 0119B may be 1 x 5 (one by five) mixers. At any one time only one group of twelve signals from any of the I/O control cabinets is received at the receivers 10118A of bus 1 or 10118B bus 2. The bus 1 and bus 2 mixers 10119A and 10119B are similar to the above-described bus 1 and bus 2 mixers 10106 and 10107 which were provided for the control information. Only one of the I/O control cabinets are sending at a time but for each gate in the bus 1 mixer 10119A five inputs, four of which are inactive, are received from each of the five cabinets. These mixers are used to channel this down from five signals to one signal. Therefore the output of the bus 1 mixer 10119A, for example, comprises 12 groups of five inputs from each of the I/O cabinets for the 12 bits of information, or address.

Now refer to FIG. 30A and FIG. 30B wherein is shown the memory input matrix for bits 1 to 6. Refer also to FIG. 5D. This comprises the circuits for the first six bits from input bus 5 10121, input bus 4 10122, input bus 3 10123, input bus 2 10124, input bus 1 10125 and the input mixer 10127. It also includes the test circuit of input simulation bus 10126. There are actually two memory input matrix units provided. A second unit (not shown) is provided for bits 7 to 12 which may be substantially the same unit as the memory input matrix for the first six bits. Therefore, only FIG. 30 is provided and will be described as exemplary of both circuits.

Referring to FIG. 30A and FIG. 30B, each of the OR gates O11501, O11502, O11503, O11504, O11505 and O11506 and its respective AND gates feeding into each of the OR gates refers to one of the bits of address or information to be transferred to the address register 1021 or the information register 1033, respectively.

Refer now to the first bit for example, and the circuit of OR gate O11501. Depending upon which module has gained access a signal arrives on one of the crosspoint bus inputs XP Bus 1, XP Bus 2, XP Bus 3, XP Bus 4, XP Bus 5 (see FIG. 30A). This signal is applied to respective AND gates A11501, A11502, A11503, A11504, or A11505. An additional AND gate is provided for test purposes and will not be described. Similarly the control line activated goes to the corresponding AND gate feeding into respective OR gates O11502, O11503, O11504, O11505, and O11506. Depending upon which of the AND gates is enabled by the respective crosspoint XP Bus 1, 2, 3, 4, or 5, the respective AND gate of AND gates A11501–A11505 is enabled by the address information coming in from the corresponding module along the lines IUAB1, the I/O exchange A input, or CU4B1, CU3B1, CU2B1 or CU1B1, the computer input from computers 4, 3, 2, or 1 respectively. If there is used a second I/O exchange instead of the 4th computer, the input will be changed accordingly.

Assume that input is coming from bus 1 which is the bus for the I/O control module group of exchange A. Then signals appear on the line marked XP Bus 1 and a corresponding signal now appears on the input line IUAB1. This is the incoming address for information bit 1 from the input-output control module of input-output exchange A which has gained access. These two inputs are ANDed together in AND gate A11501 and depending whether the incoming bit is a zero or a one, AND gate 11501 will have a low or a high output. Hence OR gate O11501 will provide a corresponding output at the output INB1. This is the output from the input mixer 10127.

The input bus 1 unit 10125 comprises the five AND gates A11501, A11506, A11507, A11508, A11509, and A11510. This corresponds to the six of the twelve outputs from input bus 1, 10125. The output from each of the respective AND gates is applied to the input mixer 10127. The mixer comprises 12 OR gates six of which are OR gates O11501, O11502, O11503, O11504, O11505, and O11506.

Output INB1 is the first bit of address or information, INB2 is the second bit, INB3 is the third bit, INB4 is the fourth bit, INB5 is the fifth, and INB6 is the sixth bit of information or address output from the input mixer 10127.

Six other bit circuits for bits 7, 8, 9, 10, 11, and 12 respectively for the first 12 bits of information or address are provided by an identical unit. These INB outputs 1 to 12 are transferred to the gating of the memory address register and the memory information registers.

Now refer to FIG. 31, the memory address register. This shows the memory address register 1021 for bits 1 to 6 and the core enable flip-flop circuit FF11620. A second portion of the address register 1021 for bits 7 to 12 will also be provided which will be substantially identical to the first 6 bits shown. Only one core enable flip-flop FF11620 is provided, however. The core enable flip-flop FF11620 is a primary control to control the memory read cycle and memory write cycle. During normal operation it is always in the reset state. Whenever the equipment is on-line it is in the reset state and it is in set state only for test purposes.

The memory address register 1021 is never reset, but always is in the state of the last address which has been entered into it. Therefore, the memory address register 1021 must be forced into the state required for each bit. This is accomplished by using a pair of gates, one to set the "zero" side of the flip-flop of each bit, and one to set the one side of the flip-flop of each bit. For example, take the circuit of bit 1 which comprises the circuit of flip-flop FF11601. The "zero" side of flip-flop FF11601 is set by an OR gate O11601 and the "one" side is set by an OR gate O11602. The OR gate O11601 is turned on by AND gate A11601 and the OR gate O11602 is turned on by the AND gate A11602. The inputs to the AND gate A11601 are the inverted INB1 signal which is the output of the input mixer and the LMAR or Load Memory Address Register signal occurring at MT0 crosspoint time. The input to AND gate A11602 is the same output of 1NB1 which is the first bit coming in from the input mixer 10127 shown in FIG. 5D and its second input is the load memory address register signal at MT0XP or MT0 crosspoint time. This signal is not inverted. Hence, if the signal coming in on line INB1 is a high it will be inverted across inverter I11601 and the input to AND gate A11601 will be a low. In such case the high signal enables the AND gate A11602 at MT0 crosspoint time by the LMAR signal causing the OR gate O11602 to provide an output which sets flip-flop FF11601 into the one state. Similarly if the incoming bit is a zero the INB1 input will be a low which is inverted across I11601 and is transmitted through AND gates A11601 and OR gates O11601 to set the zero side of flip-flop FF11601. This low will not enable AND gate A11602 and therefore the one side of flip-flop FF11601 will not be set. Hence depending upon whether the incoming signal along line INB1 from the input mixer 10127 is a zero or a one the state of flip-flop FF11601 will definitely be set accordingly. The same thing applies for each of the other flip-flops of the first 6 bits, flip-flops FF11602, 11603, 11604, FF11605, and FF11606. The first bit output of flip-flop FF11601 in the memory address system is different from the other five bits shown in FIG. 31 and is different from the six least significant bits of the memory address register 1021. The most significant bit output is applied to each of the most significant bit decoder gates of the decoders 1023 and 1024 and from there to the switches 1027.

Refer again to FIG. 31. The output of flip-flop FF11601, the most significant bit, is applied to respective AND gates A11610 and A11611. When flip-flop FF11601 is set in the "one" state a high is applied into AND gate A11610. When the "0" side of flip-flop FF11601 is in a high state, a high output is applied into AND gate A11611. Upon the occurrence of a switch control address strobe SCAS pulse the gate which is high of AND gate 11610 or AND gate A11611 causes corresponding signal output MAR1S or $\overline{\text{MAR1S}}$. The bar over MAR1S means MAR1S NOT. This indicates either a one or a zero output respectively. The output of the zero side $\overline{\text{MAR1S}}$ is applied to 32 six input decoder circuits all in least significant bit decoder 1023 (see FIG. 5C). Similarly the MAR1S "one" side flip-flop output of flip-flop FF11601 is applied to the other 32 six input gates in the MAR (memory address register) most significant bit decoder 1024. Since 32 of the six bit decoder gates have one input from the zero side of the first bit flip-flop FF11601 of the memory address register 1021 and since the other 32 gates have one input from the one side of the first bit flip-flop FF11601 of the memory address register 1021, then by applying the switch control address strobe SCAS to the AND gates A11610 and A11611 the state will be conveyed without necessity of resorting to inserting a separate SCAR strobe input into each of the most significant bit MAR decoder 6 input gates 1023. The outputs of the other five flip-flops FF11602, FF11603, FF11604, FF11605, and FF11606 are fed to the 64 most significant bit decoder gates 1023. The signals from these most significant bit decoder gates 1023 are fed to the switches 1027 thereby turning on one of the 64 switches. These switches in conjunction with the 64 drivers of driver unit DR10106 comprising read drivers 1025 and write drivers 1026 select the particular word desired in the core matrix 1028 (see FIG. 5C). In a similar manner the MAR 7 through 12 least significant bits (not shown) of the memory address register 1021 enables the 64 gates of the MAR least significant bit decider 1024 to in turn set one of the 64 drivers DR10106 which are used in conjunction with the switches to select the worwd in the core matrix 1028.

Refer to FIG. 32 which shows the address register decoder 1023 for the six most significant bits. This provides decoding for the switches SW00 to SW17. The switch numbers are in octal code notation, so that SW00 to SW17 comprises the first 16 switches. There are eight groups of address register decoders, each group of which is similar to the group of FIG. 32. Each of the AND gates, for example, AND gates A11701 is a six input AND gate and is followed in circuit by an OR gate. AND gate A11701 accordingly feeds output into OR gate O11701. The output of each of the OR gates such as OR gate O11701 is sent to the input of a respective one of the switches in the switch unit 1027. For example, the output of OR gate O11701 is fed into switches SW00 of switches 1027. These are the switches which cooperate with the drivers DR10106 to select the word in the core matrix 1028 to which access is required. The input signals to the AND gates such as AND gate A11701 are taken from either the zeros or the one sides of each of the memory address register (MAR) 1021 six most significant bits. The inputs, for example, to AND gate A11701 are the zero sides of the six most significant bits.

Refer to FIG. 33 which shows bits 1 to 12, the 12 most significant bits of the memory information register 1033. These are the bits for syllable A, in the block labelled MIR A in FIG. 5D.

In contradistinction to the memory address register 1021, in the case of the memory information register 1033, the register is reset at the beginning of each cycle. Assume that an information word is to be fed into core memory 1028. For the operation of writing into memory a set of AND gates are used which comprise AND gates A11801, A11802, A11803, A11804, A11805, A11806, A11807, A11808, A11809, A11810, A11811, and A11812. A load memory information register signal is present. In the showing of FIG. 33 the load memory information register A signal is assumed to be present. There are five load memory information register signals, one for each of syllable portions A, B, C, and D, and one signal for parity.

These signals were discussed in conjunction with FIG. 29 the memory registers controls and parity circuit. In the presence of the load memory information register signal, the AND gates, A11801–A11802 are activated. The AND gates A11801–A11812 are enabled by the signals such as the first bit signal 1NB1 which appears on the 12 lines between the input mixer 10127 and the memory information register 1033 (see FIG. 5D). In FIG. 5D the memory information register 1033 is shown by the respective A, B, C, D, and parity read and write blocks which are ORed together. If the bit is a "1," AND gate A11801 is enabled causing a high output from OR gate O11801. This sets the "one" side of flip-flop FF11801. The read inputs are applied during Read operation into respective AND gates A11821, A11822, A11823, A11824, A11825, A11826, A11827, A11828, A11829, A11830, A11831, and A11832. The gates are activated for the read operation by a transfer core into memory information register signal, TCMIR–1 or TCMIR–2. These are applied as shown in FIG. 33. For example, take the first most significant 12 bits. AND gate A11821 is enabled by a signal input from single shot multivibrator B1 (SSB1) which applies the single-shot bit one signal. If the signal is a "one" coming from the core matrix 1028 through the sensing amplifiers 1031 and the single shots 1032, AND gate A11821 is enabled causing OR gate O11801 to provide a high output which sets the "one" side of the flip-flop FF11801. Similarly, in the presence of an appropriate TCMIR signal, plus the output of the corresponding single shot multivibrator bit the respective AND gates are enabled to set the "one" side of the corresponding bit flip-flop in the memory information register 1033. Whether the operation is a read or a write operation during the first six time periods MT0 through MT6, during the MT1 to MT5 periods the memory information register 1033 is set. From time periods MT6 through MT10 the information in the memory information register 1033 is read back into the cores 1028.

In the write operation, whatever is in the cores 1028 which are addressed is destroyed and during MT6 to MT10 times the word in the memory information register is written into the cores 1028.

In summary in order to provide a "1" into the memory information register 1033 there must be present either a read signal input concurrently with a signal from the single shot multivibrator bit 1 circuit or there must be present a write operation concurrently with a "1" being written in as indicated by the INB 1 signal input.

Now refer to FIG. 34 the memory information output circuit 10153 (see also FIG. 5D). In either case of FIG. 33 whether a read operation or a write operation the information is transferred out 12 bits at a time. The requesting module determines whether it wishes to look at the information or not. Refer back to FIG. 5D. Whether a read or a write information operation occurs the information is read out of the memory information register 1033 into information output mixer 10151 and then into the line drivers information output circuit 10152. In the case of a write information the requestor would not want to look at the information and means are provided (not shown) so that it need not do so.

FIGURE 34 is the logical diagram of the information output (not numbered) and information out mixer 10151 circuits included in the surrounding box outline by dashed lines and designated as means 10153.

The circuit of FIG. 34 gates out syllable by syllable the contents of the memory information register 1033. At MT4 signal time from the time counter 10113 (see FIG. 5A), 12 bits of syllable D is read out of the memory information register 1013. The 12 bits from the memory information register 1013 syllable D are read through respective AND gates A11901, A11902, A11903, A11904, A11905, A11906, A11907, A11908, A11909, A11910, A11911, A11912. Similarly the second 12 bits are read out of syllable position C at time MT5 from AND gates A11913 and the corresponding AND gates in each of the memory information output circuits of OR gates O11901 through O11912 respectively. At time MT6 the contents of the B syllable in the memory information register 1013 are read out from AND gate 25 and the corresponding AND gates in each of the OR circuits O11902–O11912. At MT7 time the AND gate A11937 is enabled by the MT7 signal and the contents of syllable A of the memory information register 1033 are read out from the AND gates corresponding to AND gate A11937 in each of the OR gate configurations O11901–O11912, respectively. Finally the parity bit is read out at MT8 time by enabling of the AND gate A11949 and consequently OR gate O11912 to the line drivers 10152. The line drivers 10152 are similar to the line drivers 10111 except that line drivers 10152 refer to the information output whereas the line drivers DR11101–DR11109 in line drivers 10111 refer to the master controls unit 10115 outputs. This data is fed into the appropriate registers in the requestor modules. For example, where a computer P1, P2, P3 or P4 request information from a memory module M1–M16, the information from the line drivers information output unit 10152 is read into the M register 3007 of the L and M register 3006, 3007 in the memory exchange sections of the computer modules.

I/O CONTROL MODULE

*Theory of operation*

This section gives a general description of the theory of operation of the I/O control modules. The word system as used in this section means the I/O system as a self-contained subsystem of the illustrative embodiment data processor. First, there is an I/O system description followed by I/O subsystem descriptions.

*System description*

The input/output control (I/O) modules, I/O 1–I/O 10 and where present I/O 11–I/O 20 comprise control and data manipulation registers and associated decoding and timing registers. Each I/O control module can control any device of the I/O complement, and there can be as many simultaneous I/O operations as there are I/O modules. This section describes the theory of operation of a typical module and the relationship among the I/O modules which can be added to the data processor system of the invention.

*I/O module instruction words (descriptors)*

A complete understanding of the theory of operation for a typical I/O control module depends to a great extent on an understanding of the I/O module instruction words called descriptors. Five types of descriptors are used—set-up, command, in-process, result, and release. The set-up, release, and command descriptors are constructed by the program and are used for communication to the I/O modules; the in-process and result descriptors are constructed within given I/O modules and are used in communication from the I/O modules. FIGS. 36, 37, 38, 39, and 40 show descriptor formats.

A computer module operating in control mode can cause a memory module to transmit a word to the I/O control module which will be interpreted as a set-up descriptor, a release descriptor, or a command descriptor. The I/O control modules return to memory in-process and release descriptors.

A TIO instruction is used with the set-up, command, and release descriptors.

*TIO instruction*

The TIO instruction, which is given only when a computer module is in the control mode, sends the set-up descriptor, command descriptor, or release descriptor (obtained from the memory location specified by $A_2$) to the I/O modules. This instruction can be a command TIO or an unconditional TIO.

The command variation transmits a command descriptor to an I/O module, if a module is available. If no I/O module is available, the computer takes its next instruction from the location specified by $A_3$.

The unconditional variation transmits a set-up descriptor or release descriptor for immediate access to the I/O modules. The branch syllable is ignored for the variation, since the descriptor is sent unconditionally. The descriptor involved is sent to the I/O modules associated with the I/O bus designated by $A_1$ and called bus A or bus B.

The TIO instruction word is:

TIO-Transmit to Input/Output—16 O IO M B

Example:

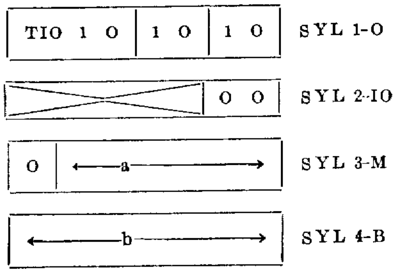

Location $(a+BAR)$ contains the command descriptor:

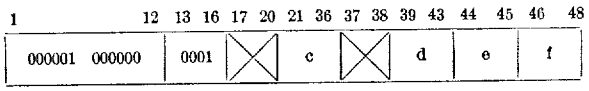

The special input/output syllable (IO), numbering the bits from left to right, is coded as follows:

Bits 1 through 10 are blank.

| Bit 11 | Bit 12 | Variation | Bus | Use |
|---|---|---|---|---|
| 0 | 0 | Command | A | Command descriptor. |
| 0 | 1 | Unconditional | A | Set up or release descriptor. |
| 1 | 0 | Command | B | Command descriptor. |
| 1 | 1 | Unconditional | B | Set up or release descriptor' |

The instruction says: Transmit the command descriptor found in memory location $(a+BAR)$ to the lowest-numbered non-busy I/O control module. If no I/O control modules are available, take the next instruction from the location specified by $(b+BPR)$. Otherwise, continue in sequence, while the I/O module takes over execution of the command as follows:

(a) perform operation *f*, type *e*,
(b) on device *d*
(c) involving 1 record (bits 13 to 16)
(d) using memory locations *c* through $c+63$ or 64 words bits 1 to 12).

*Set up descriptor*

Refer to FIG. 38, the format of the set-up descriptor. The set-up descriptor establishes the base address of descriptors (in-process and result) which will be returned to the memory modules from the I/O control modules. (The in-process Memory area is called the A list, and the result area is called the C list.) The descriptor contains the 11 most significant bits of the memory address. The other 5 bits (a total of 16 bits are required) are supplied by each I/O control module.

The descriptor is transmitted to all I/O control modules simultaneously, usually as the result of an unconditional TIO instruction. The first non-busy I/O control module responds and returns a full in-process descriptor. If no parity error exists, the location of this in-process descriptor is in the memory area designated by the descriptor base address portion of the set-up descriptor. If a parity error exists, the in-process descriptor location is designated by the previous contents of the descriptor base address register which will be zero after power is turned on and before the first set-up descriptor is successfully received.

All I/O control modules check the set-up descriptor for correct parity. If it is correct, the I/O control modules load the descriptor base address field in the descriptor base address register. If a unit is non-busy, but not next in line, the last syllable of the set-up descriptor is loaded into the descriptor register and is returned as an in-process descriptor to the new location. The I/O control module remains busy and must be released by a release descriptor.

If parity is not correct, as determined by each I/O control module individually, the contents of the descriptor base address register will not change, and all non-busy modules detecting the error will return an in-process descriptor with parity error status if it reads 10001 in bits 44 to 48. Also, it will become and remain busy until released by a release descriptor.

*Command descriptor*

Refer to FIG. 36, the format of the command descriptor. A TIO instruction with a command descriptor initiates each I/O operation. All transfers of data or the initiations of activities at a terminal device are controlled by a command descriptor which is normally transmitted by a computer P1, P2, P3 or P4 executing a conditional TIO instruction. If all I/O units are busy, the computer will transfer control to the address specified by the $0_3$ syllable in the TIO instruction.

The 48-bit command descriptor contains the word count (bits 1–12), record count (bits 13–16), memory module number (bits 21–24), memory address (bits 25–36) device number (39–43), instruction type (bits 44–45), and instruction modification (bits 46 to 48). Programming of word count and record count will vary among I/O devices. The memory module number 1–16 of modules M1–M16, is contained in bits 21 to 24, and the memory starting address in that module is contained in bits 25 to 36.

The memory starting address is counted up during operations. The number of the I/O device being used is in bits 39 to 43, and the instruction type is given in bits 44 and 45 as follows:

| Bit 44 | Bit 45 | |
|---|---|---|
| 0 | 0 | One way output device write. |
| 1 | 0 | One way input device read. |
| 0 | 1 | Two way device write. |
| 1 | 1 | Two way device read. |

Each of the above have eight permissible variations which may be interpreted by the particular device involved except for One Way Input Device Read. This code, 10, is also used for set-up and release descriptors. Since there are only two lines carrying information to the terminal (I/O) device for this kind of device, there are not enough lines to allow much variation in the instructions as detected by the device. The terminal device (I/O device can detect two instructions one of which, 10011, can be used only to initiate some action that does not involve transfer of data.

*In process descriptor*

Refer to FIG. 37, the format of the In Process descriptor. The normal consequence of sending a command descriptor to the first non-busy I/O control module is for that I/O control module to engage the designated terminal device and to return an in-process descriptor with 000–000 in the status field. Except for the status field, all bits of the in-process descriptor are identical to those of the command descriptor which started the I/O operation.

The I/O terminal device involved controls the rate of data transfer, if any, until a condition for ending the operation occurs. The I/O control module then releases the terminal device, returns a result descriptor with appropriate status information, and interrupts a computer which will examine the result descriptor and take appropriate action. If, however, the first non-busy I/O control module detects a parity error in the command descriptor or if it finds the unit available signal from the addressed terminal device is low, it will not engage the terminal device, but will return an in-process descriptor with 111–000 (for parity error) or 001–000 (for device not available) appearing in the status field.

The in-process descriptor will have one of three possible conditions. The three terminal device status bits will never be set, making XXX–000 the format for this kind of descriptor. The three possible conditions are:

000–000—Beginning operation. The command descriptor was received satisfactorily and the device was available. The operation will continue until a result descriptor is returned to memory. The I/O control module and the terminal device are now busy.

001–000—Device not available. The selected terminal device was either busy or not ready. The I/O control module will remain busy until released by a release descriptor.

111–00—Parity error in the descriptor. The set-up, or command descriptor contained a parity error. The I/O control module will remain busy until released by a release descriptor.

*Result descriptor*

Refer to FIG. 40, the format of the result descriptor. A result descriptor is returned following the completion or interruption of the operation of a terminal device. The first 16 bits will contain the word count and record count of the operation existing at the time the operation ended or was interrupted by a release descriptor. Bits 21 to 36 contain the memory address following the last address used in the I/O operation.

There will always be at least one bit set in the status field of the result descriptor, and either of the two forms may occur. In some instances it may be possible to have the form XXX–YYY, although this should be rare. If XXX–YYY does occur, there are two causes for terminating the operation which may be interpreted by assuming first that all X's are zero and they by assuming that all Y's are zero and interpreting both according to the code shown below.

Status of the form XXX–000 is well-defined regardless of device or operation. The form 000–XXX is largely interpreted according to type of terminal device and operation.

The status codes 001–000 or 000–000 should not appear in the result descriptor. The status codes used are:

010–000—Interrupted by release descriptor. The operation was ended because a release descriptor for this I/O control module was received before the normal ending occurred.

011–000—Word count equals zero. The last word to an output device has been reached, or an input device has reached the end of the allotted memory area.

100–000—No access to memory. A request for access to memory, either to read or write, has exceeded a time limit of 100 to 200 microseconds.

101–000—Power failure.

110–000—Parity error from terminal device. A character has been received from the selected terminal device with even parity.

111–000—Parity error in data from memory. A word received from memory contained even parity.

The usual meanings of the Terminal Device code are given below. These meanings are used on the eight devices in this system.

000–001—On read operations, this code has the meaning of end of record and last allotted record. On write operations it may have a different meaning, although none of the devices in the system presently give it a different meaning on write operations.

000–010—On one way output devices, this code means something is wrong such as a parity error or a malfunction. On other devices it means:

Magnetic tape unit—End of file
Card reader—Input hopper empty
Magnetic drum—Illegal instruction
Card punch—No response to status control 000–011—This usually means unit malfunction. On the Magnetic Tape Unit, the code is expanded to include other abnormal conditions.

000–100—The meaning varies as follows:

Magnetic tape unit—File protected
Magnetic drum—Channel protected
Paper tape reader—Rewinding
Card punch—Illegal descriptor 000–010—The meaning varies as follows:

Magnetic tape unit—End of tape
Paper tape reader—Local test
Card punch—Punch error
Flexowriter—Off line 000–110—This is used on four devices to indicate that memory access was too slow for the device. This is used on those devices whose operation is ruined if memory access is delayed somewhat, but not long enough to shut down with the 100 to 200 microseconds. There is no Memory access circuitry.

000–111—Parity error.

At approximately the same time that the descriptor is being returned to memory, the I/O control module (one of I/O 1–10 or 10–20 where present) sends an interrupt signal to the computer(s) and disconnects from the terminal device. The I/O control module will remain busy unless the cause of the termination was a release descriptor. Otherwise, it will remain busy until a release descriptor is received.

*Release descriptor*

Refer to FIG. 39, the format of the release descriptor. The release descriptor, which allows an I/O control module to accept a new command descriptor, is transmitted to the one I/O control module designated by the I/O control module number in bits 39 to 42. An unconditional TIO instruction is used to send this descriptor.

A release descriptor interrupts an input/output operation or if the operation has ended, it allows the I/O control module to accept a new command descriptor if it is the next non-busy control module.

A release descriptor is ignored by all non/busy I/O control modules and by all units whose number does not match the I/O control module number field of the release descriptor. If the designated busy unit detects a parity error in the release descriptor, it will also ignore the descriptor. If the first non-busy I/O control module detects a parity error, it will return an in-process descriptor with parity error status information. No computer will be interrupted because of this release descriptor.

An I/O control module remains busy after an operation ends. The computer must cause a release descriptor to be sent after reading the result descriptor to all the I/O control modules to accept new command descriptors.

TERMINAL DEVICE CONTROL SIGNALS

This subsection will define briefly the various basic signals that establish communication between the terminal devices and the I/O control modules.

*Unit available (input device)*

The unit available signal indicates that the input device can transmit information and is not being used by the computer.

*Start/stop (input device)*

A true start/stop signal indicates that the device has been connected to a computer and that the device is ready to transmit the first character (6 bits). When this signal is received, the device transmits its first character strobe signal.

*Character strobe (input device)*

This device output signal, when true is a command to the I/O control module to interrogate the data lines. The first character strobe signal is transmitted after the device receives a start/stop signal, then succeeding character strobe signals are tranmitted after the device receives a character request signal.

*Character request (input device)*

This device input signal, when true indicates that the computer is ready to accept the next character. Since the delay between the character strobe signal and the character request may be indefinite, the device must wait. The input device uses the character request signal as an indicator that it must transmit the next character strobe signal.

*Data lines (input device)*

Input devices have seven data outputs. Six outputs represent the character, and the seventh is generated in such a way as to make the parity odd.

*Status (input device)*

The status signal is functionally the same as the character strobe signal, in that it indicates that the data lines may be strobed. The receipt of a status signal indicates that status information rather than a character exists on the data lines. Timing specifications are the same for both signals. If both signals appear at the same time, the data on the data lines are interpreted as status code and also as a character.

*Output device signals*

Output devices provide output signals called unit available, character requests, and status. Inputs are called start/stop, character strobe, and data. Their purposes are the same as for input devices.

DEVICE TYPES

This subsection discusses One Way Output Device Write, Two Way Device Write, One Way Input Device Read or Control, and Two Way Device Read.

*One Way Output Device Write*

There are eight operations for this type of device, ranging from 00000 to 00111. As the in-process descriptor is being returned, the three instruction variation bits of the command descriptor are transmitted to the terminal device over data lines 4, 5, and 6.

The four bits of the record count field are transmitted over data lines 7, 1, 2, and 3. The Terminal Device can detect and use these signals to vary its operation. As far as the I/O module is concerned, the One Way Output Device Write Command has no variations. The command interpretation is:

Transmit the number of words specified by the word count field starting at the memory address given by the Memory Module field and the starting address fields of the command descriptor. Continue transferring data until the word count field becomes zero. Terminate the operation early if the status line from the Terminal Device becomes a 1, or if any of several conditions is detected by the I/O Unit.

The status signal 000–010 in the status field of the result descriptor means that something went wrong. No more detailed explanation of a terminate situation is given.

*Two way device write*

The initiation of a two way device write operation is identical to that for a One Way Output Device. The transfer of data and the ending are different, however.

If bit 46 of the descriptor, the most significant bit of the instruction variation field, is a 1, the read character request line in addition to the write character strobe line will become a 1 whenever the least significant eight bits of the word count field are 0 and the last character of a word is being transmitted to the device. If bit 46 is a zero, all 21 bits of the word count field must be 0 and the last character of a word is being transmitted to the device. If bit 46 is a zero, all 12 bits of the word count field must be 0 with the last character being transmitted before the read character request line will become a 1. This signal is used at the Terminal Device to separate groups of data with a record gap or to initiate and execute an ending procedure before allowing the I/O Unit to disconnect.

Since a two way device possesses data lines in the direction of the I/O Unit, the device has the ability to transmit seven possible reasons for ending the operation into the status field of the return descriptor. The status can be used to alter its usual operation.

*One Way Input Device Read or Control*

The input only read operation begins by transmitting the Read start/stop signal to the terminal device. Since there is no way for the terminal device to distinguish between the five order codes (10010, 10100, 10101, 10110, and 10111) that cause this effect, the One Way Input Device Read code is usually given only as 10010.

The one way input device control operation causes the read character request line to become a 1, keeping the Read start/stop at 0. This operation allows no transfer of data but it is used as a control function such as rewind, ring bell, and eject form. The operation will end when a terminating status code is received.

Since the data lines are in the direction of the I/O control module, they can be used to carry more information. For input devices, 000 on the least significant bits act as a control signal to the I/O Unit in that if any characters are currently in the information register, they must be loaded into Memory with delete characters (all ones) to fill the vacant positions at the most significant end. Two other cotnrol functions are presenlty available; 001000 will clear the information register and restore the character counter, and 010000 will count the memory address and the word count fields in the opposite direction. Six status codes unconditionally terminate the operation, while a seventh terminates if the record count is one, otherwise it counts down the record count field.

*Two Way Device Read*

The initiation of a Two Way Device Read operation is identical to that for a Two Way Device Write operation. The record count field and the instruction variation field continue to be transmitted until the operation ends.

When the last character of the last word (as designated by the word counter) occurs, the I/O Unit will signal over the write character strobe line in parallel with the read character request line. The Terminal Device can use this signal to mean that no more characters can be accepted into memory, and by holding up the read character strobe line, the Terminal Device can delay the ending of the operation until it has prepared for ending, such as checking longitudinal parity.

All status conditions that apply to a One Way Input Device apply to a Two Way Device read operation as well.

The I/O control module interprets a Two Way Device Read operation as follows:

Send the instruction variation field and the record count field to the Terminal Device over the write data lines starting two microseconds before the rise of the read start/stop line and continuing until the fall of the read start/stop line. Read each character from the read data lines into the information register with the leading edge of each read character strobe signal. When the information register is full, execute a normal I/O to memory transmission. On the last character of the last allowed input word, signal the Terminal Device. When the read character strobe goes to 0 following this last character, terminate the operation with appropriate status information in the result descriptor. Also, end the operation if the Terminal Device sends a terminating status code over the status line and the read data lines.

SYSTEM BLOCK DIAGRAM DISCUSSION

FIGURE 35 is a block diagram of the Input/Output Module as a subsystem of the modular data processing system of the invention. A maximum 1-bus system would contain 10 I/O modules housed as two modules per cabinet. In any given cabinet, the two modules are functionally the same. Illustrative embodiment I/O control modules, however, have a common power supply, and they have common receivers and drivers which are located physically in the rear rack. If a less than full complement system contains one I/O control module, it is located in the rear rack.

*Signal flow*

An I/O Module will do the following:

(1) load the descriptor base address register when a set-up descriptor is received.
(2) set up I/O operations when a command descriptor is received. The module goes busy.
(3) return an in-process descriptor to the A list designated in the memory by the Automatic Operating and Scheduling Control Method.
(4) send a result descriptor to the Automatic Operating and Scheduling Control System C list. The result can be a complete result or a partial result with provision for finishing the processing at some later time.
(5) go non-busy when a release descriptor is received.
(6) provide odd-parity generation and checks.
(7) start a terminal device if proper conditions exist.
(8) provide requests for data (to input devices).
(9) answer requests for data (from output devices).
(10) enter status information when a status signal comes from an I/O device.
(11) provide timing and control for loading and unloading descriptors and data.
(12) provide asynchronous to synchronous conversion for synchronizing operations with I/O device timing.
(13) provide necessary logic for switching interlock functions.

A full discussion of the I/O control module is given in the incorporated by reference aforementioned patent application for A Data Processor Input/Output Control System of Pezely, Sichel, Hallman and Perkins.

A brief discussion of each of the units in the block diagram of FIG. 35 follows.

*I/O module receivers*

The I/O module receivers (not numbered) accept input information, information crosspoint, and descriptor crosspoint lines from the memory modules M1–M16. Also, the receivers accept character strobe, status, device available, and data lines which interconnect the terminal devices and I/O control modules and access signals from the other I/O cabinets. The output signals are essentially the same as input signals.

*Memory input selector*

The memory input 516 provides 16 standardized memory select signals as determined by the presence of information and/or descriptor crosspoints.

*Memory input selection gates*

The memory input selection gates 517 provide the input data channel signals from the bits from memory modules M1 through M8 and from the bits from memory modules M9 through M16 under the control of the output signals from the memory input selector 516.

*Descriptor channel inputs*

The descriptor channel inputs 519 accept descriptor information bits from the memory and form the 12 descriptor channel input bits from memory signals. Also, this section accepts simulation switches for data signals SBB1 through 12. The output signals are the descriptor channel input bits to memory.

*Input parity checker*

The input parity checker 534 checks the parity of the characters from the input devices and generates a signal (PET) if parity is not correct.

*Information channel input*

The information channel inputs 541 accept information bits from the memory modules M1–M16 and from the 12 information channels input bits form memory signals. This section also accepts simulator switches for data signals SBB1 through 12. The output signals are the information channel input bits to memory.

*Output parity generator*

The output parity generator 542 generates parity for character output to a Terminal Device. Inputs consist of the first six data output channel bits.

*Output selection gates to memory*

The output selection gates to memory 526 select syllables of the descriptor register or the information register for transfer. Information input signals are the 48 bits from the information register and the 48 bits from the descriptor register.

*Output register I/O to memory*

The output register 527 holds the output register bits which can be memory address, descriptors, or information, until they are sent to the I/O control module line drivers 528 for transfer to the selected memory module of modules M1–M16.

Input information signals consist of the output syllable selection from the descriptor register or the information register, and the memory address. Input control signals consist of an indication that switch logic is active in modes wherein access is allowed or that access is gained to one of the Memory Modules M1–M16.

*Device selection*

The device selection block 530 includes the device decoder (not shown) and the availability matrix (not shown). The inputs to the availability matrix for input devices consist of even device decode signals, odd output device available signals and the availability matrix for output devices output signals. The device number field of the command descriptor is decoded and buffered in the device decoder. The output signals are the even device selection numbers between 0 and 62. These outputs go to the availability matrix for output devices, to the availability matrix for input devices, and to other networks. The output of the availability matrix indicates that the selected device is available or not available.

*Terminal equipment input selection gates*

The terminal equipment input selection gates 532 develop the seven terminal data input channel bits which result from bit inputs from I/O input device receivers and from the device selection network.

*Module comparator*

The module comparator 521 compares the module number from the unit designator with the I/O Module field of a release descriptor.

*Information register*

The information register (IR) 524 holds 48-bit information words during transfer from memory modules to terminal devices and information words as 6-bit characters during transfer from terminal devices to memory modules. Input signals consist of the information channel input bits, the simulation signals, and two character buffer output bits. The characters in the IR are shifted left in the register, six bits at a time, each time a character enters. Simulation syllables can be set into the IR.

*Parity generator and checker*

The parity generator and checker 520 develops an output which is used as the parity error signal on input from memory or the parity bit on output to memory.

*Memory module address and parity selection gates*

The memory module address gates 523*a* control the transfer of the memory address to the output register. The network selects the address from either the BAR 511 or the descriptor 514 registers. The parity selection gates transfer the parity bit to the output register as the fifth syllable transfer.

*Terminal equipment output data gates*

The terminal equipment output data gates 543 control the data output to the terminal devices. When the terminal data output channel bits are present along with appropriate device decode control signals, the gated resultants are the data bits to an output device.

*Control and parity register*

The control and parity register 512 has three functions: the storing by syllable of memory inputs, descriptors, and information, parity checking of inputs from memory to I/O, and parity generation for outputs from I/O to memory.

*Two character buffer*

The two character buffer (TCB) 523 accepts inputs from the terminal equipment for transfer to the information register 524 or inputs from the information register 524 for transfer to the terminal equipment data output lines 522 to expand the available memory access time.

*Information register to terminal equipment output gates*

The information register to terminal equipment output gates 525 select appropriate bits from the information register 524 and two character buffer 523 responsive to a counter (not shown) which controls transfer for transmission to Terminal Devices.

*Drivers*

Drivers 528 and 544 standardize all signals prior to their leaving the I/O Module.

*Descriptor register*

The descriptor register 514 holds the I/O instruction word (descriptor) in use at any given time. After accepting an instruction word from memory, the descriptor register controls the operation of the I/O control module until the operation has been completed. The descriptor register 514 is composed of 48 flip-flops and associated gating. Input signals are listed according to field breakdown.

*Word counter*

The word counter (not shown) is counted down once for each data transfer to or from memory. It contains the number of words pertinent to the specified operation and when it has been counted down to zero, the operation is complete. The counter can be incremented for a specific operation under control of a terminal device.

*Block counter*

The block counter (not shown) operates similar to the word counter in that it contains the number of blocks of words pertinent to a specified operation. It is counted down under control of a terminal device and when it has been decremented to zero, the operation is complete.

*Status*

The status portion of the descriptor register 514 is allocated to record the successful completion of an operation or the reason for an unsuccessful completion. Three bits (DR17–19) are under the control of logic internal to the I/O control module, and three bits (DR20, 37, 38) are under the control of logic internal to the terminal device.

*Address counter*

The address counter (not shown) is counted up once for each data transfer to or from memory. It contains the current memory location and module number to or from which data transfer shall occur.

*Device and order code*

The device number portion (DR39–44) of the device and order code contains the number of the terminal device that is to be used for the operation specified in the order code. The order code portion (DR45–48) of the descriptor register 514 is allocated to control instructions to the terminal equipment and varies with the device assigned.

*I/O unit designator*

The I/O unit designator 550 develops the control signals which allow priority resolution between modules in a cabinet, and it also provides the I/O control module number which selects the two memory locations in the descriptor list assigned to the I/O control module.

A detailed description of operation of the I/O control module including additional tying in details of the descriptors follows:

I/O CONTROL MODULE (DETAILED DESCRIPTION)

Referring to FIG. 35, there is shown a block diagram of an input-output control unit of the system. A maximum configuration comprises ten such input-output control units for each of I/O exchange busses A and B hereinbefore described. Consider the configuration where there is only one bus, bus 1, for I/O exchange A, to which is connected ten input/output control units. The input/output control unit is provided to service descriptor requests only. In particular it services command descriptor requests.

There are five kinds of descriptors. The command descriptor is the descriptor which is executed by the input/output control module I/O 1–I/O 10 or I/O 11–I/O 20. The command descriptor is one of three types of descriptors generated by the automatic operating and scheduling control system. The other two types of descriptors are the set-up descriptor and the release descriptor. The set-up descriptor establishes the descriptor base address register location, which location is emptied into descriptor BAR unit 511 of FIG. 35. The release descriptor generated by the automatic operating and scheduling control releases a busy I/O module for operational use. The method of doing this is that the release descriptor is received in the control and parity register 512 and resets all of the control flip-flops in the master control unit 513 and resets the descriptor register 514.

In addition there are two other descriptors generated by an I/O control module. These are the in process descriptors and the result descriptors. The in process descriptors tabulate those I/O command descriptors which are in process. They are generated when a command descriptor is initially started to be carried out and they are rewritten into memory by the next successive command descriptor. They are erased by inserting in place of the last in process descriptor word for a particular input/output control module, the next in process descriptor which occurs. A result descriptor is generated by the input/output control module at the termination of a descriptor operation. The result descriptor designates the successful or unsuccessful operation achieved for a command descriptor and the reasons why in the case of a non-successfully terminated descriptor.

A transfer input/output instruction (TIO) which comes from the automatic operating and scheduling control together with a command descriptor initiates each I/O control operation. The instruction word from the AOSC includes the address of a command descriptor in memory which initiates this operation. All transfer of data to or from a terminal device is controlled by a command descriptor which is normally transmitted by a computer P1, P2, P3 or P4, which executes a conditional TIO instruction. If all the input/output control modules of a bus to which the command descriptor is attempted to be transferred are busy, the computer which was caused to go into operation by the automatic operating and scheduling control system transfers control to the address specified by an $O_3$ syllable (to be explained hereinbelow) in the transfer input/output control instruction.

Assuming that the I/O control bus is not busy, the command descriptor is enabled to come from memory onto the I/O control bus. The descriptor word is placed into the descriptor register 514 of the first I/O control module which is not busy. The I/O control modules for each I/O exchange bus are arbitrarily selected in an order of preference, the maximum being 10 modules in from 1 to 10 order. The way in which selection of an I/O control unit to accept a descriptor occurs is that the I/O's are scanned in this arbitrary order, and the first numbered I/O control unit which is not already busy is selected. The word busy in the previous sentence means that although the bus at this point is not busy, a higher arbitrarily numbered I/O control module may be busy in the sense that it is transferring to or from an input or an output device. However, the bus is not busy and the first or highest order I/O control module which is not already busy with an input or output device is the first non-busy I/O control module, selected to receive the command descriptor word. That is there are two meanings of the word busy herein. The first meaning is that access to the bus cannot be gained. That is, access to the bus can be gained in the switch interlock only when the entire ten I/O control units are not on the air on this bus. The second busy condition refers to the individual input/output control module which may or may not be busy with an input or an output device. Assuming that the input-output bus is available then the lowest arbitrarily numbered non-busy input/output control module is selected to receive the descriptor word in descriptor register 514.

Refer to FIG. 36, the command descriptor format.

The command descriptor is a 48 bit word. The 48 bit command descriptor comprises a word count (bits 1 to 12); record count (bits 13 to 16); memory module number (bits 21 to 24); memory address (bits 25–36); device number (bits 39–43); instruction type (bits 44 and 45); and instruction modification (bits 46 to 48).

The word count portion of the descriptor corresponds to the number of memory words which are going to be utilized to execute the command.

The record count refers to the situation wherein instead of words, records are going to be counted. This, for example, might occur on a tape unit wherein a certain number of words will appear with spaces therebetween to make up each record, and where 16 records, for instance, might make up a complete tape. Where the command descriptor involves taking such groups or records from an input unit, the bits 13 to 16 comprising the record count specify how many will be taken. With the four bits up to a maximum of 16 records may be taken from an input device.

The memory starting address shown in FIG. 36 from bit 21 to bit 36 comprise bits 21–24 and bits 25–36. Bits 21–24 define the memory module number to identify which one of the 16 memory modules M1–M16 from which the command descriptor is going to effect a read or into which the command descriptor is going to effect a write.

The memory address bits 25 to 36 portion of the memory starting address bits 21 to 36 form the address in the particular memory module selected at which the operation is started.

The device number given by bits 39 to 43 and which group may be taken as further comprising bit 44 gives the number of the input or output device selected. Bit 44 tells whether it is an input or an output device. For example, a zero in bit 44 indicates an output device and a one indicates an input device. The five bits 39 to 43, inclusive, tell which numbered one of the 32 inputs or which numbered one of the 32 output devices is involved. The total complement 64 input and output devices comprise a total complement of 32 input devices and a total complement of 32 output devices. The 32 input devices are arbitrarily numbered from 1 to 32, inclusive, and the 32 output devices are numbered arbitrarily also from 1 to 32, inclusive. The device number with bit 44 constitutes a six bit device decoder of the 64 arbitrarily numbered input and output devices. By virtue of bit 44 all odd numbers (numbers which terminate in a one in the 44th bit position) are made input devices and all even numbers (numbers which terminate in a zero in the 44th bit position) are output devices. The 45th bit determines whether the input/output device is both an input and output device, or just either one. If the 45th bit is a one the device is both an input and output device or two-way device, and if a zero, the device is a one-way input or output device. The operation code or instruction modification bits 46–48 refer to the specific I/O device involved. For example, if the device were a punch, bit 48 would determine whether it were to punch data or tape leader.

The five different types of descriptors set-up, release, command, in process, and result descriptors have been enumerated also hereinabove.

Refer again to FIG. 35 which shows the block diagram of an input/output control module. When a command descriptor is received with this input/output control module being the lowest numbered, available, non-busy module, when input is received on the bus of its I/O Exchange group, the command, if it is a descriptor, is received in the cross point circuitry which is contained in the I/O control module itself. The initial entry point, if a descriptor is received, is into descriptor XPD gate circuit 515. The information then is fed into the memory input select device 516 which enables the memory select gates 517.

The descriptor command received in the descriptor XPD unit 515 is a control signal XPD. This is a one bit signal which occurs prior to a descriptor being sent and is initiated by the memory modules M1–M16 which is about to send the descriptor. The XPD control bit causes the memory input select unit 516 to open particular gates of the memory select gates unit 517. There are 16 descriptor XPD gates in unit 515, one for each of the memory modules M1–M16. Therefore, the memory module sends the XPD signal through the correct descriptor XPD 515 gate to cause the memory select gates 517 to open so as to receive the descriptor word from the particular memory module which is sending this descriptor word. The memory in circuit 518 comprises 12 receivers for each of the 16 memory modules M1–M16 or 12 times 16 receivers. The receivers are double inverter units. After double inversion, the receivers of the memory in circuit 518 restore the signal input. This signal input is fed in from memory in circuit 518 through the memory select gates 517 which were enabled by the XPD signal for that memory module. The descriptor word then is fed through the descriptor channel inputs circuit 519 into the descriptor register 514. The 48 bits of the descriptor word therefore comes in, syllable by syllable, or 12 bits at a time ino the descriptor register 514. The 49th parity bit is channelled into the control and parity register 512. In the event that the parity bit indicates an error the control and parity register 512 causes the parity generator and check circuit 520 to inform the descriptor register by inserting the proper bits into the descriptor status portion. Bits 17–20 comprise the status portion bits of the descriptor.

The control and parity register 512 operates in two ways. In the first way as a parity register, it examines each twelve bits of each incoming syllable and it compares with the parity bit to check for parity error. It also operates as a control register in that as each incoming descriptor is sent to it, the control and parity register 512 discriminates and determines whether the incoming descriptor is a command descriptor, a setup descriptor, or a release descriptor. If the descriptor has selected the input-output control module of FIG. 35 as the first non-busy input-output control module, the descriptor goes directly into the descriptor register 514. However, every one of the I/O control modules receives the setup descriptor in its control and parity register 512. The setup descriptor changes the descriptor base address register (BAR) 511 in accordance with the setup descriptor.

The release descriptor is on a module basis. Therefore, when the control and parity register 512, when operating as a control register, decodes the descriptor as a release descriptor, the control and parity register 512 then examines the module comparator 521 and if an output results, the I/O control module goes through the normal release procedure to be described hereinbelow wherein the flip-flops in the master control unit 513 are reset and the descriptor register is reset 514.

A release descriptor occurs when the program wants to release a busy input-output control module for operational use. This enables program control by the programmer deliberately deciding to release the input-output control module for a specific purpose. Even if finished with an operation, the input-output control module cannot release itself, there must be a specific instruction stored in the automatic operating and scheduling control which releases the input/output control module before it can operate on a new descriptor.

Normally, a release descriptor occurs after a result descriptor has been generated by the input-output control module indicating that it has finished an operation. In such case the release descriptor is required to reset the descriptor register and to reset the input-output control module so that it can accept a new descriptor.

However, the inventive system also provides for the eventuality that even if all input-output control modules are busy or this particular one is busy, the programmer may wish to have a particular descriptor operated on and may insist that whatever is being done be terminated. This eventuality is taken care of by the release descriptor which will interrupt even if the input-output control module is still busy and has not sent a result descriptor indicating that it has completed an operation.

In this case the result descriptor indicates the portion of the operation already completed so that after the interruption has been effected operation can be resumed. Here, the result descriptor provides a bit in the status portion which provides the information that although the I/O control module had commenced and was interrupted, the I/O control module had not finished the operation assigned to it. Then, after the interrupt, the automatic operating and scheduling system must retransmit a descriptor which starts the interrupted operation where it had been left off.

After the descriptor register 514 has received the command descriptor, the portion of the descriptor containing the input or output equipment address number is decoded and a signal is sent to the terminal equipment data output channel 522. The device number which is to be selected to be read into or read out of is decoded by decoder means (not shown in FIG. 35) and a start signal is sent to the selected device.

Assume the selected input or output device is an input device. Assume the decoder (not shown) enables the receiver in the devices in circuit 531. This actuates the terminal equipment select gates 532. The device selection unit 530 signal enables one set of 32 gates of the 7 times 32 gates responsive to the 7 times 32 receivers from the inuput devices. Information comes through the devices in gates 531 and through the terminal equipment select gates 532 into the two character buffer (TCB) 533. The information comes in seven bits at a time, six being data bits and one being a parity bit. The parity bit is channelled into the input parity check unit 534. This parity bit is a control bit fed into the input parity check unit 534. Input parity check unit 534 compares the parity bit with the input character. If an error occurs a signal is sent to the status portion of the descriptor register 514. That is, the parity error terminal control line output (PET) of the input parity check circuit 534 in the event of error introduces a bit into the status portion of the descriptor register 514 which stops operation. Any such parity bit set into the status portion of the descriptor in the descriptor register 514 sends a result descriptor back to its assigned location in memory which causes an interruption of this operation. The automatic programming and scheduling loop for this occurrence is then involved.

That is upon the device being selected, one of the 32 lines of device selection unit 530 is activated. This in turn activates one of the 32 groups of 7 terminal equipment select gates 532. The data then is fed into the two character buffer 533. Simultaneously the descriptor register 514 requests access to memory through the memory module address and parity select gates 523*a* to request access to memory. This is done in order to send an in process descriptor to memory.

The in process descriptor is the command descriptor which is currently in the descriptor register 514 and which returned to the in process portion of the descriptors in memory. That is, it is an in process descriptor because it is located in the in process section of descriptors in memory.

The information is fed into the TEC two character buffer 523 one character at a time. From the two character buffer the information is loaded a character at a time into the information register 524.

To save time the two character buffer 523 requests access to memory prior to unloading the 7th and 8th characters into the information register 524. Upon loading the 9th and 10th characters into the information register 524 if, at the time of transfer of the 9th and 10th characters from the two character buffer 523 the contents of the information register 524 have not been unloaded into memory then operation halts and a dump signal is initiated by the 10th character in the two character buffer 523.

When access has been gained to memory, the contents of the information register 524 are shifted out serially, 12 bits or one syllable at a time through output selection gates to memory 526 and through the output register (I/O to memory) 527. From the output register input/output control to memory unit 527 through input-output control module line drivers 528, the information is sent directly to the memory at the memory module indicated.

As described in conjunction with the memory module description hereinabove, the memory module address signals and the memory address and information signals comprise the four bit address of the particular memory module (not shown in FIG. 35). There are 18 lines going from the input-output control modules to memory which comprise the request bit, the read level bit, four lines indicating the memory module address and 12 bits or lines which on the first twelve bit transfer are the memory address and on the succeeding transfers of twelve bit signals are the information to be read into memory. These are in groups of four data syllables of 12 bits each.

The command descriptor register 514 comprises 48 flip-flops (not shown) of which the first 12 comprise a word counter (not shown). This word counter is capable of counting in either direction. The word counter portion is down counted on every memory transmission operation between the I/O control unit and the memory device being addressed. Bits 13 through 16 of the description register 514 comprise a record counter which counts down one for every "end of record" signal from an input device. The memory starting address portion comprises 16 bits, the first four of which provide the memory module address and the next 12 of which comprise a memory starting address counter. These 12 bits are counted up from the starting address in memory. Counting occurs once per memory transfer between the memory module of memory modules M1–M16 selected and the I/O control module of FIG. 35. A description of the descriptor register is provided in the aforementioned co-pending patent application for A Data Processor Input/Output Control System of Pezely, Sichel, Hallman and Perkins.

Operation ceases when the word counter reaches zero.

Assume that an output device has been selected by the descriptor. At the end of the cycle of transmission of the in process descriptor (see FIG. 37) to memory, access is gained to memory to read in the first data word into the information register 524. As in the case of the descriptor XPD 515, an XP signal is received into the information cross point unit 540 which causes the memory input select device 516 to open appropriate memory select gates 517 which enables one of the 16 groups of 12 bits each of receivers in the memory in unit 518. Upon being enabled the group in memory in unit 518 sends output through the memory select gates 517 into the information channel inputs unit 541. The information is fed 12 bits at a time serially into the information register 524 from the information channel inputs unit 541. The 4 serially transferred groups of 12 bits each are fed through information channel input 541 to provide a 48 bit word into the information register 524. At the fifth transmission time the parity signal is placed into the control and parity register 512. In the transfer out operation the word is transferred from the information register 524, six bits at a time into the information register to terminal equipment output gates 525. Six bits or a character at a time are sent into the terminal equipment data output channel 522. At the same time that the information is fed a character at a time to the terminal equipment data output channel 522, the output parity generator 542 generates a parity signal which is fed into the terminal equipment data output channel 522. This is the 7th bit which is added to the 6 bits of data for each character and which is sent out from the terminal equipment data output channel 522 into the terminal equipment output data circuits 543. From terminal equipment output data circuits 543 this information is fed into the input/output control module line drivers 544. From I/O control module line drivers 544 the information is sent to the output device selected of the 32 output devices. Selection of the particular output designated is accomplished by device selection from device selector 530 which feeds the appropriate signal to actuate the appropriate terminal equipment output data circuits 543 to enable channelling to the proper device. The terminal equipment output data circuit 543 comprise 32 circuits of seven gates each to select the output unit designated.

Upon the transmission of the 6th character to the output device from the information register 524, the 7th and 8th characters are dumped into the two character buffer 533 and memory access is requested to bring over the next word. That is in feeding information into an output device as contrasted with the input situation, the first six characters are transmitted from the information register 524 through the information register to terminal equipment output gates 525 and thence into the output device. The 7th and 8th characters are not sent from the information register 524 to the information register to terminal equipment output gates 525 but instead take the alternative path shown by the dashed lines 546 and 547 going via the two character buffer 533 to the information register to terminal equipment output gates 525.

The conditions under which the I/O control module requires access to memory are:

(1) to require a data word from memory;

(2) to insert a data word into memory;

(3) to send an in proess descriptor to memory; and (4) to send a result descriptor to memory to indicate that the I/O control module has completed a command descriptor operation.

Each time a result descriptor is generated by an I/O control module (one of modules I/O 1–10 or I/O 11–20), a computer interrupt signal is sent to each of the computer modules P1, P2, P3 and P4 indicating that the computer module can now examine the result descriptor. That is, the computer P1, P2, P3 or P4 will see whether or not there was a successful completion of the descriptor operation from the result descriptor, i.e., that there was no parity error or malfunction of the input/output terminal device.

There are three steps which must occur to gain access to memory by the I/O control module. These are:

(1) a determination must be made that there is present one of the four (4) request conditions, set forth in the last paragraph, namely, to reference a data word from or require a data word in memory or to want to send into memory an in process or a result descriptor;

(2) the input/output control module must gain access to its bus (to memory) from the other I/O control modules of its I/O Exchange (A or B);

(3) if the above two steps have been followed, the I/O control module of modules I/O 1–10 or I/O 11–20 must get access to a particular memory module selected from modules M1–M16.

Input/output access to memory is governed by a system of priorities which comprises:

(1) That either the I/O control module has priority or it does not. This is established by the particular input or output unit with which the input/output control module is communicating. Actually, it is established by the program, and comes over as a bit, for example, bit 37, in the descriptor received from a computer;

(2) The second basis of access to the I/O bus from a group of I/O control modules to memory is on the basis of an arbitrary predetermined order of I/O control modules numbering from I/O 1 to I/O 10 and according priority of the input/output (I/O) control module or unit of a particular I/O exchange A or B. In order to gain access to the bus from I/O to memory, the particular I/O control module attempting to gain access must encounter a condition that no lower numbered I/O control module with priority is requesting memory;

(3) The third basis of access is that no other module is connected to memory, and (4) The fourth basis of access is that no descriptor transmission is occurring.

In the third condition that no other module is connected to memory, the particular I/O control module which wishes to gain access merely looks at all other input/output control module lines to see that there is transmission occurring. However, in the case of the descriptor, the I/O control module has no way of telling when a descriptor is to come from one of the computers P1–P4. Therefore, if a descriptor is being transmitted, although the communication lines may be low, a command descriptor may be being sent out from a computer at this instant. Therefore, in this condition, the I/O control module must be inhibited from gaining access to the bus.

The above 4 steps are for the case where a particular I/O control module wishes to gain access to the bus from I/O to memory as a priority A request. In the case where the I/O control module has no priority, it must fulfill the following four conditions:

(1) no priority A input/output control modules are requesting access to the bus;
(2) no lower numbered priority B I/O control modules are requesting access;
(3) no other module is connected to memory; and
(4) no descriptor transmission from a computer is taking place.

Referring to FIG. 41, FIG. 41 is a logical diagram of the circuit which sets the state of an RC or request conditions flip-flop under FF41 which is provided. The circuit of FIG. 41 provides means whereby the RC flip-flop is set in the one state to permit access to the I/O to memory bus (Bus 1 or 2) to occur. Refer also to FIG. 42. A request memory access flip-flop FF42 is provided. When the RC flip-flop FF41 is in the "one" state which is the state shown in FIG. 41, the request conditions exist such that it is possible to enable to set the RQ or request memory access flip-flop (FF42 of FIG. 42) into the "one" state and gain access to the bus from I/O to memory. The conditions labelled (1), (2), (3), (4), (5) and (6) in FIG. 41 are those involved in setting the RC flip-flop FF41 to the "one" state.

Continue to refer to FIG. 41.

Access to memory is required for one of the following 6 conditions which correspond to the 6 condition AND gates, 1, 2, 3, 4, 5 and 6 of FIG. 41. These AND gates 1, 2, 3, 4, 5 or 6 are enabled respectively to enable OR gate O41 and hence set flip-flop FF41 to the state shown in FIG. 41 under the following corresponding respective enabling conditions:

(1) the first reason for gaining access is that a result descriptor is to be sent from the I/O control module to memory;
(2) to request the first data word for an output device; this occurs during the in process descriptor return cycle;
(3) to obtain all subsequent data words for the output device;
(4) to send out an in process descriptor;
(5) the special case of sending out a result descriptor indicating power failure in the I/O control module; and
(6) to return all data words to memory from an input device.

The legend on the drawing of FIG. 41 for the encircled numbers is as follows:

(1) RESULT DESCRIPTOR
(2) First Data Word for Output Device (occurs during In Process Cycle)
(3) All Subsequent Data Words for Output Device
(4) In Process Descriptor
(5) Special Case of Result Descriptor for Power Failure
(6) All Data Words From Input Device Refer to FIG. 42, which shows the request memory access flip-flop FF42 and the logical circuitry responsive to the FIG. 41 request conditions existing and to remaining conditions whereby access from I/O to the memory bus is obtained. OR gate 541 is responsive to indication that no lower priority Exchange A modules are trying to gain access to the I/O A to memory bus. The inputs come from each of the other four I/O modules containing cabinets of cabinets IC/A–IC5AV (see FIG. 3*b*) to indicate this condition. One line PA* is from the other module in the illustration herein described I/O control module cabinet. The circuit of OR gate O542 generates a high output where there is no priority "A" from any cabinet. These are signals just received from the other 4 I/O cabinets. This is the case where the I/O control module trying to gain access is a priority "B." If this line is activated and a priority B request is going out from the control module then in addition the NLPB line must be activated to activate AND gate A541 and allow setting of the request memory access (RQ) flip-flop FF42. Line NLPB when in AND gate A541 enabling condition, indicates that no lower priority B module is requesting access and the inputs to OR gate O543 are from the other four cabinets and the other module in the same cabinet PB*.

An OR gate O544 circuit is provided. OR gate O544 is activated when an indication on each of the RQ (request memory) lines is received indicating that no other I/O control module has gained access of the I/O to memory bus. When either of AND gate A542 indicating no lower priority A module is attempting to gain access or AND gate A541 indicating that no lower priority B module is trying to gain access in the case of a priority B request from the module under consideration, then by means of OR gate O545, the RQ or request memory access flip-flop FF42 is set to enable access to the I/O to memory bus line to occur.

Now refer to FIG. 43 which shows the computer interrupt circuit for any of the I/O control modules I/O 1–I/O 10 or I/O 11 to I/O 20 where present.

The computer interrupt is generated during the return result descriptor cycle. In conjunction with the automatic operating and scheduling control system, the computers P1–P4 send out three types of descriptors:

(1) a setup descriptor which changes the base address;
(2) a command descriptor which provides an operational instruction by virtue of which the input/output control module performs the operation, and
(3) a release descriptor which in effect says to the I/O control module herein described, "go from busy to non-busy status."

The term busy as used in conjunction with the I/O control modules does not means necessarily that the I/O control units are working on an operational instruction, but it refers merely to the state of the busy flip-flop (not shown) which upon an operational instruction being given is set by the cross point D signal or XPD signal which is applied to the first non-busy I/O control module. This busy flip-flop (not shown) is set by a release descriptor sent from a computer module in accordance with an instruction furnished in effecting the automatic operating and scheduling process. As stated, the I/O control module when it completes an operation remains busy until a release descriptor is received. The I/O busy flip-flop (not shown) will be reset, that is, the busy signal will terminate upon receipt of a release descriptor.

The release descriptor is on an I/O control module basis. That is, the release descriptor is addressed to a particular I/O control module of the set in a particular input/output exchange, I/O 1, 2, 3, 4, 5, 6, 7, 8, 9, or 10 or I/O Exchange A or I/O 11, 12, 13, 14, 15, 16, 17, 18, 19 or 20 of I/O Exchange B where used in the system. In normal operation first a setup descriptor is sent by the computer, in conjunction with the automatic operating and scheduling control system. After this, a release descriptor normally is sent to the first I/O control unit. Then, a command descriptor is sent to that I/O control unit. As the object program requires input/output operations modules are successively released and command descriptors sent in. If the automatic operating and scheduling control system desires to initiate an input/output operation, and there are no non-busy or non-actively-engaged modules at this time, and this is established by an examination of the result descriptor list in memory, the operating and scheduling control has the option of interrupting one of the current operations by sending a release descriptor. If the control does not wish to interrupt one of the currently engaged operations, it must wait until a result descriptor has been returned as signified by the computer interrupt signal generated by the input/output control module.

When an operation has been completed by an I/O control module, it sends a result descriptor back to the portion in memory which contains the result descriptors. At the same time that the I/O control module sends the result descriptor, it generates an interrupt signal which goes to all of the computers P1–P4. The computer P1–P4, before it sends out a release descriptor, scans the result descriptors in memory to see if there is an available I/O control module. When it scans the result descriptors, the computer module P1, P2, P3 or P4 which is assigned to perform an automatic operating and control function scans the result descriptors to see if an I/O control module is present which has successfully completed its assigned operation.

Upon determining from the result descriptor portion in memory that an I/O control module I/O 1–I/O 10 or I/O 11–I/O 20 has successfully performed its last operation, the computer P1, P2, P3 or P4 selects that I/O control module to send a release descriptor to. The method by which the computer P1, P2, P3 or P4 determines which module has returned the descriptor is as follows:

Refer again to FIG. 35, the I/O control module block diagram.

The descriptor base address register 511 contains 16 bits, the first 11 of which are the base address as established by the operating and scheduling control process and the next four bits of which are the I/O control module number (of number 1 to 10 on this I/O memory bus), and the last bit of which is the state of a descriptor return control flip-flop (not shown) in the I/O control module. This descriptor return control flip-flop (DRC) is initially in the "zero" state. The descriptor return control flip-flop when in the "zero" state causes the entire descriptor number to be even and refers to an even location in memory. In the "one" state, it refers to the next succeeding odd location in memory. Each even location therefore, contains the in process descriptors which are initially sent out from the I/O control modules I/O A1–I/O A10 or I/O B1–I/O B10 upon receipt of each command descriptor. When finished the I/O control module sends out the result descriptor which is contained in the succeeding odd location in the result descriptor portion of memory. The first 11 bits in the descriptor base address register 511, therefore, are the descriptor base address, the next four bits are the I/O control module number, and the last bit indicates whether it is an in process descriptor, if in an even location, or a result descriptor, if in the next succeeding odd location. Therefore, in scanning, first reading in the result descriptor portion of memory is effected, and if there are no descriptors in the odd locations, then each of the I/O control modules is currently engaged in some operation. If there is a number rather than an empty in an odd location, this indicates that the particular I/O control module which has sent out the next prior even location in process description has completed its operation. Therefore, the result descriptor must be examined to indicate whether the I/O control module has completed its operation successfully. This is indicated by looking at the status portion of the result descriptor (bits 17–19 of FIG. 40). Assume that this operation has been completed successfully. Then the computer P1, P2, P3 or P4 which is doing the scanning sends out a release descriptor addressed to that I/O control module.

Summarizing when a command descriptor is sent out from a computer P1–P4 to the first available I/O control module, that I/O control module sends an in process descriptor to memory. On receipt of the computer interrupt signal the automatic operating and scheduling control system then scans the result descriptor portion of memory and examines the result descriptors (see FIG. 40). The first result descriptor which has a non-empty following descriptor indicates that an operation has been completed. Upon scanning the status portion (bits 17–19) of this result descriptor, it can determine whether successful operation has occurred. If so, this particular input-output control module is available for a next operation which is assigned by the automatic operating and scheduling control to a computer module P1, P2, P3 or P4 which initiates a command descriptor to that I/O control module upon need.

Refer again to FIG. 43.

In the circuit of FIG. 43, the crosspoint flip-flop FF551 in the I/O control module is set by the arrival of a crosspoint signal XP from memory. The crosspoint signal XP is the signal which indicates, that the I/O control module has gained access to memory. Access has been requested by the I/O control module so that it can return a descriptor to memory, for example, an in process descriptor. Therefore, any time access is gained to memory, the crosspoint control flip-flop FF551 is set to the one state shown. However, the $ILC_nRD$ signal is desired only when a result descriptor is being returned.

The legend for the inputs to AND gate A551 is as follows:

DRC=indicates return descriptor (least significant bit of base address register)
DTC=indicates descriptor rather than data
$\overline{TER}$=not release descriptor The crosspoint flip-flop FF551 is set every time access to memory is obtained by virtue of the crosspoint signal XP through AND gate A552 and through OR gate O551. The other four gate inputs to OR gate O551 are for test only, as indicated on the drawing. However, a distinction is made between accessing memory for (1) a data transmission, (2) as in process or (3) a result descriptor. AND gate A551 does this. One input to AND gate A551 is the ONE side of flip-flop FF551. The other inputs which must be present are DRC which indicates a return descriptor, DTC which indicates that a descriptor rather than data is being returned and $\overline{TER}$ which means that the signal is not a release descriptor. Thus the four conditions are (1) access to memory indicated by AND gate A552 in response to the crosspoint signal XP, (2) a return descriptor signal from the least significant bit of the base address register 511 (FIG. 35) which is a ZERO for an in process descriptor and a ONE for a result descriptor, (3) the DTC signal which comes from a first DTC control flip-flop (not shown) whenever a descriptor rather than data is being returned from the I/O control module and a signal from a second TER control flip-flop (not shown) $\overline{TER}$ which is always in the high state when a release descriptor has not been received.

The release descriptor can find the I/O control module in one of two states when sent out: (1) The I/O control module has completed an operation and is waiting to be released, or (2) The I/O control module is actively engaged with a terminal device.

A result descriptor is sent back under the following conditions: (1) when the operation is completed successfully, (2) when the operation is completed unsuccessfully or (3) when the I/O control module receives a release descriptor while it was actively engaged. That is, either the job is finished, or an error occurs, or an actual interrupting of an in process job has been effected.

The TER flip-flop (see FIG. 43) is put in the ONE state by a release descriptor. It is not desired to generate an interrupt if the automatic operating and scheduling control is already in the control mode. If a release descriptor has been sent to the I/O control module the automatic operating and scheduling control system is in the control mode, and need not be interrupted to reset it into the control mode. The TER signal prevents the computer from being interrupted after it knows already that it has sent a release descriptor and that a result descriptor is coming back. The computer wants to be informed only when a result descriptor is coming back for some reason other than the reason than that which the release descriptor was sent. For this reason the TER terminate flip-flop (not shown) is set each time a release descriptor is received from a computer. A signal is desired to be sent in only when the I/O control module is in the system and AND gate A555 has another input marked MM in order to permit placing of the I/O control into the test mode. The signal is applied through OR gate O552 in the four conditions indicated and is OR'ed with signals from the other I/O control module in the cabinet. The $ILC_nRD$ signal therefore indicates that the other I/O control module in the cabinet is returning a result descriptor. In this signal $C_n$ refers to the cabinet for the particular I/O control module (not a computer).

At the computer itself there is an OR gate responsive to signals of each of the five I/O cabinets IC1–IC5 (see FIG. 3B). At output to this OR gate the signal indicates computer interrupt. The same $ICL_nRD$ signal is sent simultaneously to all four computers.

By the setting of the mask interrupt mask register the automatic operating and scheduling control determines which of the four computers P1, P2, P3, or P4 is going to do something about the result descriptor being received.

INPUT/OUTPUT CONTROL

Refer to FIG. 44. FIG. 44 is a flow diagram of flow of instructions and flow of data between an I/O Control Module and the other types of system units. This section defines the format of Input/Output commands and describes the control functions provided for eight terminal devices as an example of control of the terminal devices. The approach given here illustrates the flexibility for controlling other devices as well for controlling these eight.

This section also includes a description of the command codes available with each of the eight devices, as well as the meaning of the status codes that each device can set in the Result Descriptor.

This section refers to five types of descriptors, three of which are generated by the program and two of which are responses from the I/O Control Unit. A computer module operating in the control mode can cause a memory module to transmit a word to the I/O Control which will be interpreted as a Set Up Descriptor, a Release Descriptor, or a Command Descriptor. As a Command Descriptor initiates action in the device, the I/O Control Unit will transmit an In Process Descriptor to memory. Later, when the operation ends, a Result Descriptor will be returned to memory.

*Set up descriptor*

The Set Up Descriptor (see FIG. 38) is transmitted to all I/O control modules at the same time, usually as the result of an unconditional TIO instruction.

The first non-busy I/O control module will respond normally, returning a full In Process Descriptor (see FIG. 37). If no parity error exists, the location of this In Process Descriptor will be in the area designated by the Descriptor Base Address portion of the Set Up Descriptor bits 1–11. If an error exists, the location will be designated by the previous contents of the Descriptor Base Address Register 511 (see FIG. 35), which will be zero after power is turned on and before the first Set Up Descriptor is successfully received.

All I/O control modules check the Set Up Descriptor for correct parity. If it is correct, they will load the descriptor Base Address field into the descriptor Base Address Register 511. If it is non-busy but not next in line, the last syllable of the Set Up Descriptor will be loaded into the Descriptor Register 514 and returned as an In Process Descriptor to the new location. If a Set Up Descriptor is correctly received a non-busy I/O control module will set 001–000 in the Status field before returning an In Process Descriptor. The I/O control module will remain busy and must be released by a Release Descriptor see FIG. 39. If parity is not correct, as determined by each I/O control module individually, the contents of the descriptor base address register 511 will not change, and all non-busy I/O control modules detecting the error will return an In Process Descriptor with parity error status provided it reads 10001 in bits 44 to 48. Also, it will become and remain busy until released by a Release Descriptor.

*Release descriptor*

The Release Descriptor (see FIG. 39) is transmitted to one I/O control module designated by the Control Unit number determined by bits 39–42 in the format. Usually an unconditional TIO instruction is used to send this descriptor.

A Release Descriptor is used to interrupt an input/output operation still in progress, or if the operation has ended, to allow the I/O control module to accept a new Command Descriptor (see FIG. 36) if it is the next non-busy I/O control module when the Command Descriptor is transmitted.

A Release Descriptor is ignored by all non-busy I/O control modules and all units whose number does not match the Control Unit number field of the Release Descriptor (see FIG. 39). If the designated busy I/O control module detects a parity error in the Release Descriptor, it will also ignore the descriptor. If the first, non-busy I/O control module detects a parity error it will return an In Process Descriptor with parity error status information. No Computer will be interrupted because of this Release Descriptor.

Normally, a Release Descriptor is used to allow an I/O control module to accept a new Command Descriptor. Because of the possibility of losing descriptor information, an I/O control module remains busy after an operation ends. This allows the computer any length of time to examine the result Descriptor, although the computer must send a Release Descriptor after reading the Result Descriptor to allow the I/O control module to accept new Command Descriptors.

All transfers of data or initiation of some activity at the terminal device is controlled by a Command Descriptor (see FIG. 36), which is normally transmitted by a computer executing a conditional TIO instruction. If all I/O control modules are busy, the computer will transfer control to the address specified by the $O_3$ syllable in the TIO instruction.

*Command descriptor*

Command Descriptors follow the format shown in FIG. 36. These are four types of Command Descriptors specified by bits 44 and 45. These are:

| | |
|---|---|
| 0 0 | One way output device write. |
| 0 1 | Two way device write. |
| 1 0 | One way input device read. |
| 1 1 | Two way device read. |

The normal consequence of sending a Command Descriptor to the first non-busy I/O control module is for the I/O control module to engage the terminal device and to return an In Process Descriptor with 000–000 in the status field (see FIG. 37). The device then controls the rate of data transfer, if any, until a condition for ending the operation occurs. The I/O control module then releases the terminal device, returns a Result Descriptor (see FIG. 40) with appropriate status information, and interrupts a computer, which will examine the Result Descriptor and take appropriate action. If the first non-busy I/O control module detects a parity error in the Command Descriptor or if it finds the Unit available signal from the addressed terminal device is low, it will not engage the terminal device, but will return an In Process Descriptor with 111–000 (for parity error) or 001–000 (for device not available) appearing in the status field. 001–000 in the Status field also means "Set Up Descriptor correctly received" if the order code was 10001. This appears in the new descriptor address.

*In Process Descriptor*

The In Process Descriptor (see FIG. 37) will be a copy of the Command Descriptor wherever the Command Descriptor format (see FIG. 36) agrees with the In Process Descriptor format. A Release or Set-Up Descriptor containing a parity error will be interpreted as a Command Descriptor.

*Result Descriptor*

A Result Descriptor (see FIG. 40) is returned following the completion or interruption of the operation of a terminal device. At approximately the same time that the descriptor is being returned to memory, the I/O control module I/O A1–I/O A10 or I/O B1–I/O B10 sends an interrupt signal to the computer and disconnects from the terminal device. The I/O control module will remain busy unless the cause of the termination was a Release Descriptor. If not, it will remain busy until a Release Descriptor is received, at which time it will not return a Result Descriptor. The various conditions for terminating an operation are given in Section 2. A Release Descriptor never interrupts a computer.

*Interpretation of Status Information*

The In Proces descriptor and the Result Descriptor contain Status Information. The three bits of the descriptor contain I/O control module status and three contain terminal device Status. In this discussion these six bits, when written together, take the form of XXX–000 if the I/O control module causes the termination or 000–XXX if the terminal device is the cause.

*Status of the In Process Descriptor*

The In Process Descriptor will have one of three possible conditions shown. The three Terminal Device Status bits will never be set, making XXX–000 the format for this kind of descriptor. The three conditions are:

000–000 Beginning Operation. The Command Descriptor was received satisfactorily and the device was available. The operation will be underway until a Result is returned to memory. The I/O control module and the terminal device are now busy.

001–000 Device not available. The selected terminal device was either busy or not ready. The I/O control module will remain busy until released by a Release Descriptor.

001–000 also means "Set Up Descriptor correctly received" if the Order code was 10001. The descriptor is sent to the new descriptor address.

111–000 Parity Error in Descriptor. The Set-Up, Release or Command Descriptor contained a Parity Error. The I/O control module will remain busy until released by a Release Descriptor.

*Status in the result descriptor*

There will always be at least one bit set in the Result Descriptor, and either of the two forms may occur. In some instances it may be possible to have the form XXX–YYY although this should be rare if not non-existent. If XXX–YYY does occur, there are two causes for terminating the operation, either one being sufficient, and the causes may be interpreted by first assuming all X's are zero and then assuming that all Y's are zero and interpreting both according to the code shown below.

Status of the form XXX–000 is well defined regardless of device or operation. The form 000–YYY is largely interpreted according to type of Terminal Device and operation.

The status code, 001–000 should not appear in the Result Descriptor nor should 000–000.

010–000 Interrupted by Release Descriptor. The operation was ended because a Release Descriptor for this I/O control module was received before the normal ending occurred.

011–000 Word Count Equals Zero. The last word to an output device has been reached or an input device has reached the end of the allotted memory area.

100–000 No Access to Memory or Data. A request for access to memory either to read or write, has exceeded a time limit of 100 to 200 microseconds.

101–000 Power failure interrupt.

110–000 Parity Error from Terminal Device. A character has been received from the selected Terminal Device with even parity.

111–000 Parity Error in Data from Memory. A word received from memory contained even parity.

*Status control signals*

The usual meaning of the terminal device code are given below. These meanings are used on the eight devices given by way of example, and are not to be construed as limiting the scope of the invention to apply meanings to these and other input and output devices.

000–001 On read operations this code has the meaning of End of Record and last allotted record. On write operations it may have a different meaning, although none of the eight devices being designed give a different meaning on write operations.

000–010 On one way output devices, this means something is wrong, such as parity error on malfunction. On other devices it means various things.

Mag tape unit—End of file
Card reader—Input hopper empty
Magnetic drum—Drum not addressed
Card reader—No response to status control 000–001 Generally, this means unit malfunction. On the magnetic tape unit this is expanded to include other abnormal conditions.

000–100 Meaning varies as shown below:

Mag tape unit—File protected
Mag drum—Channel protected
Paper Tape Reader—Rewinding
Card punch—Illegal descriptor 000–101 Meaning varies as shown below
Mag tape unit—End of tape
Paper Tape Reader—Local test
Card punch—Punch error
Flexowriter—Off line 000–110 This is used on four devices to indicate that memory access was too slow for the device. This is used on those devices whose operation is ruined if memory access is delayed somewhat but not long enough to shut down with the 100 to 200 micro-second No Memory Access circuitry.

000–111 Almost exclusively Parity Error. In the case of the Paper Tape Reader, it is a special case of a parity error, namely as isolated Blank character.

*Flexowriter*

Provisions are made in the system to incorporate a commercially available Flexowriter as an input/output device if desired. The Flexowriter, modified to specification of the system of this invention (100 print positions) has, in addition to the printer and keyboard, a slow speed paper tape reader and a slow speed paper tape punch. The punch may be used off-line to prepare punched tape to be read by the Paper Tape Reader, or by the tape reader on the Flexowriter in place of the operator typing information into memory from the keyboard. Tapes may be duplicated at the operator's option.

When on line, the keyboard is locked until addressed by an I/O control module. There are two commands, "Read from keyboard" and "Print on 'Flexowriter'." A key on the "Flexowriter" can be used to interrupt a computer to request a "Read from Keyboard" command to be sent to an I/O control module. The instructions are:

11 XXX Read from Keyboad
3 0

When this command is being executed, the ENTER indicator on the keyboard is lit. The operator may type information from the keyboard or enter information from the attached tape reader. End of Message may be signalled by depressing Carriage Return twice from the keyboard or by sensing either two Carriage Returns or two Blanks in succession on the tape.

The Command Descriptor will allow some maximum number of words for the operation. Generally the instruction means, "Read from the keyboard into *w* words beginning with address *m*."

01 XXX Print on Flexowriter
1 0

This command will print *w* words beginning at memory address *m* on the Flexowriter. Delete characters will be ignored.

The following status signals have meaning for the Flexowriter:

00001 End of Message—sometimes sets 000–001 in Result Descriptor
00101 Off Line sets 000–101
00111 Parity Error sets 000–111

*S203 Printer*

An S203 Printer commercially available from the Burroughs Corporation, Detroit, Mich. is a preferred illustrative embodiment input/output unit. This is a one way output device which has a single command; namely, "Print *w* words" starting at location *m* on the "S–203 printer." This printer has a 72-character line with automatic line feed and "carriage return" after printing 72 characters. Printing occurs at 500 character per second with approximately 23 milliseconds for line feed and "carriage return." This gives approximately 360 lines per minute operation. Delete characters are not printed. The device checks parity and stops on some mechanical malfunction.

*Card punch*

A card punch may be provided as an illustrative embodiment input/output terminal device. The 100 c.p.m. Punch has two instructions:

01–0X0 Punch Alphanumeric Cards. Punch *w* words from memory starting at *m* on *w*/10 punched cards, using an alphanumeric code.

01–0X1 Punch Binary Cards—Punch *w* words from memory starting at location *m*. on *w*/20 punched cards, packing two six bit binary characters per column.

The following status codes are used:

No Response to Status Control—sets 000–010
Unit Malfunction on—sets 000–011
Illegal Instruction—sets 000–100
Punch Error—sets 000–101
Data too slow—sets 000–110
Parity Error—sets 000–111
Cancel Current Word—takes next word from memory

*Card reader*

A card reader may be provided in the illustrative embodiment system. The 200 card per minute Card Reader has only one instruction, although it has two modes of reading. If a switch is set in the ALPHA position, it will read cards punched in the same alphanumeric code produced by the punch. If it is in the BINARY position, it will read the same binary format produced by the punch. The instruction is:

10 010 Read from Card Reader. Read *w* words into memory starting at location *m*. If the mode switch is in the ALPHA position interpret each column as alphanumeric and read 10 words from each card. If the switch is in the BINARY position, interpret each column as two six bit binary digits and read 20 words from each card.

The status conditions used by this device are:

00010 Empty Input Hopper—sets 000–010
00011 Unit Malfunction—sets 000–011
00110 Data too Slow—sets 000–110

*Drum*

The illustrative embodiment of the invention may comprise a complement of magnetic drums. Magnetic Drum is organized into 64 channels of 512 words each. On one revolution, only 256 words can be read from or written on one channel, due to the word interlace logic within the Drum. All 512 words can be read in two successive revolutions.

Channels 0 to 31 may be protected against being altered. Four channel protect switches are provided to prevent writing on these channels, each switch protecting eight channels. One switch protects channels 0 to 7, another channels 8 to 15, and so forth.

01XX0 Write on Drum. Write *w* words starting at memory location *m* on the Magnetic Drum. This command must be preceded by an Address Drum Command. Average access time to the first word is ½ a revolution, or 8.33 milliseconds. Subsequent words in the same operation are accessed 64 microseconds apart, except for the times successive words are separated by dead space. Such words are separated by a minimum of 57 microseconds. After writing the specified number of words at approximately 15,400 words per second, the Address Complete flip-flop will be reset.

01XX1 Read from Drum. Read *w* words into memory beginning with location *m*. The starting address on the drum has been specified by the Address Drum command which must immediately precede this command. The drum address is reset at the end of the operation.

Access time and speed are the same as for the Write on Drum Command.

The device uses the following status signals:

Not Addressed—sets 000–010
Unit Malfunction—sets 000–011
Channel Protected—sets 000–100
Data too Slow—sets 000–110
Parity Error—sets 000–111

*Magnetic Tape*

A complement of magnetic tape units may be expected to be provided in the illustrative embodiment system. The Magnetic Tape Unit is by far the most complex device, not only in number of logic cards, but also in the flexibility of its command code. Flaws are detected and rejected when reading in the gap between records. When writing, a read head checks the parity of the words being written. Each record must check on both transverse and longitudinal parity.

Fourteen instructions are provided with the Magnetic Tape Unit. Once the five essential instructions, Read, Write, Erase, Backspace, and Rewind, are mechanized, the remaining nine commands may be easily added to make the unit a more powerful device. The instructions are:

01000 Not used.

01001 Rewind—This command will end immediately after the Rewind is actually begun.

01010 Test. This command is included for maintenance purposes, such as verifying start/stop times. It is similar to a Write instruction except that characters E, W, and L are control characters. Information will be written normally until the first E is encountered. Information will continue to be extracted from memory, but not written on tape until the first W is encountered. After an E, an L will cause correct longitudinal parity to be written on Tape. E never appears on tape, the first W following an E will not appear on tape, and an L following an E will write longitudinal parity instead of the character L. At the end of the instruction, longitudinal parity will be added automatically.

The use of this instruction can create inter-record gaps of any size. It can vary the placement of the longitudinal parity mark. It can place flaws of some types in the record gap.

01011 Write. This instruction will write one record with as many words as specified in the word count field. "Zero words" is interpreted as 4096 words. A 4096 word record takes about 5 feet of tape, and may be written in about 500 milliseconds.

01100 Write End-of-File. A special record may be placed on the tape to indicate separation of data. This command does not involve the transfer of data, so the contents of the word count field, the on record count field and the memory address are meaningless. The End-of-File mark is a particular character with even parity repeated at the time to write longitudinal parity.

01101 Rewind and Lockout. Although file protect rings may be used to prevent erasure of important data on tape, this instruction may be installed. Until some manual intervention at the tape transport, a locked out tape may be read, but not altered.

01110 Erase. This command is used to avoid areas of tape which possibly contain flaws. A parity error during the readback of a write operation signals a possible flaw. If during an erase the read back indicates that there is a valid record, an abnormal condition will be sent to the I/O control unit. The form of the Erase command is to erase the area normally occupied by a record of W words in length. Memory will be accessed, just as in the Write Command, but information will not be placed on the tape.

01111 Write Multi-Records. This instruction is identical to the Write Command, except that record gaps will be inserted at 256 word intervals. The first record to be written will be shorter than 256 words if and only if the word count field is not zero in the eight least significant bits. The form of the instruction reads: record $w$ words on tape in form 1 to 16 records (all but the first will be 256 words long and the first may be 256 words long) starting at memory location $m$.

11000 Not used.

11001 Backspace one Record and Read $n$ Records. This command says to position the tape one record back and then read data from the tape into memory starting with location $n$, until either $w$ words is read or the number of records specified by the record count field is read.

11010 Backspace $n$ records. This command does not involve transfer of data. The number of records is specified by the record count field of the Command Descriptor.

11011 Backspace to End of File. This command does not involve either counting records or transferring data. The tape will backspace until an End-of-File record is sensed. The next read command will not sense this End of File.

11100 Read. This instruction will read information from tape until $w$ words are entered or until $n$ records are transferred. Motion of tape is forwards only.

11101 Advance $n-1$ records and read one record. This command causes the tape unit to skip over $n-1$ records of any length, when $n$ is specified by the record count field, and read one record of up to $w$ words in length.

11110 Advance $n$ records. This command is identical to Backspace $n$ records except in the direction of tape.

11111 Advance to End-of-File. This command causes the tape to skip over the remainder of the present file. Successive Advance to End-of-File commands will skip successive files.

The status signals used are as follows:

000001 End of Record.

000010 End of File.

000011 Abnormal Condition—On write commands, this indicates that the unit is not in write status or that a valid record has been detected too soon, on erase, that a valid record has been sensed, on read, or backspace that the write status is on, and on rewind that the rewind did not begin.

000100 File Protect.

000101 End of Tape. This code is used under three conditions:

(a) The Physical End of Tape mark is sensed and stored to allow the remainder of the present record to be read or written before stopping. Tape cannot continue foreward until a Backspace or a Rewind moves the tape back past the End of Tape mark. The End of Tape status code is sent at the end of the present record.

(b) The code is used when the Load Point mark on tape is sensed during a Backspace operation.

(c) On a Rewind operation, this code indicates that a rewind has started. The tape unit will remain not available, even though it is not addressed by an I/O Control Unit, until the tape reaches the Load Point Mark.

000110 Data too Slow.

000111 Parity Error.

001000 Cancel Current Word. This is used for a Read operation to clear the Information Register when a flaw is detected.

Other input/output units are provided to 64 per I/O Exchange in the preferred illustrative embodiment. The method of adapting them to the system will be apparent from the above description.

Refer again to FIGS 3A and 3B of the drawings, the system cabling diagram. FIGS 3A and 3B present a block diagram of the preferred illustrative embodiment maximum system configuration illustrating the control and data signals. A maximum system in one optional configuration presented comprises four computers P1, P2, P3, and P4, ten input/output control modules I/O A1–I/O A10 which comprise two modules in each of the 5 cabinets IC1, IC2, IC3, IC4 and IC5, eight memory module cabinets MC1, MC2, MC3, MC4, MC5, MC6, MC7, and MC8 (containing 16 memory modules M1–M16). Connectible to the I/O Bus 1 configuration of I/O exchange A is a plurality of 32 input device channels and 32 output device channels. As shown in FIG. 3B, duplicate interconnections may be utilized in an alternative embodiment which has five additional input/output control cabinets connected to Bus 2 instead of the computer P4 connected to Bus 2. The switch interlock 150 provides interconnection between each of the four computers P1, P2, P3 and P4 and each of the eight memory modules containing cabinets MC1, MC2, MC3, MC4, MC5, MC6, MC7, and MC8. In addition, the switch interlock 150 provides for connection between the five IC cabinets in the I/O exchange A portion through Bus 1. The 5 IC cabinets IC1–IC5 share the bus to each of the eight memory cabinets MC1–MC8. There is therefore one bus for the I/O control modules and one bus for each of the four computers P1–P4. In the optional configuration Bus 2 is utilized for a second group of five input/output control module cabinets which are provided. Connection between the four processors or computers P1 through P4 and the individual input/output control cabinets IC1 through IC5, is provided for the two signals indicating I/O busy and descriptor return interrupt. Each of the I/O control module cabinets is connected to the 32 input channels and the 32 output channels through 32 groups of lines. Each group has 12 lines. In the case of the input devices there are ten lines feeding into each of the individual I/O control module cabinets IC1–IC5 and there are two lines leading from each of the I/O cabinets IC1–IC5 into the individual input channels.

Restated, in the input to terminal devices between each I/O cabinet and each terminal device there are twelve lines, ten of which are input lines and two of which are output lines. The input lines comprise seven data lines, one character strobe line, one unit available line and one status line. The output lines comprise one character request line and one start-stop line. For interconnection between the output terminal devices and the I/O cabinets IC1–IC5 there are 12 lines for each output device. The three lines from the output device to the I/O control module cabinets IC1–IC5 comprise 1 character request line, one status line and one unit available line. The 9 output lines comprise 7 data lines, one start-stop line and one character strobe line.

Assume the 4 computers configuration is employed. Application of the following discussion to the optional 3 computer and 3 I/O Exchange configuration is readily apparent.

Between the I/O control modules I/O A1–I/O A10 and the computer modules P1–P4 there are no lines from the computers to the I/O control modules. However, there are two lines from the I/O control modules to the computers. There is one descriptor return interrupt line and one line for busy cabinet between each I/O cabinet IC1–IC5 and each computer P1–P4. Communication flow along the cables is on a "from memory module to I/O cabinet basis" but flow from I/O to memory is on "an I/O cabinet to memory module basis."

From the I/O control unit cabinets to the memory cabinets there are 18 lines from each I/O cabinet to each memory cabinet or 18 lines x 8 memory cabinets 5 I/O cabinets wherein each of the 18 lines from each I/O control module containing cabinet IC1–IC5 go to all of the 8 memory module containing cabinets MC1–MC8, respectively. There are two memory modules in each memory cabinet. The 18 lines from each I/O cabinet branch at the memory cabinet into 36 lines, 18 to each memory module. For example, taking line 101 from IC1 cabinet, this enters into each of the memory cabinets MC1, MC2, MC3, MC4, MC5, MC6, MC7, and MC8. The I/O control cabinet to memory 18 lines (cable 101 of FIGS. 3A and 3B) comprise four memory module address lines, twelve address or data information lines, one read-write level line and one request line. As seen by the legend for cable 102 in the memory to I/O control module circuit, one line from each of the 8 memory cabinets goes into each of the I/O control module cabinets IC1, IC2, IC3, IC4, and IC5. The memory to I/O communication lines comprise 14 lines for each of the 16 memory modules M1–M16. That is, there are 14×16 lines from the memories, which branch off into the five I/O control cabinets IC1–IC5. These 14 lines comprise 12 data lines, one crosspoint line and one crosspoint descriptor line. In the drawing, cable 102 represents 14 times 16 lines and each of cables 103, 104, 105, 106, 107, 108, 109 and 110 comprise 13 lines of which 12 are the information lines from each memory module and one line is for access obtained. The access obtained line is the XP or crosspoint line. The XPD lines or crosspoint D lines comprise the first line to the right coming out of each memory cabinet MC1–MC8 which are lines 1011, 1012, 1013, 1014, 1015, 1016, 1017, and 1018. The second of each of the lines, for example, 1019 and 1010 are lines comprising one per memory module M1–M16 for each XPD or crosspoint descriptor transfer for the I/O control B exchange, where utilized. In the configuration where a fourth computer is provided these lines are not utilized. Between each I/O control module cabinet IC1–IC5 and each of the other four I/O control module cabinets, there are three lines exchanged, one line for priority A request, one connecting line for priority B request and one line for memory access obtained (RQ). Each of the I/O cabinets IC1–IC5 send along these lines to each of the other four cabinets. Each of the five I/O cabinets IC1–IC5, therefore, has 12 inputs three for each of the other four I/O cabinets. From each computer P1, P2, P3, P4 to each of the memory modules there are 19 lines. That is, there are 19×4 lines where 4 computers are utilized and 19×3 lines where three computers are utilized. These lines comprise four memory module address lines, 12 address or data (information) lines, one read-write level line, one request access line and one descriptor request line. The descriptor request line transfers the indication of the TIO control line which says transfer a descriptor to the I/O. The reason why 19 instead of 18 lines are required from the computer modules is that in the case of an I/O control module, the input/output control module only wishes to write or read a particular address. However in the case of a computer requesting memory it has to also indicate whether the data is to be read back to the computer or sent to the I/O bus as a descriptor. Referring to a typical memory to the computer line, line 103 from memory 1 cabinet, 13 lines are provided for each memory module wherein the 13 lines go to all five buses, four of which may be computer buses and one of which is the I/O Exchange bus. This involves 13 lines from each of the memory modules or 13×16 to the bus of each of the computers. These 13 lines from each memory module comprise 12 data lines and one crosspoint line to indicate that access has been obtained.

Each computer cabinet contains 1 computer module. There is only one line exchanged between each computer cabinet and each of the other computer cabinets. This line is the computer interrupt line. This is a control signal used during the control mode by which one computer P1, P2, P3 or P4 can start or stop one of the other P1, P2, P3 or P4 computers. By this means, any of the computers P1, P2, P3 or P4 which is in the control mode can interrupt any of the other computers to turn the other computer off or on.

Now refer to FIG. 45A and FIG. 45B the automatic interrupt system. This system is explained in detail in the aforementioned patent application incorporated by reference herein for Automatic Interrupt System for Data Processor of Thompson, Perkins, Pezely and Shifman. In the representation of FIGS. 45A and 45B the convention has been adopted that the gates represented as conventionally drawn semicircles with light drawn line inputs such as gate A6001 are actually gates while the semicircular representation which are drawn responsive to the thick bar lines with arrows such as means P6002 represent the path of transmission which actually goes through some logical circuitry not shown, and wherein these so-called gates substitute for actual circuits in the path of transmission. In FIGS. 45A and 45B the plurality of gates 6002 is actually the control gates of the computer module interrupt register 3002 (see FIG. 4B) which is in FIGS. 45A and 45B represented in phantom by surrounding dashed lines the phantom register representation here being designated as register 6002. The mask register 3016 which is shown also in FIG. 4B comprises a plurality of flip-flops, for example, flip-flop FF6001, flip-flop 6019 and the flip-flops shown in FIGS. 45A and 45B in the horizontal plane therebetween. The interrupt register is provided by the flip-flops between flip-flop FF6010A and flip-flops FF6039 in the phantom box 3002. The priority control gates are provided in the phantom box 6003 and the selective reset gates are shown in phantom in the box 6004. The subcommand matrix 3020 (see FIGS. 4A and 4B also) comprises a restart control circuit 6005, which is a section of the subcommand matrix 3020. The subcommand matrix 3020 further comprises a power failure control unit 6006, a count real-time clock control circuit 6007 and an interrupt control circuit 6008.

Refer back to FIGS. 4A and 4B, the computer module. As stated just above each of the solid arrow input lines indicate the semicircular representation into which they point to be actually a path through the K and E registers 3004 and 3005 in the computer module.

Refer again to FIG. 45A and FIG. 45B. The statements in the boxes shown at the top of FIG. 45A and FIG. 45B are the interrupt conditions. These are power failure, count real time clock, restart, external request 1, external request 2 to 16, I/O termination, interrupt computer in, real-time clock, write out of bounds, illegal instruction, parity error, arithmetic overflow, and no memory access. While these conditions are the ones actually provided in the illustrative embodiment, it is within the scope of the invention to add or to substitute other conditions which will cause interrupt such as, for example, computer P1 stopped, computer P2 stopped, or computer P3 stopped.

Assume, that power failure has occurred. Upon occurrence of the power failure condition, an interrupt signal occurs and is fed into inverter I6001. The signal is inverted in inverter I6001. The resulting signal output from inverter I6001 inhibits recognition of all other interrupt conditions. For example, the signal output of inverter I6001 responsive to power failure interrupt inhibits signals from being received by the count real time clock control, it does this by the output of inverter I6001 comprising one input to AND gate 6010 to inhibit gate A6010 in the presence of a power failure interrupt signal. In turn this signal inhibits the circuit responsive chain of priority control gates from enabling the OR gate O6001. With no signal output from the OR gate O6001, interrupt control in interrupt control unit 6008 cannot occur. Therefore upon the occurrence of power failure no other interrupt condition will be recognized. Power failure and restart after power failure which occurs by actuation of restart control unit 6005 are mutually exclusive conditions. That is, when a power failure occurs, restarting cannot occur until the power failure has been cleared. When the power failure occurs the power control unit 6006 is actuated. This causes a sequence of subcommands to be performed at the completion of the instruction going on at the time the power failure occurs. The subcommands involved transfer the contents of some important flip-flops into the power failure dump register 064 and 065 (see FIG. 4A also). The loading of power dump register 064 occurs along the line L064 and the loading of power dump register 065 occurs along the path L065. Out of the power failure control 6006, the dumping is exercised through the path illustratively represented as path P6064 and path P6065. This path includes the contents of the state of control flip-flops PS1, PS2, PS3 of the program syllable flip-flop PS1, PS2, PS3, the repeat flip-flop RPF and the first repeat or iterate flip-flop FRP, the program full flip-flops PF1 and PF2, the overflow, underflow and not normalized flip-flops POV, PUN, and PNN, the contents of the SA1 and SA2 flip-flops and the contents of the interrupt, initiate power failure and reverse stack flip-flops INP, IPF and RSF are dumped into the power failure dump register 064 (see FIGS. 4A and 4B).

The next series of subcommands which emanate from power failure control unit 6006, upon power failure actuating this unit, transfer the state of the interrupt register 3002 into the power failure dump register 065. This is effected through the path P6065 coming from the interrupt register unit 3002 by virtue of a parallel transfer represented as the solid arrowed line into the path P6065. Finally, the power failure causes the computer to halt by output from the power failure control unit 6006 represented in FIG. 45A by the halt output of the power failure control unit 6006. The halt instruction which occurs as a result of power failure control causes the subcommand matrix 3020 to go into the halt state (not shown), and this shuts down this computer.

After the trouble which caused the power failure has been rectified restart may be effected when the automatic power start switch (not shown) is on. When power is restored, the restart control circuitry 6005 goes into the restart state. The restart control state of restart control circuit 6005 causes a flow of information through path P6001 by enabling the contents of the power dump failure dump register 064 and 065 to be emptied through that path to again reset the above-recently-enumerated control flip-flops PS1, PS2, PS3, RPF; FRP, PF1, PF2, POV, PUN, PNN, SA1, SA2, 1NP, 1PF and RSF into the corresponding state which was in effect at the time of the power failure. The next step in restart control causes the contents of power failure dump register 064 and 065 to be transferred via path P6002 so as to restore the interrupt register 3002 to the condition it was in before power failure when it emptied its information into the power dump register 065. The restart control 6005 then sets the restart flip-flop FF6010A in the interrupt register 3002.

Setting the reset flip-flop FF6010A in the interrupt register 3002 to the "one" state causes it to enable AND gate A6020 in the absence of a power failure signal and to inhibit AND gate A6021 from allowing any lower priority conditions to be recognized in the priority control gates 6003. Restart control then passes to interrupt control.

The restart control 6005 goes to the interrupt control 6008 by returning it to the beginning of instruction state and permitting the interrupt bit in flip-flop FF6010A which was just set to be recognized by the interrupt control unit 6008. This is shown by the arrow into and go to interrupt control unit 6040.

At the initiation of restart and for each of the other lower priority rated interrupt conditions, the interrupt control unit 6008 causes a series of events which are functions of the interrupt control system. These are:

(1) First the interrupt control 6008 causes the control flip-flops to be transmitted via path P6004 into the interrupt dump register 070 (see FIG. 4A also).

(2) Second the contents of the program storage register in use, 100 to 103 or 104 to 107, is transferred via path P6005 into the interrupt program register 110 to 113. If the remaining program syllable register other than the one which is dumped into IPR 110 to 113, that is the other of register PSR 100 to 103 or 104 to 107 is also filled, the instruction in the other PSR register must be obtained from memory when the program is restored to the point at which interruption occurred.

(3) The third step in interrupt control is that the contents of the base address register 055 are caused by path P6006 to effect transfer of the contents of the base register 055 into the interrupt storage register 040 to 042.

(4) The fourth step is that the contents of the base program register 054 are transferred by path P6008 into the interrupt storage register 040 to 042. This fills two groups of 16 bits or 32 bits in the interrupt storage register 040 to 042. The interrupt storage register 040 to 042 has 48 bits in all. If the second program syllable register 100 to 103 or 104 to 107 has been filled the program count register 057 is counted down by the interrupt control circuit 6008 and its contents are transmitted via path P6006 into the third register of the interrupt storage registers 040–042. If program storage registers 100 to 103 and 104 to 107 are not filled then the contents of the program count register 057 are transferred directly without counting down into the interrupt storage register 040 to 042.

Only forty-eight bits of the program storage register are saved and if the other forty-eight are filled in the second storage register, these must be reinserted by loading back from core storage, when the control program returns to the interrupted program.

(5) The fifth occurrence caused by the interrupt control unit 6008 is to cause the interrupt address register 063 via path P6007 to empty its contents into the base address register 055.

(6) The sixth step effected by the interrupt control 6008 is to cause the interrupt address register 063 to send the same contents via path P6009 into the base program register 054.

Now refer to the circled lines add 1, add 2, add 3, add 4, add 5, add 6, add 7, add 8, add 9, and add 10. These serve to enable explanation of the next condition to occur. Each of the conditions other than power failure and count real-time clock are numbered with these numbers add 1, add 2, etc.

(7) The seventh condition which occurs due to the interrupt control 6008 is that the interrupt control 6008 causes the contents of the interrupt address register 063 to be added to the add number which is determined by the condition being recognized in the adder 3032 and the added number is transmitted by path P6010 into the program count register 057. This control is effected by interrupt control 6008 through the paths P6011 and P6012. The add interrupt number add 1, add 2, etc. is triggered by the particular condition which is occurring as shown in the add interrupt number block 6031. In the process of adding the interrupt number the interrupt bit being serviced, in this case flip-flop FF6010A is reset to the zero state. The interrupt control 6008 then branches to the interrupt address via returning to the beginning of instruction state of the subprogram. That is, it returns to phase 1, time $T_1$. The branch to interrupt address therefore means return to phase 1, times $T_0$. This is effected by the branch to interrupt address means 6041.

Refer to the count real time clock interrupt condition of FIG. 45A and FIG. 45B. In addition to the three megacycle master and slave clocks in the computers, the memory modules, and in the I/O control modules, there is an additional clock in each computer which is designated the real-time clock. This clock should be accurate to one part in 1,000,000.

The subcommand matrix 3020 (see FIG. 4B) is structured so that it returns to phase 1, time T1 of its operation in a period which is much less than the 10 milliseconds which occur between the counts of the real-time clock. When each count of the real time clock occurs, the real-time clock sends out a signal which is recognized by the subcommand matrix 3020 at the beginning of successive instructions. This signal starts the count real-time clock time control 6007. Setting the count real-time clock control causes one to be added to the contents of the real-time clock 114 and 115 in the thin-film memory. This is done by adding the one in the adder 3032 to the contents of the real-time clock register. Then the count real time clock control 6007 returns to the next instruction by setting the subcommand matrix 3020 to the phase PH1, time T1 state. This is symbolized by the return to next instruction block 6042.

Now assume that an external request 1 interrupt condition has occurred. This is one of 16 lines which enter the computer directly from a terminal device or external source of some kind. The word external means external to the system being of the invention.

One of the external requests is the "Flexowriter." The others may be fed directly into a computer P1–P4. Any one of these external requests which may occur can be made to cause the occurrence of one of these external request conditions. This condition occurrence, if permitted by the corresponding state of the flip-flop in the mask register, such as the state of flip-flop FF6001 as shown, will allow the respective AND gates A6001–A6016 to cause the OR gate O6020 to provide an output. This output from OR gate O6020 causes AND gate A6031 in the interrupt register control gates 6002, when the system is in the normal mode, to provide an output which output sets the external request flip-flop FF6031–FF6039 in the corresponding position in the interrupt register 3002. If this is the highest rated interrupt condition (for example, the condition in FF6031 when occurring the highest), the priority control circuitry recognizes the setting of flip-flop FF6031 into the "one" state. The "one" state of flip-flop FF6031 is fed to AND gate A6041 to cause AND gate A6041 to provide an output when not inhibited. This output of AND gate A6041 causes a signal to be provided to the interrupt control circuit 6008 via OR gate O6001. The interrupt control circuit 6008 is activated at the end of the present instruction in the manner described hereinabove for the restart control interrupt. The "zero" state of the flip-flop FF6031 inhibits the lower priority control circuits from providing a signal from OR gate O6001 to initiate action of the interrupt circuit 6008.

The characteristics of the external request inputs are such that they must remain in the "one" state until serviced. When all higher priority interrupts have been attended to, these external requests will cause actuation of the interrupt control circuitry 6008. When a demand for service by an external request unit is made, however, the automatic operating and scheduling control may via a computer P1–P4 reset the corresponding flip-flop in the mask register 3016 to delay this service or to permit it to go through immediately. Upon delay the AND gates, such as AND gate A6001, will be inhibited from performing the service until the corresponding mask register flip-flop is reset. For example, assume the request for service is made at external request 1, which causes its output line to be high. This line remains high until the automatic operating and scheduling control causes the computer module P1, P2, P3 or P4 to set the state of flip-flop FF6001 into the "one" state shown. Upon setting this flip-flop into the high state, AND gate A6001 produces a high output to enable OR gate O6020. Then enabled OR gate O6020 provides a high at one input to AND gate A6031. If then there is operation in the normal mode, which indicates that there are no interrupts presently being serviced, then the flip-flop FF6031 in the interrupt register 3002 is set into the "one" state. This interrupt is processed as described above for the power failure interrupt, assuming the absence of a higher priority interrupt inhibiting the AND gate A6041. When the branch to the external request portion of the automatic operating and scheduling control operations occurs, the automatic operating and scheduling control then has the choice of either causing the sending out of a command descriptor to an I/O control module to handle this request, or it must reset the corresponding flip-flop such as flip-flop FF6001 in the mask register 3016 before the computer returns to the normal mode. Therefore, the automatic operating and scheduling control must blank out this incoming signal either by servicing it, in which case the command descriptor causes the external request output to go low, or by resetting the flip-flop in the mask register, which prevents the external request signal from getting through. The control mode flip-flop 6009*a* (labelled SET CONTROL MODE in FIG. 45B), is set on the first step whenever the interrupt control circuit 6008 is activated. In time, this occurs while the first syllable is being transferred from the program storage register 100 to 103 or 104 to 107 into the interrupt program register 110 to 113. Upon the control mode being set, the normal mode input into AND gates such as AND gate A6031 inhibits these AND gates from setting flip-flops such as flip-flop FF6031 in the interrupt register. This enables the selective reset unit 6004 through AND gates such as AND gate A6051 to reset the interrupt register flip-flops such as register flip-flop FF6031.

For example, assume an external request occurs. If the mask register so allows, this causes a steady high at the input to AND gate A6001 to provide in turn a steady high at one input to AND gate A6031. If the computer is then in the normal mode, this causes continuous setting of the interrupt register flip-flop FF6031 to the "one" state. At the end of the present instruction being executed by the computer in its normal mode, interrupt control in interrupt control unit 6008 starts. Upon starting, substantially immediately, the set control mode flip-flop FF6009 (not shown—see normal mode input 6009A), is set which in normal mode causes the signal input to inhibit flip-flop FF6031 from receiving a high at its "one" state input. Later, during interrupt control conditions, a reset pulse is delivered to AND gate A6051 which, in the absence of a higher priority interrupt, resets flip-flop FF6031 in the interrupt register 3002. The flip-flop FF6031 does not at the end of this reset pulse go into the "one" state since AND gate A6031 is inhibited by the control mode from allowing the flip-flop FF6031 to go into the "one" state. Therefore, inhibiting of the set input to the interrupt register flip-flop FF6031 occurs because the output of OR gate O6020 must be removed during the control mode operation of the automatic operating and scheduling control, in order to prevent the external request from causing another interrupt. However, the initial setting of the interrupt control 6008 by the external request 1 causes the control mode to be effected and causes servicing of that external request. This means that the external request is serviced only once without returning to the interrupt mode. The automatic operating and scheduling control employs an instruction in the instruction repertoire which says "store external request." By this instruction, the states of the "AND" elements A6001 to A6016 are loaded into core memory. A computer may then examine these bits individually and decide which external request is to be effected. The automatic operating and scheduling process and means then causes this program to be executed. Thus, there could be 16 different sets of instructions employed by the automatic operating and scheduling control system, one to service each type of external request. Since trailing edge flip-flops are used, the output of the interrupt register 3002 may be sampled at the same time that the flip-flop is being reset. This means that, for example, the "Add 2" from flip-flop FF6031 and the other ADD numbers are coming through and added in the adder 3032 while the reset pulse is being generated to reset the flip-flop FF6031. For this reason, reset will not occur simultaneously with enabling of AND gate A6042, for example, which would otherwise propagate down the successive AND gates to allow other interrupt conditions to go through.

Refer again to FIGS. 45A and 45B. The interrupt for external request has been discussed. There are a plurality of other lower priority requests in the inventive system which cause automatic interruption to be effected and the automatic operating and scheduling control means to take over and effect its process.

The I/O termination interrupt is caused by a pulse, ⅔ of a microsecond long. This pulse comes from the I/O control unit which has just terminated an input/output operation. If the mask bit for this condition is set in the one state, the I/O termination bit enables AND gate A6017. Upon being enabled AND gate A6017 provides output which is fed to one side input of flip-flop FF6032 to set the interrupt register flip-flop FF6032 to the "one" state. The flip-flop FF6032 may be set for the one state either in the normal or in the control mode. If the flip-flop FF6032 is set in the control mode, the AND get A6091 will be inhibited from permitting the OR gate O6001 to cause the interrupt control unit 6008 to go into the interrupt condition. When the control mode operation in accordance with the automatic operating and scheduling control returns to the normal mode, the interrupt condition from flip-flop FF6032 then causes OR gate O6001 to set the interrupt control 6008, provided that there is no higher priority interrupt condition present at this time. Inhibiting of AND gate A6043 occurs where such a higher priority interrupt condition exists. Other lower priority conditions are then inhibited by the "zero" state side of flip-flop FF6032 when this flip-flop is set to the one state. This inhibiting is effected via AND gate A6044. AND gate A6044 is also caused to provide priority interrupt inhibit signals to AND gates which are in the circuit which circuit without this inhibiting permits the "one" state of lower prority interrupt to be transmitted.

Once I/O termination interrupt has been recognized by interrupt controls 6008, the interrupt control 6008 proceeds in the case of interrupt restart after power failure except that three is added from the box 6031 to the contents of the interrupt register 063.

Now refer to the interrupt computer N condition (where N means any of the computers in the system). This condition occurs where access to computer N is attempted to be gained by another computer. The mask register is not set up to mask out an interrupt computer N condition. The flip-flop FF6033 is set in both the normal or control modes to the "one" state upon occurence of the interrupt computer condition. As in the case of the I/O termination interrupt, this condition will not be executed in the control mode since AND gate A6091 inhibits the interrupt control 6008 from recognizing this interrupt signal except in the normal mode. This interrupt computer N condition has a unique feature. If this interrupt occurs while computer N is in the "halt" condition, computer N will start and will recognize the attempt to gain access to it. This is shown by the "if halted go to start" means 6044 which is the representation of this feature which is built into the illustrative embodiment inventive system.

The next lower priority interrupt is that due to the real-time clock. This interrupt occurs whenever the real-time clock 114 and 115 in thin-film memory in 3001 (see FIG. 4A) is in overflow condition. If the mask register 3016 flip-flop corresponding to this condition is set in the "one" state this will permit AND gate A6018 to set the interrupt register flip-top FF6034 into the one state. If there is now higher priority interrupt occurring, then AND gate A6045 permits the OR gate O6001 to notify interrupt control 6008. In normal mode via AND gate A6091 interrupt control will be permitted to recognize the output of OR gate 6001 due to a real-time clock interrupt. Interrupt control here proceeds as in the case after restart control 6005 has initiated start with the exception that add 5 instead of add 1 is effected by add interrupt number unit 6031. Plus 5 is added to the contents of the indirect address register 063 for the real-time clock interrupt.

The next lower priority interrupt shown in FIGS. 45A and 45B is the write out of bounds interrupt. This occurs whenever in the normal mode, an object program attempts to write in a memory address, that is the outside of the space allocated or allotted to that program by the memory bounds registers. These are the upper limit and lower limit flip-flop registers 3012 and 3013 shown in FIG. 4A. If comparator 3010 or 3011 of FIG. 4A gives an out of bounds signal during a "write" command, the subcommand matrix and controls unit 3020 (see FIG. 4A and 4B) generates a write out of bounds interrupt signal.

Refer again to FIG. 45A and FIG. 45B.

The write out of bounds interrupt condition is recognized in the normal mode only by inhibiting AND gate A6032 in the control mode from the mode normal input ($\overline{6009A}$). In the control mode there are effectively no upper nor lower limits.

In view of the importance of the interrupt address register 063 contents, a load thin-film instruction to the address of the interrupt address register 063 contents in thin-film memory occurring in the normal mode is made also to cause a write out of bounds interrupt signal. That is a load thin-film (LTF) instruction, addressed to the interrupt address register 063, is not permitted to occur in the normal mode since it would change the contents of the interrupt address register 063. Therefore whenever an attempt is made to make such an instruction in the normal mode occurs a write out of bounds interrupt signal appears. The load special register instruction which otherwise would change the upper and lower limit registers 3012 and 3013 (see FIG. 4A) also causes a write out of bounds interrupt to take place. The reason for this is to protect these critical registers and make sure that no portion of the memory stored and coded automatic operating and scheduling process can be erased. That is, if the interrupt address register 063 were permitted to be changed while in the normal mode, a branch to interrupt address 6041 which came out of interrupt control 6008 would not go to the correct portion of the stored and coded automatic operating and scheduling control process. It might even miss entirely the portion in memory which contains the automatic operating and scheduling control process.

The illegal instruction interrupt occurs in the normal mode only when the program attempts to execute certain instructions built into the computer system which instructions are reserved for the control mode, or if the illustrative embodiment computer system attempts to execute an unused order code. If the system attempts to execute an unused order code in the control mode, the computer halts (not shown). The execution of the illegal instruction interrupt is identical to that of the write out of bounds interrupt except that 7 is added (Add 7) to the contents of the interrupt address register 063 for this interrupt.

The parity error interrupt signal occurs whenever a parity error is generated in the normal mode during execution of a program. In the control mode detection of a parity error will cause the computer to halt. The parity error is identical with the write out of bounds and illegal instruction interrupts except that eight is added (Add 8) to the contents of the interrupt address register 063. The arithmetic overflow interrupt signal is next lower in priority for service than to the parity error interrupt signal. The arithmetic overflow interrupt circuit is identical to that of the parity error interrupt circuit with the exception of the add nine to the interrupt address register 063 operation and the further fact that the mask register can mask out the arithmetic overflow interrupt signal by means of flip-flop FF6019. The artihmetic overflow occurs whenever two numbers are added together in the arithmetic registers 3030 and the adder 3032 (see FIG. 4B) overflows.

Whenever a memory module (M1–M16) is addressed by a requestor module, that is a computer P1–P4 or an I/O control module I/OA1–I/OA10 or I/OB1–I/OB10 when the memory module M1–M16 services that request it sends back a cross point signal to the requesting unit one of P1–P4, one of I/OA1–I/OA10 or I/OB1–I/OB10. If this signal is not received within a predetermined amount of time then the requestor module causes a no memory access interrupt signal to be sent out.

In the normal mode, the AND gate A6036 sets an interrupt register flip-flop FF6039 and the same type of interrupt condition servicing as, for example, the write out of bounds interrupt condition servicing occurs, with the exception that for the servicing of the no memory access interrupt, ten is added to the contents of the interrupt address register 063. Again, if no memory access occurs while the computer P1, P2, P3 or P4 is in the control mode, the requestor module if a computer will halt and if an I/O requestor, it will go into a termination condition which is the sequence of operations resulting in an I/O termination interrupt.

Thus it is seen that in the case of any of the interrupt signals occurring, the interrupt control unit 6008 is actuated such that a branch occurs to the proper interrupt address in the portion of memory which stores the first step of the process in the automatic operating and scheduling control process which can cause the automatic operating and scheduling control system to take care of remedying the situation created by the particular interrupt condition. The interrupt address portion of the stored and coded automatic operating and scheduling control process (AOSP) contains a list of branch instructions, which transfers control to the proper process in the AOSP to take control upon the occurrence of this particular interrupt condition.

In the event of power failure, while in the control mode, inventive system means (not shown) are provided so that after the restart control unit 6005 goes on, the computer goes into a halt condition.

Optionally, several other methods could be employed. Processing of the old interrupt can continue except that no descriptor to any I/O control module will be allowed to be sent as long as the restart interrupt condition has not been serviced and flip-flop FF6010A is set in the "one" state. This prevents any descriptor from an I/O control module from going to the wrong descriptor address.

Refer to FIG. 46. FIG. 46 shows a simplified block flow diagram of the automatic interrupt system, whereupon when interrupt conditions occur, where permitted by mask register 3016, the signal is passed through gates 6002 and interrupt register 3002 to priority selection matrix 6003. In order of priority established by matrix 6003, the signal is then caused to be serviced in accordance with the steps in memory determined by the address determining means shown.

FIG. 47 is a chart diagram of interrupt operations in conjunction with the AOSP to be described later in detail.

INTERRUPTS

In operating the computer system of the invention, in normally carrying out an object program, fetch of an operator is contingent upon the absence of a power failure, a pseudo-interrupt to update the real time clock, and any other interrupt. The flip-flops of the description of this section on interrupts are not shown herein but are incorporated herein from the aforementioned copending application of Mott, Lounsbury, Thompson, Beauregard, Murtaugh, and Sardinas.

*Power failure servicing*

In the event of a primary power failure during computation, 500 microseconds are provided to store, in the non-volatile thin-film memory, the contents of all control flip-flops necessary to restart computation from the interrupt point. However, computation will resume after power on only if the automatic program start switch (not shown) is on. Power failure interrupt has priority over all other interrupt routines. In the event of the power failure interrupt occurring, power failure dump operations occur as follows:

(1) In the first power failure dump register 064 are stored the contents of a first group of control flip-flops comprising a PS1, PS2, PS3 flip-flop program storage counter, a repeat flip-flop, an iterate flip-flop, program-full first and second flip-flops, program overflow program underflow and program not normalized flip-flops, a stack address counter, a control mode INT flip-flop, a command control flip-flop for power failure and a reverse stack flip-flop all of which are flip-flops (not shown) which appear in the controls portion of the subcommand matrix and controls unit 3020 (see FIG. 4B).

(2) In the second power failure dump register 065 are stored the contents of a second group of control flip-flops which comprises the interrupt register bits 1–12 of interrupt register 3002. (See FIG. 4B).

*Real time interrupt servicing*

The base of the real-time clock system is a 100-cycle oscillator. Its 0.5 microsecond wide output pulse sets a control flip-flop IRT for updating the real-time clock. This flip-flop (not shown herein) is in the subcommand matrix and controls section 3020 and causes an interrupt, which is second in the priority logic next to power failure interrupt, to update the real time clock registers 114, 115. When the two real-time clock registers 114 and 115 have reached a maximum count a bit in the interrupt register 3002 is set (bit 15). The real-time clock servicing then commences as follows:

(1) the 12 least significant bits of the real time clock count using the syllable counter (not shown but see Mott et al. for computer) in the subcommand matrix and control section 3020 are read.

(2) The real-time clock is incremented by one.

(3) The new real-time clock count is stored back into thin-film memory 3001 in the computer.

(4) If incrementing does not produce a carry, the servicing is completed; if it does produce a carry then the 12 most significant bits of the count are read, incremented by one, and stored back into thin-film 3001.

(5) Examination is again conducted as to whether incrementing produced a carry, and if not, the operation is completed.

(6) If a carry was produced by incrementing, the mask bit Q5 mask register 3016 for the real time clock is examined, and if set, operation is completed; and if not set, the real time clock interrupt, bit 15, of the interrupt register 3002 is set upon which real-time clock updating has been completed.

*Interrupt servicing*

When an interrupt occurs and a bit occurs in the interrupt register 3002, a control flip-flop ITE, which is the interrupt flip-flop (not shown herein) in the subcommand matrix and control portion section 3020 is set by the next clock pulse. This interrupt ranks third in the priority logic (next to power failure and real-time clock update). The ITE flip flop senses the presence of an interrupt bit in the interrupt register 3002, at time T1 of phase 1. An interrupt routine jump then is implemented with the aid of an interrupt routine jump (IRJ) control flip-flop (not shown but shown in Mott et al. for computer) in the subcommand matrix and controls portion 3020.

The interrupt routine jump stores the information necessary to restart from the point of interruption. The initiation of the interrupt routine jump establishes the control mode and sets the control mode flip-flop (INT) in the subcommand matrix and controls section 3020. Return to normal mode is accomplished by an interrupt return routine instruction. Upon setting the interrupt routine jump flip-flop, the following servicing of interrupt routine operations occur:

(1) The contents of a first group of control flip-flops are stored in the interrupt dump register. This group includes flip-flops PS1, PS2, and PS3 of the program storage address counter, repeat and iterate flip-flops RPF and FRP, program full flip-flops PF1 and PF2, overflow flip-flops for program overflow PCV, program underflow PUN, and program not normalized PNN, the stack address counter flip-flops SA1 and SA2, a control mode flip-flop INT, the power failure command control flip-flop IPF, and the up-down reverse stack flip-flop RSF. These are each flip-flops in the subcommand matrix and controls section, and these are stored in bits 1 through 15 of the interrupt dump register 070.

(2) The contents of the program storage register 100–103 and 104–107 are stored in the interrupt program register 110–113 and the control mode flip-flop (INT) is set.

(3) The contents of the base address register 055 are stored in the interrupt storage register 042 least significant location.

(4) The contents of the base program register 054 are stored in the next least significant location 041 of the interrupt storage register.

(5) The contents of the program count register 057 are examined and if an overlap occurred immediately preceding the interrupt, one is subtracted from the program count, and if not, the subtraction is not effected, but in both cases the program count is stored in the most significant location of the interrupt storage register 040.

(6) The contents of the interrupt base address register are stored in the base address register 055 and the base program register 054.

(7) The binary correspondence of the interrupt being serviced is transferred into the M register 3007, and this number is added to the interrupt base address and stored in the program count register 057. This ends the servicing for interrupt.

In the primary power distribution system of the illustrative embodiment system of the invention, primary power is accepted from a three phase, four wire supply and placed into a circuit breaker cabinet. Between the circuit breaker cabinet and ground in such array as may be found practicable, a console module is provided for display purposes in one circuit. Another circuit may comprise a plurality of first, second and third lines of 7 cabinets each in a complete illustrative embodiment system. For systems comprising less than the complete number of modules or of cabinets in the system corresponding reduction in the numbers of each of the circuit breaker lines may be employed. The I/O terminal device and interface units are connected in parallel and to one side of each is connected a circuit breaker in the circuit breaker cabinet. The other side of each unit is grounded. Circuit breakers could be placed in the cabinet or optionally conventionally in the wall of the room enclosure where the system is housed, as desired. The circuit breaker cabinet or the wall structure includes one circuit breaker which is connected to one side of each of the cabinets. There may be an additional circuit breaker in each cabinet. From one to five circuit breakers, for example, could be provided in a circuit breaker cabinet or in the supply system and connected to one side of each of the cabinets in the system, including the terminal device and interface units. Additionally, if desired, a second circuit breaker has been disposed in the input line to each of the cabinets themselves.

Refer to FIG. 48, the block diagram of the power system of the illustrative embodiment of the invention. From the primary power supply PR1.PW., 60 cycle, three phase, AC input power, which could be actually from 47 to 63 cycles, and at 120/208 volts is brought in to the system and filtered in a console filter 7001. After being filtered in filter 7001, the AC input voltage is passed through first console circuit breakers 7002. Provided also in the input power lines and circuits which comprise a console AC control unit, an AC fault unit, a console transformer 7052, first console circuit breakers 7053, a console rectifier circuit 7054, a console storage capacitor 7003, and a console general control circuit 7004. The AC control circuits 7050 contain conventional relays. The AC fault circuits 7051 sense loss, e.g., under voltage. The storage capacitor 7003 is provided so that if AC power is lost, sufficient power is stored in the storage capacitor 7003, so that the control circuits 7004 may send signals out to the system. Console indicators 7055 on the front panel of the console are supplied with power either from the cabinets or from the console rectifier 7054 in the console power supply.

There is one console per system and there is one power system such as is shown in the cabinet portion of FIG. 48 for each of the modules in the system. In the cabinets, the primary power PR1, PW, also is fed into a cabinet filter unit 7060, through second appropriate cabinet protective circuit breakers 7061 into the cabinet AC control unit 7005, and the cabinet general control unit 7006. A cabinet transformer 7056 and a rectifier unit 7007 responsive to the transformer unit 7056 are also provided.

The transformer 7056 steps the voltage down into 7 different AC voltages. One AC output of the transformer 7056 is supplied to the cabinet indicators 7010 to provide a one volt AC supply to the indicator 7010 lamp filaments. The remaining 6 AC voltages are fed into rectifier 7007 which provides the 6 DC voltages required for each cabinet in the system. This supplies the DC voltages into the strip lines (see FIG. 12, also).

Appropriate voltage regulators 7011, voltage regulator fault controls 7008, third cabinet circuit breakers 7057, and a cabinet storage capacitor 7009 are provided in each of the cabinets.

The control unit 7006 comprises a plurality of relays. Control 7006 turns the voltage regulators in the voltage regulator 7011 on in sequence, and turns them off in sequence. The control circuit 7006 also controls under voltage sensing by the voltage regulator fault control circuit 7008. The voltage regulator fault control circuit 7008 comprises a solid state circuit which is responsive to signals from the voltage regulator 7011 to check the voltage, and is capable of turning any of the voltage regulators 7011 off in the event of under or over voltage. The fault control circuit 7008 also controls the control circuit 7006. The fault control circuit 7008 also accepts information from the console via an output line fed therein from the console control circuit 7004. The control circuit 7006 also sends information to the cabinet indicators 7010 and to the console indicators 7055 which presents to the indicators in the console 7055, the power supply status of each cabinet system. Appropriate ready and test signals may also be provided at this output, if desired.

There is an interchange of information between the console control 7004 and the cabinet control unit 7006. Signals such as ready signals are interchanged between the control units 7004 and 7005 along the lines therebetween. The storage capacitor 7009 insures that the voltage regulators 7011 will have power for at least five hundred microseconds after primary power has been lost. This is essential for the power failure automatic interrupt feature of the computers. However, if the voltage regulator fault control 7008 senses an over voltage or an under voltage in the voltage regulator circuits 7011, it turns them all off within 5 microseconds. Also, if AC power input is lost at any point, then control unit 7004 shuts off the voltage regulators 7011 in sequence rather than shutting all of them off together as in the case of an over or under voltage.

Now refer to FIG. 49, the block diagram of a (transposer) interface unit (transposer) and terminal device power systems. In the interface unit and terminal device cabinets, primary power is supplied through interface filter means 7101 and passed through the interface protective circuit breaker circuits 7102 into the interface control unit 7103. A transformer-rectifier-regulator circuit 7104 regulates power into the interface load of the module 7105. Primary power is also supplied directly into the terminal device or input or output unit.

The terminal device 7106, when individually turned on, is capable of providing power to the control unit 7103 in its interface portion which enables power to be supplied to the transformer-rectifier-regulator 7104 into the load 7105. This is for individual operation for a terminal device. FIG. 49 indicates power lines only. There are many intercommunication lines also between the terminal device 7106 and the interface load 7105. Similarly, there is intercommunication between modules, for example, between the cabinet load units of FIG. 48 and the interface load unit 7105 of the interface unit in FIG. 49.

Refer to FIG. 50. FIG. 50 is a schematic diagram of the positive voltage regulator circuits 7011 of FIG. 48. There are two positive voltage regulator circuits such as is shown in FIG. 50 in each voltage regulator unit 7011.

Refer to FIG. 51. FIG. 51 shows the negative voltage regulator circuit of voltage regulator circuit 7011 of FIG. 48. Two of these negative voltage regulator circuits of FIG. 51 are provided for each voltage regulator 7011 of FIG. 48.

A positive low voltage regulator is provided. This low voltage regulator is shown in FIG. 52. One FIG. 52 positive low voltage regulator is provided for each unit 7011 of FIG. 48.

The circuits of FIG. 50 the positive voltage regulator and FIG. 51 the negative voltage regulator are made complementary so as to establish the ground as the ground of the entire system. Because of this, a number of transformer windings and rectifiers are saved and need not be supplied in this system. In addition, the series power transistor which in conventional circuits is in the ground line is kept out, which enables the unregulated input voltage to be used for other power system circuits not only for the regulator. The complementing of the circuits enables temperature stability and enables them to be short-circuit protective. The K start contact (not numbered) shown in each of FIGS. 50 and 51, enables small power (one amp contact), contacts to be used in contrast with other circuits which require 20 amp contacts where they appear at the output. Thus, a typical regulator, when it comes on, will overshoot in the first surge of power, but the circuits of FIGS. 50 and 51 insure that this does not happen. This means that the voltage regulator fault control 7008, which is very sensitive, is not triggered on turning on the power in any of the cabinets or the system. When power is applied to the input, $-V_{in}$, shown in FIG. 51, the K on contacts close first and then K start closes for about 14 milliseconds and then opens. The RC network R7411 and capacitor C7411 slows down the turn on of the transistor circuit to prevent this overshoot. The electronic type of protection thus built in the system is very fast acting and is effective as long as the K start relay is open. The K on contact also permits the voltages to turn off in sequence so that K on is opened first in the turn off sequence. In each of the regulators of FIGS. 50, 52 and 51, there are two regulators for two of the voltages of the type shown in FIG. 51, there are two voltage regulators for an additional two voltages of the type shown in FIG. 50 and there is one voltage regulator for the low voltage three volt regulator of FIG. 52. By virtue of the fact that each of the K on contacts of FIGS. 50, 52 and 51 are different contacts, sequencing is mandatory in the voltage turning-off process.

FIG. 53 is a schematic diagram of the voltage reference circuit of the preferred illustrative embodiment of the inventive system. This establishes a reference voltage to compare the output of the voltage regulator 7011 against. The circuit generally comprises temperature stable reference diodes and potentiometers to adjust the voltage for critical adjustment of the reference voltages needed for voltage sensing. In order to establish under or over voltage, the voltage which are the standards for what the voltage should be must be established. The output of the voltage reference circuit of FIG. 53 provides these standards. The under voltage sensing relays are required to enable getting up to the sequencing of voltages before attempting to sense whether there is under voltage present.

Refer to FIGS. 54, 55 and 56. The outputs of the reference circuit voltages of FIG. 53 appear as the inputs of the fault sensing positive voltage circuit of FIG. 54. FIGS. 55 and 56 each are provided also with inputs from the voltage reference circuit of FIG. 53. These provide the fault sensing circuits for negative and positive voltage and for the low positive voltage. All of these circuits are in the voltage regulator fault control unit 7008 (see FIG. 48).

One output voltage of the regulator 7011 of FIG. 54 appears in the input V2. The reference is applied at the inputs V1 and V3 of FIG. 54 for the respective over and under reference voltages. These V1 and V3 inputs are applied to all three of the circuits of FIGS. 54, 55 and 56.

Basically, what happens in these circuits is as follows: (1) If the voltage is high, current goes in one direction causing an eventual over voltage signal output by saturating one of the transistors, and (2) if the voltage goes too low, the other transistor becomes saturated resulting in a low voltage output signal.

The transistors provide isolation which is required in the circuits. The system is described in detail in the aforementioned incorporated copending application for "High Speed Direct Current Voltage Fault Sensing, Indicating, and Load Protecting Apparatus" of Albert B. Fegley.

The sequence off circuit output inhibits the operation of the fault sensing just before circuits are sequenced off.

The V8 signal voltage input lines in each of the three circuits of FIGS. 54, 55 and 56 is a six volt unregulated signal to supply isolation in the fault sensing circuits. This in connection with the transistors in the circuit provides isolation in the regulators.

Refer to FIG. 57. FIG. 57 shows a representative example of the indicating or recording circuits wherein responsive to the outputs of the circuits of FIGS. 54, 55 and 56, fault sensors, the respective indicator lights are turned on to indicate that a fault is present to display which of the over or under voltage circuits has caused the trouble. These are provided in the system for servicing purposes.

When the circuit of FIG. 57, the recording circuit, is caused to operate, the lamp remains lit once it has been lit even though the voltage regulators may be off. By this scheme, the regulators 7011 (see FIG. 48) are turned off, although unregulated power still comes in. This unregulated power keeps this lamp lit. Once the light has been observed, reset switch S7911 must be reset. Upon resetting switch S7911, all power applied into the particular module is turned off.

Now refer to FIG. 58. FIG. 58 is a schematic diagram of the protection and high speed sequencing off circuit. In order to enable the module to turn on again when turn off is effected, for example, due to a one voltage spurious signal which might be coming in from an adjoining module or cabinet, the switch S7911 must be reset and then set again when the particular module is started up again.

When an AC fault occurs, off-sequencing is provided by the sequencing-off circuits 8001, 8002, and 8003, shown in the boxes bordered by dashed lines in FIG. 58. The point designated "open" must be opened where the sequencing-off circuit is used. This is an optional feature.

From the V*out* line of FIG. 57, with a 24 volt input at V*in*, for example, applied through switch S7911, 22 volts output appear at the V*out* line. This voltage is applied at the V*sig* input in FIG 58. This causes the control rectifiers CR8001, CR8002, CR8003, CR8004, CR8005 and CR8006 to fire. When the controlled rectifiers CR8001–CR8006 fire, there is a one volt drop between the cathodes of each of these rectifiers and ground. That one volt output is disposed across the output of each of the regulators 7011. There is one of these for each of the regulators 7011. When the controlled rectifiers CR8001–CR8006 fire, the output is dragged down to essentially 1 volt. This enables the controlled rectifiers CR8001–CR8006 to put a dead short across the output of the regulators.

That is, when the circuit fault sensing circuit (of FIG. 56) indicates a fault, a 6 volt signal is applied at the Sig. $V_1$ input of the circuit of FIG. 57 or the corresponding signal input Sig. $V_2$, Sig. $V_3$ or Sig. $V_4$ for the other circuits. Upon applying the 6 volt signal input Sig. $V_1$, the control rectifier CR7901 (for the Sig. $V_1$ input and the corresponding controlled rectifiers, not numbered, for the other Sig. V signals) fires causing the above-described approximately 22 volt output to be applied at the signal input of the circuit of FIG. 58. Upon application of this signal at the signal input to the circuit of FIG. 58, the corresponding control rectifier, e.g., control rectifier CR8001, fires causing the one volt signal output to be disposed across the output of all regulators 7011 since all of the control rectifiers CR8002, CR8003, CR8004, CR8005 and CR8006, in addition to CR8001 fire upon a signal input being applied to the circuit of FIG. 58. This one volt signal across the output of the voltage regulators protects the voltage regulators. This will prevent catastrophe to the entire system which might otherwise occur even if only one regulator 704 was off and the condition was proper for such catastrophe.

The inputs at the sequence-off circuits of unit 8001 of the circuit of FIG. 58 designated $V'_2$ correspond to the sequence-off circuit outputs of the circuit of FIG. 56. These are the circuits which supply the inhibiting voltages in the FIG. 56 fault sensing circuits.

A signal input appears at the input designated $V'_4$ in FIG. 58 which originates in the console, which is a power off signal and is at a 6 volt level. This is the signal which occurs 500 microseconds after an interrupt due to power off has occurred and it fires the control rectifier CR8001 and enables the first two sequences of the control rectifiers CR8003, CR8004, CR8005. In the second sequence control rectifier CR8006 fires. Following that, controlled rectifiers CR8003, CR8004 and CR8005 fire to apply the one volt outputs across the corresponding regulators 7011 upon the power off signal being supplied from the console. The console power off signal occurs because of an AC fault power off signal supplied from the console by the operator. The sequence off between the first step and the second step in the event of AC power failure is about 15 microseconds.

If an output voltage is lost, that is, a voltage regulator 7011 develops a fault, all output voltages are removed in 5 microseconds. This is an important feature of the protection to the computer system because it enables relatively instantaneous removal of voltages to prevent component failure from continued presence of voltage when a fault occurs.

In each of the voltage regulators 7011, sensing occurs at plus or minus 1 volt of the nominal supply, except for the 3 volt supply. In the 3 volt supply sensing occurs when the supply is one-half under or over the nominal voltage. This circuit is fool proof under extremely varying ambient conditions. For example, the circuit is operative to provide less than two-tenths of a volt drift between 25° C. and 90° C. ambient temperatures.

Refer to FIG. 59. As stated in the event of interrupt, 500 microseconds delay occurs. The 500 microseconds delay is effected by a conventional 500 microsecond time delay circuit. This 500 microsecond delay circuit is responsive to signal input supplied by the AC fault sensing and signalling circuit of FIG. 59.

Upon the occurrence of an AC voltage failure, a signal is sent to the logic and simultaneously is sent into a time delay circuit (not numbered). After the timer has timed out 500 microseconds later, it sends a ready off signal to the power supply. A power off signal is sent to the power supply 15 microseconds later.

The AC fault sensing and signalling circuit schematically shown in FIG. 59 is located in the console. The console is connected to the same primary power source that each of the other cabinets has its power supply connected to. If a sudden dip or rise occurs on the four line input, which is the primary source of power supply, this is sensed at the three phase AC input by the circuit of FIG. 59. Upon sensing an over voltage or under voltage or failure of the primary power supply source, the circuit of FIG. 59 generates a signal which is delayed in the 500 microsecond delay timer circuit (not shown) to enable shut down of the equipment in 500 microseconds.

The signal from the FIG. 59 circuit is sent over instantaneously to logic which notifies the computer that the circuit will be off in 500 microseconds. This signal triggers the interrupt circuit logic as well as the timer.

*Overall DC voltage distribution and strip line circuits*

In the computer system of the preferred illustrative embodiment of the invention, AC and DC power supplies and a power distribution system comprising a power harness are provided. An AC control system governs distribution of AC power from cabinet to cabinet. This is primary AC power. Within each system cabinet is a unit to convert the AC to DC.

The DC voltages are plus 3 volts, minus 15 volts, plus 15 volts, minus 30 volts, plus 30 volts, and plus 50 volts. All but the plus 50 volts DC power is supplied from regulated power supply outputs. An additional 23 volt DC power supply is used for the indicator lamps on the consoles. A 1 volt AC voltage is provided to heat the filaments of the indicator lamps. The +50 unregulated DC forms the plate supply for the one volt AC supply.

Within each module DC power is distributed by means of low inductance, low impedance shielded strip line network.

Each cabinet has its own complete power supply and control system. In the DC portion of this power supply, the output connected to the DC package is aligned with a DC receptacle. From the DC receptacle, a plurality of voltage busses extend into movable racks which may be hingedly mounted.

From the DC connector a group of flat copper busses separated by an individual ground means for each bus, in alternate copper bus and ground means array conveys the DC power to the logic card holding racks containing the logic circuits of the illustrative embodiment. The voltage busses adjoin to vertically disposed copper voltage busses that are in a fixed location on the hinge side of each rack. These are disposed vertically within the hinged portion of each rack. The rack is a swinging module which contains the rows of cards, each of the cards containing a circuit for the module.

DC power is ultimately delivered to the cards by means of a horizontally positioned voltage distribution strip line assembly. The strip line assembly comprises alternate horizontal flat strips of tin plated copper separated directly by grounding means and insulated busses to insulate each copper plate from each other and to ground each copper plate. Thus, alternate grounded strips and hot strips are provided. Fingers which comprise a flat strip of copper with insulation therearound vertically depend from the strips. The fingers depend only from the insulated busses. There are no fingers from the grounds. Each of the fingers contain the respective DC voltages from which the busses extend. Attaching the strip line assembly to the rack is effected by the application of conductive epoxy cement. That is, the groups of horizontal strips are actually secured to the rack by means of conductive epoxy cement. The purpose of this is to both hold the strips in place physically and give a low impedance ground. The fingers are cut to appropriate length to fall in exact juxtaposition with the card connector pins to which they are connected.

Thereby there is provided a low impedance, low inductance highly conductive, and adequately insulated and shielded power distribution system. A system to effect this, such as is provided by this type of system, is mandatory with a high speed computer. Although DC power is being transmitted, a low impedance is necessary to eliminate cross-talk and other adverse effects. Wire other than ground wire is required to be distributed in the high frequency computer system of the present system and the method and means herein described is highly satisfactory.

AUTOMATIC OPERATING AND SCHEDULING CONTROL SYSTEM MEANS AND PROCESS (AOSP)

*Introduction*

The anticipated applications of the inventive system definitely discourage a mode of operation which is common for machines of an earlier generation, whereby a "main program" and its ancillary routines are conglomerated, by hand or automatically, to constitute a "program deck" which, for each "run," is loaded into the computer and given control. The inventive computer system in view of its intended uses provides means and a process of operation in which many more-or-less unrelated tasks are being performed at the same time, many small standard jobs are being done in response to external stimuli, and involved structures are set up (perhaps dependent on incoming data) to handle large processing tasks. For abbreviation the automatic operating and scheduling control system means and process will be hereinafter abbreviated as AOSP and when thus referred to AOSP will mean both and either of the means and method as the meaning dictates. In such an environment then, in order to realize the potential of the machine, the AOSP must have access to a very large set of programs and data complexes which it can call upon without any human intervention. Thus, in the design of the AOSP it is assumed that there will be available at run time a file of programs and data, which contain not only the raw items, but a substantial amount of information about their nature, interrelationships, requirements, and constraints. Clearly, the greater part of this information can be collected and automatically appended to each program (or data complex) by the programming system—primarily the compiler or assembler, in the case of programs—which translates these items from external languages and places them in the file.

The AOSP is not a package of passive utility routines: it merely employs some so-called routines. It is a control system and process which responds dynamically, to the changing requirements of the computing complex. This necessarily entails that there be available to the AOSP information about the programs and data whose operation it is to oversee. When it enters the system, a program, or, for that matter, a block of data, cannot be handled as a monolithic block of binary words, but must be accompanied by a certain amount of identifying and descriptive information. This externally supplied information, and additional information generated by the AOSP itself in the course of its activities, constitute the internal bookkeeping records by means of which the AOSP makes its decisions to allocate memory space, assign computer modules to the various programs, etc.

An operating system may provide data which is available to adapt or modify a specifically written program in order to locate where something, which may be stored in various places, may be located. Operating systems can also do various conversions for example, from binary notation to and from decimal notation in putting input into a computer or taking output from a computer. For example, assume a user hands collection of data and the problem to be solved to the program. The program must be loaded into the machine and matching the language of the program and the machine must occur. If several problems could be run at once, then scheduling must be effected to run the machine practicably, so that while operating, different programs are prevented from interfering with one another in operation.

Scheduling is the process of deciding which job to run. In scheduling it is determined what time each of the jobs are to be initiated and given to the operating system to work. In the usual computer, this is done in sequential manner, wherein one problem after another is solved sequentially. In the present computer system, it is desired to put in all problems at once and work them in an optimum manner interspersed with one another. The selection of the jobs for operating and scheduling is done completely under computer control in this system. The selection and the operating is effected by the automatic operating and scheduling control process and system described herein. The AOSP process information may be on a drum or other external storage device, but while the machine is running it is placed in core memory. The AOSP may be also utilized for such functions as diagnostic processes, that is for determining causes for failure in the machine such as machine errors or mechanical failure. The AOSP may be also used for detecting programming errors and providing service in such case. For example, when a program makes an illegitimate request or tries to write out of bounds the AOSP will detect this, indicate what is going on and remove the problem from operation. It will store sufficient information at this point so that what has happened may be determined.

In addition to error recovery and diagnosing the system of the invention schedules equipment, i.e. which units are busy, which are available, and selects from the available ones a module or I/O device which can operate upon a next succeeding portion of the program which is desired to schedule in at this time. The AOSP can also be employed to switch from one unit which is malfunctioning and transfer its functions to another unit upon malfunction of the first unit.

*AOSP general philosophy*

The AOSP works directly on the multiprocessor operating system of the invention on the assumption that at least two computers are in the system (or the program could be simplified) and there is at least one memory module for exclusive use by the operating system. A high frequency of interrupts is anticipated. The active parts of the operating system are kept in core to alleviate core-drum transfers.

The preferred illustrative embodiment inventive system provides for 16 external interrupt lines. It is assumed that these lines will require rapid response in the activation of some I/O and/or computation. For each line there is required a minimum program to acknowledge the input (responder) and space reserved in core at all times for the maximum message length from each line. The acknowledging and processing programs may be provided by the user. The duplication controls and activation of the programs may be the same. Each of these programs, until duplication is accomplished, have special abilities to modify the operating system tables and should relinquish this role as soon as possible.

The AOSP is able to handle two classes of programs, one class is debugging, compiling, teting, etc.; the other class is a set of debugged operational programs as in some command-control system. The operating system assumes the program is incorrect if an illegitimate situation is detected.

In the invention considerable logic has been incorporated to provide for the detection of errors that may occur within the system. For example, in each processor a portion of the interrupts are directed to hardware and/or program error detection such as:

Intenal Parity Error or No Access to Memory.
Illegal Instruction.
Write Out of Bounds.
Arithmetic Overflow.
Restart After Primary Power Failure.
Primary Power Failure interrupt.

There are also error indications associated with the Input/Output system. These error indications, if they occur, are relayed to the program via the status codes contained within the In-Process and Result Descriptors that are returned to the memory from each I/O Module. The status conditions representative of various I/O errors are:

In the In-Process Descriptor:
- Parity of descriptor was incorrect on arrival at the I/O Control Module.
- The I/O device requested is not available.
- It is either in use or inoperable.

In the Result Descriptor:
- Parity error on data read from memory.
- Parity error on data from the I/O device.
- Power failure interrupt.
- Access to memory is not available.
- Operation not completed when released.

One function of the AOSP is to recognize these error interrupts and status codes and call on service routines designed explicitly to handle the detected conditions. These error handling routines are in addition to the more demanding part of the AOSP involved in the normal response routines such as allocation, I/O readies, etc. However, they are maintained in a file on a drum or magnetic tape to be called by the AOSP when required. The techniques used in recovery from a particular error interrupt are directly, and intimately related to a specific installation, its operational environment, and system configuration.

If the program being executed and the status of I/O equipment is known in detail, at the time of detection, it would be possible to narrow down the source of the error considerably. Some sources of error would still be difficult to isolate unless one assumes at least one of the modules is functioning properly.

Many possible techniques are available to implement diagnosis. Assume Computer #1 detects a parity error in Memory #3, the word in Memory #3 having been written from I/O Control Module #2 on Bus #4. First computer #1 is tested using some other memory, or Computer #2 may do all the testing of the suspect set of modules exclusive of Computer #1.

If the malfunction does not repeat on test, there is some sort of transient error in the system and a comprehensive confidence testing program on all equipment should be introduced.

If the error remains, a test may be run in the suspect memory module with a variety of test patterns. If the test is successful, then a test of the switching interlock between the computer and the memory would be performed. Then a test of the memory using some other I/O Control Module would be performed. If successful, suspect I/O Control Module is tested with some other memory. In this manner all possible data transfer paths are checked. Eventually one of the modules (or data transfer lines) fails some test and this module (or path) is developed to be avoided until repaired. In the way the test fails, information can be provided to maintenance personnel to aid in correcting the malfunction.

This seems relatively straightforward in theory, but in practice complications are encountered. Assume, while operating, there is detected the fact that memory Module #5 is down. Use of Memory Module #5 cannot be stopped. It contains data essential to continue. This data must be recovered. This means either redundant storage or the ability to back up to some restart point and start over with computation, or perhaps some combination of both techniques. In addition to recovering the data, all program addresses which reference this data must be changed. All programs have to be written so that this change may be accomplished (perhaps just some one base address). With a complex program layout structure in core memory, complex bookkeeping must be carried out.

If it is determined that a computer module fails, the recovery is trivial or complex depending on whether there is any parallel processing at the time of the failure. If an I/O Control Module fails, recovery is easy or impossible depending on whether operation was within an input or an output, and which terminal equipment is involved. If an I/O Control Module fails while it is reading cards, the cards will have to be reloaded. If it is accepting unbuffered input of any type, the data is lost. If it were printing a message or writing on a drum, then the operation can be redone by another I/O Control Module.

If there is trouble in the switching interlock, or the clocks get out of phase, then it is likely to be almost impossible to continue operation.

There is an alternate technique which basically involves stopping all work at the time of detected error, put all modules to work chasing it down, reloading from previously stored restart data, and resume-bypassing the bad equipment of course. This would involve reallocation at load time, but this is standard practice. This route is suitable only for non-real time critical applications, although perhaps more economical in time and core space than any other procedure and straightforward.

Since the computers are identical, thus improving system availability, there are no fixed master-slave relationship between computers. The computer, which is inside a programmed lockout or in the control mode in the operating system, has the ability to direct other computers. This control switches back and forth between the computers as required. A preferred memory module (0), may house the operating system, or optionally the information for the process could be floated to any module. There is inherent in the I/O control modules a hierarchy in access to the data transfer bus. Aside from this, the I/O control modules are used as they become available.

The operating system reflects the modularity of the equipment. Multiprocessing is a complex subject. The AOSP allows a single piece of code to be called for execution (without duplication) by many programs on any number of computers. It also allows the programmer (using discretion) to initiate a parallel process. It allows certain preferred programs to control the order in which processing of I/O requests is effected.

AOSP tables are almost all linked lists imbedded in the jobs being executed. In the illustrative embodiment these lists are sacred. Any manipulation of them outside the operating system causes chaos. The AOSP tries to optimize use of core space. It uses simple algorithm to provide, in every request, the smallest adequate available block. Reallocation and packing of memory may be effected if desired, but it requires an enormous amount of control and restrictions on the programs. It is simpler to dump at convenient points specified by the programmer and reload (packing memory as a matter of course).

The operating system, to an uninterested user, performs as though it were the only user of the apparatus at the time of running. Aside from a few conventions about the structure of the program (provided by a compiler), he can work as though he were working with a single computer. However, for more advanced thinkers, there is available the ability to perform true multiple processing on a single task. Considerable analysis must be done to determine when it is more efficient to do parallel processing. It will require on the order of 20 MS to initiate and drop a parallel path. Therefore, very minor tasks should be serial.

*Structure of AOSP and modes of operation*

There are two modes of operation in the computer system of the invention, normal and control. The basic difference between them is that interrupts are inhibited in control mode and some instructions (as TIO) are illegal in the normal mode and cause an interrupt. The obvious way for a computer to be able to make operating decisions would be to stay in the control mode while it is performing this task. However, with the several computers possibly in the control mode simultaneously, it is necessary to perform programmed lockouts to prevent interference. It is very simple to do a lockout test in the normal mode, but not so easy in the control mode. Also if multiple interrupts occur, it is convenient to make a programmed decision of which to honor first. This situation is detectable if the computer quickly goes to and stays in normal mode in the AOSP. Therefore, most of the AOSP process is performed in the normal mode.

The AOSP must be able, in the normal mode, to identify which computer is performing steps in accordance with the AOSP and when it is in the AOSP and when not. The IAR, a protected register in normal mode, is set to a value to indicate which transfer table a computer is to go to if the computer is executing an object program. When the computer is interrupted, the IAR is set to a different value to cause interrupts to go to a different transfer table, and XII is set to the number of the computer for use inside the AOSP. When the XII computer leaves the AOSP, the IAR is set to the proper value. In this way, the computer always carries enough information to remain in control. The AOSP process is written out in the same form as a set of routines would be and each of these may be entered several times in the process of servicing one interrupt. For instance several core allocations may have to be done and several named objects may have to be found in the files. Several computers may be using the same routine at different levels. Spare thin film in the computer is used to carry return locations and other flags to indicate what level it is now processing and what to do next. When necessary, values indexed by computer number are addressed to find reference information.

The number of lockouts is minimized so that processing time is impeded as little as possible. The choice is in how many different lockouts and when it is necessary to invoke them. As an example, other computers must be inhibited from scanning for a named object in the core while the named object table is being modified, or other computers must be inhibited from modifying user links of an object while a computer is unlinking a user. There are five basic lockout functions and usually they are invoked for only a few instructions. Occasionally they are held "up" for a considerable amount of computation, the total time a computer is looping on a lockout will not be significant. We will have to perform simulations or studies to be exact about it.

To perform a lockout, the program consists of two MOVE or TRS instructions.

| | | |
|---|---|---|
| MOVE | LOCK, | *A |
| MOVE | LOCK, | *B |
| LOCK | ADDR | LOCK* |
| A | ADDR | A |
| B | ADDR | B |

To release the lockout $$\text{MOVE } B_0, B$$
$$\text{MOVE } A_0, A$$

This will affect the lockout absolutely no matter when or how many computers want control. As an aside, if lockouts within lockouts are required, they must always be given in the same order (hierarchy of lockouts) or the computers may get jammed waiting for an impossible situation.

EXAMPLE

```
——→ t          loop

COMP 1  LOCK A  ——→  LOCK B
COMP 2  LOCK B  ——→  LOCK A
```

Consider the I/O problem of multi-computers sharing I/O equipment. Provided are a set of Device tables indicating the current device availability and status, and an associated queue of requests for each device. To have a simple scheduling system for I/O, when an I/O control module becomes available, there is taken the oldest queue entry from the devices in a fixed order of devices (reflecting transfer rates, i.e., drum-mag tape-printer card reader, and card punch). Request or priority is not associated with scheduling. Device priority is considered only in this regard. However, the requestors priority is considered in allocating core space (especially for previously unallocated requests) and hence in some cases, the high priority job will run "smoother" than a low priority job (a complex function of machine configuration and job mix). The problems associated with several programs using the same device are left pretty much with the programs. Associated with each device is a "Status Controller," which is the name of the only job which can modify the device table status. Typical statuses for a magnetic tape unit are:

(1) Read or Write
(2) Allow exclusive user
(3) Disallow exclusive user
(4) Read only
(5) Status controller only may be exclusive user Now consider a job requesting a set of input data from some buffer tape. The system will usually run more efficiently if the tape remains positioned for reading the next set of data if computation time is small. Hence, the program should ask (via macro) for exclusive use of this tape, and relinquish exclusive use as quickly as possible. This will tend to prevent the tape moving back and forth long distances if two users are simultaneouly making requests for spurts of data in different areas of tape.

Requests of the type, "Get object called A from file called B", are allowed. In the word specified, the address of where this object is, is put in core, and a bit in this word is reset when the object is usable. This is a general enough filing system for most requirements. At the base of the information is the System Directory, which contains information about all mounted or active file directories. The directory of a file need not be on the same device as the file itself. The file directory contains information about the type, size and location of the named objects on the file. The System Directory remains in core memory, the file directory is in core memory or on some fast access medium (drum) and the bulky files is on tape or disc. In the above example, object A is allowed to have as requirements with it other objects on (perhaps other) files. The total complex of required objects will be usable before the requestor is notified. Now consider how to select what is to be run. In the core memory is a set of thin film images called the Job table. These represent the current state of a computer either at the time the job was last run or last activated. The set of jobs are linked in priority order. When a computer is interrupted, the contents of the thin film registers is stored in the part of the core memory representing the job table entry of the interrupted job. If, during the processing of the interrupt, some other job's status becomes suspended ready to run, the remainder of the contents of the thin film registers corresponding to the interrupted job is stored, that job's status is suspended, and the computer searches for the highest priority suspended job. When found, the computer changes the job status to "running", loads its thin film registers from the indicated job table, loads its control registers (MASK, IAR, LOCK, ETC.) and goes to the control mode to do an IRR to resume processing.

In the event a computer, (the ADSP) finds no work in the job table, the AOSP again tries to find work to do, constantly scanning the external request lines. The AOSP must determine if the system's memory is glutted. If it is, some job must be removed to allow the others to proceed.

*Structure of jobs to be executed*

Refer to FIGS. 60–70 inclusive. FIG. 60 is a simplified flow diagram of the AOSP. FIGS. 61–69 are format and bit definitions of AOSP headers (or headings) for program and data areas, data object, simple subroutine and bit definition of ABI (adaptor block) line. FIG. 70 defines the format and bits of bits 1–16 of the ABI. There has been assumed a rather rigid format of blocks of data in the memory and the inter-relationship of these blocks by type. The concepts of implementing the AOSP are now briefly described by way of introduction.

The basic program entity consists of a body of instructions which is called a Program Area (PA) and an associated block of addresses, constants and working storage called a Data Area (DA). A body of instructions without a DA is called a Simple Subroutine (SS) and a block of data without an associated PA is called a Data Object (DO). These entities are held together through a table of linking information usually near the head of a DA, the table being called an Adaptor Block (table composed of ABI lines). A PA may have associated with it many DA's, each of these called an incarnation of the program (PA–DA). The structure may best be examined by example. Consider an incarnation of some program being entered via a SRJ from another program running. Control is given to what is called a "Starter Patch" which is inserted when readied, and when executed accomplishes these functions:

(1) Saves the previous settings of the base address register 055 in the new DA.

(2) Loads the base address register 055 and the base program register 054 to the head of the new DA and new PA respectively.

(3) Sets limit register XR15 to the new contents of the base address register 055.

(4) Places a pointer named Path L to the job table which performed the subroutine jump in the new DA.

(5) Gives control to the first instruction of the new program area (PA).

Before the program can be entered by subroutine jump to be executed it must previously have been "Readied". This consists of setting absolute addresses in ABI lines to specified indirect addresses after these objects are themselves "Ready", and also updating required memory map tables. A DA's Adaptor Block specifies which objects are required with it (Necessaries) and also provides specification of Conditional objects (to be Readied as required) and Parameter pointers. In fixed fields the PA is given the number of such Necessaries, Conditionals, and Parameters. If a DA has Necessaries, a program is activated to call for the Readying of these necessaries. With this accomplished, a report is made to the requesting jobs, and their memory bounds approximately expanded in the job table.

The detailed specification of the Adaptor Block and the manner in which necessaries, conditionals and parameter are formated is given in detail FIG. 69.

Blocks of information in the core can be linked together in 3 ways. If the object has a name, it is linked into the Named Object map in alphabetic order of name and file name. If the block is available space, it is linked into the availability map in order of size of this block of space. All objects are linked to the previous and to the next object in order of ascending core address. An object may exist in various states during Readying. If a request is made for an object which is not in the Named Object Map, this object's name is inserted in the Named Object map in what may be termed a Dummy Object. This object is four words in length and retains the information required for deferred processing of a request. Deferred processing could occur in the event adequate space is not now available. Insertion of this object into the Named Object Map prevents duplication of work in the event of several simultaneous requests of the same object. Every nonavailable block of space has a user link associated with it. A user link is a set of requesting lines spanning various Adapter Blocks which could represent several jobs. There is some redundancy in the various linking, but each set of links is used in several ways by various parts of the AOSP.

*Initiation of work by a computer*

As a final set of preliminary remarks, an explanation of how anything gets going is required. When an external request line goes up, it indicates the existance of some new input source to the computer. At this time (as soon as reasonably possible) a descriptor is sent to an I/O control module to accept this data. The place in which to read the message has been previously established. A known program is activated to create another copy of itself (for the next message) and interpret the input. This program is called Responder. Considering in sequence the steps taken:

(1) A computer is interrupted by the external line going up.
(2) This computer initiates an I/O request in the I/O processing section of AOSP.
(3) The mask of the active line is put down (to prevent interrupt loops).
(4) Prereadied Responder is activated (put in suspended ready to run Status).
(5) The computer selects a job from job table (which ordinarily is the Responder).
(6) When Responder gets control it asks for the Readying of a new copy of itself by performing a Branch request MACRO thus establishing a parallel path of control.
(7) One path sets itself up for another message.
(8) The other path waits for the message and the completion of the set up of the other path of control.
(9) The mask bit is set for the next message.
(10) The message is decoded (i.e. some run request).
(11) The request program is Readied.
(12) Priority and job name are established.
(13) Control is given to Readied program.

*Major Macro calls*

The Branch Macro is now discussed. First it should be noted that programs are associated with entries in the job table and not with computers. Any computer may select any job and run it. The Branch causes a new entry to be created in the job table (identical to the calling job except the top of the stack is set to zero in one, non-zero in the other). Then either entry may be executed by any available computer either in parallel or serially. The program cannot expect that the Branch causes parallel processing (there may only be one computer), but coding must be effected as though either path may be in any partial state of completion. The control is not as complex as might be imagined.

Typically, the coding is (1) SET $A=1$
(2) BRANCH
(3) IF STACK=0, GO TO B
(4) PERFORM INDEPENDENT FUNCTION
(5) AWAIT $A=0$
(6) RESUME

B (1) PERFORM INDEPENDENT FUNCTION
(2) SET $A=0$
(3) END BRANCH

The reason for doing this may be to speed elapsed time due to need for computer processing, or to give the computer work because of expected delays due to I/O.

A Macro is a deliberate program generated interrupt which has in specified thin-film registers the parameters of the request on the AOSP. This is the way a program does I/O, branching, await a condition, ask for a named object, get core space, and terminate. Certain macros are restricted to preferred programs (responder, Readier) and attempted use by others cause termination. Macros of this type are: change this job's status to suspended in real time, report to all users this object is now ready for use, remove from the time tables a specified function, etc. The most common macros for the usual programs are:

(1) Branch
(2) Activate this job when a specified bit becomes zero.
(3) Activate this job when all previous I/O requests are completed.
(4) Decrease the priority of this job.
(5) End Branch.
(6) Give me exclusive use of some specified DO (LOCK).
(7) Release exclusive object use (UNLOCK).
(8) I/O requests.
(9) Find or READY.
(10) Release use of object, device, etc.

*Detailed description of mechanics of find macro*

The most complex of the macro calls are "Ready" and "Terminate." A review of most of the previous material and a deeper appreciation of the concepts may be had by following through the details of a typical Ready request.

Consider a point in a program where it is determined that object A on file B is required. The program generates a macro call interrupt on the computer executing the code. The parameters required are an indicator that a Ready is to be performed and which word in the Adaptor Block (a condition or parameter type) contains the information of what is wanted. After the interrupt, it is noted that this is a macro call, several thin film registers are saved, and entry is made to a transfer table which sends the AOSP to the Find path which will send it to the Ready path.

The first thing done is a decoding of the bits in the requesting line (at times referred to as ABI line). The information specified there is the file name and a pointer to the object name, the type of object this is (Program type or Data type), whether the program wishes to write into this object (from computer or I/O) and whether exclusive or possible shared use is desired. Assume that some PA–DA is wanted, the program will write in the DA, and allows shared use of the PA.

The next thing to be done is to scan the named objects in core to determine if the PA is already in memory. If it is, a dummy is formed to make the need for a DA to be readied. If not, a dummy is formed in the memory map indicating that the Readying of a PA has been initiated. Assume the PA is not yet in the memory map.

The computer processing this request then attempts to find in the system directory the file directory. If it is not found, a bad I/O is reported and the requesting jobs terminated. If it is found, assuming the file directory is not now in core, space must be allocated to bring in the directory. If space is available, it is assigned and control proceeds. If not, a dummy space request is left in the chain of unallocated dummies and control returns to the requesting program.

As space is released by various users, checks are made to determine if the unallocated dummies should be given another chance at allocation. Each time an allocation is tried and fails, the priority of the space request is increased. Eventually, the priority becomes large enough to cause the allocation of space to stop until this space is available.

When space is assigned for the required directory, which could be done by any computer at some later time, an I/O request is queued and later honored to transmit the directory from, say the drum, to its assigned space in memory. When some computer is interrupted because of the I/O complete, it notes that this was a directory which came in, scanning is thus effected for the named objects requested from the file. These objects are linked as dummies to the file entry in the system directory. The process is repeated in assigning space for and bringing in the requested objects.

When the PA is in core (determined by the I/O complete report, or perhaps found when the memory map was scanned originally) a similar process is repeated to bring in a DA for each requestor.

When each DA is brought in, its header is appropriately modified to reflect required absolute addresses and links, and a check is made to determine if additional requirements exist for this DA (Necessaries). If they do, a program is activated (generated in the job table) to call for the Readying of these necessaries. This is a special type of coded process which calls for the readying of the necessaries as other programs call for readying of conditionals. When all are reported as found (some of these necessaries may have necessaries, but this is handled by a fresh job table executing the same Readier program). The Readier calls for a special report Macro (available only to it) to remove its job table and activate the reporting of the object as though it had no necessaries. The reporting consists of placing the address of the head of the DA in the line in the caller's Adaptor Block, setting bits in this word to indicate the presence of the address, decreasing the number of unserviced I/O requests in the job table entry of the requestor, modifying the memory bounds of the entry to include the new object and all its necessaries that are of the "Write" type and cause rescheduling of this computer if there is a detected status change in the job reported to.

When all DA's are in core and no other requests are required from the file the file directory space is released and the system directory flagged to reflect this.

The sketchy description of Ready (neglecting multiple requests, termination and lockout) illustrates the disjointness in time of a computer and a program. Functions are performed when any computer can service them, and reports may be rapid or slow. There is no need for the programmer outside the system to worry about this feature unless he is interested in scheduling a batch of jobs, some of which must be performed as some function of time. The way in which things are done tends to keep the machine active.

*General description of the AOSP and its action*

In summary of the above paragraphs, at any time when the system is in operation, there exists in the core memory a collection of programs in various states of completion, along with numerous blocks of data related to them. There is also in the memory a set of records acessible to the AOSP, which refer to these programs and data objects and enable the AOSP to determine their states and interelationships. On some secondary storage medium (presumably tape or disc) there exists a file of programs and data which has been created by the programming system. The file has associated with it a table of contents, or directory, which gives, for each item in the file, its location in the file and its size (or the sizes of its component parts). In case the directory is too large to be maintained in cores, it will be kept on as fast a secondary medium as possible. In order to locate an item in the file for the purpose of bringing it into cores, the AOSP—having first verified that the item is not already in the core memory—calls on a program called the Locator with the name of the item as argument, and receives as output the size of the item and its location on the file. The AOSP then calls upon the Allocate and input routine (ALOCINP) to find a block of storage large enough to accommodate the item, and when the Allocator reports back with the address of the location it has chosen, this address, together with the other information obtained from the Locator, enables ALOCINP to cause input descriptors to be constructed to read the item into memory. The descriptive information which accompanies the item as it is read in enables the AOSP to "Ready" it—i.e., satisfy any requirements it might have for additional programs or data objects, and then establish the linkages between this item and the programs which are going to refer to it.

All I/O requirements of the running programs are handled through the AOSP so that it can schedule input and output, assign useful work to any computer whose current program is stalled until the completion of an I/O operation, and otherwise administer the contact of programs with the secondary storages of the machine.

The AOSP reacts to all External Request Line interrupts by executing a Responder program which is constructed for interpreting messages from the external lines in accordance with the types of messages and formats in use in a particular installation. It is assumed that if the Responder determines that an external message directs the execution of some program by the machine, it will construct and execute the appropriate call on the Readier.

A responder is a program which the computer executes and scans the input data from an external line. The responder is activated automatically. The responder program is activated when the button is pressed or whenever a signal occurs in an automatic line which involves insertion of data into the memory of the machine. The places in memory where this data goes has been predetermined such that there is always available space for the message to come in. That is, the maximum message expected is anticipated and should this space be used up and overflow occur, a second space has been allocated to receive this portion of the incoming data. The responder program itself, is always in core memory ready to run. It is considered part of the automatic operating and scheduling control process. The responder "program" asks for other programs to be run. That is, assume someone enters on the keyboard which indicates that this certain information should be entered. The information such as a command run is interpreted in that the program specified to be run is to be executed. The program to be run must be in the files which are maintained and certain information must be known about this program. One of the first programs to be done is a program which will enlarge the files of information which are available. For example, suppose a batch of cards is available containing certain information which is to be placed on the files along with information describing the significance of information on the batch of cards. Then to be entered into the computer is that there is a batch of cards in a certain location, the information of which is to be placed on the file. A file is a list or directory or inventory of things about which certain knowledge is known. That is, for example, a list may be in existence and information may be available that it is on the tape and the length and locations on the tape may be known. This is a directory. The file is the information itself, the directory is the table which describes the information.

Originally, therefore, loaded with the AOSP, is a program which adds information to the file. Now external information can be taken and added to the file. In this manner updating the information to the amount necessary can be effected.

The AOSP, therefore, employs a set of process steps in the format of a set of instructions including transfer instructions which upon the occurrence of an event transfer instructions which upon the occurrence of an event transfer the control of a computer to execute a sequence of steps of processes as group of "instructions" starting at a certain location in memory. In addition, it is a set in memory of numbers which reflect current configuration, what the files look like, what the computers are doing, what modules are in operation and are not in operation, and the description basically of the programs that are being run. The description of the programs being run include such items such as priority, starting place, length of program, the status of the job that is running, information about what is in core memory now and where, and which programs are using which pieces of data. Physically it appears like a set of memory locations in core memory which contain ones and zero's several of which are executed as instructions and some of which are coded to indicate what is going on in the machine. Although, in the illustrative embodiment the process of the AOSP is coded and placed in the core memory, the AOSP written processes could, of course, be contained in an outside input unit external to the machine and could be loaded in before program operations of the computer registers are performed. Assume the AOSP is unloaded in the machine and assume further that an external request interrupt occurs. One example of such external in request interrupt is an indication of the operator who presses a button to show that new information is to be loaded into the machine. At this point, the responder is a group of so-called "instructions" which upon execution cause the computer to scan the incoming pieces of information and interpret them.

For example, suppose the operator punches in "run," this will cause certain bits to be placed in the core. When the program examines these bits, it will compare them against a table of known groups of bits. These messages will have various designations. For example, one group of bits may be decoded as "run," the second group as "find," and the third group as "print," and in response to this kind of instruction, this kind of machine changes automatically to follow this information.

For example, take the order, "Run Joe." The computer is enabled to run and the coded instruction also causes the machine to look in the directories until it finds program "Joe." That is, one number is compared against another until the matching numbers are found, and this is "Joe" that is being looked for. "Joe" is then brought from the external directory where it was found, into the "main" core memory. When it is entered into the computer system, control is transfered to the "Joe" program. When "Joe" program has been executed, it generates a certain type of interrupt called "halt" which indicates to the computer interpreting this "halt" that the operation has been completed. Following this, "Joe" is removed from core memory and the records in the AOSP that Joe is running are modified.

Much of the AOSP operation necessarily occurs "behind the back" of the user's program and of the programmer. The establishment of the correct linkages between programs, subprograms, and data occurs automatically; the scheduling of I/O and the maintenance of system bookkeeping are done without explicit mention in the running programs; and, of course, response to interrupt conditions is independent of any foreknowledge on the part of the interrupted program. However, many of the AOSP functions are available to the programmer at his request, via "Control Macros," which are essentially subroutine-like calls on parts of the AOSP package. Some typical representatives of these functions are: make ready, and then execute, an arbitrary program found on the file; hold up the operation of this program until some specified condition obtains, such as completion of an I/O operation, termination of some other program, etc.; establish some sequence of operation as a parallel process to be executed independently of the establishing program on another computer (if available).

A further responsibility of the AOSP is to recognize, diagnose, and try to recover from certain hardware malfunctions. The AOSP makes it easy to insert variant interrupt servicing routines.

*The structure of programs in memory*

Refer again to FIGS. 60–70 inclusive, and further refer to FIGS. 71–74 inclusive.

In general, a program in the memory of the machine consists of two parts: the body of instructions, called the Program Area (PA) (see FIGS. 61 and 62), and a block of words used as data by the program, called the Data Area (DA) (see FIGS. 63 and 64). These blocks correspond, of course, to the two principal base-address registers in the computer, the base program register (BPR) 054 and the base address register (BAR) 055. When a computer module is executing a program, its base program register 054 is usually set to the beginning of the Program Area, and its base address register 055 normally contains some address within the Data Area of the program. The term DAA (Direct Address Area) is used to apply to computer operation, denoting specifically the 2048-word block of memory beginning at the address currently in a computer's base address register 055. Thus normally, if a computer P1–P4 is executing a program, the Data Area of the program (or some terminal segment of it if the base address register 055 has been augmented by a Subroutine Jump is contained within the Direct Address Area of the computer P1, P2, P3 or P4.

To meet the bookkeeping requirements of the Automatic Operating and Scheduling Control System and Process (AOSP), both the Program Area and the Data Area are preceded by a few additional words of information. The words preceding the Program Area (see FIGS. 61 and 62) are called the Program Header (PH), and those preceding the Data Area, (see FIGS. 63 and 64) the Data Header (DH).

Note that there might exist several Data Areas corresponding to one Program Area. The assumption is that any program in the machine is capable of being executed simultaneously by two or more computers without mutual interference, unless the programmer has explicitly provided for the contrary case by calling for lockouts in the body of his code. For a program to be run simultaneously by two computers, the two computers must, in general, have different values in their base address registers 055. For the case of simple subroutines, the different base address register settings are provided automatically by the Subroutine Jump command. But the more general case requires that a program have several different Data Areas. Hence, the true programmatic entity in the machine corresponds to the Program Area comprising the code to be executed, together with that particular Data Area which was established for this particular use of the program. The pairing of a Program Area and one of its Data Areas is termed an "incarnation" of the program, and whenever it is necessary to point to it with a single address, that of the Data Area is used. Plausibly, then, one of the elements of the Program Header (the USER LINK of FIG. 62) is a pointer to the Data Area of the first incarnation of the program, the Data Header of each Data Area points to the Data Area of the next incarnation (if any), and one of the elements of the Data Header is the location of its Program Area (POINTER TO PROGRAM HEADER of FIG. 64).

*Control flow and scheduling*

Refer to FIG. 71, the diagram of the job table.

The AOSP records which keep track of the flow of control through the programs in the computer are kept in the Job Table. One entry in the Job Table consists primarily of a block of words sufficient to store all the computer registers (thin film and special) which must be saved in order to completely disconnect a computer from the program it is running; besides the thin-film storage area 3001 there are a few additional header words in each Job Table entry. The basic doctrine behind the use of the Job Table is this: Whenever a computer is running in the normal mode, there must have been assigned a Job Table entry corresponding to the path of control which it is following, and the header words of that entry must contain the appropriate values. Whenever it is decided to "suspend" that path of control flow (temporarily cease execution of the current program and assign the computer to an entirely different normal-mode task), the memory-bound register and the necessary thin film registers will be stored in the Thin Film Storage Area (TFSA) 3001 of this entry. To resume computation on this path at a later time, the registers of the computer are reloaded from the thin film storage area (TFSA) in core memory, and control is returned to the normal-mode operation by executing an interrupt return routine.

It is not expected that every interruption of a computer will lead to a suspension of the control path which the computer was executing: the normal occurrence will be to respond to the interrupt condition in the control mode and then return to the interrupted computation. The program which processes the interrupt need only save and restore those thin film registers which it requires for its own use. If thin film registers do need to be saved, the thin film storage area (TFSA) corresponding to the interrupted path offers a convenient area in which to save time.

Whenever a computer module is looking for useful work, it is the Job Table which it consults (by executing a "scheduling program" or process of scheduling coded and located in core memory). It looks for the Job Table entry which has the highest priority and which does not indicate that a computer is presently working on the control path it represents. This will generally mean that the program with which this path was associated was suspended in order to await the completion of an I/O request or of some other task. The computer seeking employment checks to see if the postponement condition still obtains, and if not, loads its registers from the TFSA at that Job Table entry and proceeds. If the postponement condition is still in effect, the computer goes on to check the Job Title entry with next highest priority.

*Setting up a program in the memory: the Readier*

The process of bringing (an incarnation of) a program to a condition in which computer control can be transferred to it is called "readying" the program, and is accomplished by an automatic operating and scheduling control system and process (AOSP) routine called the "Readier." In broad outline, readying consists of the following steps:

(A) Verify that the Program Area of the program exists in the memory, or, if it does not, cause it to be input (put there); if it needs to be input, then the information necessary to construct its first Data Area is brought in at the same time.

(B) A Data Area for the incarnation is constructed, either from the newly-input information, or on the basis of existing Data Areas.

(C) Those elements of the Adapter Block (see FIGS. 69 and 70 and description of Adapter Block in next few paragraphs) of the new Data Area which must be established immediately are processed.

(D) The location of this incarnation of the program is reported back to the program which called upon the Readier.

In order to reduce the number of file references, the Readier is designed to take advantage of the existence in cores of a previous incarnation of the same program by effectively copying the information needed for creating a new Data Area from the old one.

**The Adapter Block*.—Many programs will probably need to refer to data which, for various reasons, cannot conveniently be placed within its own Data Area. Such data objects, allocated independently of the Data Area of a program which refers to them, are termed "external". References to external data must be indirect, via words, within a Data Area of the program. The set of such words, one for each external object, is called the Adapter Block. Whenever an incarnation of a program is made ready for execution, the external objects to which it refers are checked by the AOSP, and their current addresses are inserted in the appropriate locations within the Adapter Block of the program being set up. The list of external items referred to by a program is carried partly in the program Header, and partly in the file copy of the program's DA.

*Allocation and input requests*

The closely related program ALOCINP (for Allocate and Input) and Input Complete Report (INCOMER) operate in the following context. When a program requests the establishment of a Data Object or a program, some appropriate AOSP "subroutine" (usually READIER) will in general scan the Memory Map for the item. If the item is not in the Memory Map a directory search (see FIGS. 72–74) will then be made in the standard file (or in some named user file) by an appropriate call upon the Locator. If the item is in the directory as anticipated, a call is made on the ALOCINP program, supplying as variables of call the item name, its "mode" (0, if data; 1, if a program), the file name (file location of the item), the name of a place to report the results of the call (usually an AB line in the caller's Data Area) and the length of the object (two lengths, that of the program area and that of the data area, if mode —1). ALOCINP immediately sets up a dummy header for the item and links it into the Memory Map with a flag set (to indicate "dummy"). From now until the time establishment has been completed, other calls of establishment of the same item will find it on the Memory Map, link themselves into the user chain originating in the dummy header (later on, in the true header) and go on with the assurance that someone else will worry about getting the item in and reported to them. Thus, redundant allocation and input requests will not be floating around the AOSP. Whenever a program requests establishment of an item and it is found that the item is in the condition of being already the subject of another establishment request, but not yet usable, the AOSP, after appropriately arranging reporting linkages, raises a WAITBIT in the adapter block to record the condition.

The ALOCINP tries to locate space for the item, two regions for programs, one for data objects, and, if it fails to get space, links the dummy header into the chain of unallocated items. If space is obtained a true header is set up replacing the dummy in the map, and a call is made on the input/output package, supplying the necessary information to build descriptors.

When an I/O complete interrupt occurs, signalling the successful transmission of a file item into memory, the header of the region into which the item was read is checked by INCOMER. INCOMER follows the user chain, inserting the absolute location of the region and knocking down WAITBITS in each requester.

Remember that in previous paragraphs it was desired to get program "Joe" into core memory. It was also known where it was located externally and how large it was. A core memory block which is unoccupied and large enough to fit all of program "Joe" into it must be located. This is one of the functions of the AOSP known as "allocate". Another function which is to bring the information in program "Joe" into the area that was allocated is the input routine. Allocate plus input comprise "Alocinp."

Assume that it is known that the tape containing "Joe" is on unit No. 2 and that it is the 17th record of that tape. The tape is now positioned for the fourth record. The tape is positioned to the 17th record by scanning forward 13 records and then reading the information starting with the 17th record into the area in memory that was allocated. When the transmission of the 17th record is complete, the computer is interrupted by scanning the records to determine that this is what has happened. The proper programs, and the places in memory are reported to indicate that program "Joe" is now in memory.

To determine how the space was allocated or was decided upon, all available core space is kept in a linked list. A linked list is provided which contains the addresses of the available core space in memory in size order from largest to smallest. When space is required, this list is scanned and the smallest available space which is adequate is selected. This space is then subtracted from the list of available space, since it is to be used, and the linked list is modified to show this fact. Each time an operation is completed, the information in it is deleted from the linked list and this space in memory is added to the available space in the linked list. In a similar way, the information that is not available is linked together in alphabetical order. Each of the block of core spaces has a name associated with it or a number and these are linked together in numerical or alphabetical order. Therefore, there is provided two linked lists, (1) a list of available space, and (2) a list of used space (alpha links). The number or name is always the first word in the memory space. In certain fixed positions following that are pointers to the next or previous item. Also in a position relative to the first fixed word which tells the title of the list is the address of the user of this information. This type of user is a line in the adaptor block. If there are no users this space in memory becomes available. This is the way the core memory is allocated. The words in core memory are the conventional 48 bit words of the illustrative embodiment computer system. 16 bits are requirted to specify any address in core memory. For example, assume the first word is filled by the designation which means "Joe." The third word contains the last 16 bits containing the address of "Sam" which may be the next item by name in the core memory and contains also the next previous 16 bits which will contain the address of "Ben," where "Ben" is the previous item in core memory. This set of words associated with the name "Joe" at the head of the block which identifies "Joe" is called a Key or Header. The Key gives information about what it is, how it is used, where the next block of words may be found, and where the next prior block of words may be found. The length of "Joe" is placed in a successive word.

Refer to FIG. 65 which presents the format of a Data Object before being Readied. This is the data which is to be worked on or modified which might be the input data for a table of constants, for example. The first 48 bit word contains the name for example "Joe," the first 16 bit positions of the second word labelled "Bits" contains the format shown in FIG. 70. This describes what this list is: whether or not it is ready for use; whether it is someone's exclusive copy; whether it is now locked out, that is available for only one of a given set of users; whether or not someone may write in this area of memory; the number of necessary items associated with this data object; and how allocation has progressed, that is whether it is in the core, whether it is allocated to the core but not in, or whether it is in and not yet ready; etc. For example, it could be unallocated because space could not be obtained at this time.

Refer again to FIG. 65. The next 16 bits is the address of the first user or an ABI pointer, or adapter block *i*th line which has the address of this Data Object and is currently using it. Also in this Adapter Block Line is the address of the next user. For example, see the format of the Adapter Block Line (ABI) line in FIG. 69. The length is in the 16 bits of the second word. The first 16 bits of the third word (third line) contains the name of the file under which this object was filed. The other two 16 bit words of the 48 bit word are the same links. The next word or fourth word of a Data Object contains two 16 bit fields which give the address in memory of the previous block in memory whatever it is and the next block in memory wherever it is. This next address could be in another memory module.

The above description of the figures shows what the information looks like on the tape before it is brought into memory.

After being brought into memory, this information is modified so that it appears in the format shown in FIG. 66, the format of "Data Object After Readied." After modification, the Data Object is ready for use, and reports are made to all users.

*Control macros*

Now refer to the concept of macro. Macro is a request on the AOSP to perform a certain function. The type of function is indicated by values in certain registers. These registers will, for example, be index registers. To make a request on the AOSP, an interrupt must be caused. The operator must perform a proper type of interrupt so that this can be recognized as a request and the type of request that it is. This is internal. That is, the program is running and it executes a certain type of halt instruction. Upon the execution of this halt, this causes an interrupt and then the registers which have been set for this eventuality are looked at. First, every bit in the various registers which are to be loaded at the time that control will be regained by the program after interrupt must be correct. For example, assume that somewhere in limit register 1 there is a number between one and 23. The halt instruction must have occurred in the first syllable of a word, and the other bits in the word must be of a cetrain configuration. If these match, this is interpreted as a macro request. The exact type of request is determined by the value which indicates what word 1 to 23 it is.

If the program being run wishes to have the priority changed, it may have this effected by the AOSP if it first loads appropriately a set of limit registers and gives the proper halt instruction. These limit registers are the set of limit registers 021–037 in thin-film memory 3001 in the computer. When one of these limit registers 021–037 contains a value which is the call of the macro as to what type of requets it is and it is found that the previous instruction has these bits which is a halt and these bits which match and the limit register is a certain set which indicates what type of halt has occurred, then change is effected to a program which executes the type of macro request indicated by the halt. When the macro has been carried out or completed the operation, then control is returned to the program immediately following the halt instruction.

For example, assume a set of instructions is being executed and this set of instructions is in core memory. Through the interpretation of data, the computer executing this program decides that the priority of execution should be changed. The computer cannot change this priority by itself but does so by the above described means.

*The initiation of a program structure in the computer*

The discussion of programs and jobs thus far has been in terms of being in the middle of some job which was already in the computer and running. The response to an external message which directs the system to run a particular program will now be discussed. It is assumed that this will be the standard way of setting up wholly new and independent program structures. This will also constitute the discussion of the processing of External Request interrupts.

When an External Request interrupt occurs, the computer which has this responsibility will be interrupted, and start executing an AOSP control-mode procedure called the "External Request Interrupt (ERI) Processor" (see FIGS. 45–47 also and FIG. 4B also). The essential function of this processor is to determine which External Request line (ERI) to service, and transmit an input descriptor to read in the initial message from the input unit associated with that External Request Interrupt. Having done this, the computer can return to the normal-mode job from which it was interrupted.

When the input transmission is complete, a program called the "Responder" decodes the message, and determines the appropriate action to take. Assume that this action is to set up and execute some program (in a user's installation, of course, the action to be taken might be any function of the system). Since this new program presumably constitutes a new, independent, parallel path of control in the system, it should correspond to a Job Table entry (see FIG. 71), which must be set up. Having identified the program to be run, the Responder calls for it to be readied, and, when this is done, relinquishes control to it.

Now, in theory, all these actions could be handled with the AOSP mechanisms, e.g., causing the new Job Table entry to be set up by executing a BRANCH from some control path, and explicitly calling the Readier for the Responder. For two reasons, however, in this case the mechanism is short-circuited:

(1) In the case of a Command and Control installation, very rapid response to the External Request lines will be required;

(2) There has to be some point, outside of the normal cycling of the system, where the initial establishments are made, and it might as well be here.

Therefore, the following restrictions will apply:

(A) A copy of the Responder program is always in core along with copies of its necessary external entities, such as decoding tables, syntax tables for parsing the input message, etc.

(B) At all times there exists a readied, but unused, Data Area for the Responder (see FIG. 64) regardless of how many incarnations it may have, there is always one which is ready to start.

(C) At all times, there exists a Job Table entry, marked "Awaiting one I/O" with minimum priority or not linked into the priority chain, with its Thin-Film image so arranged that it will start executing the pre-readied incarnation of the Responder when it is loaded into a computer and Interrupt Return Routine is performed i.e., the Base Address Register 055/Interrupt Storage Register 040–042 contains the location of the pre-readied Data Area. The location of this pre-established Job Table entry is contained in a system constant.

(D) At all times, a space is ready into which to read the initial message from an external request unit.

(E) The Responder Program Area, a first Data Area, a first Job Table entry, and a first initial-message space are set up when the AOSP is initially loaded into the inventive computer system. Whenever any of these are "used up" by obeying a request to initiate a new program structure, new ones must be obtained.

To simplify the discussion, it is assumed that there is a single Responder to handle all of the External Request lines, and that one of the arguments it receives when it is called is the number of the External Request line which is delivering the message it is to decode. In an operational installation, it may be true that the types and formats of messages to be expected from the various external lines vary widely, and can be determined by the identity of the line. In such a situation, it would obviously be more efficient to have separate Responders for the different (sets of) external lines; this would require pre-readied Data Areas and pre-arranged Job Table entries for each.

*External request interrupt processing and the responder*

The following is a shorthand description of processing an external request interrupt.

*ERI processor*

(1) (Control comes here upon external Request Interrupt.) Save computer registers which might be needed, according to standard conventions for interrupts.

(2) Determine which External Request line to service and construct and TIO an input descriptor for that unit. So instruct the tables which the I/O Complete program will use, that the completion of this input will be reported to the Job Table entry.

(3) Transmit the external request line number to the preset incarnation of the Responder. Set the PRIORITY field of the Job Table entry to maximum (so that, when the I/O is complete, the Responder will get a crack at the message as soon as possible. If it turns out not to be of high priority itself, the PRIORITY field can be reduced again and link it appropriately into the Job Table priority ordering.

(4) Obtain space for a new Data Area for the Responder.

(5) Obtain a new Job Table entry space for the Job Table mechanism.

(6) Obtain a new initial-message space for use next time.

(7) Test the External Request lines, and if any are up, go to Step 2. Otherwise, restore any saved registers and Interrupt Routine Return.

*The Responder*

This is a normal-mode program, entered via Interrupt Routine Return, by the first computer available after the initial-message input (initiated by the External Request Interrupt Processor) has terminated and been reported by the I/O Complete routine. The Responder expects to find in standard locations, the External Line number, and the location into which the initial message from that line has been read.

(1) Decode the initial message. This, of course, depends on the hardware-code used by the particular external unit, and the standard format(s) used for messages for this unit. If extensive translation is required, the Responder at this point may need to ready and execute auxiliary routines, or call for special decoding tables.

It is assumed that the decoding indicates that the message directs the running of some program; specifically, then, the message should contain some subset of the following information:

(a) Name of the (top/first) program (of the program-structure) to be executed (PNAME);

(b) Set-up parameters (if needed) for this program ($V_1, V_2 \ldots$);

(c) Specify priority of the program (PRIORITY).

(2) Store PNAME in Job Table entry; store PRIORITY, suitably encoded, in PRIORITY field of the Job Table.

(3) From PNAME and the set-up parameters, construct a calling sequence for the Readier.

(4) Execute the Readier.

(5) Release this DA. (The Data Area of this incarnation of the Responder.)

(6) Store MODE in MODE field of Job Table entry.

(7) Relinquish control to the readied program. The word "relinquish" is used to indicate that this is not a call on the readier program (e.g., via subroutine jump) but that the Responder has no further interest in this control path; it is up to the program structure in question to properly terminate itself and release its space. Also, if the mode of execution of the program is other than "normal," the "relinquismment" might be a suspension of the program (for instance, if the program is to be timed, and the Clock in the present computer is reserved for another use), or an actual sending of control to a supervisory program (a monitor, intepreter, etc.).

Thus the program requested by the outside world has been set up and launched on its career, and by the normal functioning of the Readier, its necessary data objects have been obtained and the set-up parameters mentioned in the external request have been installed. The first program will itself request the reading of any further programs or data objects that it needs.

*ALOCINP*

Refer again to the allocate and input process. First "incomer" is discussed. "Incomer" is a so-called "routine" which is activated whenever an I/O interrupt occurs, e.g., whenever an I/O result descriptor occurs. Assume a result descriptor has been sent out. From looking at the result descriptor, it is known where the descriptor is in memory. Also it is known from this descriptor where the information that was brought in by the I/O control module or which was sent to output has been entered. Therefore, it is known that the information has been successfully brought into core memory. The incomer may be thought of as analogous to a program. The incomer "program" causes notification of all of the users of the information which has been brought in to core memory that it is there. If required, "incomer" expands the memory bounds, and if required, modifies the waiting status of the user so that they are now enabled to go into operation. The user in this sense is the ABI line, which ABI line is in a data area. Associated with the ABI line is a pointer or the address of the path of control which is executing the program area associated with this data area.

Restating, assume a result descriptor has occurred. This causes an I/O complete interrupt. Following this, the "incomer" causes comparison of the descriptor which initiated the operation with the result descriptor. If they compare showing that the result has occurred successfully, then access is gained to the "key" area where the information was read into the memory.

In that key area is found a pointer to each of the users and bits are set which indicate to all of the users that the item is ready for use. The job table is also notified that the item is in and that the I/O count is reduced by one. The memory bounds are expanded to include this object. If necessary, the running status of the job is changed.

*Readier*

Assume that the object which may be a table or a set of input data, for example, has been entered into core memory. The object may bring in a new adaptor block. Some of the items in the adaptor block may be necessary. If so, they must be brought in after the object is brought in, but before the object is reported as ready for use. The "program" which scans these adaptor block lines is known as "readier." The information on the tape may have been relative to zero. When brought into the core memory, this information must be given absolute correct addresses in core memory. Also, controls are made to initiate bringing in the necessary items in this adaptor block. That is, the addresses must be modified to make them correct, and there is also other necesary information that must be brought in with the other data brought into the adaptor block from the tape. For example, assume that the arc cosine routine has just been brought into memory. This program must have the square root routine available to it. Hence, whenever the arc cosine is brought in, it requires the square root routine brought in also. This, the readier takes care of. That is, the readier initiates the request to bring in the square root the same way the request to bring in the arc cosine is made. The readier is responsive to a macro call to initiate these operations. Assume that a macro call is received which states, "bring in the arc cosine." When the arc cosine is in, "incomer" inspects it and discovers that it has a necessary further requirement. This is the necessary further requirement that the square root be brought in. Then control is transferred to a readier "routine" which makes request for whatever necessaries are required. When the necessaries are brought in, a readier is notified and then causes the reporting of the facts that the arc cosine is ready just as though it had been brought in without the necessaries provided by the readier. That is, an item comes in and either reporting is effected if it has no necessaries, or, if it has necessaries, the report is delayed until the readier brings in these necessaries. These necessaries may have subsequent necessaries, which would cause activation of another incarnation or control path of readiers. This could grow into a tree structure. In any case, after all necessaries are brought in, the readier reports readiness to operate on the program. There is also a processing section in memory in code which interprets what the marco is and transfers control to the appropriate routine. Also, the automatic operating and scheduling control scans the job table to activate the highest priority suspended job. Therefore, when an interrupt occurs it is decided what to do next; this request function is performed; and control goes to the scheduler, which selects a new job to be done outside the AOSP. The registers in the computer, the thin-film registers 3001, are loaded appropriately, and the interrupt return instruction is given and control is given back to the program selected by the scheduler at the point that it was last interrupted.

The readier and incomer has been discussed. A discussion of the structure of programs in memory follows:

By way of review of previous discussion, in general, a program in the memory module of the system of this invention comprises two parts: the body of instruction called the Program Area (PA), and the block of words used as data by the program, called the Data Area (DA). These blocks correspond to the two principal base-address registers in the machine, the base program register 054, and the base address register 055. When a computer module is executing the program, its base program register 054 will usually be set to beginning of the Program Area and its base address register 055 will normally contain some address within the Data Area of the program. The term direct address area (DAA) applies to the computers to denote the 2048 word block of memory beginning at the address currently at the computers base address register. Thus, if a computer is executing a program, the Data Area of the program is contained within the direct address area of the computer. That is, within the memory module will be set up a program and a data area. The Data Area will not normally exceed 2048 words.

The base program register 054 contains the address of the first program word in memory. A maximum of 4096 Program Area words will follow, since the transfer instruction is 12 bits long which provides for 4096 addresses. The base address register 055 will, of course, also contain an address in memory. Since there are only 11 bits for data addressing, $2^{11}$ power is 2048, and therefore the data area is 2048 words long. However, since only 2048 words or a fixed number of data is available for the 4096 maximum steps of the program, the 12th bit of the 12 bit syllable for the data address is a bit indicating whether the address is a direct or an indirect address. When the information is unloaded into memory from tape cards or other input devices, there appears in fixed fields the number of necessary, the number of conditional, and the number of parameter requirements of this program (see FIG. 65). The requirements are always referenced in an indirect manner. For each requirement, a word is provided in memory in an area of the data addressing section called the Adaptor Block. This word is used to identify what is a requirement and is later replaced with an address of where this object was put. The object may be a block of words on a tape or a sine subroutine or the requirements for a scratch magnetic tape. A scratch tape is a tape wherein the information can be destroyed or erased and new information placed thereon. This could be a magnetic tape, for example.

Since there is a word in the data address portion for each "necessary," the necessaries are then scanned. The necessaries are the Data Objects being discussed. In addition to these necessary requirements, as the program is being executed, it may find it requires some other information which is in the category of conditional information, that is, information conditional upon what has been found out by the program at a particular branch point. At the time that a program decides that it requires a conditional object or routine, also, it may request the AOSP to prepare a group of data words properly. That is, the AOSP must bring the words from the Data Objects in and otherwise make them available and useful for a sequence of operations of the program. The address of where the Data Objects are provided in core is also provided to an "adaptor block line" associated with and located in a particular word location in each group of data. The memory bounds of this job are also expanded to include this newly placed in Object.

Now look at the structure of the Data Area shown in FIG. 64. In the FIG. 64, Data Area After Readied drawing, these have been discussed previously, herein lines 2, 3, and 4, the Bits, User Link, Pointer to Program Header, Location of Starter and the Memory Link words. The Pointer to Program Header gives the address of the pointer, and the location of the starter gives the address of the starter word. The first word is effectively a transfer instruction from a word in core memory into the data address portion of memory. That is, if it is desired to enter and execute a program, the program area is entered through the data area. This is accomplished by going to the "starter patch" where the base program register 054 (BPR) and base address register 055 (BAR) sets are loaded into the computer registers. BAR set means the setting which is to be put into the BAR. This is shown in line 5 of FIGURE 64, the Data Area After Readied Chart. The previous setting of the base address register 055 is placed in BAR STORE as indicated and a pointer to the path of control is stored in the PATH L indicated. PATH L is the address of the Job Table element or path of control which is the image of the thin-film memory 3001 contents of a computer P1, P2, P3 or P4 in the core memory M1–M16. FIG. 64 shows where the adaptor block lines are placed, where initial conditions and constants are placed, and where the working storage is of Data Area. This Data Area of FIG. 64 will be a maximum of 2048 or $2^{11}$ words.

Refer to FIG. 62, the illustrative diagram of Program Area After Readied for use. The first four lines of the figure have been described here above. Line 5 is of use only for the automatic operating and scheduling control system and process. The sixth word in the Program Area is divided into three parts: the Number of Parameters, the Number of Conditionals, and the Number of Necessaries. The 7th word shows the Names of the Necessaries and the Names of the Conditionals. These names are coded representations of the titles given to the necessaries and conditionals respectively. The remainder of the words in Program Area up to 4096 total words are the words of the instructions of the program to be executed, which words are in the code of the computer.

For another path of Program Area and Data Area, a new copy of the Data Area is constructed, and that path of control or computer executes the same path that the other computer did, does, or will. Both computers being employed by the AOSP will then execute the same program. However, no program may overwrite its own instructions or modify its own instructions or anything in the Program Area. Thus, for example, if two programs wish to execute a particular routine, they will go to the two separate copies of the Data Area which are provided and they will both execute the one copy of the Program Area.

Thus, the Adaptor Block may ask for another Data Area and another Program Area, and if the Program Area is not the identical program area being executed, it will be brought in. This linking of the Data Area with a Program Area is called an incarnation of program. The program for almost all calls on the automatic operating and scheduling control system and process refers to one or more adaptor block line (ABI line) such as shown on line 8 of FIG. 64, and also as shown in FIG. 69. For a program to stop executing control and to stop executing within a first program area and to start executing within a second program area, there is a subroutine jump instruction provided to the computer which transfers indirectly to the address shown in the adaptor block line. Indirectly is stated because the subroutine jump instruction works only on an absolute address and the absolute address in the data address block may itself contain a second address.

As stated hereinabove, there are certain Data Objects furnished which may be tables of coefficients, atmospheric tables, or any other tables of input or output data. Associated with each of these Data Objects is a small Adaptor Block which may specify more necessary conditions to be brought in with this Data Object.

A "Simple Subroutine" (see FIGS. 67 and 68) may also be provided which has no Data Area associated with it. Any writing done by these instructions in the Simple Subroutine must write back into the callers direct address area (DAA). The major classes of information to be stored in memory comprise the Program Areas, the Data Areas, and the Data Objects. This is the structure of a typical program.

That is, the adaptor block refers to the net of words in Data Objects (see FIGS. 65 and 66), which Data Objects are groups of words which cannot conveniently be placed within a direct address area of a given program and which require external data. By means of the adaptor block, indirect references to such external data are made via words which are in a direct area of the program. The net of external words which are references to such external data, one for each external object, is the Adaptor Block.

Assume a request is made to the AOSP for some reason to provide a certain number of spaces in core memory and at this time the space is not available. These requests are linked together and as core memory is made available, these lists are scanned and when the size of memory permits, such that they can be allocated, they are. This linked list is linked in order of priority of the requests.

Now refer to the input/output (I/O) requests from programs. Assume that there are several programs running in parallel, all of them making input and output requests. Every one of these requests cannot be serviced at the time they are made. Hence, a list or queue of I/O requests which have not yet been serviced must be built up. Now let us regard that queue. The system of the invention comprises a number of I/O control modules. In the preferred illustrative embodiment system, there are 10 I/O control modules per I/O Exchange Branch. The system comprises also a number of input and output units, for example, 32 input and 32 output units in the maximum preferred illustrative embodiment configuration. There may be any number of requests on each of these units. These requests must be serviced in the proper order. For example, assume that it is desired to read a certain record into a particular unit and to read out of a particular unit onto a certain other record. Communication must be such that there are no errors in the places from where the information is to be read, in the information which is actually read, and the places into which the information is read. Therefore, there are several goals to be maintained in diminishing the size of the queue:

(1) First and foremost, is that all transfers be correct and also serviced in the proper sequence where they are related.

(2) It is desirable to keep I/O transfers as busy as possible for most efficient use of the machine, and (3) It is desirable to diminish the queued list of requests as rapidly as possible.

Consider that there are several programs making a request on one particular magnetic tape unit. Each of these programs may have built up a backlog of requests on that particular tape unit. Requests which are sequential must be serviced sequentially. It is also desirable for efficiency not to read requests alternately off the beginning and the end of the tape. That is, for maximum efficiency in using the tape and for spending minimum times, it is desired to read off the tape in areas which are as nearly adjacent as possible. For this reason the program is permitted to drive the tape and to prevent other programs from gaining access for a short while. Therefore, if the programmer is aware that he is going to ask information from adjacent portions on the tape, sequentially, he does not want another program to position the tape in other locations.

(4) Certain tapes have restrictions on their use. For example, not every program can write on a library tape. Therefore, associated with each device is a program which is called the status controller of that device. This may allow or disallow programs to write on the device or to gain exclusive use of the device. Nominally, if there is a choice, from the queue will be taken that request which can be serviced most rapidly.

Thus, the I/O queue is a table of waiting requests from which is scanned when a unit reports itself available at I/O complete time, and to that unit is presented another request for input or output. When that request is completed, it is noted in the "queue table" who the program belongs to and that program is notified that the information is now available to it.

For example, examine what happens when an I/O complete occurs. In the table is the address of the head of the area into which data was transferred from an input unit or to an output unit. In the key of that area is the first user, which is an adaptor block line. From the adaptor block line, the program looks at the PATH L word in the key of the adaptor block line and decreases the count of I/O requests waiting in the Job Table (see FIG. 71). The Job Table has the core image of the thin-film registers of a particular computer P1, P2, P3 or P4, which is running the job, or which could be running the job. From one to four computers in the illustrative embodiment configuration (three or four computers in the preferred illustrative embodiment) are running all of the jobs in the Job Table. Although the computer is available, some of the jobs may not be running until they get the particular order of the I/O control module, in response to whatever requirements may be needed.

*Summary of program and data area formats*

In order for the AOSP to properly control the running of programs and the processing of data within the system of the invention a certain amount of information about these objects must be available to the AOSP. This information usually takes the form of prefixed words (headers or adaptor blocks) to the programs and data. Much of the required information will be appended by the operating system compiler in its course of compiling the program, the rest of the information will be controlled by the AOSP itself in its course of monitoring the operational programs.

The format and bit definitions of the various headers that must be appended to the operational program and data operating in the illustrative embodiment of the invention are shown in FIGS. 61–70 of the drawings. Requests by operational programs (AOSP routines themselves) for particular types of service to be performed by the AOSP are initiated by macro calls on the AOSP. The specifications of macro calls on the AOSP are contained on the following pages:

I/O MACRO SPECIFICATIONS

*Status Controller (S.C.)*

(1) Controls read/write status of tape.
(2) Controls type of user for a particular device.

(a) Has ability to lockout a device to exclusive users, non-exclusive, or everyone but himself (3) Can designate a new Status Controller.

*Types of users*

(1) Exclusive User (XCL)

(a) Has control of device until he releases himself as user.
(b) Cannot change status.

(2) Non-Exclusive User (NXCL)

(a) Cannot gain exclusive control or change status.

*Statuses*

Present Device Status (1) Available for next appropriate user in queue.
(2) In use non-exclusive user.
(3) Avail for exclusive user.
(4) In use exclusive user.
(5) Temporarily inactive.
(6) Available for use as scratch, new, special.
(7) Not assigned, i.e., no ID associated with this device.
(8) Device out of service.

*Queue status*

(1) Not locked out.
(2) Locked out to exclusive users.
(3) Locked out to non-exclusive users.
(4) Locked out at all users but Status Controller.

I. Get device macro call—

Format of ABI line:

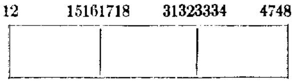

a. Get me a tape with the given ID
b. Get me a scratch tape
c. Get me a new (or special) tape
} Establish me as status control of this device and get given queue status.

PARAMETERS

X14—Pointer to ABI lines of this request (relative to base address register 055)

$X13$=(if a tape)
00–0 tape with given ID
00–1 scratch tape
0–10 new (or special) tape Bits 1—16 of ABI line=Name of device right justified i.e.
"MT"—mag tape
"PR"—paper tape reader and
"PP"—Paper tape Punch
"CR"—Card Reader and
"CP"—Card Punch
"LP"—Line Printer
"DM"—Drum
"FX"—Flexowriter"

Bits 17—32 17—18=11

Bits 33—48 = Point to tape or device ID
= or pointer to place where ID will be stored when I/O control finds it.

Call Number in top of stack

II. Ready me as a user.
X14=Pointer to ABI line of this request.
Bits 1-16 of ABI line=Name of device right justified.
Bits 17-32 17-18=11
Bits 33–48=Pointer to tape or device ID.

III. Ready me as exclusive user
X14=Pointer to ABI line of this request.
Bits 1-16 of ABI line=Name of device right justified.
Bits 17-32 17-18=11
Bits 33–48=Pointer to tape or device ID IV. Release me as user
X14=Pointer to ABI line of original request.
X13=Pointer to ID.

V. Release me and remove from system (can be requested by status controller only)
X14=Pointer to ABI line of original request.
X13=Pointer to ID.
VI. Release me as user and status controller and establish as scratch.
X14=Pointer to ABI line of original request.
X13=Pointer to ID.
VII. Release me as status controller and make "name" status controller.
X14=Pointer to Job Table. Name of new status controller or 0.
X13=Pointer to ID.
VIII. Change Statuses (Status controller only)
X14=Pointer to ABI line of original request (user).
X13=Pointer to ID.
L12=Read/Write status: 01, Read; 10, Write; 11 Read or Write; 00—don't change existing status.
L13=Kind of tape status: 001 scratch; 010—new; 011—special; 100—file; 000—don't change existing status.
L14=Queue status: 000—not locked out; 001—locked out to exclusive user; 010—locked out to nonexclusive user; 011—locked out to all users but me.
IX. Get Information
X14=Pointer to original ABI user line.
X12=Pointer to an ABI line containing pointer to core address.
X13=Pointer to ID.
L12=Record Count.
L13=Start Record Number (relative to Beginning of File).
L14=File Number.
X. Execute
X14=Pointer to original user ABI line.
X13=Pointer to ID.
X12=Core add. ABI line (data object).
L12=Record Count.
L13=Word Count.
L14=Operation Code.
X1=Pointer to drum address if one exists.
XI. Position Tape
X14=Original ABI line (user).
X13=Pointer to ID.
X12=Pointer to a report ABI line.
L13=Record Number.
L14=File Number.

USE OF FILE MAINTENANCE

A program wishing to utilize the file maintenance processes provided for the inventive system should include file maintenance (FM) as one of its conditionals or necessaries. When FM is to be performed, the caller must ready FM and execute a subroutine jump instruction so that the base address register 055 will point to a list of parameters in the callers Data area.

When control is passed to file maintenance only a small control process will exist. The control process will be coded in its own Program area and Data area and will have as its conditionals all file maintenance routines currently available. As the list of FM routines is expanded the control process will be adjusted. The control program will determine from the parameters supplied which FM routine or routines are required to perform the desired function. The appropriate routines will then be readied as simple subroutines (using the Data Area of the control program).

Refer to FIG. 72, the System Director Item diagram, FIG. 73, the File Directory Item (Core) Diagram and FIG. 74, the File Directory Item (Tape and Drum) diagram.

Listed below are the current file maintenance routines being developed with parameters required:

(1) CREATE a file entry in the System Directory (see FIG. 72)

(a) Function
(b) Pointer to partially completed System Directory item (8 words) in which the following information has been placed (see FIG. 72).
W000 File-Name
W001 DIR-Core-Address and PCore
W002 Tape-ID or zeroes
W004 Word-Count
W007 Stat-Cont or Zeroes
All other positions are zero filled Assumes a completed File Directory exists in core, with 6 words preceding the first File Directory item.

This macro will accomplish the following:

(1) An entry will be made into the System Directory
(2) A header will be appended to the File Directory
(3) A special File Directory item (called DIRECTRY) will be appended to the File Directory.
(4) The File Directory will be left in core or placed on the DEVICE (as specified by use of the PCore bit).

(2) ADD to File Directory (a) Function
(b) File-Name
(c) Status-Controller
(d) Pointer to a completed File Directory item (4 words)

Assumes that an entry exists in the System Directory for this file.

This macro will accomplish the following:

(1) A new item will be added to the File Directory.
(2) The DIRECTRY item in the File Directory will be updated.
(3) The appropriate System Directory item will be updated.
(4) The File Directory header will be updated.

(3) DELETE ITEM FROM FILE DIRECTORY (a) Function
(b) File-Name
(c) Status-Controller
(d) Object-Name Assumes that an entry exists in the System Directory for this file.

This macro will accomplish the following:

(1) The item will be deleted from the File Directory.
(2) The DIRECTRY item in the File Directory will be updated.
(3) The File Directory header will be updated.
(4) The appropriate System Directory item will be updated.
(5) When the object is in core or drum its space will be released.

(4) REMOVE FILE (a) Function
(b) File-Name
(c) Status-Controller

Assumes that this entry exists in the System Directory.

This macro will accomplish the following:

(1) Removes the entry pertaining to the file from the System Directory.
(2) When the File Directory is in core or drum, its space will be released.
(3) When the objects belonging to this file are in core or drum, their space will be released.

Obviously, in the light of the above teachings many suggestions are contemplated on and are within the scope of this invention. For example, Dump Macro and Restore Macro are contemplated. They are defined as follows:

DUMP MACRO—At some convenient point it should be specified that enough information is dumped to resume computation at this point at any future time. This includes job tables, tape positions, pertinent status conditions in device tables, etc.

RESTORE MACRO—Take the dump information and load and execute the "routine" from point where dumped (involves positioning tapes, constructing job tables, etc.).

If the system of the invention is to be used for computation center type work, a scheduling process will be incorporated in accordance with the teachings herein presented to introduce new problems into the system from some filed backlog. This should be done in such a way to optimize equipment usage.

For command control applications the scheduling must reflect the requirements of the system. This scheduling must be specified by the user. Presumably, depending on how stringent the requirements are, some tailoring or redesign of the operating system readily apparent in the light of the teachings herein is required. These are contemplated as within the scope of this invention.

It is contemplated provide a more a more generalized I/O package which will easily be modified to accept new I/O equipment and recover from some of the more expected errors. These could be incorporated as parameters the number of times to try to read a tape record before making a bad parity report. A device may be provided (from whatever set is available) appropriate to the requirements of the program without the program being so explicit about it. A request of the type, "I need some device with 20,000 words," would give a tape, drum, or disc depending on configuration at call time.

Provision to anticipate I/O requirements of scheduling; printing messages to operators to mount and dismount tapes in advance of program need is contemplated also. In place of operating procedure wherein is entered on the "Flexowriter" a request on the AOSP a card driven responder to activate programs may be provided. If a program has output, it asks for exclusive use of the printer and dumps out its data. A similar output servicing routine to speed up program execution, adding off-line tape to print equipment or more on-line printers if the output load dominates the efficiency of the system is contemplated and within the scope of this invention. At present, if a program makes an illegal request, it is ripped out of the memory and a terse message is printed indicating bits. The ability to provide dumps of enough areas for the debugging programmer to have some idea of what was the configuration of his program at the time trouble was encountered is within the scope of natural expansibility of the illustrative embodiment herein described. The parameter space available now for specifying what to do in the event of unexpected trouble may be further implemented by effecting further means to initiate proper action.

The automatic operating and scheduling system and process (A.O.S.P.) of the invention has been disclosed as providing means and a method operative in coordination with the remainder of the system and process of the invention to exercise supervisory executive control of the independent modules of the system including several processors. The AOSP discloses means and a method further to carry out the functions of (1) distributing the work load among the processors; (2) checking the status of equipment, and (3) supervising system operation. The AOSP enables the system to be truly modular.

*Summary*

Thus the invention described herein illustrates a modular system which presents a natural solution to the problem of obtaining greater computational capacity, more natural than simply to build larger and faster machines. The organizational structure of the system of the invention has been shown to be a suitable basis for the data processing facility for command and control. It is evident that the requirements peculiar to this area of application are, in effect, aspects of a single characteristic, which might be called *structural freedom*, and which is provided by the invention. A unique characteristic of the structure realized by the invention, integrated operation of freely intercommunicating, totally modular elements, provides the means for achieving structural freedom.

The invention fulfills the requirement that some specified minimum of data processing capability be always available, or that, under any conditions of system degradation due to failure or maintenance, the equipment remaining on line be sufficient to perform primary system functions. In the system of this invention module failure results in a reduction of the on-line equipment configuration but permits normal operation to continue, perhaps at a reduced rate. The individual modules are designed to be highly reliable and maintainable, but system availability is not derived solely from the source, as is necessarily the case with more conventional systems. The modular configuration permits operation, in effect, with active spares, eliminating the need for total redundancy.

The invention fulfills a second requirement that the working configuration of the system at a given moment be instantly reconstructable to new forms more suited to a dynamically and unpredictably changing work load. The invention herein described provides a system wherein all communication routes are public, all modules are functionally decoupled, all assignments are scheduled dynamically, and assignment patterns are totally fluid. The system of interrupts and priorities controlled by the AOSP and the switching interlock of this invention permits instant adaptation to any work load, without destruction of interrupted programs.

The requirement for expansibility calls simply for adaptation on a greater time scale. Since all modules of the inventive system are functionally decoupled, modules of any type may be added to the system simply by plugging into the switching interlock or the I/O exchange. Expansion in all functional areas may be pursued in accordance with the teachings of this invention far beyond that possible with conventional systems.

It is clear that the inventive system exceeds the goals of other systems even if only circuitry is considered. However, the process initiated with the automatic operating and scheduling control system and process is as much an improvement in taking advantage of system structure to perform hitherto unrealizable and unrealized functions as is the actual hardware. The concept of a "floating" AOSP as the force that molds the constituent modules of an equipment complement into a system is an important notion having an effect beyond the implementation of the other features of the inventive system. The process and system of the AOSP in conjunction with the system brings to light a change of perspective; it introduces the thought made abundantly clear herein that computers do not slavishly run programs, but that programs can with the proper system and process be made to control computers.

The means and method of the invention disclosed hereinabove thereby provides a truly modular computer system, which is organized for built-in growth potential and well suited for applications involving complex and voluminous data processing and computer operations. It provides a modular processor readily organizable for specific applications and including appropriate complementary computer modules, memory modules, I/O control modules, input and output devices, a common exchange between I/O control modules and I/O devices, a switch interlock to govern communication between I/O control modules and computers on one side and memory modules on the other, and transposer means provided between the exchanges and the input/output devices, per se to effect easy communicability. The modular computer system provided by the hereinabove disclosed invention is based upon an automatic operating and scheduling control system and process wherein coded methods for scheduling and for operation upon the occurrence of certain events are stored in a totally shared memory operated upon by each computer only as needed to determine work assignments, and wherein each computer schedules itself, establishing master/slave relationships with other computers for optimum handling of parallel operations. The automatic operating and scheduling control system and process operates in conjunction with the switch interlock to perform its functions and enable true modularity. The truly modular processor system of the invention described hereinabove is of configuration such that hardware failures simply reduces on-line equipment configuration permitting normal operation to continue at a reduced rate. No central elements in this apparatus whose failure could immobilize the entire system need be provided. The modular processing system of the invention described herein reacts instantly to real-time influence, to new programs, to changes in program priorities, and adapts to manual or automatic interrupt signals. The system comprises a memory which is divided into modules which are used concurrently by all computer and I/O control units on I/O exchange busses to provide a shared memory and comprises means to resolve conflicts as to gaining access therein according to priority. In the inventive system disclosed, the modular processor system comprises computers and I/O control units which in turn control input and output units, the system having time-sharing of memory and automatic interrupt capabiilty to recognize programmed and hardware-generated interrupt conditions, manually initiated requests and automated external requests for communication with the computer system. The disclosed inventive system further recognizes equipment faults to cause transfer of control of the interrupted computer from the object program to an AOSP which handles the condition and after the interrupt condition has been satisfied returns control to the program.

The invention described herein thereby provides a modular computer unique in orientation towards both military and industrial applications. The system of the invention incorporates advanced circuitry, packaging and logical techniques. It is adaptable to flexible programming and is provided with an automatic operation and/or scheduling control system and process, the former being operative in normal mode of operation and for running object programs and the latter being operative during a control mode to implement operating and scheduling control and provide servicing to enable substantially continuous operation with a minimum of work stoppage.

Obviously, many modifications and variations of the present invention are possible in the light of the above teachings. It is therefore to be understood that within the scope of the appended claims, the invention may be practiced other than as specifically described and illustrated.

What is claimed is:

1. A modular data processing system, comprising in combination:
- a plurality of identical computer modules,
- a plurality of memory modules,
- a plurality of input-output control modules,
- a bus for connecting each of said input-output control modules to all of said memory modules,
- a plurality of buses for respectively connecting each of said computer modules to each of said memory modules,
- switch interlock means distributed within said memory modules assigning a predetermined priority to said buses over which one of said memory modules happens to be simultaneously addressed,
- each of said computer modules including interrupt means,
- each of said interrupt means responsive to a plurality of interrupt conditions causing its associated computer module to address via one of said plurality of buses a storage location within said memory modules containing a program for servicing the particular interrupt condition to which said interrupt means is responding,
- each of said interrupt means including an interrupt register providing each computer module with the capability of responding to all of said plurality of interrupt conditions,
- mask register means connected to said interrupt register permitting its associated computer module to respond only to selected ones of said interrupt conditions,
- each of said make register means including means for changing one or more of said selected ones of said interrupt conditions to which its associated computer module responds.

2. A modular data processing system according to claim 1 wherein said means comprises a plurality of flip-flops the particular combination of which in the set condition is determinative of the ones of said interrupt conditions to which the associated computer responds.

3. A modular data processing system comprising in combination:
- a plurality of identical computer modules,
- a plurality of memory modules,
- a plurality of input-output control modules,
- means interconnecting said modules to permit communication by said computer modules and said input-output modules with said memory modules,
- said memory modules including storage means storing a list of addresses,
- said memory modules further including a group of storage means at the address location identified by each of said addresses of said list,
- each one of said groups of storage means storing a routine for servicing one of a plurality of possible interrupt conditions,
- each of said computer modules including interrupt means responsive to individual ones of said interrupt conditions to compute the address of the address in said list of addresses which identifies the particular group of storage means containing the routine for servicing the interrupt condition to which said means is responding,
  - said interrupt means further including,
  - an interrupt address register containing the base address of said list of addresses,
  - means providing a constant related to the particular interrupt condition to which said interrupt means is responding,
  - adder means connected to said interrupt address register and said means adding said constant to said base address,
  - a program count register connected to said adder for storing the results of said condition.

4. A modular data processing system according to claim 3 further including means for accessing in said memory modules said group of routines whose address is contained in said program count register.

5. A modular data processing system according to claim 4 wherein each of said interrupt means further includes,
- interrupt register means providing its associated computer module with the capability of responding to all of said plurality of interrupt conditions,
- mask register means connected to said interrupt register means prohibiting its associated computer modules from responding to selected ones of said interrupt conditions,
- each of said mask registers including a plurality of flip-flops whose combination of set conditions is determinative of the ones of said interrupt conditions to which a computer module is prohibited from responding.

6. A modular multiprocessing computer system comprising:

(a) a plurality of identical processor modules, each processor module including, a counter, interrupt register means for registering an unique signal configuration in response to the occurrence of one of a plurality of designated external or internal interrupt conditions in the system, means responsive to the occurrence of one of said interrupt conditions and the setting of one of said interrupt register means for causing the associated one of said processor modules to interrupt its task process being run and to switch to the control mode, means for selectively setting an unique signal configuration in the counter of one of said processors in response to the setting of the processor interrupt register means, (b) at least one input-output control module for controlling communication between the system and a plurality of input-output devices, (c) at least one memory module for storing information data and object program data, said memory module being accessible by all processor modules and input-output modules in the system, (d) control memory storage means remote from said processor modules for storing a plurality of sequences of executive routines and at least one fix-up routine for controlling task processing and system control respectively, and means responsive to the setting of one of said unique interrupt signal configurations in said counter in response to the setting of said interrupt register means for initiating the performance of one of said executive or fix-up routines for handling the particular interrupt conditions.

7. A modular multiprocessing computer system comprising:

(a) a plurality of identical processor modules, each processor module including, a program counter, interrupt register means for storing an unique signal configuration in response to the occurrence of one of a plurality of designated exterior or interior interrupt conditions in the system, an interrupt address register, arithmetic means for combining the selectively settable contents of said interrupt register means with the contents of the programmable settable interrupt address register, and means for selectively setting in the program counter a coded signal corresponding to the combined contents of said interrupt register means and said interrupt address register in response to the occurence of an interrupt condition, and processor mode control means responsive to the setting of said interrupt register means for causing said processor to switch from or to a task processing mode to or from a control operating mode, and (b) at least one input-output control module for controlling communication between said system and one of a plurality of input-output devices, (c) at least one memory module for storing information data and object program data, said memory modules being accessible by all processor modules and input-output modules in the system, (d) control memory storage means remote from said processor modules for storing sequences of executive routines and at least one fix-up routine for controlling system task processing and system control respectively, (e) switch interlock means interconnectable between each of said computer modules, said input-output control modules, said memory modules and said control memory storage means for establishing communication paths therebetween, and (f) means responsive to the setting of the program counter by said arithmetic means in response to the setting of said interrupt register means for establishing access to said control memory means at a predetermined address and for calling forth therefrom the performance of one of said executive routines or said fix-up routine which corresponds to the particular interrupt condition occurrence which set said interrupt register means.

8. A modular multiprocessing computing system comprising:

(a) a plurality of identical processor modules, each processor module including, a program counter, interrupt register means for registering an unique signal configuration in response to the occurrence of one of a plurality of designated external or internal interrupt conditions in the system, an interrupt address register, arithmetic means for combining the selectively settable contents of the interrupt register means with the programmable settable contents of the interrupt address register, means for selectively setting a unique signal configuration in the program counter by the arithmetic means in response to the setting of one of said unique signal configurations in said interrupt register means, fast access memory register means for storing information and data relating to the particular program being processed by said processor module, means responsive to the occurrence of one of said interrupt conditions and the setting of said interrupt register means for causing the processor modules to interrupt its program being run and to switch from the processing mode to the control mode, program data address means responsive to the switching of a processor from or to the control mode for controlling the reading or writing of information from or to the fact access memory register means, (b) at least one input-output control module for controlling communication between the computing system and a plurality of input-output devices, (c) at least one memory module for storing information data and object program data, said memory module being accessible by all processor modules and input-output modules in the system, (d) control memory storage register means remote from said processor modules for storing sequences of executive routines and at least one fix-up routine for controlling task processing and system control respectively, (e) job table storage register means for storing initial or up-dated program identifying data on all programs entered into and operational on by the computing system, (f) switch interlock means interconnectible between each of said processor modules, said input-output modules, said memory modules, said control memory storage means and said job table storage means for establishing communication paths therebetween, (g) means responsive to the setting of said program counter by said arithmetic means in response to the setting of said interrupt register means for providing access to said control memory storage means whereby one of said executive routines or said fix-up routines which correspond to the particular interrupt condition is called forth and initiated, and (h) means responsive to the switching of one of said processors from the process mode to the control mode and said program data address controlling means for transferring the contents of said fast access memory of said processor switched to the control mode to a predetermined address in said job table memory means.

9. The modular multiprocessing computer system defined in claim 7 wherein said control memory storage means and said job table storage means comprise separate blocks of contiguous storage elements in said memory module, said control memory storage means and said job table storage means being addressable only in response to the setting of predetermined signal configurations in said program counter in response to the registering of an interrupt condition in said interrupt register means and each additionally including a memory allocation means for insuring the allocation of the necessary number of contiguous storage elements in each job table storage means to store information withdrawn from said fast access memory means of said processor switched to the control mode in response to the interruption of a program being run by said processor module.

10. A modular data processing system, comprising in combination:

a plurality of substantially identical computer modules,
a plurality of input-output control modules,
a plurality of memory modules, each of said memory modules accessible by said input-output modules and said computer modules,
said memory modules containing a plurality of groups of storage elements, each of said groups storing an interrupt servicing routine,
each of said computer modules including interrupt means responsive to any one of a plurality of interrupt conditions for switching said computer module from a normal mode to a control mode for accessing and processing the interrupt servicing routine contained in the group of storage elements identified by the interrupt condition to which said computer module is responding,
said memory modules containing further storage elements maintaining current records and storage space for each of the programs scheduled for running by said computer modules according to a predetermined priority scheme,
each of said computer modules including transfer means responsive to a shift to the control mode to transfer the pertinent operating instructions and data being processed in the normal mode to said storage space,
each of said computer modules including accessing means responsive to its completion of an interrupt servicing routine to access said further storage elements and resume normal mode processing of the program having the highest priority.

11. A modular data processing system according to claim 10 wherein said interrupt means further comprises, mask register means inhibiting said computer module from responding to selectable ones of said interrupt conditions.

12. A modular data processing system according to claim 11 wherein each of said computers further include, an arithmetic unit comprising at least one operating register,
means connecting said operating register to said mask register means for changing the ones of said interrupt conditions to which said mask register means inhibits said computer module from responding.

13. A modular data processing system according to claim 12 wherein said operating register comprises, a plurality of bit storing units,
said mask register containing a corresponding plurality of bit storing units whose bit states are changeable in accordance with the bit states of respective bit storing units in said operating register in response to preselected types of data being inserted into said operating register.

14. A modular data processing system according to claim 10 wherein each of said computer modules includes, a fast access memory comprising registers for storing necessary data for processing a selected program,
said interrupt means responsive to an interrupt condition to transfer said data in said fast access memory to said further storage elements when the interrupt condition to be serviced requires critical portions of said fast access memory whereby said data is available for processing by others of said computer modules.

15. A data processing module according to claim 14 wherein said means for transferring said data to said further storage elements includes, first register means connected to said fast access memory into which is written segments of data from said fast access memory,
second register means connected to said memory modules,
means connected to said first and second register means for transferring the contents of said first register means to said second register means and thence into an addressed portion of said further storage means.

16. A data processing module according to claim 10 further comprising, table storage means located in said memory modules listing the address of each one of said groups of storage elements,
an interrupt address register containing the base address of said list of addresses,
means providing a constant related to the particular interrupt condition to which said interrupt means is responding,
adder means connected to said interrupt address register and said means adding said constant to said base address,
a program count register connected to said adder for storing the results of said addition.

17. A modular data processing system according to claim 16 further including means for accessing in said memory modules said group of routines whose address is contained in said program count register.

18. A modular data processing system according to claim 10 further including, a clock system permitting the system timing to be taken over by a back-up clock system without the loss of a single clock bit time,
said clock system comprising,
one of said computer modules containing a first master clock running at a first frequency,
one of said memory modules containing a second master clock tuned to run at a second frequency selected so that the difference between the reciprocals of said first and second frequencies is less than one-half bit time of the data processing system,
means connecting said first master clock to said second master clock causing said second master clock to run at said first frequency,
each of said modules containing a slave clock connected to said first and second master clocks,
each of said slave clocks tuned to run synchronously at a third frequency less than said second frequency,
each of said slave clocks containing means for synchronizing itself to said first frequency when said first clock is operative or to said second frequency when said first master clock fails whereby failure of said first master clock or said second master clock does not result in the loss of a single bit time.

19. In a modular data processing system comprising a plurality of computer modules, at least one memory module, at least one input-output control module and switch interlock means interconnectable between each of said computer modules, said memory module and said input-output control module for establishing communication paths therebetween, wherein the improvement comprises, a clock system for permitting the system timing to be taken over by a back-up clock system without the loss of a single clock bit time with, one of said modules containing a first master clock running at a first frequency, another of said modules containing a second master clock tuned to run at a second frequency less than said first frequency, means coupling said first master clock to said second master clock causing said second master clock to run at said first frequency when said first master clock is operative, each of said modules containing a slave clock, each of said slave clocks tuned to run asynchronously at a third frequency less than said second frequency, each of said slave clocks containing means for synchronizing itself to said first frequency when said first master clock is operative and to said second frequency when said first master clock fails whereby failure of said first or second master clock does not result in the loss of a single bit time.

20. In a modular data processing system comprising a plurality of computer modules, a plurality of memory modules, a plurality of input-output control modules and switch interlock means interconnectable between each of said modules for establishing communication paths therebetween, wherein the improvement comprises, a clock system for permitting the system to be taken over a back-up clock system without the loss of a single clock bit time with, one of said computer modules containing a first master clock running at a first frequency, one of said memory modules containing a second master clock tuned to run at a second frequency less than said first frequency, means coupling said first master clock to said second master clock causing said second master clock to run at said first frequency when said first master clock is operative, each of said modules containing a slave clock, said first and second master clocks coupled in parallel to the synchronizing inputs of said slave clocks, each of said slave clocks tuned to run asynchronously at a third frequency less than said second frequency, the difference between said first and second frequency and the difference between said second and third frequency being substantially equal, each of said slave clocks containing means for synchronizing itself to said first frequency when said first master clock is operative and to said second frequency when said first master clock fails whereby failure of said first or said second master clock does not result in the loss of a single bit time.

References Cited

UNITED STATES PATENTS

| | | | |
|---|---|---|---|
| 3,056,110 | 9/1962 | Cypser et al. ------ | 340—172.5 |
| 3,061,192 | 10/1962 | Terzian ------------ | 235—157 |
| 3,108,257 | 10/1963 | Buchholz --------- | 340—172.5 |
| 3,200,380 | 8/1965 | MacDonald ----- | 340—172.5 |

OTHER REFERENCES

Chao, The System Organization of Mobidic B, 1959, Proceedings of the Eastern Joint Computer Conference, pages 101–107.

PAUL J. HENON, *Primary Examiner.*

R. RICKERT, *Assistant Examiner.*

UNITED STATES PATENT OFFICE
CERTIFICATE OF CORRECTION

Patent No. 3,419,849 December 31, 1968

James P. Anderson et al.

It is certified that error appears in the above identified patent and that said Letters Patent are hereby corrected as shown below:

Column 4, line 58, after "Zimmerman" insert -- now U.S. Patent No. 3,274,554, issued Sept. 20, 1966 --. Column 6, line 52, after "Computer System" insert -- now U.S. Patent No. 3,274,554, issued Sept. 20, 1966 --. Column 7, lines 74 and 75, cancel "system control function does the". Column 16, line 21, "regular" should read -- regulator --. Column 18, line 62, cancel "is". Column 19, line 5, "program" should read -- programmer --. Column 20, lines 10 and 11, "operation" should read -- operating --. Column 23, line 18, "TRANSPOSE" should read -- TRANSPOSERS --; line 40, "megacycle" should read -- 3-megacycle --; line 49, "but" should read -- bus --. Column 24, line 66, "deail" should read -- detail --. Column 27, line 7, after "reflection" insert -- back --; line 65, "babase" should read -- base --; line 68, after "volt" insert -- supply is --. Column 31, line 73, cancel "not"; line 75, "outposts" should read -- outputs --. Column 32, line 66, cancel "is". Column 37, line 44, after "Zimmerman" insert -- now U.S. Patent No. 3,274,554, issued Sept. 20, 1966 --; line 56, after "89,525" insert -- , now said U.S. Patent No. 3,274,554, issued Sept. 20, 1966 --. Column 42, line 44, "142" should read -- 143 --. Column 44, line 16, "equipment" should read -- equivalent --. Column 45, line 64, after "syllable" insert -- indicating --. Column 47, lines 21 and 22, cancel "described in the description of FIG. 77 hereinbelow"; lines 27 and 28, cancel "shown in the flow chart of FIG. 77"; line 50, after "73" insert -- of the above-mentioned U.S. Application S.N. 241,273 of Mott et al --; line 54, after "70" insert -- of the above-mentioned application S.N. 241,273 of Mott et al --. Column 51, line 35, "circulator" should read -- circular --. Column 58, line 36, "10150" should read -- 1028 --. Column 59, line 70, "S1012" should read -- 1031 --. Column 65, line 21, "1A" should read -- 5A --. Column 71, line 62, "SWRC" should read -- SWMRC --. Column 74, line 5, "LMIR" should read -- LMIRA --. Column 77, line 29, "A11802" should read -- A11812 --. Column 78, lines 20 and 21, "1013" should read -- 1033 --. Column 82, line 44, "000-010" should read -- 000-101 --. Column 92, line 74, "TEC" should read -- TCB --; same column 92, line 75, and column 93, lines 3, 8 and 11, "523", each occurrence, should read -- 533 --. Column 125, line 67, "teting" should read -- testing --. Column 129, lines 1 to 8, in the example, insert -- loop -- at the end of the example associated with the loop arrow. Column 135, lines 1 and 2, cancel "transfer instructions which upon the occurrence of an event". Column 143, line 2, "reading" should read -- readying --. Column 151, line 22, cancel "a more", second occurrence; line 46, "bits" should read -- this --. Column 156, line 45, "fact" should read -- fast --. Column 158, line 65, "synchronously" should read -- asychronously --. Column 159, line 35, after "over" insert -- by --.

Signed and sealed this 24th day of March 1970.

(SEAL)
Attest:

EDWARD M.FLETCHER,JR.
Attesting Officer

WILLIAM E. SCHUYLER, JR.
Commissioner of Patents